US012470980B2

(12) United States Patent
Kim

(10) Patent No.: US 12,470,980 B2
(45) Date of Patent: Nov. 11, 2025

(54) METHOD AND DEVICE FOR HEADER COMPRESSION OR DECOMPRESSION PROCEDURE SUPPORTING CELL GROUP ACTIVATION OR DEACTIVATION IN NEXT-GENERATION MOBILE COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 335 days.

(21) Appl. No.: 18/150,445

(22) Filed: Jan. 5, 2023

(65) Prior Publication Data

US 2023/0217306 A1 Jul. 6, 2023

(30) Foreign Application Priority Data

Jan. 5, 2022 (KR) .................. 10-2022-0001572

(51) Int. Cl.
*H04W 28/06* (2009.01)
*H04W 12/106* (2021.01)
*H04W 76/19* (2018.01)

(52) U.S. Cl.
CPC ......... *H04W 28/06* (2013.01); *H04W 12/106* (2021.01); *H04W 76/19* (2018.02)

(58) Field of Classification Search
CPC ... H04W 28/06; H04W 76/19; H04W 12/106; H04W 36/0033; H04W 80/02;
(Continued)

(56) References Cited

U.S. PATENT DOCUMENTS

2015/0296414 A1 10/2015 Yi et al.
2017/0331670 A1 11/2017 Parkvall et al.
(Continued)

FOREIGN PATENT DOCUMENTS

WO 2020/139509 A1 7/2020

OTHER PUBLICATIONS

NPL document, TSGRAN; Evolved Universal Terrestrial Radio Access; packet data convergence protocol (PDCP) specification (Release 16) Dec. 23, 2021 (Year: 2021).*
(Continued)

*Primary Examiner* — Mewale A Ambaye
(74) *Attorney, Agent, or Firm* — Jefferson IP Law, LLP

(57) ABSTRACT

The disclosure relates to a 5G or 6G communication system for supporting a higher data transmission rate. A method performed by a terminal in a wireless communication system is provided. The method includes identifying whether a packet data convergence protocol (PDCP) entity is suspended in case that the PDCP entity re-establishment is requested from an upper layer, identifying whether an indicator is configured for indicating that an uplink data compression (UDC) is continuously used and a PDCP service data unit (SDU) is compressed, for an acknowledged mode (AM) data radio bearer (DRB) whose the PDCP entity is not suspended, and submitting the PDCP SDU, in case that the indicator is configured for indicating that the UDC is continuously used and the PDCP SDU is compressed.

10 Claims, 17 Drawing Sheets

(58) Field of Classification Search
CPC ...... H04W 67/52; H04L 47/365; H04L 69/24; H04L 67/60; H04L 69/04
See application file for complete search history.

(56) References Cited

U.S. PATENT DOCUMENTS

| | | | |
|---|---|---|---|
| 2018/0124865 A1* | 5/2018 | Lee | H04W 8/04 |
| 2019/0149421 A1* | 5/2019 | Jin | H04W 36/305 370/331 |
| 2022/0053367 A1* | 2/2022 | Rao | H04L 1/188 |
| 2022/0295345 A1* | 9/2022 | Trim | H04W 28/06 |
| 2023/0116955 A1* | 4/2023 | Zhang | H04W 36/00698 370/331 |
| 2023/0189066 A1* | 6/2023 | Kim | H04W 76/19 |
| 2024/0080919 A1* | 3/2024 | Kuo | H04W 76/15 |

OTHER PUBLICATIONS

Extended European Search Report dated Jan. 17, 2025, issued in a European Patent Application No. 23737396.4.

CATT et al., "Introduction of UDC in NR", 3GPP Draft; 3GPP TSG-RRAN2 Meeting # 107; R2-1909915, XP051767706, Aug. 16, 2019, Prague, Czech Republic.

3GPP; TSGRAN; Evolved Universal Terrestrial Radio Access (E-UTRA); Packet Data Convergence Protocol (PDCP) specification (Release 16), 3GPP TS 36.323 V16.5.0, Dec. 23, 2021.

International Search Report dated Apr. 11, 2023, issued in International Patent Application No. PCT/KR2023/000199.

3GPP TS 38.321 V16.7.0, 3rd Generation Partnership Project; Technical Specification Group Radio Access Network; NR; Medium Access Control (MAC) protocol specification (Release 16) Dec. 2021.

3GPP TS 38.323 V16.6.0, 3rd Generation Partnership Project; Technical Specification Group Radio Access Network; NR; Packet Data Convergence Protocol (PDCP) specification (Release 16) Dec. 2021.

Samsung, [AT116-e][221][R17 DCCA] UP issues for SCG deactivation, 3GPP TSG-RAN WG2 #116e, R2-2111314, Nov. 2021.

Samsung, [AT115-e][220][R17 DCCA] Bearer handling of SCG deactivation, 3GPP TSG-RAN WG2 #115e, R2-2108862, Aug. 2021.

* cited by examiner

METHOD AND DEVICE FOR HEADER COMPRESSION OR DECOMPRESSION PROCEDURE SUPPORTING CELL GROUP ACTIVATION OR DEACTIVATION IN NEXT-GENERATION MOBILE COMMUNICATION SYSTEM

CROSS-REFERENCE TO RELATED APPLICATION(S)

This application is based on and claims priority under 35 U.S.C. § 119(a) of a Korean patent application number 10-2022-0001572, filed on Jan. 5, 2022, in the Korean Intellectual Property Office, the disclosure of which is incorporated by reference herein in its entirety.

BACKGROUND

1. Field

The disclosure relates to a wireless communication system. More particularly, the disclosure relates to a method and a device capable of rapidly activating a cell in a wireless communication system or a mobile communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

With the recent development of communication systems, the demand for methods for activating cells more rapidly is increasing day by day.

The above information is presented as background information only to assist with an understanding of the disclosure. No determination has been made, and no assertion is made, as to whether any of the above might be applicable as prior art with regard to the disclosure.

SUMMARY

In a next-generation mobile communication system, carrier aggregation (CA) or dual connectivity (DC) may be used to provide a terminal with a service having a high data transmission rate and a low transmission delay. However, there is a need for a method for preventing a processing delay that may occur when carrier aggregation or dual connectivity is configured and activated for a terminal connected to a network, or when carrier aggregation or dual connectivity is used and then deactivated. In particular, if a terminal maintains multiple cells in an activated state to use carrier aggregation or dual connectivity, the terminal needs to perform control channel monitoring for each cell, and thus battery consumption of the terminal may be severe. On the other hand, if the terminal maintains the multiple cells in a deactivated state to reduce battery consumption of the terminal, a data transmission/reception delay may occur due to a delay occurring when the multiple cells are activated to use carrier aggregation or dual connectivity.

In the disclosure, a cell may refer to a primary cell (PCell), a secondary cell (SCell) (e.g., SCell configured in a master cell group (MCG)), a primary secondary cell (PSCell) (e.g., PCell of a secondary cell group (SCG)), or an SPCell (e.g., SCell configured in a secondary cell group (SCG)).

Aspects of the disclosure are to address at least the above-mentioned problems and/or disadvantages and to provide at least the advantages described below. Accordingly, an aspect of the disclosure is to provide a data transmission/reception delay that can be reduced by reducing a delay required for cell activation.

Another aspect of the disclosure is to provide a new dormant mode, suspension mode, or deactivation mode so that a radio resource control (RRC) connected terminal, for which a connection to a network is configured, can rapidly activate and deactivate carrier aggregation or dual connectivity in next-generation mobile communication system.

Another aspect of the disclosure is to provide a method capable of operating a new dormant (hibernation, dormancy, or suspension) mode in a bandwidth part level (BWP-level), a cell level, or a cell group level (e.g., with respect to a secondary cell group). Based on the proposal, carrier aggregation or dual connectivity can be rapidly activated, and the battery power of a terminal can be saved.

Additional aspects will be set forth in part in the description which follows and, in part, will be apparent from the description, or may be learned by practice of the presented embodiments.

In addition, when a base station indicates a terminal to activate a cell (PCell, PSCell, or SCell), the base station can temporarily configure, allocate, or send a large number of transmission resources enabling the terminal to perform channel measurement, so that the terminal can rapidly activate the cell or cell group, based on the channel measurement or by quickly reporting a result of the channel measurement to the base station.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
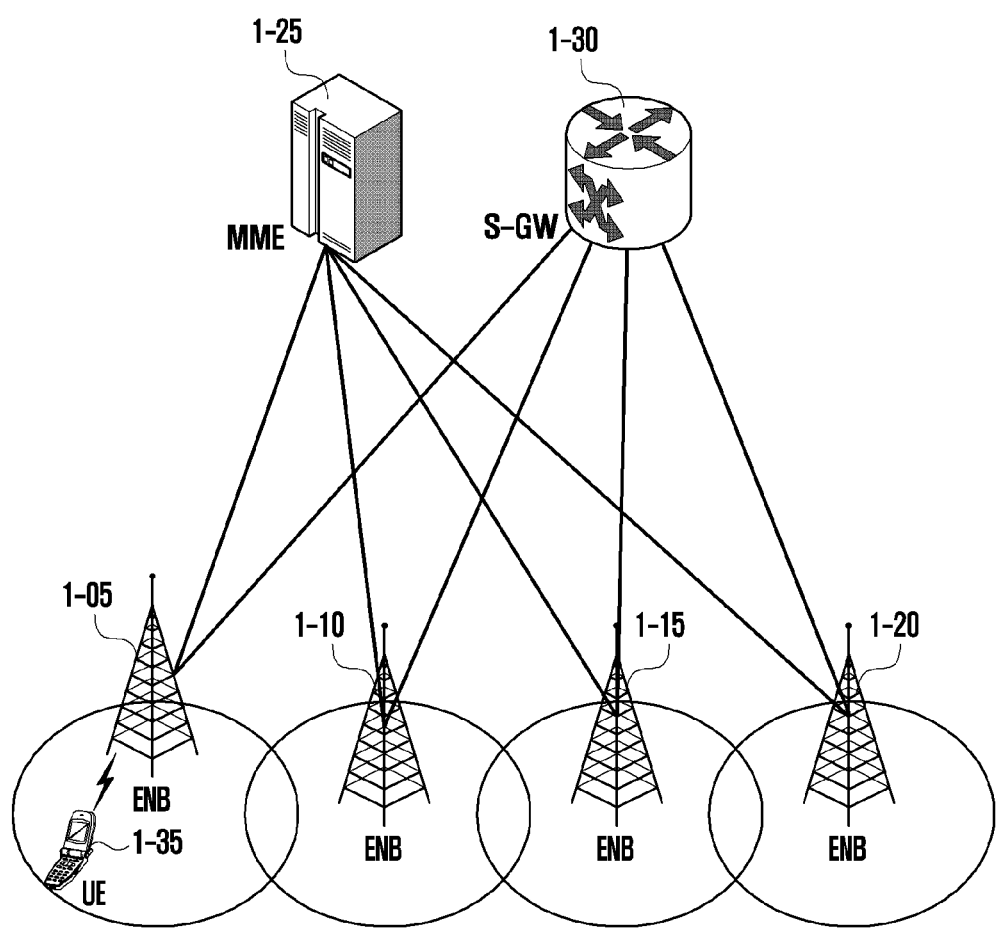
FIG. 1 is a diagram illustrating a structure of an LTE system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) or new radio (NR) standards for the convenience of description. However, the disclosure is not limited by these terms and names, and may be applied in the same way to systems that conform other standards.

In the disclosure, a terminal may refer to a user device, a stationary terminal, a mobile terminal, or the like. In the disclosure, a base station may refer to a stationary base station, a mobile base station, a Node B (NB), an evolved Node B (eNB), a next generation Node B (gNB), a transmission and reception point (TRP), or the like. In the following description, the term "eNB" may be interchangeably used with the term "gNB" for the convenience of description. For example, a base station described as "eNB" may indicate "gNB".

FIG. 1 is a diagram illustrating a structure of an LTE system according to an embodiment of the disclosure.

Referring to FIG. 1, as illustrated, a radio access network of an LTE system includes next-generation base stations (evolved Node B, hereinafter, ENB, Node B, or base station) 1-05, 1-10, 1-15, and 1-20, a mobility management entity (MME) 1-25, and a serving-gateway (S-GW) 1-30. A user terminal (user equipment, hereinafter, UE or terminal) 1-35 accesses an external network via the ENBs 1-05 to 1-20 and the S-GW 1-30.

In FIG. 1, the ENBs 1-05 to 1-20 correspond to existing Node Bs of a UMPS system. The ENBs are connected to the UE 1-35 via a radio channel and perform more complex roles compared to the existing Node Bs. In the LTE system, all user traffic including a real-time service, such as voice over IP (VoIP) via the Internet protocol, is serviced through a shared channel so that a device which collects state information, such as buffer states, available transmission power states, and channel states of the UEs, so as to perform scheduling is required, and the ENBs 1-05 to 1-20 take on the role of the device. A single ENB typically controls multiple cells. For example, in order to implement a transmission rate of 100 Mbps, the LTE system uses, for example, orthogonal frequency division multiplexing (hereinafter, referred to as OFDM) as a radio access technology in a 20 MHz bandwidth. Further, an adaptive modulation & coding (hereinafter, referred to as AMC) scheme that determines a modulation scheme and a channel coding rate according to a terminal channel state is applied. The S-GW 1-30 is a device configured to provide a data bearer, and generates or removes a data bearer under control of the MME 1-25. The MME is a device that is in charge of various control functions as well as a mobility management function for a terminal, and is connected to multiple base stations.

Figure 2:
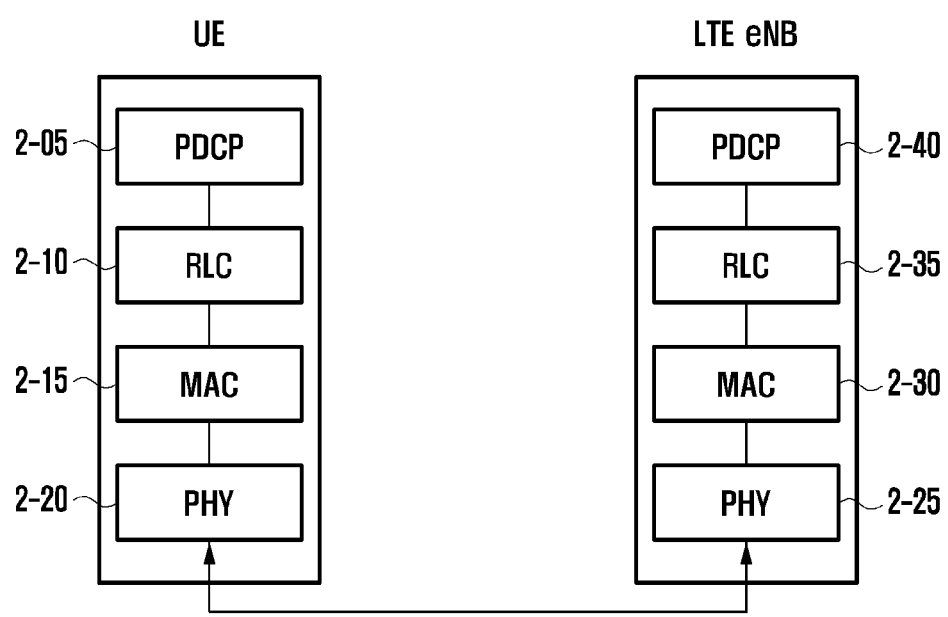
FIG. 2 is a diagram illustrating a radio protocol structure in an LTE system according to an embodiment of the disclosure.

FIG. 2 is a diagram illustrating a radio protocol structure in an LTE system according to an embodiment of the disclosure.

Referring to FIG. 2, radio protocols of the LTE system include packet data convergence protocols, (PDCPs) 2-05 and 2-40, radio link controls (RLCs) 2-10 and 2-35, and medium access controls (MAC) 2-15 and 2-30 in a terminal and an eNB, respectively. The packet data convergence protocols (PDCP) 2-05 and 2-40 are in charge of operations, such as IP header compression/restoration. Main functions of the PDCPs are summarized as follows.

Header compression and decompression function (ROHC only)
    User data transmission function (transfer of user data)
    Sequential delivery function (in-sequence delivery of upper layer PDUs at PDCP re-establishment procedure for RLC AM)
    Reordering function (for split bearers in DC (only support for RLC AM): PDCP PDU routing for transmission and PDCP PDU reordering for reception)
    Duplicate detection function (duplicate detection of lower layer SDUs at PDCP re-establishment procedure for RLC AM)
    Retransmission function (retransmission of PDCP SDUs at handover and, for split bearers in DC, of PDCP PDUs at PDCP data-recovery procedure, for RLC AM)
    Encryption and decryption function (ciphering and deciphering)
    Timer-based SDU discard function (timer-based SDU discard in uplink)

Radio link controls (hereinafter, referred to as RLCs) 2-10 and 2-35 reconfigure a PDCP protocol data unit (PDU) or an RLC service data unit (SDU) to an appropriate size so as to perform ARQ operation and the like. Main functions of the RLCs are summarized as follows.

Data transmission function (transfer of upper layer PDUs)
    ARQ function (error correction through ARQ (only for AM data transfer))
    Concatenation, segmentation, and reassembly function (concatenation, segmentation, and reassembly of RLC SDUs (only for UM and AM data transfer))
    Re-segmentation function (re-segmentation of RLC data PDUs (only for AM data transfer))
    Reordering function (reordering of RLC data PDUs (only for UM and AM data transfer)
    Duplicate detection function (only for UM and AM data transfer)
    Error detection function (protocol error detection (only for AM data transfer))
    RLC SDU discard function (only for UM and AM data transfer)
    RLC re-establishment function The MAC 2-15 and 2-30 are connected to multiple RLC layer devices included in one terminal, and perform multiplexing of RLC PDUs to an MAC PDU and demultiplexing of the RLC PDUs from the MAC PDU. Main functions of the MACs are summarized as follows.

Mapping function (mapping between logical channels and transport channels)
    Multiplexing and demultiplexing function (multiplexing/demultiplexing of MAC SDUs belonging to one or different logical channels into/from transport blocks (TB) delivered to/from the physical layer on transport channels)
    Scheduling information reporting function
    HARQ function (error correction through HARQ)
    Function of priority handling between logical channels (priority handling between logical channels of one UE)
    Function of priority handling between terminals (priority handling between UEs by means of dynamic scheduling)
    MBMS service identification function
    Transmission format selection function (transport format selection)
    Padding function Physical layers 2-20 and 2-25 perform channel-coding and modulation of higher layer data, and make the same into OFDM symbols and transmit the OFDM symbols via a radio channel, or demodulate and channel-decode the OFDM symbols received via the radio channel and deliver the same to a higher layer.

Figure 3:
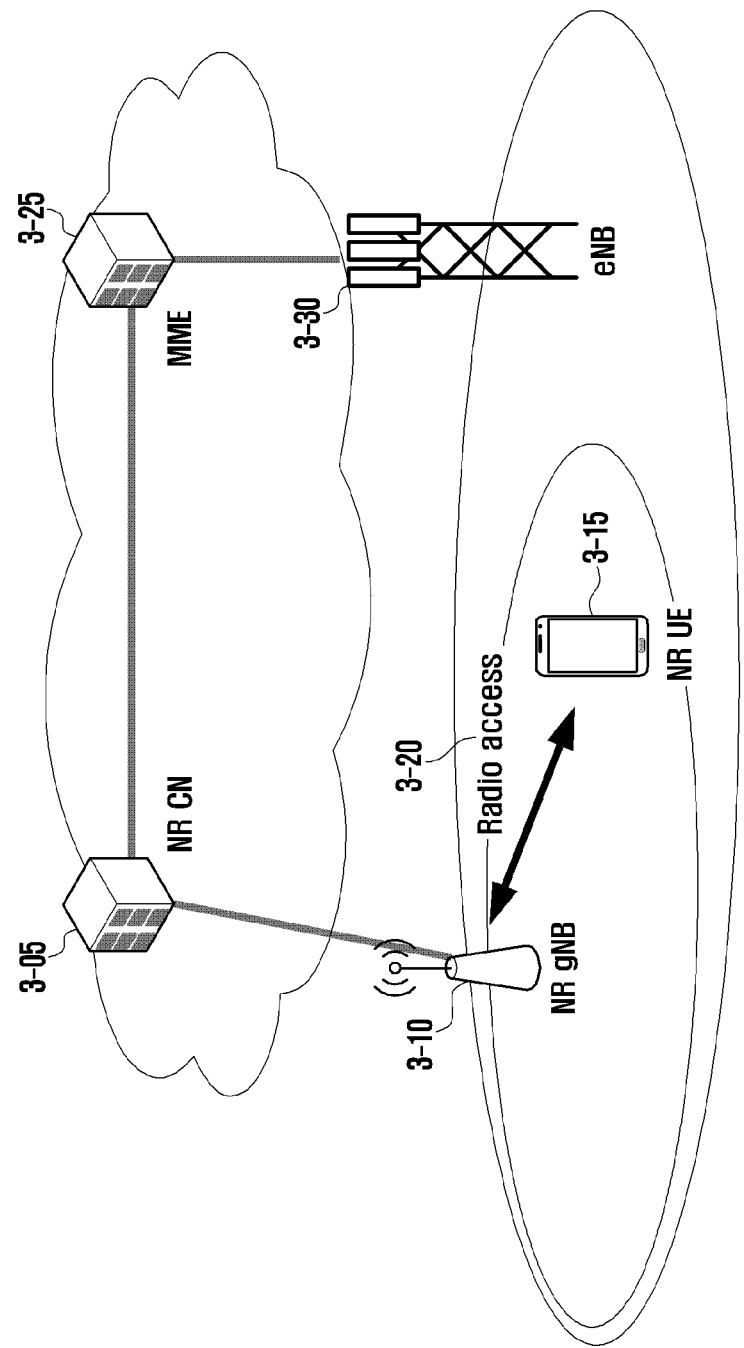
FIG. 3 is a diagram illustrating a structure of a next-generation mobile communication system according to an embodiment of the disclosure.

FIG. 3 is a diagram illustrating a structure of a next-generation mobile communication system according to an embodiment of the disclosure.

Referring to FIG. 3, as illustrated, a radio access network of the next-generation mobile communication system (hereinafter, NR or 5G) includes a next-generation base station (new radio Node B, hereinafter, NR gNB or NR base station) 3-10 and a new radio core network (NR CN) 3-05. A user terminal (new radio user equipment, hereinafter, NR UE or terminal) 3-15 accesses an external network via the NR gNB 3-10 and the NR CN 3-05 when within a radio access area 3-20.

In FIG. 3, the NR gNB 3-10 corresponds to an evolved Node B (eNB) of an existing LTE system. The NR gNB may be connected to the NR UE 3-15 via a radio channel and may provide a more superior service compared to an existing Node B. In the next generation mobile communication system, because all user traffic is serviced through a shared channel, a device which collects state information, such as buffer states, available transmission power states, and channel states of UEs, to perform scheduling is necessary, and the NR NB 3-10 takes on the role of such a device. A single NR gNB typically controls multiple cells. In order to implement ultra-high-speed data transmission compared to the current LTE, an existing maximum bandwidth or greater may be available, and a beamforming technology may be additionally combined by using an orthogonal frequency division multiplexing (OFDM) scheme as a radio access technology. Further, an adaptive modulation & coding (hereinafter, referred to as AMC) scheme that determines a modulation scheme and a channel coding rate according to a terminal channel state is applied. The NR CN 3-05 performs functions, such as mobility support, bearer configuration, and QoS configuration. The NR CN is a device that is in charge of various control functions as well as a mobility management function for a terminal, and is connected to multiple base stations. Further, the next-generation mobile communication system may be linked to an existing LTE system, and the NR CN is connected to an MME 3-25 via a network interface. The MME is connected to an eNB 3-30 that is an existing base station.

Figure 4:
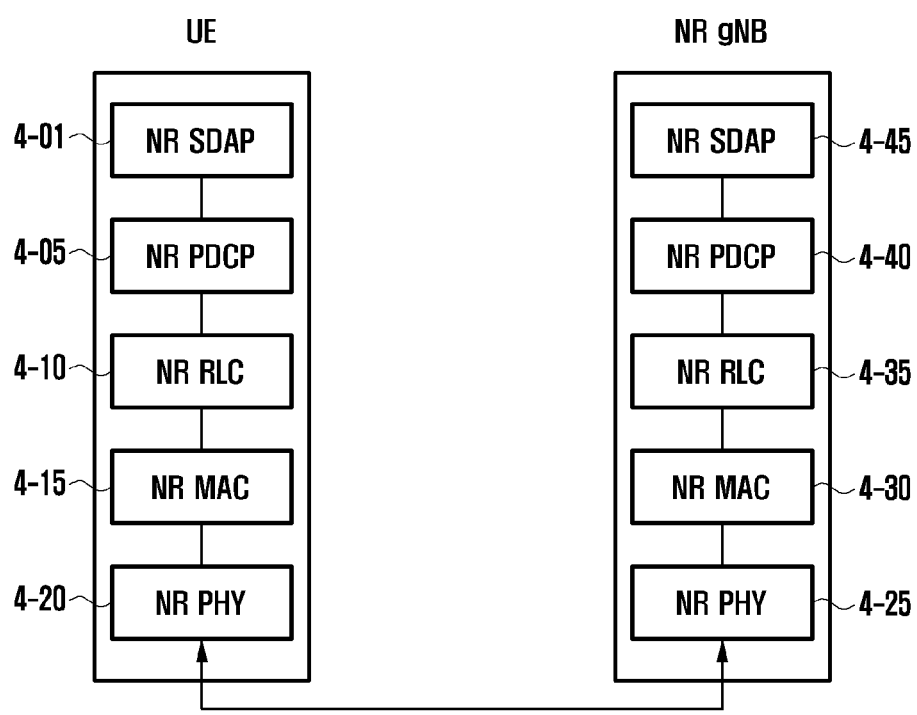
FIG. 4 is a diagram illustrating a radio protocol structure of a next-generation mobile communication system according to an embodiment of the disclosure.

FIG. 4 is a diagram illustrating a radio protocol structure of a next-generation mobile communication system according to an embodiment of the disclosure.

Referring to FIG. 4, a radio protocol of the next-generation mobile communication system may include NR SDAPs 4-01 and 4-45, NR PDCPs 4-05 and 4-40, NR RLCs 4-10 and 4-35, and NR MACs 4-15 and 4-30 in a terminal and an NR base station, respectively.

Main functions of the NR SDAPs 4-01 and 4-45 may include some of the following functions.
   User data transfer function (transfer of user plane data)
   Function of mapping a QoS flow and a data bearer for an uplink and a downlink (mapping between a QoS flow and a DRB for both DL and UL)
   Function of marking a QoS flow ID in an uplink and a downlink (marking QoS flow ID in both DL and UL packets)
   Function of mapping reflective QoS flows to data bearers for uplink SDAP PDUs (reflective QoS flow to DRB mapping for the UL SDAP PDUs)

With respect to an SDAP layer device, the terminal may be configured, via an RRC message, whether to use a header of the SDAP layer device or whether to use a function of the SDAP layer device for each PDCP layer device, for each bearer, or for each logical channel, and if the SDAP header is configured, a NAS QoS reflection configuration 1-bit indicator (NAS reflective QoS) and an AS QoS reflection configuration 1-bit indicator (AS reflective QoS) in the SDAP header may indicate the terminal to update or reconfigure mapping information for data bearers and QoS flows in an uplink and a downlink. The SDAP header may include QoS flow ID information indicating QoS. The QoS information may be used as a data processing priority, scheduling information, etc. to support a smooth service.

Main functions of the NR PDCPs 4-05 and 4-40 may include some of the following functions.
   Header compression and decompression function (ROHC only)
   User data transmission function (transfer of user data)
   Sequential delivery function (in-order delivery of upper layer PDUs)
   Non-sequential delivery function (out-of-order delivery of upper layer PDUs)
   Reordering function (PDCP PDU reordering for reception)
   Duplicate detection function (duplicate detection of lower layer SDUs)
   Retransmission function (retransmission of PDCP SDUs)
   Encryption and decryption function (ciphering and deciphering)
   Integrity protection and verification function
   Timer-based SDU discard function (timer-based SDU discard in uplink)

In the above, the reordering function of an NR PDCP device refers to a function of reordering PDCP PDUs received in a lower layer, in the order based on PDCP sequence numbers (SN), may include a function of delivering data to a higher layer in the rearranged order or may include a function of directly delivering data without considering the order, may include a function of rearranging the order and recording lost PDCP PDUs, may include a function of reporting states of the lost PDCP PDUs to a transmission side, and may include a function of requesting to retransmit the lost PDCP PDUs.

Main functions of the NR RLCs 4-10 and 4-35 may include some of the following functions.
   Data transmission function (transfer of upper layer PDUs)
   Sequential delivery function (in-order delivery of upper layer PDUs)
   Non-sequential delivery function (out-of-order delivery of upper layer PDUs)
   ARQ function (error correction through ARQ)
   Concatenation, segmentation, and reassembly function (concatenation, segmentation and reassembly of RLC SDUs)
   Re-segmentation function (re-segmentation of RLC data PDUs)
   Reordering function (reordering of RLC data PDUs)
   Duplicate detection function
   Error detection function (protocol error detection)
   RLC SDU discard function
   RLC re-establishment function In the above, the in-order delivery function of an NR RLC device refers to a function of delivering RLC SDUs, which are received from a lower layer, to a higher layer in order, wherein the in-order delivery function may include a function of, when originally one RLC SDU is divided into multiple RLC SDUs and then received, reassembling the divided RLC SDUs and delivering the same, may include a function of reordering the received RLC PDUs based on RLC sequence numbers (SNs) or PDCP sequence numbers (SNs), may include a function of rearranging the order and recording lost RLC PDUs, may include a function of reporting states of the lost RLC PDUs to a transmission side, may include a function of requesting to retransmit the lost RLC PDUs, and may include a function of, when there are lost RLC SDUs, delivering only RLC SDUs before the lost RLC SDUs to a higher layer in order. Alternatively, the in-order delivery function may include a function of, although there is a lost RLC SDU, if a predetermined timer has expired, delivering all RLC SDUs received before starting of the timer to a higher layer in order, or may include a function of, although there is a lost RLC SDU, if a predetermined timer has expired, delivering all RLC SDUs received up to the present time to a higher layer in order. In the above, the RLC PDUs may be processed in the order of reception thereof (in the order of arrival regardless of the order of the sequence numbers) and delivered to the PDCP device regardless of the order (out-of-order delivery), and in a case of segments, segments stored in a buffer or to be received at a later time may be received, reconfigured into one complete RLC PDU, processed, and then delivered to the PDCP device. The NR RLC layer may not include a concatenation function, and the function may be performed in an NR MAC layer or may be replaced with a multiplexing function of the NR MAC layer. In the above, whether to perform the in-order delivery function or the out-of-order delivery function may be configured via an RRC message.

In the above, the out-of-sequence delivery function of the NR RLC device refers to a function of delivering RLC SDUs received from a lower layer to an immediate higher layer regardless of the order, may include a function of, when originally one RLC SDU is divided into multiple RLC SDUs and received, reassembling and delivering the received RLC SDUs, and may include a function of storing the RLC SNs or PDCP SNs of the received RLC PDUs, arranging the order thereof, and recording lost RLC PDUs.

The NR MAC 4-15 or 4-30 may be connected to multiple NR RLC layer devices included in one terminal, and main functions of the NR MAC may include some of the following functions.

Mapping function (mapping between logical channels and transport channels)
Multiplexing and demultiplexing function (multiplexing/demultiplexing of MAC SDUs)
Scheduling information reporting function
HARQ function (error correction through HARQ)
Function of priority handling between logical channels (priority handling between logical channels of one UE)
Function of priority handling between terminals (priority handling between UEs by means of dynamic scheduling)
MBMS service identification function
Transmission format selection function (transport format selection)
Padding function NR PHY layers 4-20 and 4-25 may perform channel coding and modulation of higher layer data, make the same into OFDM symbols, and transmit the OFDM symbols via a radio channel, or may perform demodulation and channel decoding of the OFDM symbols received via a radio channel and deliver the same to a higher layer.

The next-generation mobile communication system may use a very high frequency band, and thus a frequency bandwidth may also be very wide. However, supporting all of very wide bandwidths in terminal implementation requires high implementation complexity and incurs high costs. Therefore, in the next-generation mobile communication system, the concept of a bandwidth part (BWP) may be introduced, wherein multiple bandwidth parts (BWP) may be configured in one cell (SPcell or SCell), and data may be transmitted or received in one or multiple bandwidth parts according to an indication of a base station.

When a dormant bandwidth part proposed in the disclosure is introduced, the disclosure proposes a specific operation and method of state shifting or bandwidth part switching in consideration of a state of an SCell and multiple bandwidth parts configured for the SCell. In addition, the disclosure proposes each of a bandwidth part switching method and a method of managing a dormant mode according to a bandwidth part level (BWP-level) and performing state shifting, and proposes a specific bandwidth part operation according a state of each SCell or a state or mode (active, deactivated, or dormant) of each bandwidth part. In addition, in order to rapidly activate a cell (SCell) or a bandwidth part, first channel measurement configuration information for the cell or the bandwidth part is configured via an RRC message or a MAC CE, and a terminal is be indicated, via the RRC message or the MAC CE, to apply and use (activate) the first channel measurement configuration information so that the terminal may rapidly measure a channel signal (e.g., a reference signal) for the cell or the bandwidth part, and may rapidly report a measurement result to a base station so as to rapidly activate the cell or the bandwidth part. In the above, activating of the cell or the bandwidth part may refer to procedures in which the terminal monitors a physical downlink control channel (PDCCH) in the cell or the bandwidth part, the base station transmits the PDCCH to the terminal, the base station transmits downlink data (physical downlink shared channel (PDSCH)) to the terminal, the terminal transmits uplink data (physical uplink shared channel (PUSCH)), the terminal transmits a measurement result, a hybrid automatic repeat request (HARQ) acknowledgment (ACK), or a negative acknowledgment (NACK) via a physical uplink control channel (PUCCH), the terminal transmits a sounding reference signal (SRS), the terminal measures a channel measurement signal (synchronization signal block (SSB), channel state information reference signal (CSI-RS), or reference signal (RS)) transmitted by the base station, or the terminal measures the channel measurement signal transmitted by the base station and reports a result thereof.

In the above, the first channel measurement configuration information may include configuration information, from the base station, for a channel measurement signal for a specific terminal (or terminals) in the cell or bandwidth part. For example, the first channel measurement configuration information may include a cycle of the channel measurement signal, the number of signal transmissions, a period in which the signal is transmitted, an offset for the time at which the signal is transmitted, a duration between transmitted signals, a list of multiple transmittable channel measurement signals, a time transmission resource (or frequency transmission resource) indicating a location of the signal to be transmitted, a transmission resource (time transmission resource or frequency transmission resource) for reporting of a measurement result, a cycle of reporting the measurement result, or the like. In the above, the first channel measurement configuration information configured via the RRC message may include multiple pieces of channel measurement signal information, and beam configuration information or one piece of channel measurement signal information among the multiple pieces of channel measurement signal information configured in the above via the RRC message, MAC control element (CE), or downlink control information (DCI) is indicated, so that the terminal may perform channel measurement or channel measurement reporting by applying or using the indicated beam configuration information or channel measurement signal information. As another method, by configuring or indicating the channel measurement signal information via the RRC message or MAC CE, the terminal may perform channel measurement or channel measurement reporting by applying or using the configured (or indicated) channel measurement signal information. The first channel measurement configuration information may be configured differently for each cell or each bandwidth part with respect to multiple cells or bandwidth parts configured by the RRC message, and in order to support the terminal to easily measure the transmission resources for channel measurement, beam-related configuration information (transmission configuration indication (TCI) state or Quasi Co-Location (QCL)), such as a beam direction, a beam number, or a beam location, may be configured together. In the first channel measurement configuration information, a timing advance (TA) value (or offset value) for synchronization of a downlink signal of the base station or an uplink signal of the base station, a timer (time alignment timer (TAT)) indicating validity of the TA value, or a timer value (TAT value) is configured, so that channel measurement or channel measurement reporting may be performed properly.

The first channel measurement configuration information proposed in the disclosure may be available for configuration of only downlink bandwidth part configuration information for each cell. For example, the first channel measurement configuration information proposed in the disclosure may not be available for configuration of uplink bandwidth part configuration information for each cell. This is because, only after first measuring a downlink channel and then reporting a measurement result of the channel or cell, the terminal may be able to correctly receive a PDCCH and follow the indication of the base station.

The first channel measurement configuration information proposed in the disclosure may be initially deactivated when configured via an RRC message or after handover, and may be activated later by MAC control information, DCI information of a PDCCH, or an RRC message, which will be proposed later in this disclosure. When the configuration is performed via an RRC message as in the above, the base station may easily manage a cell state or channel measurement of the terminal only when an initial state is a deactivated state, and a timing of when and how the terminal is to perform channel measurement may be accurately performed without a processing delay problem of the RRC message.

In the disclosure, multiple bandwidth parts are configured in one cell (Spcell, Pcell, Pscell, or Scell) for each downlink or each uplink, and an active bandwidth part (active DL or UL BWP), a dormant bandwidth part (dormant BWP or dormant DL BWP), or a deactivated bandwidth part (inactive or deactivated DL/UL BWP) may be configured and operated via bandwidth part switching. For example, a data transmission rate may be increased by a method similar to carrier aggregation by shifting a downlink or uplink bandwidth part to an activated state for the one cell, the downlink bandwidth part may be shifted or switched to a dormant bandwidth part to prevent the terminal from monitoring the cell, thereby reducing battery consumption, and the terminal may perform channel measurement for the downlink bandwidth part and report a channel measurement result, so as to support rapid activation of the cell or bandwidth part. Battery consumption of the terminal may be reduced by shifting the downlink (or uplink) bandwidth part to a deactivated state in the one cell. In the above, a state shift indication or a bandwidth part switching indication for each bandwidth part in each cell may be configured or indicated via an RRC message, an MAC CE, or DCI of the PDCCH.

The dormant bandwidth part may be extended and applied to dual connectivity, and may be applied to, for example, a PSCell of a secondary cell group. As another method, by extension to the concept of cell group suspension or cell group deactivation, cell group suspension or deactivation may be indicated to one cell group (e.g., secondary cell group) of a terminal for which dual connectivity has been configured, and data transmission or reception is suspended, PDCCH monitoring is suspended, or PDCCH monitoring is intermittently performed based on a very long cycle in the indicated cell group, so that power consumption of the terminal can be reduced. If the cell group suspension or deactivation is indicated to the terminal, the terminal may perform channel measurement in a cell group for which the cell group suspension or deactivation has been indicated, and may report a channel measurement result to a network (e.g., to a master cell group or a secondary cell group), so as to support rapid activation of dual connectivity. With respect to the cell group for which cell group suspension or deactivation has been indicated, the terminal may perform procedures as described above or may maintain and store the cell group configuration information without discarding or clearing the same, or the cell group configuration information may be restored according to a cell group activation or resumption indication from the network. For example, the cell group configuration information (e.g., configuration information, bearer configuration information, or cell-specific configuration information of each of PDCP, RLC, or MAC layer) configured for the terminal may be stored or maintained as it is. However, if the cell group is suspended or deactivated, the bearers or an RLC bearer of the bearers may be suspended, or transmission (or data transmission, for example, SCG transmission) may be suspended in the cell group. If cell group resumption or activation is indicated to the cell group for which cell group suspension or deactivation has been indicated, the terminal may resume, restore, or re-apply configuration information of the cell group, and may resume transmission (e.g., SCG transmission) for the bearer, the RLC bearer, or the cell group, restart data transmission or reception, restart PDCCH monitoring, perform channel measurement reporting, or reactivate configured transmission resources periodically.

In the above, when the cell group is suspended or deactivated, suspending the bearer (bearer using an RLC UM mode or bearer using an RLC AM mode) may refer to suspending the PDCP layer device or the RLC layer device (or suspending data transmission or reception or data processing), and transmitting (or receiving) no data for the bearer (or corresponding to a logical channel identifier corresponding to the bearer) in the MAC layer device (or not selecting the logical channel identifier as a target in a logical channel prioritization (LCP) procedure). For suspending of the PDCP layer device, embodiments specifically proposed in the following of the disclosure may be applied.

In the above, when the cell group is suspended or deactivated, suspending the RLC bearer (RLC bearer using an RLC UM mode or RLC bearer using an RLC AM mode) may refer to suspending the RLC layer device (or suspending data transmission or reception or data processing), and transmitting (or receiving) no data for the bearer (or corresponding to a logical channel identifier corresponding to the bearer) in the MAC layer device (or not selecting the logical channel identifier as a target in a logical channel prioritization (LCP) procedure). In the above, suspending the RLC bearer may refer to that the PDCP layer device connected to the RLC layer device may continue data processing. For example, the PDCP layer device connected to the suspended RLC bearer may process and transmit data or may receive and process data via another RLC bearer (e.g., an RLC bearer belonging to a cell group (e.g., MCG) different from the cell group (e.g., SCG)).

In the above, when the cell group is suspended or deactivated, suspending transmission to the cell group (e.g., SCG transmission) may refer to transmitting (or receiving) no data for the bearer (or corresponding to a logical channel identifier corresponding to the bearer) belonging to the cell group in the MAC layer device (or not selecting the logical channel identifier as a target in a logical channel prioritization (LCP) procedure). However, suspending transmission to the cell group (e.g., SCG transmission) may refer to that data processing or data pre-processing is possible in the PDCP layer device or the RLC layer device. For example, although data (or uplink data) of a higher layer device is not transmitted in the cell group, data processing may be performed in advance for transmission in the PDCP layer device, the RLC layer device, or the MAC layer device.

In the above, when the cell group is resumed or activated, resuming the bearer (bearer using an RLC UM mode or bearer using an RLC AM mode) may refer to resuming the PDCP layer device or the RLC layer device (or resuming data transmission or reception or data processing), and transmitting (or receiving) data for the bearer (or corresponding to a logical channel identifier corresponding to the bearer) in the MAC layer device (or selecting the logical channel identifier as a target in a logical channel prioritization (LCP) procedure).

In the above, when the cell group is resumed or activated, resuming the RLC bearer (RLC bearer using an RLC UM mode or RLC bearer using an RLC AM mode) may refer to resuming the RLC layer device (or resuming data transmission or reception or data processing), and transmitting (or receiving) data for the bearer (or corresponding to a logical channel identifier corresponding to the bearer) in the MAC layer device (or selecting the logical channel identifier as a target in a logical channel prioritization (LCP) procedure). In the above, resuming the RLC bearer may refer to delivering data to the PDCP layer device connected to the RLC layer device or receiving data from the PDCP layer device.

In the above, when the cell group is resumed or activated, resuming transmission to the cell group (e.g., SCG transmission) may refer to transmitting (or receiving) data for the bearer (bearer using an RLC UM mode or bearer using an RLC AM mode) belonging to the cell group (or corresponding to a logical channel identifier corresponding to the bearer) in the MAC layer device (or selecting the logical channel identifier as a target in a logical channel prioritization (LCP) procedure). However, resuming transmission to the cell group (e.g., SCG transmission) may refer to that data processing or data pre-processing is possible in the PDCP layer device or the RLC layer device. For example, data (or uplink data) of a higher layer device may be transmitted in the cell group, and data processing may be performed in advance for transmission in the PDCP layer device, the RLC layer device, or the MAC layer device.

As another method, when the cell group is suspended or deactivated in the above, a bearer (or RLC bearer) using an RLC UM mode may be suspended to suspend the PDCP layer device or the RLC layer device so that data transmission or reception or data processing may be suspended, or data transmission or reception may be suspended in the MAC layer device. However, with respect to a bearer (or RLC bearer) using an RLC AM mode, transmission to the cell group may be suspended so that data processing can be continuously performed for the PDCP layer device or the RLC layer device, or data transmission or reception may be suspended in the MAC layer device. This is because, if a security key is changed, in PDCP re-establishment, there is retransmission (or regeneration) for an RLC AM bearer (therefore, if the security key is not changed, a data processing rate may be increased, and if the security key is changed, data loss does not occur due to retransmission (or regeneration)), but there is no retransmission (or regeneration) for an RLC UM bearer so that, if data processing is performed in advance in the RLC UM bearer, data loss may occur within the terminal (if the security key is not changed, a data processing rate may be increased, but if the security key is changed, there is no retransmission (or regeneration) and all data is discarded during re-establishment of the PDCP layer device and the RLC layer device, data loss thus occurs). Therefore, different procedures may be applied to the bearer (or RLC bearer) using the RLC AM mode and the bearer (or RLC bearer) using the RLC UM mode. For suspending of the PDCP layer device, embodiments specifically proposed in the following of the disclosure may be applied.

First channel measurement configuration information for rapid cell group or cell (SPCell (PCell or PSCell) or SCell) activation may be included in and configured via the cell group configuration information or cell (SPCell (PCell or PSCell) or SCell) configuration information, previously configured cell group configuration information or cell (SPCell (PCell or PSCell) or SCell) configuration information, or a message (e.g., an RRC message, RRCReconfiguration, MAC control information, or downlink control information (DCI) of a PDCCH) indicating cell group or cell (SPCell (PCell or PSCell) or SCell) activation or resumption. In the first channel measurement configuration information, in order to rapidly activate the cell group, configuration information of a cell (e.g., PCell, PSCell, or SCell) of the cell group may include configuration information which enables the base station to transmit a large number of channel measurement signals temporarily or transmit channel measurement signals frequently so that channel measurement may be rapidly performed in the cell, wherein the configuration information includes a cycle for a frequent channel measurement signal (e.g., a radio resource, a temporary reference signal or tracking reference signal (TRS), a synchronization signal block (SSB), a channel state information reference signal (CSI-RS), or a reference signal (RS)), transmission resource information for transmission (frequency or time transmission resource in which the frequent channel measurement signal is transmitted), an interval or a frequency (the number of times the frequent channel measurement signal is transmitted), a timer value (time at which the frequent channel measurement signal is transmitted), a time interval (interval in which the frequent channel measurement signal is transmitted (e.g., an offset of a time unit (slot, subframe, symbol, or the like)), or a transmission resource, cycle, interval, timing, offset, or the like via which the terminal should report a measurement result. The first channel measurement configuration information may enable configuration of a short reporting cycle (or transmission resource) in which the terminal may report a channel measurement result, or may enable configuration of a transmission resource for channel measurement so that the base station is able to transmit a large number of channel measurement signals (or transmission resources or, for example, radio resources or temporary reference signals or tracking reference signals (TRSs)) or transmit channel measurement signals frequently so as to support the terminal to perform rapid channel measurement or measure more signals.

The first channel measurement configuration information may include configuration information, from the base station, for a channel measurement signal for a specific terminal (or terminals) in the cell or bandwidth part. For example, the first channel measurement configuration information may include a cycle of the channel measurement signal, the number of signal transmissions, a period in which the signal is transmitted, an offset for the time at which the signal is transmitted, a duration between transmitted signals, a list of multiple transmittable channel measurement signals, a time transmission resource (or frequency transmission resource) indicating a location of the signal to be transmitted, a transmission resource (time transmission resource or frequency transmission resource) for reporting of a measurement result, a cycle of reporting the measurement result, or the like. The first channel measurement configuration information may be configured differently for each cell or each bandwidth part with respect to multiple cells or bandwidth parts configured by the RRC message, and in order to support the terminal to easily measure the transmission resources for channel measurement, beam-related configuration information (transmission configuration indication (TCI) state or Quasi Co-Location (QCL)), such as a beam direction, a beam number, or a beam location, may be configured together. In the first channel measurement configuration information, a timing advance (TA) value (or offset value) for synchronization of a downlink signal of the base station or an uplink signal of the base station, a timer (time alignment timer (TAT)) indicating validity of the TA value, or a timer value (TAT value) is configured, so that channel measurement or channel measurement reporting may be performed properly. The first channel measurement configuration information configured via the RRC message may include multiple pieces of channel measurement signal information, and beam configuration information or one piece of channel measurement signal information among the multiple pieces of channel measurement signal information configured in the above via the RRC message, MAC CE, or DCI is indicated, so that the terminal may perform channel measurement or channel measurement reporting by applying or using the indicated beam configuration information or channel measurement signal information. The indication may include defining mapping of a bitmap, an index, or an identifier and each piece of channel measurement signal information configured in the above, and performing indication based on the defined mapping. As another method, by configuring or indicating the channel measurement signal information via the RRC message or MAC CE, the terminal may perform channel measurement or channel measurement reporting by applying or using the configured (or indicated) channel measurement signal information.

The first channel measurement configuration information proposed in the disclosure may be initially deactivated when configured via an RRC message or after handover, and may be activated later by MAC control information, DCI information of a PDCCH, or an RRC message, which will be proposed later in this disclosure. When the configuration is performed via an RRC message as in the above, the base station may easily manage a cell state or channel measurement of the terminal only when an initial state is a deactivated state, and a timing of when and how the terminal is to perform channel measurement may be accurately performed without a processing delay problem of the RRC message.

The first channel measurement configuration information proposed in the disclosure may be available for configuration of only downlink bandwidth part configuration information for each cell. For example, the first channel measurement configuration information proposed in the disclosure may not be available for configuration of uplink bandwidth part configuration information for each cell. This is because, only after first measuring a downlink channel and then reporting a measurement result of the channel or cell, the terminal may be able to correctly receive a PDCCH and follow the indication of the base station. In addition, the message (e.g., an RRC message, RRCReconfiguration, MAC control information, or downlink control information (DCI) of a PDCCH) indicating the cell group or cell (SPCell (PCell or PSCell) or SCell) activation or resumption may include second channel measurement configuration information for signal measurement of cells (PSCells, PCells, or SCells) of the cell group. The second channel measurement configuration information may include general channel measurement configuration information, such as a transmission resource, cycle, time interval, or frequency of the channel measurement signal, or a transmission resource, cycle, or time interval for channel measurement reporting.

In the disclosure, a terminal may perform channel measurement by applying first channel measurement configuration information or second channel measurement configuration information according to the following conditions, and may report a measurement result to a base station.

1> If the terminal receives a message (e.g., a PDCCH indicator, MAC control information, or an RRC message) indicating to activate (or resume) a cell (PCell, PSCell, or SCell) or a cell group (or if the cell group was previously deactivated), 2> If the first channel measurement configuration information is configured for the terminal.

3> According to the first channel measurement configuration information of the terminal, it may be identified that the base station is to transmit a large number of channel measurement signals frequently, and the terminal may measure a large number of channel measurement signals or measure channel measurement signals frequently until a first condition is satisfied or temporarily (e.g., up to a time interval (e.g., subframe, slot, or symbol) configured in the first channel measurement configuration information, during a time interval appointed (or predetermined) in consideration of an offset, or for a specific time period (e.g., while a timer is running)) according to the first channel measurement configuration information. In addition, the terminal may report an obtained channel measurement result according to the cycle or transmission resource configured in the first channel measurement configuration information, until the first condition is satisfied or up to a time interval (e.g., subframe, slot, or symbol) configured in the first channel measurement configuration information, during a time interval appointed (or predetermined) in consideration of an offset, or for a specific time period (e.g., while a timer is running). Therefore, as the terminal is able to rapidly measure a frequent channel measurement signal and rapidly report a result thereof, the cell (PCell, SCell, or PSCell) or the cell group may be rapidly activated (or resumed), or scheduling information may be rapidly indicated. If the second channel measurement configuration information is configured for the terminal after the time interval (e.g., subframe, slot, or symbol) configured in the first channel measurement configuration information, after the appointed (or predetermined) time interval, after the specific time period (e.g., when a timer expires), or after the first condition is satisfied, the terminal may suspend or clear application of the first channel measurement configuration information, and may measure the channel measurement signal according to the second channel measurement configuration information. For example, fallback may be performed from the first channel measurement configuration information to the second channel measurement, or the second channel information may be applied instead of the first channel measurement configuration information. The obtained channel measurement result may be reported according to the cycle or transmission resource configured in the second channel measurement configuration information. If the second channel measurement configuration information is not configured, channel measurement may not be performed.

2> Otherwise (if the first channel measurement configuration information is not configured for the terminal).
  3> If the second channel measurement configuration information is configured for the terminal, the channel measurement signal may be measured according to the second channel measurement configuration information. The obtained channel measurement result may be reported according to the cycle or transmission resource configured in the second channel measurement configuration information. If the second channel measurement configuration information is not configured, channel measurement may not be performed.

The first condition of the disclosure may be one of the following conditions. Hereinafter, the disclosure proposes efficient conditions under which the base station is required to transmit neither an unnecessarily large amount of transmission resources nor unnecessarily frequent transmission resources when, under the first condition, a cell is activated, a cell group is activated or resumed (or when activating the cell group from the deactivated state), or the terminal in an RRC inactive mode resumes a connection during RRC connection resumption. For example, channel measurement or channel measurement reporting may be performed by applying the first channel measurement configuration information until one of the following conditions is satisfied.
  1> When the terminal successfully completes random access (4-step random access or 2-step random access) in the cell (e.g., PCell, SCell, or PSCell) or the cell (e.g., PSCell or SCell) of the cell group, or when the terminal successfully completes random access and is allocated with a first uplink transmission resource or is indicated with an uplink transmission resource for the first time, the terminal may determine that the first condition is satisfied.
  2> More specifically, for example, if the terminal performs contention-free random access (CFRA) (for example, if a pre-designated preamble or a terminal cell identifier (e.g., C-RNTI) is assigned).
  3> It may be considered that random access is successfully completed when the terminal transmits a pre-designated preamble to the cell and receives a random-access response (RAR) message or receives an indication of a PDCCH for the random-access response, and therefore the terminal may determine that the first condition is satisfied. As another method, when an uplink transmission resource is received for the first time after RAR reception, it may be determined that the first condition is satisfied.
  2> If the terminal performs contention-based random access (CBRA) (e.g., if neither a pre-designated preamble nor a terminal cell identifier (e.g., C-RNTI) is assigned).
  3> When the terminal transmits a preamble (e.g., random preamble) to the cell, receives a random-access response (RAR) message, transmits message 3 (e.g., handover completion message) by using an uplink transmission resource allocated, included, or indicated in the random-access response message, and receives, from a target base station via message 4, a MAC CE (contention resolution MAC CE) indicating that contention has been resolved, or when an uplink transmission resource is received via a PDCCH corresponding to C-RNTI of the terminal, it may be considered that random access to the target base station has been successfully completed, and the terminal may thus determine that the first condition is satisfied. As another method, if the size of the uplink transmission resource allocated in the random-access response message is sufficient so that the terminal is able to transmit message 3 and additionally transmit uplink data, the terminal may determine that the uplink transmission resource is received for the first time and may determine that the first condition is satisfied. For example, when the RAR is received, the terminal may determine that the uplink transmission resource is received for the first time, and may determine that the first condition is satisfied.
  1> If 2-step random access is configured for or indicated to the terminal, and the terminal thus performs 2-step random access.
  1> Alternatively, although 2-step random access is not configured or indicated in the message, if the terminal supports 2-step random access according to terminal capability, and if 2-step random access is supported in system information of the cell, and information (e.g., a random access resource, a threshold for determination of whether to perform or not perform 2-step random access, or the like) for 2-step random access is broadcast in the system information, or if the terminal receives the system information, and the terminal performs 2-step random access for the cell due to a signal strength that is sufficient or is greater than the threshold broadcast in the system information,
  2> When 2-step random access is successfully completed, the terminal may determine that the first condition is satisfied.
  2> The 2-step random access may be performed specifically by one of contention-based random access (CBRA) or contention-free random access (CFRA).
  3> If the terminal performs CBRA-based 2-step random access.
  4> The terminal may transmit the preamble in the transmission resource (e.g., PRACH occasion, transmission resource configured by the base station via an RRC message, or transmission resource broadcast in the system information) for 2-step random access, and may transmit data (e.g., MsgA MAC PDU) in a transmission resource (e.g., PUSCH occasion) for data transmission. The data may include MAC control information (C-RNTI MAC CE) including a terminal identifier (C-RNTI) or an RRC message (RRCReconfigurationComplete message or handover completion message).
  4> The terminal may monitor a PDCCH scrambled with the terminal identifier (C-RNTI) or with a first identifier (MsgB-RNTI) derived by a frequency or time at which the preamble is transmitted.
  4> If the terminal receives a PDCCH scrambled with the terminal identifier, if a downlink transmission resource is allocated via the PDCCH, or if MAC control information (timing advance command MAC CE) for timing adjustment is received in the downlink transmission resource.
  5> The terminal may determine that the 2-step random access has been successfully completed and may determine that the first condition is satisfied.
  4> If the terminal receives a PDCCH scrambled with the first identifier (MsgB-RNTI), if a downlink transmission resource is allocated via the PDCCH, or if a fallback random-access response for the preamble transmitted by the terminal is received in the downlink transmission resource, (For example, when the base station has received the preamble but has failed to receive MsgA, if a fallback RAR indicating to transmit MsgA via another transmission resource is received).
  5> The terminal may transmit data (MsgA MAC PDU) via the transmission resource indicated in the fallback random-access response.
  5> The terminal may monitor the PDCCH scrambled with the terminal identifier (C-RNTI).
  5> If the terminal receives the PDCCH scrambled with the terminal identifier, or an uplink transmission resource is allocated via the PDCCH, the terminal may determine that the 2-step random access has been successfully completed, and may determine that the first condition is satisfied.

3> If the terminal performs CFRA-based 2-step random access.

4> The terminal may transmit the preamble in a transmission resource (e.g., PRACH occasion or transmission resource designated by the base station via the RRC message) for 2-step random access, and may transmit data (e.g., MsgA MAC PDU) in a transmission resource (e.g., PUSCH occasion) for data transmission. The data may include MAC control information (C-RNTI MAC CE) including a terminal identifier (C-RNTI) or an RRC message (RRCReconfigurationComplete message or handover completion message).

4> The terminal may monitor a PDCCH scrambled with the terminal identifier (C-RNTI) or with the first identifier (MsgB-RNTI) derived by a frequency or time at which the preamble is transmitted.

4> If the terminal receives a PDCCH scrambled with the terminal identifier, if a downlink transmission resource is allocated via the PDCCH, or if MAC control information (timing advance command MAC CE) for timing adjustment is received in the downlink transmission resource.

5> The terminal may determine that the 2-step random access has been successfully completed and may determine that the first condition is satisfied.

4> If the terminal receives a PDCCH scrambled with the first identifier (MsgB-RNTI), if a downlink transmission resource is allocated via the PDCCH, or if a fallback random-access response for the preamble transmitted by the terminal is received in the downlink transmission resource, (For example, when the base station has received the preamble but has failed to receive MsgA, if a fallback RAR indicating to transmit MsgA via another transmission resource is received).

5> The terminal may determine that the 2-step random access has been successfully completed and may determine that the first condition is satisfied.

5> The terminal may transmit data (MsgA MAC PDU) via the transmission resource indicated in the fallback random-access response.

1> In the above, when random access is started or a preamble for random access is transmitted, the terminal may determine that the first condition is satisfied.

1> As another method, if 2-step random access is configured for or indicated to the terminal via the message, the terminal may determine that the first condition is satisfied. For example, in the case above, before starting 2-step random access, the terminal may determine that the first condition is satisfied.

1> As another method, if 2-step random access is configured for or indicated to the terminal via the message, and a transmission resource (PUSCH) configured for data transmission in 2-step random access is greater than a first threshold, or if a configuration value (timing advance value) for timing adjustment is included in the RRC message, the terminal may determine that the first condition is satisfied. The first threshold may be configured by the base station via the RRC message (e.g., RRCReconfiguration), may be broadcast in the system information, or may be configured to a size of data that the terminal holds for transmission. For example, in the above case, before starting 2-step random access, the terminal may determine that the first condition is satisfied. As another method, if a configuration value (timing advance value) for timing adjustment is included in the RRC message, or if 2-step random access is configured, the terminal may transmit data directly in the configured transmission resource (e.g., transmission resource configured via the RRC message, or transmission resource indicated by a PDCCH of the target base station, wherein the terminal monitors the PDCCH) without transmitting a preamble. Therefore, in the case above, before starting 2-step random access, when transmitting the data, or before transmitting the data, the terminal may determine that the first condition is satisfied. As another method, if a configuration value (timing advance value) for timing adjustment is included in the RRC message, or if 2-step random access is configured, the terminal may transmit data directly via the configured transmission resource (PUSCH) (e.g., transmission resource configured via the RRC message, or transmission resource indicated by a PDCCH of the target base station, wherein the terminal monitors the PDCCH) without transmitting a preamble. In the case above, if the configured transmission resource (PUSCH) (e.g., transmission resource configured via the RRC message, or transmission resource indicated by a PDCCH of the target base station, wherein the terminal monitors the PDCCH) is greater than the first threshold, or if the RRC message includes the configuration value (timing advance value) for timing adjustment, the terminal may determine that the first condition is satisfied, before starting 2-step random access, when transmitting the data, or before transmitting the data.

1> If the terminal in the RRC inactive mode transmits an RRCResumeRequest message and then receives an RRCResume message (or RRCSetup message) in response thereto, the terminal may determine that the first condition is satisfied.

1> When the terminal performs channel measurement based on the first channel measurement configuration information configured in the RRC message, if a timer indicating a period for channel measurement expires.

1> When the terminal performs channel measurement based on the first channel measurement configuration information configured in the RRC message, if a time interval indicating a period for channel measurement has passed (or expired) or all time intervals are used (or applied).

1> When the terminal performs channel measurement based on the first channel measurement configuration information configured in the RRC message, if all channel measurement signals are measured (or completed) a configured number of times, or if a signal is received the configured number of times.

1> When the terminal performs channel measurement based on the first channel measurement configuration information configured in the RRC message, if channel measurement is completed (if channel measurement has expired) or if channel measurement reporting is completed (or if channel measurement reporting has expired), based on the configuration information.

If the first condition is satisfied, a higher layer device (e.g., the RRC layer device) may perform indication to a lower layer device (e.g., the PDCP layer device, the RLC layer device, the MAC layer device, or the PHY layer device) by using an indicator, or a lower layer device (e.g., the PDCP layer device, the RLC layer device, the MAC layer device, or the PHY layer device) may perform indication to the higher layer device (e.g., the RRC layer device).

The methods of configuring or applying the first channel measurement configuration information proposed in the disclosure may be configured and used by extension to when a cell group (e.g., PSCell) is activated or resumed, when an SCell is activated, when an RRC connection is resumed in an RRC inactive mode (e.g., when an RRCResume message is used), or when handover is performed (e.g., when an RRCReconfiguration message is used).

In the disclosure, a bandwidth part (BWP) may be used regardless of distinction between an uplink and a downlink, and the bandwidth part may indicate each of an uplink bandwidth part and a downlink bandwidth part according to context.

In the disclosure, a link may be used regardless of distinction between an uplink and a downlink, and the link may indicate each of the uplink and downlink according to context.

In the disclosure, a cell may refer to a PCell or an SCell (e.g., SCell configured in a master cell group (MCG)), a PSCell (e.g., PCell of a secondary cell group (SCG)), or an SPCell (e.g., SCell configured in a secondary cell group (SCG)). In the disclosure, with respect to an SCell or PSCell of a terminal performing carrier aggregation or dual connectivity, a dormant bandwidth part (BWP) is configured or introduced, battery consumption of the terminal is reduced by preventing PDCCH monitoring from being performed in the dormant bandwidth part, channel measurement and reporting (e.g., measuring or reporting channel state information (CSI) or channel quality information (CQI)) are performed or beam measurement, beam tracking, or beam operation is performed in the dormant bandwidth part, so that, if data transmission is required, switching or activation is performed to a normal bandwidth part (BWP) so as to enable quick starting of data transmission in the normal bandwidth part. The dormant bandwidth part may be neither configured for nor applied to an SPCell (PCell of MCG or PCell (or PSCell) of SCG) or an SCell for which PUCCH has been configured, wherein, in the SPCell, signal monitoring needs to be performed, feedback needs to be transmitted or received, or synchronization needs to be checked and maintained continuously.

If the terminal receives, via a PCell, an indication of activation or switching to a dormant bandwidth part with respect to an SCell of a master cell group, the terminal may perform channel measurement for the dormant bandwidth part of the SCell, and may report an obtained channel measurement result via a transmission resource of the PCell of the master cell group (MCG) (e.g., via a physical uplink control channel (PUCCH) transmission resource of the PCell) or via a transmission resource of the SCell (e.g., via a physical uplink control channel (PUCCH) transmission resource) for which PUCCH of the master cell group is configured. In the above, a transmission resource (e.g., PUCCH or PUSCH) of a cell, via which a channel measurement result for a cell or a bandwidth part thereof is to be reported, may be configured for the terminal via an RRC message for each cell or each bandwidth part.

If the terminal receives, via a PSCell, an indication of activation or switching to a dormant bandwidth part with respect to an SCell of a secondary cell group, the terminal may perform channel measurement for the dormant bandwidth part of the SCell, and may report an obtained channel measurement result via a transmission resource of the PSCell of the secondary cell group (SCG) (e.g., via a physical uplink control channel (PUCCH) transmission resource of the PSCell) or via a transmission resource of the SCell (e.g., via a physical uplink control channel (PUCCH) transmission resource) for which PUCCH of the secondary cell group is configured. In the above, a transmission resource (e.g., PUCCH or PUSCH) of a cell, via which a channel measurement result for a cell or a bandwidth part thereof is to be reported, may be configured for the terminal via an RRC message for each cell or each bandwidth part.

If the terminal receives, via a PCell, an indication of activation or switching to a dormant bandwidth part with respect to the PSCell or SCell of the secondary cell group, or if the terminal receives a cell group suspension (SCG suspension or cell group suspension) indication for the secondary cell group (SCG or PSCell), the terminal may perform channel measurement for the bandwidth part (bandwidth part configured via an RRC message or last activated bandwidth part) or the dormant bandwidth part of the PSCell or SCell, and may report an obtained channel measurement result via a transmission resource (e.g., via a physical uplink control channel (PUCCH) transmission resource of the PCell) of the PCell of the master cell group (MCG), via a transmission resource (e.g., via a physical uplink control channel (PUCCH) transmission resource) of the SCell for which PUCCH of the master cell group is configured, or via a transmission resource (e.g., via a physical uplink control channel (PUCCH) transmission resource of the PSCell) of the PSCell of the secondary cell group (SCG). In the above, a transmission resource (e.g., PUCCH or PUSCH) of a cell, via which a channel measurement result for a cell or a bandwidth part thereof is to be reported, may be configured for the terminal via an RRC message for each cell or each bandwidth part.

The disclosure proposes various embodiments of operations performed based on DCI of PDCCH, a MAC CE, or an RRC message in order to operate the dormant bandwidth part or cell group suspension state, proposed above, with respect to an SCell (SCell of a master cell group when carrier aggregation is configured, or SCell of a secondary cell group when dual connectivity is configured) or a PSCell (PCell of a secondary cell group when dual connectivity is configured) of the terminal.

A network or a base station may configure an SPCell (PCell and PSCell) and multiple SCells for a terminal. The SPCell may indicate a PCell when the terminal communicates with one base station, and may indicate a PCell of a master base station or a PSCell of a secondary base station when the terminal communicates with two base stations (master base station and secondary base station). The PCell or PSCell indicates a main cell used when the terminal and the base station communicate in each MAC layer device, and refers to a cell in which timing is performed for synchronization, random access is performed, HARQ ACK/NACK feedback is transmitted via a PUCCH transmission resource, and most control signals are exchanged. A technology, in which a base station operates multiple SCells with an SPCell so as to increase transmission resources and increase uplink or downlink data transmission resources, is referred to as carrier aggregation or dual connectivity.

In the disclosure, a PCell may refer to a master cell group (MCG), and a PSCell may refer to a secondary cell group (SCG). In addition, MCG may include a PCell and SCells configured in the MCG, and SCG may include a PSCell and SCells configured in the SCG. A cell may indicate a cell group, or a cell group may indicate a cell.

When an SPCell and multiple SCells are configured via an RRC message, a state or a mode may be configured for the terminal via the RRC message, MAC CE, or DCI of a PDCCH with respect to each cell (PCell, PSCell, or SCell), each SCell, a bandwidth part of each SCell, or a cell group. In the above, a state or a mode of a cell may be configured to be one of an active mode, an activated state, a deactivated mode, or a deactivated state. A cell being in an active mode or activated state may represent that, in an activated bandwidth part, an activated normal bandwidth part, or a bandwidth part other than an activated dormant bandwidth part of the cell in the active mode or activated state, the terminal may exchange uplink or downlink data with the base station, may perform PDCCH monitoring to identify an indication of the base station, may perform channel measurement for downlink of the cell in the active mode or activated state (or activated bandwidth part, activated normal bandwidth part, or bandwidth part other than activated dormant bandwidth part of the cell), may report measurement information periodically to the base station, and may transmit a pilot signal (sounding reference signal (SRS)) periodically to the base station so that the base station is able to perform uplink channel measurement. Alternatively, if the terminal is able to activate or switch a bandwidth part to a dormant bandwidth part for the activated cell according an indication (e.g., PDCCH, MAC CE, or RRC message) of the base station, and has activated the dormant bandwidth part in the activated cell, the terminal may perform channel measurement reporting to report a channel measurement result without performing PDCCH monitoring in the cell.

As another method, if the cell, in which the dormant bandwidth part is activated, is an SCell, the terminal may not perform PDCCH monitoring, receive no downlink data, perform channel measurement or measurement result reporting, suspend a configured periodic transmission resource (e.g., type 1 periodic transmission resource (configured uplink grant type 1)), clear or initialize a configured periodic transmission resource (e.g., type 2 periodic transmission resource (configured uplink grant type 2)), transmit no sounding reference signal (SRS), transmit no uplink data, or transmit no PUCCH (e.g., scheduling request (SR) or preamble for random access). However, if the cell, in which the dormant bandwidth part is activated or cell group suspension is indicated, is a PSCell, the terminal may not perform PDCCH monitoring or may perform PDCCH monitoring in a very long cycle, receive no downlink data, perform channel measurement or measurement result reporting, suspend a configured periodic transmission resource (e.g., type 1 periodic transmission resource (configured uplink grant type 1)), clear or initialize a configured periodic transmission resource (e.g., type 2 periodic transmission resource (configured uplink grant type 2)), transmit a sounding reference signal (SRS), transmit no uplink data, transmit a PUCCH (e.g., scheduling request (SR) or preamble for random access), or perform random access.

If the cell, in which activation is performed to a bandwidth part other than the dormant bandwidth part, is an SCell, the terminal may perform PDCCH monitoring, receive downlink data, perform channel measurement or measurement result reporting, resume a configured periodic transmission resource (e.g., type 1 periodic transmission resource (configured uplink grant type 1)), configure or activate a configured periodic transmission resource (e.g., type 2 periodic transmission resource (configured uplink grant type 2)), transmit a sounding reference signal (SRS), transmit uplink data, transmit a PUCCH (e.g., scheduling request (SR) or preamble for random access), or perform random access. If the cell, in which activation is performed to a bandwidth part other than the dormant bandwidth part or cell group resumption (SCG resumption) is indicated, is a PSCell, the terminal may perform PDCCH monitoring, receive downlink data, perform channel measurement or measurement result reporting, resume a configured periodic transmission resource (e.g., type 1 periodic transmission resource (configured uplink grant type 1)), configure or activate a configured periodic transmission resource (e.g., type 2 periodic transmission resource (configured uplink grant type 2)), transmit a sounding reference signal (SRS), transmit uplink data, transmit a PUCCH (e.g., scheduling request (SR) or preamble for random access), or perform random access.

However, the cell being in a deactivated mode or deactivated state may represent that bandwidth parts configured for the cell are deactivated, the configured bandwidth parts are not activated, or the configured bandwidth parts have no activated bandwidth part, so that the terminal cannot exchange data with the base station, does not perform PDCCH monitoring to identify an indication of the base station, performs neither channel measurement nor measurement reporting, or transmits no pilot signal.

Therefore, in order to activate cells in the deactivated mode, the base station first configures frequency measurement configuration information for the terminal via an RRC message, and the terminal performs cell or frequency measurement based on the frequency measurement configuration information. The base station may receive a cell or frequency measurement report of the terminal and then may activate the deactivated cells, based on the frequency/channel measurement information. Accordingly, a lot of latency occurs for the base station to activate carrier aggregation or dual connectivity for the terminal and start data transmission or reception.

The disclosure proposes a dormant bandwidth part (BWP) or a dormant state for a bandwidth part of the each activated cell (e.g., activated SCell or activated PSCell) or proposes configuration or introduction of a dormant bandwidth part (BWP) for each activated cell, so as to reduce battery consumption of the terminal and rapidly start data transmission or reception. Alternatively, the disclosure proposes configuration or introduction of an activated state, a dormant state, a suspended state, a deactivated state, or a resumed state of a cell group state for each cell group when dual connectivity is configured for the terminal, and proposes a method of indicating cell group resumption (SCG resumption or cell group resumption) or cell group suspension (SCG suspension or cell group suspension) indicating shifting of the cell group state, and terminal operations according thereto.

In the dormant bandwidth part or the bandwidth part in the dormant mode of the activated cell (dormant BWP in activated SCell), or when the dormant bandwidth part is activated, the terminal cannot exchange data with the base station, does not perform PDCCH monitoring to identify an indication of the base station, or does not transmit a pilot signal, but the terminal performs channel measurement and reports a measurement result for a measured frequency/cell/channel periodically or when an event occurs, according to a configuration from the base station. Therefore, since the terminal neither performs PDCCH monitoring nor transmits a pilot signal in the dormant bandwidth part (BWP) of the activated cell, the terminal can reduce battery consumption compared to a normal bandwidth part (or bandwidth part other than the dormant bandwidth part) of the activated cell or compared to when the normal bandwidth part (or bandwidth part other than the dormant bandwidth part) of the activated cell is activated, and since the terminal performs channel measurement reporting unlike when the cell is deactivated, the base station may rapidly activate the normal bandwidth part of the activated cell on the basis of a measurement report or on the basis of a measurement report of the dormant bandwidth part of the activated cell, and may allow carrier aggregation to be used quickly, so as to reduce transmission latency. Therefore, in the disclosure, a cell being in an active mode or activated state may represent that, in an activated bandwidth part, an activated normal bandwidth part, or a bandwidth part other than an activated dormant bandwidth part of the cell in the active mode or activated state, the terminal may exchange uplink or downlink data with the base station, may perform PDCCH monitoring to identify an indication of the base station, may perform channel measurement for downlink of the cell in the active mode or activated state (or activated bandwidth part, activated normal bandwidth part, or bandwidth part other than activated dormant bandwidth part of the cell), may report measurement information periodically to the base station, and may transmit a pilot signal (sounding reference signal (SRS)) periodically to the base station so that the base station is able to perform uplink channel measurement. In the disclosure, a cell being in an active mode or activated state may represent that, in an activated dormant bandwidth part of the cell in the active mode or activated state, the terminal cannot exchange uplink or downlink data with the base station, or does not perform PDCCH monitoring to identify an indication of the base station, but may perform channel measurement for downlink of the activated dormant bandwidth part of the cell in the active mode or activated state, and may report measurement information periodically to the base station.

If the cell, in which the dormant bandwidth part is activated or cell group suspension is indicated, is a PSCell, the terminal may not perform PDCCH monitoring or may perform PDCCH monitoring in a very long cycle, receive no downlink data, perform channel measurement or measurement result reporting, suspend a configured periodic transmission resource (e.g., type 1 periodic transmission resource (configured uplink grant type 1)), clear or initialize a configured periodic transmission resource (e.g., type 2 periodic transmission resource (configured uplink grant type 2)), transmit a sounding reference signal (SRS), transmit no uplink data, transmit a PUCCH (e.g., scheduling request (SR) or preamble for random access); or perform random access.

As another method, if the cell, in which cell group deactivation (or suspension) is indicated, is a PSCell (or SCG), the terminal may not perform PDCCH monitoring or may perform PDCCH monitoring in a very long cycle, receive no downlink data, perform neither channel measurement nor measurement result reporting, suspend a configured periodic transmission resource (e.g., type 1 periodic transmission resource (configured uplink grant type 1)), clear or initialize a configured periodic transmission resource (e.g., type 2 periodic transmission resource (configured uplink grant type 2)), transmit no sounding reference signal (SRS), transmit no uplink data, or transmit no PUCCH (e.g., scheduling request (SR) or preamble for random access). However, when cell group deactivation (or suspension) is indicated, frequency measurement (radio resource management) may be performed using frequency measurement configuration information configured by the base station via the RRC message indicating the cell group deactivation (or suspension), or if radio link monitoring (RLM) configuration information is configured, when an indication that a signal is not synchronized is received based on a timer T310 from RLM (lower layer device (PHY layer device)), the timer T310 is driven, and a radio connection failure is declared if the timer T310 expires. If an indication that a signal is synchronized is received, the running timer T310 may be stopped. In addition, when cell group deactivation (or suspension) is indicated, if beam-related configuration information is configured to perform beam failure detection according to the RRC message indicating the cell group deactivation (or suspension), the terminal may perform beam failure detection.

In the disclosure, a dormant bandwidth part may indicate a state of a bandwidth part or may be used as a name of a logical concept indicating a specific bandwidth part. Therefore, a dormant bandwidth part may be activated, deactivated, or switched. For example, an indication of switching an activated second bandwidth part to a dormant bandwidth part in a first cell, an indication of shifting the first cell to a dormant state or a dormant mode, or an indication of activating the dormant bandwidth part of the first cell may be interpreted in the same way.

In the disclosure, a normal bandwidth part may indicate bandwidth parts other than a dormant bandwidth part among bandwidth parts configured for each cell of the terminal via an RRC message, and in the normal bandwidth part, the terminal may exchange uplink or downlink data with the base station, perform PDCCH monitoring to identify an indication of the base station, perform channel measurement for a downlink and periodically report measurement information to the base station, and periodically transmit a pilot signal (sounding reference signal (SRS)) to the base station so that the base station is able to perform uplink channel measurement. The normal bandwidth part may indicate a first active bandwidth part, a default bandwidth part, a first active bandwidth part activated from dormancy, or an initial bandwidth part.

Only one dormant bandwidth part may be configured from among bandwidth parts configured for each cell of the terminal and the dormant bandwidth part may be configured for downlink. As another method, one dormant bandwidth part may be configured for an uplink or downlink from among bandwidth parts configured for each cell of the terminal.

In the disclosure, a state of a cell group may be configured to be activated, suspended, or deactivated. The state of the cell group may be indicated by an indicator or a bitmap of DCI of a PDCCH, may be indicated via MAC control information, or may be indicated by an indicator of an RRC message. If the state of the cell group is indicated to be active, configuration information of the cell group, which is configured or indicated via an RRC message (e.g., RRCReconfiguration message, RRCSetup message, or RRCResume message), may be stored and applied in the terminal, or may be restored or resumed, and the terminal may perform PDCCH monitoring according to the configuration of the RRC message in a PCell, PSCell, or configured SCell of the cell group, receive downlink data, perform channel measurement or measurement result reporting, resume a configured periodic transmission resource (e.g., type 1 periodic transmission resource (configured uplink grant type 1)), configure or activate a configured periodic transmission resource (e.g., type 2 periodic transmission resource (configured uplink grant type 2)), transmit a sounding reference signal (SRS), transmit uplink data, transmit a PUCCH (e.g., scheduling request (SR) or preamble for random access), or perform random access.

If the state of the cell group is indicated to be suspended (suspended state) or deactivated, configuration information of the cell group, which is configured or indicated via an RRC message (e.g., RRCReconfiguration message, RRCSetup message, or RRCResume message), may be stored in the terminal, or the configuration information may be not discarded but application thereof to the terminal may be suspended, and in a PCell, PSCell, or configured SCell of the cell group, according to the configuration of the RRC message, the terminal may not perform PDCCH monitoring or may perform PDCCH monitoring in a very long cycle, receive no downlink data, perform channel measurement or measurement result reporting, suspend a configured periodic transmission resource (e.g., type 1 periodic transmission resource (configured uplink grant type 1)), clear or initialize a configured periodic transmission resource (e.g., type 2 periodic transmission resource (configured uplink grant type 2)), transmit a sounding reference signal (SRS), transmit no uplink data, transmit a PUCCH (e.g., scheduling request (SR) or preamble for random access), or perform random access.

If the state of the cell group is indicated to be deactivated, or clearing of the cell group configuration information is indicated, the terminal may clear or discard the cell group configuration information configured or indicated via the RRC message (e.g., RRCReconfiguration message, RRC-Setup message, or RRCResume me s sage).

Figure 5:
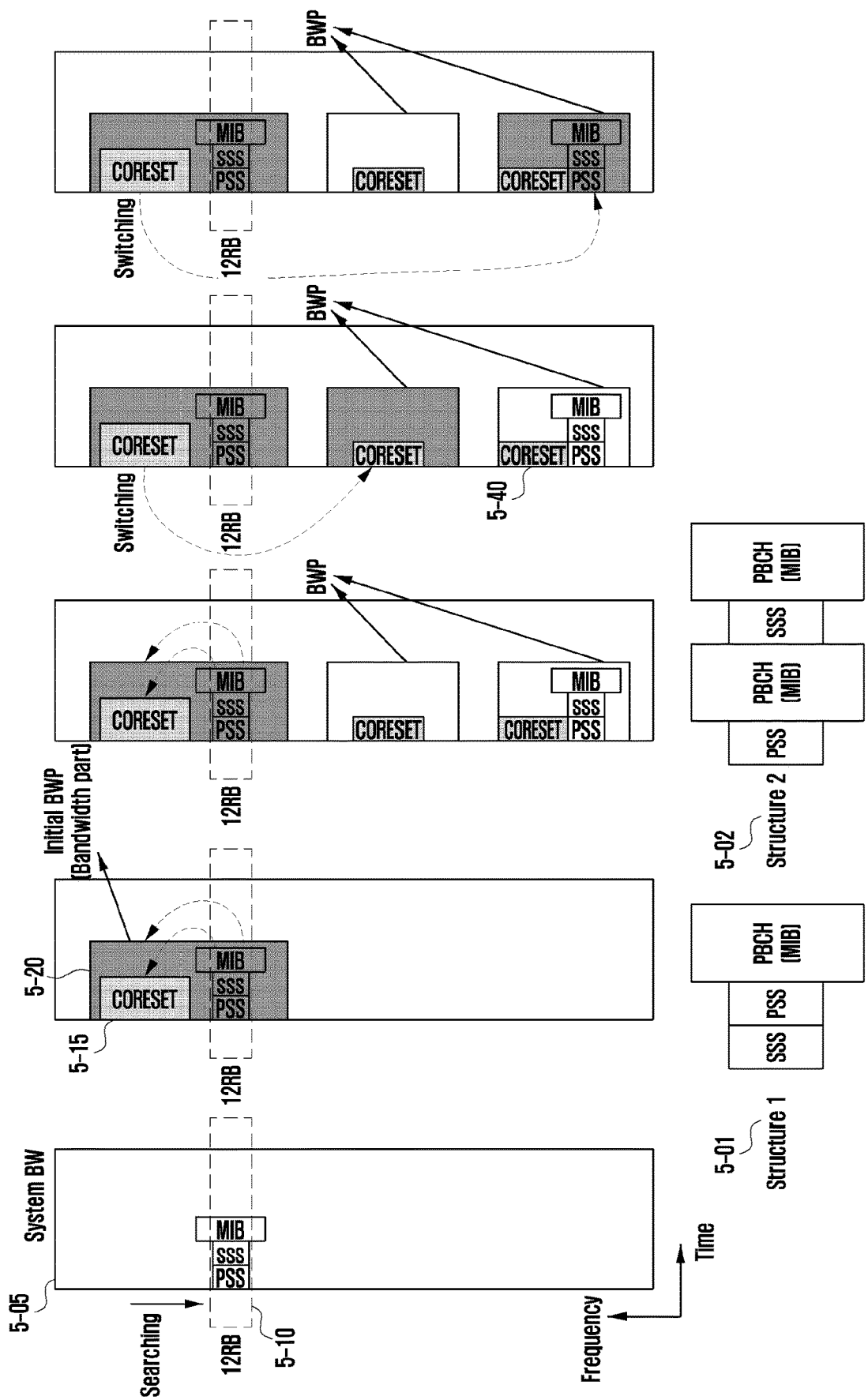
FIG. 5 is a diagram illustrating a procedure of providing a service to a terminal by efficiently using a very wide frequency bandwidth in a next-generation mobile communication system according to an embodiment of the disclosure.

FIG. 5 is a diagram illustrating a procedure of providing a service to a terminal by efficiently using a very wide frequency bandwidth in the next-generation mobile communication system according to an embodiment of the disclosure.

FIG. 5 describes a method in which the next-generation mobile communication system provides services to terminals having multiple different capabilities (or categories) and enables battery saving, by efficiently using a very wide frequency bandwidth.

Referring to FIG. 5, one cell in which a base station provides a service may provide a service of a very wide frequency band, as shown in 5-05. However, in order to provide services to terminals having different capabilities, one cell may be managed so that the wide frequency band is divided into multiple bandwidth parts.

First, a terminal initially powered on may search the entire frequency band provided by a service provider (PLMN) in a unit of certain resource blocks (e.g., in a unit of 12 resource blocks (RBs)). For example, the terminal may start 5-10 searching for a primary synchronization sequence (PSS)/secondary synchronization sequence (SSS) in the entire system bandwidth in a unit of the resource blocks. While searching for the PSS/SSS 5-01 or 5-02 in the unit of resource blocks, if the signals are detected, the terminal may read and interpret (decode) the signals, and may identify a boundary between a subframe and a radio transmission resource frame (radio frame). Accordingly, the terminal may distinguish subframes in a unit of 1 ms and may perform downlink signal synchronization with the base station. A resource block (RB) has a size of a predetermined frequency resource and predetermined time resource, and may be defined to be a two-dimensional unit. For example, a unit of 1 ms may be defined for a time resource, and a unit of 12 subcarriers (1 carrier×15 kHz=180 kHz) may be defined for a frequency resource. When the terminal completes synchronization, the terminal may identify a master system information block (MIB) or minimum system information (MSI) to identify control resource set (CORESET) information and may identify initial access bandwidth part (BWP), 5-15 and 5-20. The CORESEST information refers to a location of a time/frequency transmission resource in which a control signal is transmitted from the base station, and indicates, for example, a location of a resource in which a PDCCH is transmitted. For example, the CORESET information is information indicating a location from which first system information (system information block 1 (SIB 1)) is transmitted, and indicates a frequency/time resource in which PDCCH is transmitted. The terminal may identify information on an initial bandwidth part (BWP) when reading the first system information. As described above, when the terminal completes downlink signal synchronization with the base station and is able to receive a control signal, the terminal may perform random access in an initial bandwidth part (BWP) of a cell on which the terminal camps, may request RRC connection configuration, and may receive an RRC message so as to perform RRC connection configuration.

In the RRC connection configuration, multiple bandwidth parts may be configured for each one cell (PCell, PSCell, SPCell, or SCell). Within the one cell, multiple bandwidth parts may be configured for downlink, and regardless thereof, multiple bandwidth parts may be configured for uplink.

The multiple bandwidth parts may be indicated and configured by a bandwidth part identifier (BWP identifier) so as to be used as an initial bandwidth part (BWP), a default bandwidth part (BWP), a first active bandwidth part (BWP), a dormant bandwidth part (BWP), or a first active bandwidth part (BWP) activated from dormancy.

The initial bandwidth part (BWP) may be used as a bandwidth part determined at a cell level (cell-specific) existing one for each cell, and may be used as a bandwidth part in which the terminal accessing the cell for the first time may configure a connection to the cell via random access, or the terminal having configured the connection may perform synchronization. The base station may configure, for each cell, each of an initial downlink bandwidth part (BWP) to be used in a downlink and an initial uplink bandwidth part (BWP) to be used in an uplink. Configuration information for the initial bandwidth part may be broadcast in the first system information (system information 1 (SIB1)) indicated by CORESET, and may be reconfigured for the connected terminal by the base station via the RRC message. The initial bandwidth part may be designated with a bandwidth part identifier of 0 so as to be used in each of the uplink and downlink. For example, all terminals accessing the same cell may use an identical initial bandwidth part by designating the same with the bandwidth part identifier of 0. This is because, when random access is performed, the base station transmits a random-access response (RAR) message via the initial bandwidth part, which enables all terminals to read the RAR message, so that there may be an advantage in facilitating contention-based random access.

The first active bandwidth part (BWP) may be configured to be different for each UE (UE-specific), and may be designated and indicated by a bandwidth part identifier from among multiple bandwidth parts. The first active bandwidth part may be configured for each of the downlink and uplink, and may be configured, by a bandwidth part identifier, as each of a first active downlink bandwidth part (BWP) and a first active uplink bandwidth part (BWP). The first active bandwidth part may be used for the purpose of indicating a bandwidth part which is to be first activated and used when multiple bandwidth parts are configured in one cell. For example, when a PCell or a PSCell and multiple SCells are configured for the terminal, and multiple bandwidth parts are configured for each of the PCell, PSCell, or SCells, if the PCell, PSCell, or SCells are activated, the terminal may activate and use a first active bandwidth part (BWP) among the multiple bandwidth parts configured for the PCell, PSCell, or SCells. For example, the first active downlink bandwidth part (BWP) may be activated and used for a downlink, and the first active uplink bandwidth part (BWP) may be activated and used for an uplink.

An operation in which the terminal switches a current or activated downlink bandwidth part of a cell so as to activate a first active downlink bandwidth part (or bandwidth part configured or indicated via an RRC message), or an operation in which the terminal switches a current or activated uplink bandwidth part so as to activate a first active uplink bandwidth part (or bandwidth part configured or indicated via an RRC message), may be performed when the terminal receives an indication of activating a cell or bandwidth part, which has been deactivated, via the RRC message, MAC control information, or DCI. An operation may be also performed when an indication of shifting a cell or a bandwidth part to a dormant state or an indication of activation to a dormant bandwidth part is received via an RRC message, MAC control information, or DCI. It is because, when the cell or the bandwidth part is activated, the current or activated downlink bandwidth part is switched to activate the first active downlink bandwidth part (or bandwidth part configured or indicated by the RRC message), or the uplink bandwidth part is switched to activate the first active uplink bandwidth part (or bandwidth part configured or indicated by an RRC message), and therefore the base station can efficiently use carrier aggregation only if a frequency/channel should be measured and reported for the first active downlink/uplink bandwidth part even when channel measurement reporting is performed in a dormant state. The default bandwidth part (BWP) may be configured to be different for each terminal (UE-specific), and may be designated and indicated by a bandwidth part identifier from among multiple bandwidth parts. The default bandwidth part may be configured only for a downlink. The default bandwidth part may be used as a bandwidth part to which an activated bandwidth part among multiple downlink bandwidth parts falls back after a certain time. For example, a bandwidth part inactivity timer (BWP inactivity timer) may be configured for each cell or each bandwidth part via an RRC message, and the timer may start or restart when data transmission or reception occurs in an active bandwidth part other than the default bandwidth part, or the timer may start or restart when the activated bandwidth part is switched to another bandwidth part. When the timer expires, the terminal may fall back or switch the downlink bandwidth part activated in the cell to the default bandwidth part. The switching may refer to deactivating a currently activated bandwidth part and activating a bandwidth part indicated for switching, and the switching may be triggered by an RRC message, MAC control information (MAC control element), or L1 signaling (downlink control information (DCI) of PDCCH). The switching may be triggered by indicating a bandwidth part to be switched or to be activated, and the bandwidth part may be indicated by a bandwidth part indicator (e.g., 0, 1, 2, 3, or 4).

The default bandwidth part is applied and used only for a downlink because the base station may cause the terminal to fall back to the default bandwidth part for each cell after a certain time to receive an indication (e.g., DCI of PDCCH) from the base station, thereby facilitating base station scheduling. For example, if the base station configures, as initial bandwidth parts, default bandwidth parts of terminals accessing one cell, the base station may continuously indicate scheduling only for the initial bandwidth parts after a certain time. If the default bandwidth parts are not configured in an RRC message, initial bandwidth parts may be considered as the default bandwidth parts, and fallback may be performed to the initial bandwidth parts when a bandwidth part inactivity timer expires.

As another method, in order to enhance the freedom of implementation of the base station, a default bandwidth part may also be defined and configured for an uplink so as to be used as a default bandwidth part of a downlink.

The dormant bandwidth part (BWP) refers to a dormant bandwidth part (dormant BWP in activated SCell) or a bandwidth part in a dormant mode in an activated cell, or when the dormant bandwidth part is activated, the terminal cannot exchange data with the base station, does not perform PDCCH monitoring to identify an indication of the base station, or does not transmit a pilot signal, but the terminal performs channel measurement and reports a measurement result for a measured frequency/cell/channel periodically or when an event occurs, according to a configuration by the base station. Therefore, since the terminal neither performs PDCCH monitoring nor transmits a pilot signal in the dormant bandwidth part (BWP) of the activated cell, the terminal can reduce battery consumption compared to a normal bandwidth part (or bandwidth part other than the dormant bandwidth part) of the activated cell or compared to when the normal bandwidth part (or bandwidth part other than the dormant bandwidth part) of the activated cell is activated, and since the terminal performs channel measurement reporting unlike when the cell is deactivated, the base station may rapidly activate the normal bandwidth part of the activated cell on the basis of a measurement report or on the basis of a measurement report of the dormant bandwidth part of the activated cell, and may allow carrier aggregation to be used quickly, so as to reduce transmission latency.

For a first active bandwidth part (or first active non-dormant bandwidth part, or bandwidth part configured or indicated via an RRC message) that is activated by switching from a dormant state or a dormant bandwidth part, when the terminal is operating, as a dormant bandwidth part, a bandwidth part of one activated cell, when an activated bandwidth part is a dormant bandwidth part in the activated cell, or when switching is performed to a dormant bandwidth part in the cell, if the base station indicates, via DCI of a PDCCH, a MAC CE, or an RRC message, the terminal to switch the dormant bandwidth part, which is the bandwidth part of the activated cell, to a normal bandwidth part (or bandwidth part other than the dormant bandwidth part), indicates the terminal to switch or change the active bandwidth part in the dormant bandwidth part to the normal bandwidth part, or indicates the terminal to switch, change, or activate the active bandwidth part in the dormant bandwidth part to a normal bandwidth part (e.g., first active bandwidth part activated from dormancy), the first active bandwidth part may be a bandwidth part, which should be activated by switching the current or activated bandwidth part of the activated cell by the terminal according to the indication, or a bandwidth part which should be activated from the dormant state configured via the RRC message.

Figure 6:
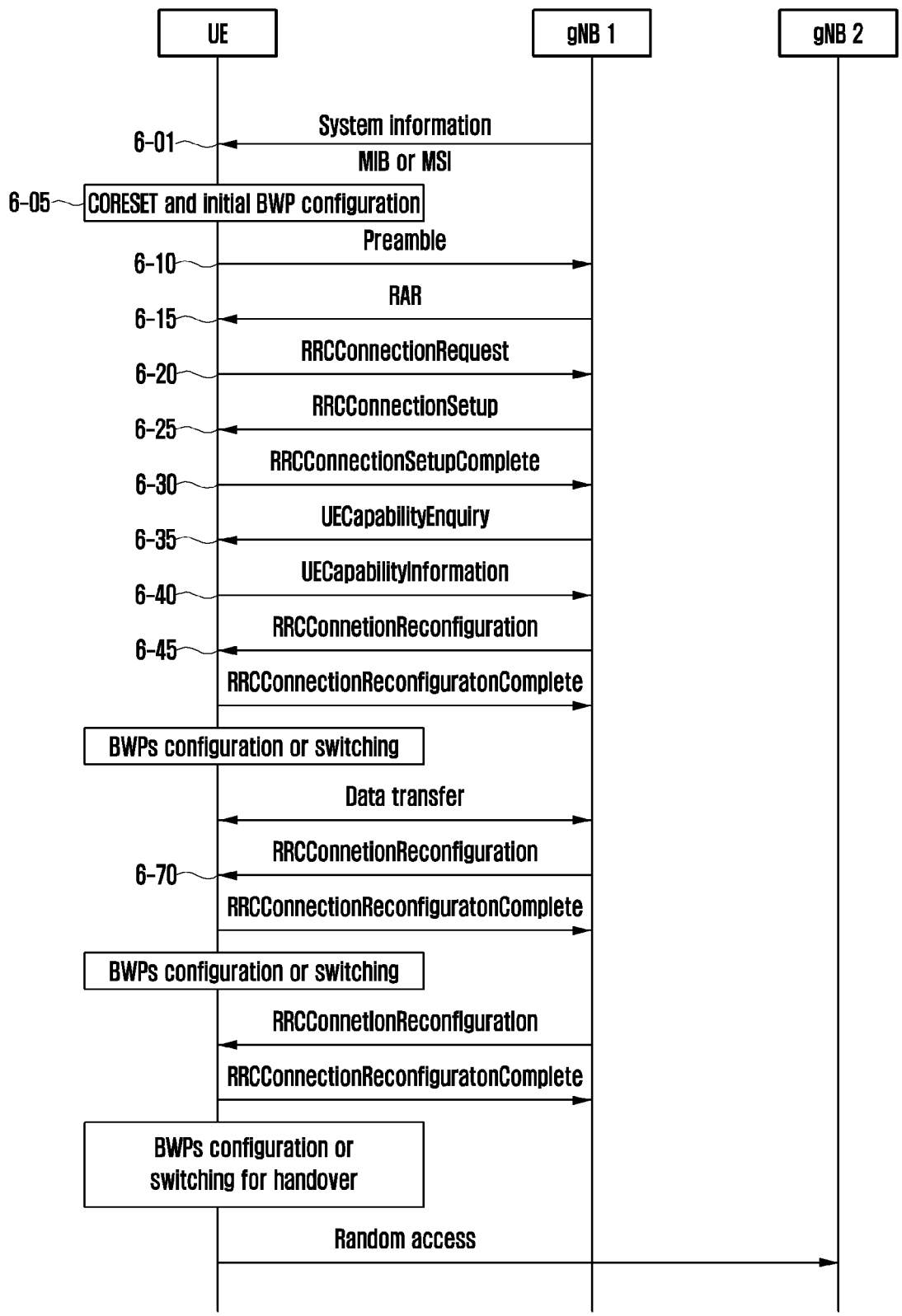
FIG. 6 is a diagram illustrating a procedure for a terminal to switch from an RRC idle mode to an RRC connected mode, and a procedure of configuring, for a terminal, bearer configuration information, cell group or cell configuration information, or channel measurement configuration information for connection, in a next-generation mobile communication system according to an embodiment of the disclosure.

FIG. 6 is a diagram illustrating a procedure for a terminal to switch from an RRC idle mode to an RRC connected mode, and a procedure of configuring, for a terminal, bearer configuration information, cell group or cell configuration information, or channel measurement configuration information for connection, in a next-generation mobile communication system according to an embodiment of the disclosure.

Referring to FIG. 6, one cell in which a base station provides a service may service a very wide frequency band. First, a terminal may search the entire frequency band provided by a service provider (public land mobile network (PLMN)) in a unit of certain resource blocks (e.g., in a unit of 12 resource blocks (RBs)). For example, the terminal may start searching for a primary synchronization sequence (PSS)/secondary synchronization sequence (SSS) in the entire system bandwidth in a unit of the resource blocks. While searching for the PSS/SSS in the unit of resource blocks, if the signals are detected, the terminal may read and interpret (decode) the signals, and may identify a boundary between a subframe and a radio transmission resource frame (radio frame). When the terminal completes synchronization, the terminal may read system information of a cell on which the terminal currently camps. For example, information of a control resource set (CORESET) may be identified by identifying a master system information block (MIB) or minimum system information (MSI), and initial bandwidth part (BWP) information may be identified by reading system information, in 6-01 and 6-05. The CORESEST information refers to a location of a time/frequency transmission resource in which a control signal is transmitted from the base station, and indicates, for example, a location of a resource in which a PDCCH is transmitted.

As described above, when the terminal completes downlink signal synchronization with the base station and is able to receive a control signal, the terminal may perform random access in an initial bandwidth part (BWP), receive a random-access response, request RRC connection configuration, and may receive an RRC message so as to perform RRC connection configuration, in 6-10, 6-15, 6-20, 6-25, and 6-30.

If basic RRC connection configuration is completed, the base station may transmit, to the terminal, an RRC message (UECapabilityEnquiry, 6-35) to inquire about the capability of the terminal, so as to identify the capability of the terminal (UE capability). As another method, the base station may inquire about the capability of the terminal to an MME or an AMF so as to identify the capability of the terminal. This is because, if the terminal had been previously connected, the MME or the AMF may have stored capability information of the terminal. If there is no terminal capability information desired by the base station, the base station may request terminal capability from the terminal. When the terminal reports the terminal capability, the terminal may report the following information as the terminal capability to the base station, wherein the information includes whether the terminal supports a dormant bandwidth part for an SCell of each cell group (master cell group or secondary cell group), whether the terminal supports the first, second, third, or fourth embodiment of the disclosure, whether the terminal supports a dormant bandwidth part for a PSCell of each cell group, whether the terminal supports cell group suspension or resumption for the PSCell of each cell group, the number of supporting cell groups, or the like. The terminal may also report the following information as the terminal capability to the base station, wherein the information includes whether it is possible, in RRC connection resumption, to store and restore, discard, partially reconfigure, or activate configuration information of an S Cell of a master cell group, an SCell of a secondary cell group, or a PSCell of a secondary cell group via an RRCResume message.

The base station transmits an RRC message to the terminal to identify the capability of the terminal, so that the capability of the terminal may be identified, for example, a frequency band which the terminal is capable of reading, or a readable frequency band area may be identified. After the capability of the terminal is identified, an appropriate bandwidth part (BWP) may be configured for the terminal. When the terminal receives an RRC message for inquiring about the capability of the terminal, in response to the reception of the RRC message, the terminal may indicate, using an offset from a reference center frequency, a range of a bandwidth supported by the terminal, a range of a bandwidth supported by a current system bandwidth, or the like, may directly indicate a start point and an end point of a supported frequency bandwidth, or may indicate the start and end points by using a center frequency and a bandwidth, in 6-40.

A bandwidth part may be configured via an RRCSetup message, an RRCResume message 6-25, or an RRCReconfiguration message 6-45 and 6-70 of RRC connection configuration, and the RRC message may include configuration information for a PCell, a PSCell, or multiple SCells, and may configure multiple bandwidth parts for each of the cells (PCell, PSCell, or SCells). When multiple bandwidth parts are configured for each of the cells, multiple bandwidth parts to be used in downlink of each of the cells may be configured. For an FDD system, multiple bandwidth parts to be used in uplink of each cell may be configured separately from the downlink bandwidth parts. For a TDD system, multiple bandwidth parts to be commonly used in downlink and uplink of each of the cells may be configured.

Information for configuring of bandwidth parts or cell configuration information of each of the cells (PCell, PSCell, or SCells) may include some of the following information.

Cell identifier (SCell index)
Cell configuration information
  First channel measurement configuration information for each cell or each bandwidth part
  Second channel measurement configuration information for each cell or each bandwidth part
Downlink bandwidth part configuration information of the cell
  Initial downlink bandwidth part (BWP) configuration information
  Configuration information of multiple bandwidth parts, and bandwidth part identifier (BWP ID) corresponding to each bandwidth part
  Initial state configuration information of the cell or downlink bandwidth part (e.g., active state, dormant state, or deactivated state)
  Bandwidth part identifier indicating a first active downlink bandwidth part (BWP)
  Bandwidth part identifier indicating a default bandwidth part (BWP)
  Configuration information for PDCCH monitoring for each bandwidth part. For example, CORESET information, search space resource information, PDCCH transmission resource, cycle, subframe number information, or the like
  Bandwidth part identifier indicating a dormant bandwidth part
  Bandwidth part identifier indicating a first active bandwidth part activated from dormancy
  Bandwidth part inactivity timer configuration and timer value
  First channel measurement configuration information for each cell or each bandwidth part
  Second channel measurement configuration information for each cell or each bandwidth part
Uplink bandwidth part configuration information of the cell
  Initial uplink bandwidth part (BWP) configuration information
  Configuration information of multiple bandwidth parts, and bandwidth part identifier (BWP ID) corresponding to each bandwidth part Initial state configuration information of the cell or downlink bandwidth part (e.g., active state, dormant state, or deactivated state)

Bandwidth part identifier indicating a first active uplink bandwidth part (BWP)

Configuration information relating to a transmission resource in which channel measurement is performed and a measurement result is reported, in a dormant bandwidth part or in a bandwidth part other than the dormant bandwidth part (e.g., PUCCH transmission resource information of PCell, PUCCH SCell, or PSCell)

In first channel measurement configuration information which may be included and configured in the RRC message (RRCReconfiguration or RRCResume), in order to rapidly activate the cell group, configuration information of a cell (e.g., PCell, PSCell, or SCell) of the cell group may include configuration information which enables the base station to transmit a large number of channel measurement signals temporarily or transmit channel measurement signals frequently so that channel measurement may be rapidly performed in the cell, wherein the configuration information includes a cycle for a frequent channel measurement signal (e.g., a radio resource, a temporary reference signal (TRS), a synchronization signal block (SSB), a channel state information reference signal (CSI-RS), or a reference signal (RS)), transmission resource information for transmission (frequency or time transmission resource in which the frequent channel measurement signal is transmitted), an interval or a frequency (the number of times the frequent channel measurement signal is transmitted), a timer value (time at which the frequent channel measurement signal is transmitted), a time interval (interval in which the frequent channel measurement signal is transmitted (e.g., an offset of a time unit (slot, subframe, symbol, or the like)), or a transmission resource, cycle, interval, timing, offset, or the like via which the terminal should report a measurement result. The first channel measurement configuration information may enable configuration of a short reporting cycle (or transmission resource) in which the terminal may report a channel measurement result, or may enable configuration of a transmission resource for channel measurement so that the base station is able to transmit a large number of channel measurement signals (or transmission resources or, for example, radio resources or temporary reference signals (TRSs)) or transmit channel measurement signals frequently so as to support the terminal to perform rapid channel measurement or measure more signals. The first channel measurement configuration information may include configuration information, from the base station, for a channel measurement signal for a specific terminal (or terminals) in the cell or bandwidth part. For example, the first channel measurement configuration information may include a cycle of the channel measurement signal, the number of signal transmissions, a period in which the signal is transmitted, an offset for the time at which the signal is transmitted, a duration between transmitted signals, a list of multiple transmittable channel measurement signals, a time transmission resource (or frequency transmission resource) indicating a location of the signal to be transmitted, a transmission resource (time transmission resource or frequency transmission resource) for reporting of a measurement result, a cycle of reporting the measurement result, or the like. The first channel measurement configuration information may be configured differently for each cell or each bandwidth part with respect to multiple cells or bandwidth parts configured by the RRC message, and in order to support the terminal to easily measure the transmission resources for channel measurement, beam-related configuration information (transmission configuration indication (TCI) state or Quasi Co-Location (QCL)), such as a beam direction, a beam number, or a beam location, may be configured together. In the first channel measurement configuration information, a timing advance (TA) value (or offset value) for synchronization of a downlink signal of the base station or an uplink signal of the base station, a timer (time alignment timer (TAT)) indicating validity of the TA value, or a timer value (TAT value) is configured, so that channel measurement or channel measurement reporting may be performed properly. The first channel measurement configuration information configured via the RRC message may include multiple pieces of channel measurement signal information, and beam configuration information or one piece of channel measurement signal information among the multiple pieces of channel measurement signal information configured in the above via the RRC message, MAC CE, or DCI is indicated, so that the terminal may perform channel measurement or channel measurement reporting by applying or using the indicated beam configuration information or channel measurement signal information. The indication may include defining mapping of a bitmap, an index, or an identifier and each piece of channel measurement signal information configured in the above, and performing indication based on the defined mapping. As another method, by configuring or indicating the channel measurement signal information via the RRC message or MAC CE, the terminal may perform channel measurement or channel measurement reporting by applying or using the configured (or indicated) channel measurement signal information.

The first channel measurement configuration information proposed in the disclosure may be initially deactivated when configured via an RRC message or after handover, and may be activated later by MAC control information, DCI information of a PDCCH, or an RRC message, which will be proposed later in this disclosure. When the configuration is performed via an RRC message as in the above, the base station may easily manage a cell state or channel measurement of the terminal only when an initial state is a deactivated state, and a timing of when and how the terminal is to perform channel measurement may be accurately performed without a processing delay problem of the RRC message.

The second channel measurement configuration information may be included and configured in the RRC message (RRCReconfiguration or RRCResume). The second channel measurement configuration information may include general channel measurement configuration information, such as a transmission resource, cycle, time interval, or frequency of the channel measurement signal, or a transmission resource, cycle, or time interval for channel measurement reporting.

The configured initial bandwidth part (BWP), default bandwidth part (BWP), or first active bandwidth part (BWP) may be used for the following purposes, and may operate as follows according to the purposes.

The initial bandwidth part (BWP) may be used as a bandwidth part determined at a cell level (cell-specific) existing one for each cell, and may be used as a bandwidth part in which the terminal accessing the cell for the first time may configure a connection to the cell via random access, or the terminal having configured the connection may perform synchronization. The base station may configure, for each cell, each of an initial downlink bandwidth part (BWP) to be used in a downlink and an initial uplink bandwidth part (BWP) to be used in an uplink. Configuration information for the initial bandwidth part may be broadcast in the first system information (system information 1 (SIB1)) indicated by CORESET, and may be reconfigured for the connected terminal by the base station via the RRC message. The initial bandwidth part may be designated with a bandwidth part identifier of 0 so as to be used in each of the uplink and downlink. For example, all terminals accessing the same cell may use an identical initial bandwidth part by designating the same with the bandwidth part identifier of 0. This is because, when random access is performed, the base station transmits a random-access response (RAR) message via the initial bandwidth part, which enables all terminals to read the RAR message, so that there may be an advantage in facilitating contention-based random access.

The first active bandwidth part (BWP) may be configured to be different for each terminal (UE-specific), and may be designated and indicated by a bandwidth part identifier from among multiple bandwidth parts. The first active bandwidth part may be configured for each of downlink and uplink, and may be configured, by a bandwidth part identifier, as each of a first active downlink bandwidth part (BWP) and a first active uplink bandwidth part (BWP). The first active bandwidth part may be used for the purpose of indicating a bandwidth part which is to be first activated and used, when multiple bandwidth parts are configured in one cell. For example, when a PCell or a PSCell and multiple SCells are configured for the terminal, and multiple bandwidth parts are configured for each of the PCell, PSCell, or SCells, if the PCell, PSCell, or SCells are activated, the terminal may activate and use a first active bandwidth part (BWP) among the multiple bandwidth parts configured for the PCell, PSCell, or SCells. For example, the first active downlink bandwidth part (BWP) may be activated and used for a downlink, and the first active uplink bandwidth part (BWP) may be activated and used for an uplink.

An operation in which the terminal switches the current or activated downlink bandwidth part of the cell so as to activate the first active downlink bandwidth part (or bandwidth part configured or indicated via an RRC message), or an operation in which the terminal switches the current or activated uplink bandwidth part so as to activate the first active uplink bandwidth part (or bandwidth part configured or indicated via an RRC message), may be performed when the terminal receives an indication of activating a bandwidth part of an activated cell or a cell, which has been deactivated or dormant, or when the terminal receives an indication of switching or activating a deactivated or dormant bandwidth part to a normal bandwidth part, wherein the indications are received via an RRC message, MAC control information, or DCI of PDCCH. When the terminal receives, via an RRC message, MAC control information, or DCI of PDCCH, an indication of shifting an activated cell or an activated bandwidth part to a dormant state, or receives an indication of switching or activating the same a dormant bandwidth part, the terminal may switch or activate the bandwidth part to the dormant bandwidth part or may make the bandwidth part dormant.

In the above description, making the bandwidth part dormant, switching to the dormant bandwidth part, or activating to the dormant bandwidth part may refer to performing operations proposed in the dormant state in the disclosure. For example, the terminal does not perform PDCCH monitoring, but may perform channel measurement for a downlink bandwidth part (or dormant bandwidth part) and report a channel measurement result to the base station. As another method, when the activated cell or activated bandwidth part is activated or switched to a normal bandwidth part, a downlink bandwidth part is switched so as to be activated to a first active downlink bandwidth part, and an uplink bandwidth part is switched so as to be activated to a first active uplink bandwidth part, and therefore the dormant bandwidth part may be configured as a default bandwidth part or the first active downlink or uplink bandwidth part. The default bandwidth part (BWP) may be configured to be different for each terminal (UE-specific), and may be designated and indicated by a bandwidth part identifier from among multiple bandwidth parts. The default bandwidth part may be configured only for a downlink. The default bandwidth part may be used as a bandwidth part to which an activated bandwidth part among multiple downlink bandwidth parts falls back after a certain time. For example, a bandwidth part inactivity timer (BWP inactivity timer) may be configured for each cell or each bandwidth part via an RRC message, and the timer may start or restart when data transmission or reception occurs in an active bandwidth part other than the default bandwidth part, or the timer may start or restart when the activated bandwidth part is switched to another bandwidth part. When the timer expires, the terminal may fall back or switch the downlink bandwidth part activated in the cell to the default bandwidth part. The switching may refer to deactivating a currently activated bandwidth part and activating a bandwidth part indicated for switching, and the switching may be triggered by an RRC message, MAC control information (MAC control element), or L1 signaling (downlink control information (DCI) of PDCCH). The switching may be triggered by indicating a bandwidth part to be switched or to be activated, and the bandwidth part may be indicated by a bandwidth part indicator (e.g., 0, 1, 2, 3, or 4).

The default bandwidth part is applied and used only for a downlink because the base station may cause the terminal to fall back to the default bandwidth part for each cell after a certain time to receive an indication (e.g., DCI of PDCCH) from the base station, thereby facilitating base station scheduling. For example, if the base station configures, as initial bandwidth parts, default bandwidth parts of terminals accessing one cell, the base station may continuously indicate scheduling only for the initial bandwidth parts after a certain time. If the default bandwidth parts are not configured in an RRC message, initial bandwidth parts may be considered as the default bandwidth parts, and fallback may be performed to the initial bandwidth parts when a bandwidth part inactivity timer expires.

As another method, in order to enhance the freedom of implementation of the base station, a default bandwidth part may also be defined and configured for an uplink so as to be used as a default bandwidth part of a downlink.

The dormant bandwidth part (BWP) refers to a dormant bandwidth part (dormant BWP in activated SCell) or a bandwidth part in a dormant mode in an activated cell, or when the dormant bandwidth part is activated, the terminal cannot exchange data with the base station, does not perform PDCCH monitoring to identify an indication of the base station, or does not transmit a pilot signal, but the terminal performs channel measurement and reports a measurement result for a measured frequency/cell/channel periodically or when an event occurs, according to a configuration by the base station. Therefore, since the terminal neither performs PDCCH monitoring nor transmits a pilot signal in the dormant bandwidth part (BWP) of the activated cell, the terminal can reduce battery consumption compared to a normal bandwidth part (or bandwidth part other than the dormant bandwidth part) of the activated cell or compared to when the normal bandwidth part (or bandwidth part other than the dormant bandwidth part) of the activated cell is activated, and since the terminal performs channel measurement reporting unlike when the cell is deactivated, the base station may rapidly activate the normal bandwidth part of the activated cell on the basis of a measurement report or on the basis of a measurement report of the dormant bandwidth part of the activated cell, and may allow carrier aggregation to be used quickly, so as to reduce transmission latency.

For a first active bandwidth part (or first active non-dormant bandwidth part) that is activated from dormancy, when the terminal is operating, as a dormant bandwidth part, a bandwidth part of one activated cell, when an activated bandwidth part is the dormant bandwidth part in the activated cell, or when switching is performed to the dormant bandwidth part in the cell, if the base station indicates, via DCI of PDCCH, a MAC CE, or an RRC message, the terminal to switch the bandwidth part of the activated cell from the dormant bandwidth part to a normal bandwidth part (or bandwidth part other than the dormant bandwidth part), indicates the terminal to switch or change the active bandwidth part in the dormant bandwidth part to the normal bandwidth part, or indicates the terminal to switch, change, or activate the active bandwidth part in the dormant bandwidth part to the normal bandwidth part (e.g., first active bandwidth part activated from dormancy), a bandwidth part, to which the terminal should switch or activate the bandwidth part of the activated cell according to the indication, may be the first active bandwidth part activated from dormancy configured via the RRC message.

In the disclosure, switching a first bandwidth part to a second bandwidth part may be interpreted as activating the second bandwidth part, or may be interpreted as deactivating the activated first bandwidth part and activating the second bandwidth part.

In the RRCSetup message or RRCResume message 6-25 or RRCReconfiguration message 6-45 of the RRC connection configuration, a state shift timer may be configured so that the terminal may perform state shifting by itself even if the terminal does not receive, from the base station, an indication via an RRC message, MAC control information, or DCI of PDCCH. For example, a cell inactivity timer (ScellDeactivationTimer) may be configured for each cell, and if the cell inactivity timer expires, the cell may be shifted to a deactivated state.

In the RRCSetup message or RRCResume message 6-25 or RRCReconfiguration message 6-45 of the RRC connection configuration, frequency measurement configuration information (measurement configuration), frequency measurement gap information (measurement gap information), etc. may be configured, and frequency measurement object information may be included. In the RRCSetup message or RRCResume message 6-25 or RRCReconfiguration message 6-45 of the RRC connection configuration, a function (power saving mode) for reducing power consumption of the terminal may be configured, and in addition to the function for reducing power consumption, configuration information, such as a discontinuous reception (DRX) cycle, an offset, an on-duration period (period during which the terminal needs to monitor a PDCCH), or time information, information on a time at which a PDCCH from the base station is monitored or detected before the on-duration period in the DRX cycle, short time cycle information, or the like may be configured. If the function for reducing power consumption of the terminal is configured, the terminal may configure a DRX cycle and detect a wake-up signal (WUS) in a period configured for monitoring of a PDCCH of the base station before the on-duration period, and the base station may indicate, via DCI of the PDCCH of the WUS, to the terminal whether to skip (or not perform) or perform PDCCH monitoring in an immediately subsequent on-duration period. The terminal always needs to perform PDCCH monitoring in the on-duration period, wherein the base station indicates, via the WUS, to the terminal not to perform PDCCH monitoring in the on-duration period, so as to enable reduction of battery consumption.

When the RRC connection configuration is completed as described above, the terminal may configure multiple bandwidth parts according to an indication configured via an RRC message. In order to reduce battery consumption, one or a small number of bandwidths among the multiple configured bandwidth parts may be activated. For example, one bandwidth part to be activated may be indicated. The base station may indicate activation of a bandwidth part via an RRC message, MAC control information (MAC CE), or L1 signaling (PHY layer control signal such as DCI of PDCCH), so as to indicate switching from an initial access bandwidth part to a new bandwidth part. As another method, new bitmap information may be defined in DCI of PDCCH, and whether to activate a normal bandwidth part (or bandwidth part other than a dormant bandwidth part), whether to activate a dormant bandwidth part, or whether to deactivate a bandwidth part may be indicated. As another method, the bitmap may be used to indicate whether to activate a normal bandwidth part (e.g., first active bandwidth part to be activated from dormancy), whether to active a dormant bandwidth part, whether to switch to a dormant bandwidth part, or whether to perform bandwidth part switching. Since there may be many other new users accessing the initial access bandwidth part, it may be more advantageous, in terms of scheduling, to assign a new bandwidth part and separately manage connected users. This is because the initial access bandwidth part is not configured for each terminal, but may be shared and used in common by all terminals. Further, in order to reduce signaling overhead, a default bandwidth part may be dynamically indicated by the MAC control information, L1 signaling, or system information.

In the RRC message (RRCSetup message or RRCResume message 6-25 or RRCReconfiguration message 6-70), configuration information for a cell group may also be included. The configuration information for a cell group may include some or multiple pieces of information from the following information, or may indicate a state, procedure, application or clearing of configuration information, or the like for each cell group.

- Cell group identifier indicating a cell group (e.g., cell group identifier or index)
- Indicator indicating a state of a cell group (e.g., active state, suspended state, or deactivated state)
- Indicator indicating a state of a cell group (e.g., indicator indicating to suspend (deactivate) a cell group (e.g., cellgroup (SCG) suspension indicator) or indicator indicating to resume (activate) a cell group (e.g., cellgroup (SCG) resumption indicator))
- If an indicator of the following is included, second DRX configuration information (e.g., a length, cycle, offset, or the like of an activation period (on duration) or a monitoring period), which enables PDCCH monitoring to be performed with a very long cycle in a PSCell of the cell group, may be configured, the indicator including an indicator (e.g., PDCP re-establishment indicator, PDCP data recovery indicator, indicator triggering a new procedure, RLC re-establishment indicator, MAC layer device initialization indicator, or MAC layer device partial initialization indicator) which triggers a procedure of a corresponding protocol layer device (e.g., SDAP layer device, PDCP layer device, RLC layer device, or MAC layer device) according to an indicator indicating a state of the cell group, an indicator indicating to initialize a header compression protocol (robust header compression (ROHC) or Ethernet header compression (EHC)) or a data compression protocol (UDC), an indicator indicating to continue using a header compression protocol (robust header compression (ROHC) or Ethernet header compression (EHC)) or a data compression protocol (UDC) (or indicator indicating not to perform initialization) (the indicators may be configured for a downlink or configured for an uplink so as to be separately configured and indicated), or an indicator indicating to suspend (or deactivate) the state of the cell group. For example, if the terminal receives an indicator indicating to suspend the cell group, the terminal may perform PDCCH monitoring based on a very long cycle by applying the second DRX configuration information, so as to save power of the terminal. As another method, if the terminal receives an indicator indicating to suspend the cell group, the terminal may, by applying bandwidth part configuration information for the PSCell of the cell group, activate or switch a downlink bandwidth part of the PSCell of the cell group to a dormant bandwidth part, and may perform terminal operations, proposed in the disclosure, in a cell in which a dormant bandwidth part is activated. In addition, if the terminal receives an indicator indicating to suspend the cell group, the terminal may deactivate all SCells configured in the cell group. As another method, if the terminal receives an indicator indicating to suspend the cell group, the terminal may activate or switch a downlink bandwidth part to a dormant bandwidth part with respect to an SCell, in which the dormant bandwidth part is configured, from among the SCells configured in the cell group, and may perform terminal operations, proposed in the disclosure, in a cell in which a dormant bandwidth part is activated or may perform deactivation for an SCell in which a dormant bandwidth part is not configured. As another method, if the terminal receives, via the RRC message, an indicator indicating to suspend the cell group, the terminal may, according to the indicator or configuration information for each SCell of the cell group, which is included in the RRC message, activate or deactivate each SCell, make each SCell dormant, or activate a dormant bandwidth part, or the terminal may activate or deactivate each SCell of the cell group, make the each SCell dormant, or activate a dormant bandwidth part, via the indicator (e.g., bitmap) of PDCCH, the MAC control information, or the RRC message before or after reception of the indicator indicating to suspend the cell group.

Configuration information relating to a transmission resource in which channel measurement is performed and a measurement result is reported, in a dormant bandwidth part or in a bandwidth part other than the dormant bandwidth part (e.g., PUCCH transmission resource information of PCell, PUCCH SCell, or PSCell)

If an indicator indicating to resume (activate) the state of the cell group is included, first DRX configuration information (e.g., a length, cycle, offset, or the like of an activation period (on duration) or a monitoring period) which enables PDCCH monitoring to be performed again in the PSCell of the cell group may be configured. Alternatively, the first DRX configuration information stored for the cell group may be restored and applied. For example, if the terminal receives an indicator indicating to resume the cell group, the terminal may perform PDCCH monitoring by applying the stored first DRX configuration information or the first DRX configuration information received via the RRC message, thereby resuming data transmission or reception. As another method, if the terminal receives an indicator indicating to resume the cell group, the terminal may activate or switch a downlink bandwidth part of the PSCell of the group to a bandwidth part (e.g., bandwidth part configured via an RRC message) other than a dormant bandwidth part, by applying bandwidth part configuration information for the PSCell of the cell group, and may perform terminal operations, proposed in the disclosure, in a cell in which a normal bandwidth part (bandwidth part other than a dormant bandwidth part) is activated. Alternatively, if the terminal receives an indicator indicating to resume the cell group, the terminal may trigger random access in the PSCell of the cell group by applying random access configuration information (random access transmission resource information (time or frequency transmission resource) for preamble transmission, designated preamble information, or the like) which is stored or received via the RRC message. As another method, when the terminal receives an indicator indicating to resume the cell group, if the RRC message includes the random access configuration information (random access transmission resource information (time or frequency transmission resource) for preamble transmission, designated preamble information, or the like), the terminal may trigger random access (e.g., contention-free random access) in the PSCell of the cell group by applying the random access configuration information, and if the RRC message for indicating resumption or activation of the cell group does not include the random access configuration information (random access transmission resource information (time or frequency transmission resource) for preamble transmission, designated preamble information, or the like), the terminal may trigger random access (e.g., contention-based random access) in the PSCell of the cell group, or may trigger random access (contention-based random access or 2-step random access) based on system information. If there is random access configuration information (random access transmission resource information (time or frequency transmission resource) for preamble transmission, designated preamble information, or the like) stored in the terminal before reception of the indicator indicating to resume the cell group, the stored random access configuration information may be cleared or discarded. As another method, the terminal may perform PDCCH monitoring in the indicated or configured cell group or cell, and may trigger and perform random access as indicated in PDCCH.

If the indicator indicating to resume (activate) the state of the cell group is included, or if the terminal receives an indicator indicating to resume the cell group, all SCells configured in the cell group may be activated. As another method, if the terminal receives an indicator indicating to resume the cell group, the terminal may activate or switch a downlink bandwidth part to a bandwidth part (e.g., first active bandwidth part or bandwidth part configured via an RRC message) other than a dormant bandwidth part with respect to an SCell, in which a dormant bandwidth part is configured, from among SCells configured in the cell group, and may perform terminal operations, proposed in the disclosure, in a cell in which a bandwidth part other than a dormant bandwidth part is activated, or may perform activation for an SCell in which a dormant bandwidth part is not configured. As another method, if the terminal receives, via the RRC message, an indicator indicating to resume the cell group, the terminal may, according to the indicator or configuration information for each SCell of the cell group, which is included in the RRC message, activate or deactivate each SCell, make each SCell dormant, or activate a dormant bandwidth part, or the terminal may activate or deactivate each SCell of the cell group, make the each SCell dormant, or activate a dormant bandwidth part, via the indicator (e.g., bitmap) of PDCCH, the MAC control information, or the RRC message before or after reception of the indicator indicating to resume the cell group.

Indicator for adding of cell group configuration

Indicator for clearing of cell group configuration

Security configuration information (security key information, security key information for a cell group, or additional information (e.g., sk-counter)

Indicator indicating handover, adding cell group, or changing cell group (e.g., ReconfigurationWithSync indicator or mobilitycontrollnfo indicator)

First channel measurement configuration information for each cell or each bandwidth part Second channel measurement configuration information for each cell or each bandwidth part Indicator for adding of cell group configuration, indicator indicating cell group change (ReconfigurationWithSync), or indicator indicating random access (ReconfigurationWithSync or newly defined indicator)

Indicator indicating, when activating a cell group, whether to activate the cell group by performing random access or activate the cell group without random access (ReconfigurationWithSync processor newly defined indicator)

Radio resource management (RRM) configuration information or frequency measurement configuration information, or separate configuration information of radio resource management (RRM) or frequency measurement, which needs to be applied or performed when a cell group is deactivated (e.g., frequency measurement configuration information (reduced or relaxed RRM configuration information) simplified to reduce battery consumption)

Configuration information for radio link monitoring (RLM) or configuration information for RLM which needs to be applied or performed when a cell group is deactivated. For example, the configuration information for RLM is configuration information of beams for each bandwidth part or configuration information of beams in units of cells to be measured by the terminal when a cell group is deactivated, may include beam-related configuration information (transmission configuration indication (TCI) state or Quasi Co-Location (QCL)), may include a timing advance (TA) value (or offset value) for synchronization of a downlink signal of the base station or an uplink signal of the base station, a timer (time alignment timer (TAT)) indicating validity of the TA value, or a timer value (TAT value), or may include synchronization signal block (SSB) configuration information to be measured, channel state information reference signal (CSI-RS) configuration information, reference signal (RS) configuration information, or transmission resource information (e.g., PUCCH configuration information (e.g., scheduling request (SR) information or specific transmission resource), frequency transmission resource, or time transmission resource) enabling result reporting when a beam failure occurs. In addition, the configuration information may include bandwidth part configuration information (e.g., indication may be performed using a bandwidth part identifier) indicating a bandwidth part in which RLM is to be performed. As another method, when a cell group is deactivated, the terminal is able to minimize a cell group activation delay by performing RLM in a first active bandwidth part (or first active downlink bandwidth part, firstActiveDownlinkBWP-ID) configured via the RRC message and monitoring, early, the first active bandwidth part required to be activated when the cell group is activated. As another method, if a cell group is configured to be deactivated (or activated), the terminal may continue to maintain a connected state with the cell group by performing RLM in a last (or previously) activated bandwidth part before the cell group is deactivated (e.g., if bandwidth part configuration information indicating a bandwidth part in which RLM is to be performed is not configured), or may perform activation in a first active bandwidth part (or first active downlink bandwidth part, firstActive-DownlinkBWP-ID) configured via the RRC message when the cell group is activated. If, when activating the cell group, bandwidth part-related configuration information indicating a bandwidth part, in which RLM is to be performed, is not configured, the terminal may perform RLM in a last (or previously) activated bandwidth part. In addition, the configuration information may include beam-related configuration information (e.g., indication may be performed using a bandwidth part identifier, a TCI state, or QCL configuration information) indicating a beam in which RLM is to be performed. As another method, when a cell group is deactivated, the terminal is able to minimize a cell group activation delay by performing RLM in a beam (e.g., TCI state or QCL configuration information) configured via the RRC message, or by activating the beam, performing RLM, and monitoring, early, the beam required to be activated when activating the cell group. As another method, if a cell group is configured to be deactivated (or activated), the terminal may continue to maintain a connected state with the cell group by performing RLM in a last (or previously) activated beam before the cell group is deactivated (e.g., if beam-related configuration information indicating a beam in which RLM is to be performed is not configured), or may perform activation in a beam configured via the RRC message when the cell group is activated. If, when activating the cell group, beam-related configuration information indicating a beam, in which RLM is to be performed, is not configured, the terminal may perform RLM in a last (or previously) activated beam.

Configuration information for beam failure detection (BFD) or configuration information for BFD which needs to be applied or performed when a cell group is deactivated. For example, the configuration information for BFD is configuration information of beams for each bandwidth part or configuration information of beams in units of cells to be measured by the terminal when a cell group is deactivated, may include beam-related configuration information (transmission configuration indication (TCI) state or Quasi Co-Location (QCL)), may include a timing advance (TA) value (or offset value) for synchronization of a downlink signal of the base station or an uplink signal of the base station, a timer (time alignment timer (TAT)) indicating validity of the TA value, or a timer value (TAT value), or may include synchronization signal block (SSB) configuration information to be measured, channel state information reference signal (CSI-RS) configuration information, reference signal (RS) configuration information, or transmission resource information (e.g., PUCCH configuration information (e.g., scheduling request (SR) information or specific transmission resource), frequency transmission resource, or time transmission resource) enabling result reporting when a beam failure occurs. In addition, the configuration information may include bandwidth part configuration information (e.g., indication may be performed using a bandwidth part identifier) indicating a bandwidth part in which beam failure detection is to be performed. As another method, when a cell group is deactivated, the terminal is able to minimize a cell group activation delay by performing beam failure detection in a first active bandwidth part (or first active downlink bandwidth part, firstActiveDownlinkBWP-ID) configured via the RRC message and monitoring, early, the first active bandwidth part required to be activated when the cell group is activated. As another method, if a cell group is configured to be deactivated (or activated), the terminal may continue to maintain a connected state with the cell group by performing beam failure detection in a last (or previously) activated bandwidth part before the cell group is deactivated (e.g., if bandwidth part configuration information indicating a bandwidth part in which beam failure detection is to be performed is not configured), or may perform activation in a first active bandwidth part (or first active downlink bandwidth part, firstActiveDownlinkBWP-ID) configured via the RRC message when the cell group is activated. If, when activating the cell group, bandwidth part-related configuration information indicating a bandwidth part, in which beam failure detection is to be performed, is not configured, the terminal may perform beam failure detection in a last (or previously) activated bandwidth part. In addition, the configuration information may include beam-related configuration information (e.g., indication may be performed using a bandwidth part identifier, a TCI state, or QCL configuration information) indicating a beam in which beam failure detection is to be performed. As another method, when a cell group is deactivated, the terminal is able to minimize a cell group activation delay by performing beam failure detection in a beam (e.g., TCI state or QCL configuration information) configured via the RRC message, or monitoring, early, the beam required to be activated when activating the cell group. As another method, if a cell group is configured to be deactivated (or activated), the terminal may continue to maintain a connected state with the cell group by performing beam failure detection in a last (or previously) activated beam before the cell group is deactivated (e.g., if beam-related configuration information indicating a beam in which beam failure detection is to be performed is not configured), or may perform activation in a beam configured via the RRC message when the cell group is activated. If, when activating the cell group, beam-related configuration information indicating a beam, in which beam failure detection is to be performed, is not configured, the terminal may perform beam failure detection in a last (or previously) activated beam.

In order to efficiently perform dual connectivity configuration (or SCG configuration) or handover, a first timer (e.g., T304), a second timer (T310), a third timer (e.g., T312), or a fourth timer (e.g., a timer for fallback) may be configured in the message. It is proposed that the timer is driven and applied in dual connectivity configuration or handover. The first timer (e.g., T304) is a timer for determining whether dual connectivity configuration or handover has been successfully performed, the second timer (e.g., T310) is a timer for determining whether a radio connection is valid, and the third timer (e.g., T312) is an auxiliary timer for determining whether a radio connection is valid and a timer for triggering frequency measurement and reporting a frequency measurement result. The fourth timer (e.g., a timer for fallback) is a timer introduced to make an attempt to activate a cell group by performing fallback with random access (normal random access (4-step random access or 2-step random access) when activation of the cell group (or SCG or PSCell) fails without random access proposed in the disclosure. The fourth timer may be the first timer, and the first timer may be used as a timer for fallback.

It is proposed to include no indicator (e.g., ReconfigurationWithSync indicator or mobilitycontrolInfo indicator) indicating handover, adding a cell group, or changing a cell group if the RRC message (e.g., RRCReconfiguration message) includes an indicator for suspending (deactivating) a cell group, and it is proposed to include an indicator (e.g., ReconfigurationWithSync indicator or mobilitycontrolInfo indicator) indicating handover, adding a cell group, or changing a cell group if the RRC message includes an indicator or configuration information for configuring resumption of a cell group. This is because, when a cell group is resumed, a connection with the cell group should be made again, and therefore it is required to perform synchronization, receive system information, or perform random access if necessary. For example, when configuring, via the RRC message, a cell group of the terminal to be in a deactivated state, the base station may restrict the indicator for adding a cell group, the indicator for changing a cell group, the indicator indicating random access, or the ReconfigurationWithSync indicator from being configured together, so that the terminal does not perform unnecessary synchronization, unnecessary connection, or unnecessary random access.

If the RRC message (e.g., RRCReconfiguration) includes an indicator for deactivating a cell group (SCG), the base station (or network) may include configuration information in the RRC message and configures the same for the terminal, wherein the configuration information indicates, when the cell group is deactivated, whether the terminal is to perform RLM or perform BFD for the deactivated cell group. When configuring the configuration information for performing of RLM or BFD for the deactivated cell group, the base station (or network) may configure beam-related configuration information for configuration of a beam or a bandwidth part in which the terminal is to perform the RLM or BFD.

In the following, the disclosure proposes methods of configuring the beam-related configuration information for reducing the size (or overhead) of an RRC message and simplifying terminal implementation. One method or multiple methods of the following methods of the base station (or network) or the terminal may be applied, or a new method may be applied based on the following methods.

First method: If indicating to perform RLM or BFD for a deactivated cell group, the base station (or network) may configure beam-related configuration information for performing of the RLM or BFD, and always includes beam information (TCI state) in the beam-related configuration information so as to configure the same (mandatory). Therefore, if the terminal receives the beam-related configuration information, when performing RLM or BFD for the deactivated cell group, the terminal may perform the RLM or BFD in a first active downlink bandwidth part (BWP) configured via the RRC message or in a beam configured via beam information in the beam-related configuration information.

Second method: If indicating to perform RLM or BFD for a deactivated cell group, the base station (or network) may configure beam-related configuration information for performing of the RLM or BFD, and configures, if necessary, beam information (TCI state) in the beam-related configuration information, (optional). Therefore, if the terminal receives the beam-related configuration information, when performing RLM or BFD for the deactivated cell group, in a case where beam configuration information is configured in the beam-related configuration information or in a first active downlink bandwidth part (BWP) configured via the RRC message, the terminal may perform the RLM or BFD in the beam configured via the beam information. If beam information is not configured in the beam-related configuration information, the RLM or BFD may be performed in a previously activated (or last activated or currently activated) beam.

Third method: If indicating to perform RLM or BFD for a deactivated cell group, the base station (or network) may configure beam-related configuration information for performing of the RLM or BFD, and always includes a bandwidth part identifier in the beam-related configuration information so as to configure the same (mandatory), or always includes beam information (TCI state) in the beam-related configuration information so as to configure the same (mandatory). Therefore, if the terminal receives the beam-related configuration information, when performing RLM or BFD for the deactivated cell group, the terminal may perform the RLM or BFD in a bandwidth part configured by the bandwidth part identifier in the beam-related configuration information or in a beam configured via the beam information in the beam-related configuration information.

Fourth method: If indicating to perform RLM or BFD for a deactivated cell group, the base station (or network) may configure beam-related configuration information for performing of the RLM or BFD, and always includes a bandwidth part identifier in the beam-related configuration information so as to configure the same (mandatory), or configures beam information (TCI state) if necessary (optional). Therefore, if the terminal receives the beam-related configuration information, when performing RLM or BFD for the deactivated cell group, the terminal may perform the RLM or BFD in a bandwidth part configured by the bandwidth part identifier in the beam-related configuration information or in a beam configured via the beam information in the beam-related configuration information. If beam information is not configured in the beam-related configuration information, the RLM or BFD may be performed in a previously activated (or last activated or currently activated) beam. In addition, if the bandwidth part identifier configured in the beam-related configuration information does not indicate a previously activated (or last activated or currently activated) bandwidth part, since the bandwidth part needs to be changed (or switched), the beam information (TCI state) should be included in the beam-related configuration information and configured for the terminal, so that the terminal performs RLM and BFD in a new beam configured in the above.

Fifth method: If indicating to perform RLM or BFD for a deactivated cell group, the base station (or network) may configure beam-related configuration information for performing of the RLM or BFD, and configures, if necessary, a bandwidth part identifier in the beam-related configuration information (optional), or always configures beam information (TCI state) (mandatory). Therefore, if the terminal receives the beam-related configuration information, when performing RLM or BFD for the deactivated cell group, the terminal may perform the RLM or BFD in a bandwidth part configured by the bandwidth part identifier in the beam-related configuration information or in a beam configured via the beam information in the beam-related configuration information. If no bandwidth part identifier is configured in the beam-related configuration information, the RLM or BFD may be performed in a previously activated (or last activated or currently activated) bandwidth part (or first active bandwidth part (first active downlink BWP) configured via the RRC message). In addition, if the bandwidth part identifier configured in the beam-related configuration information does not indicate a previously activated (or last activated or currently activated) bandwidth part, since the bandwidth part needs to be changed (or switched), the beam information (TCI state) should be included in the beam-related configuration information and configured for the terminal, so that the terminal performs RLM and BFD in a new beam configured in the above.

Sixth method: If indicating to perform RLM or BFD for a deactivated cell group, the base station (or network) may configure beam-related configuration information for performing of the RLM or BFD, and configures, if necessary, a bandwidth part identifier in the beam-related configuration information (optional), or configures beam information (TCI state) if necessary (optional). Therefore, if the terminal receives the beam-related configuration information, when performing RLM or BFD for the deactivated cell group, the terminal may perform the RLM or BFD in a bandwidth part configured by the bandwidth part identifier in the beam-related configuration information or in a beam configured via the beam information in the beam-related configuration information. If no bandwidth part identifier is configured in the beam-related configuration information, the RLM or BFD may be performed in a previously activated (or last activated or currently activated) bandwidth part (or first active bandwidth part (first active downlink BWP) configured via the RRC message). If beam information is not configured in the beam-related configuration information, the RLM or BFD may be performed in a previously activated (or last activated or currently activated) beam. In addition, if the bandwidth part identifier configured in the beam-related configuration information does not indicate a previously activated (or last activated or currently activated) bandwidth part, since the bandwidth part needs to be changed (or switched), the beam information (TCI state) should be included in the beam-related configuration information and configured for the terminal, so that the terminal performs RLM and BFD in a new beam configured in the above.

As another method, if the RRC message (e.g., RRCReconfiguration) includes an indicator for deactivating a cell group (SCG), the base station (or network) may include configuration information in the RRC message and configures the same for the terminal, wherein the configuration information indicates, when the cell group is deactivated, whether the terminal is to perform RLM or perform BFD for the deactivated cell group. When configuring configuration information for performing of RLM or BFD for a deactivated cell group, the base station (or network) may configure (include), in MAC control information, beam-related configuration information for configuring of a beam or a bandwidth part in which the RLM or BFD is to be performed, and may multiplex (e.g., include in the same transport block (TB) or the same MAC PDU) the MAC control information with the RRC message so as to transmit the same to the terminal and configure the configuration information for the terminal. In addition, the methods of configuring beam-related configuration information proposed above may be applied. Further, configuration or switching of a bandwidth part, which relates to a bandwidth part in which PLM and BFD is to be performed, may be indicated by DCI of PDCCH.

As another method, if the RRC message (e.g., RRCReconfiguration) includes an indicator for deactivating a cell group (SCG), the base station (or network) may include configuration information in the RRC message and configures the same for the terminal, wherein the configuration information indicates, when the cell group is deactivated, whether the terminal is to perform RLM or perform BFD for the deactivated cell group. When configuring configuration information for performing of RLM or BFD for a deactivated cell group, the base station (or network) may configure (include), in MAC control information, beam-related configuration information for configuring of a beam or a bandwidth part in which the RLM or BFD is to be performed, and may include the MAC control information in a container of the RRC message so as to transmit the same to the terminal and configure the configuration information for the terminal. In addition, the methods of configuring beam-related configuration information proposed above may be applied. Further, configuration or switching of a bandwidth part, which relates to a bandwidth part in which PLM and BFD is to be performed, may be indicated by DCI of PDCCH.

In the following, proposed are methods of, when an uplink data compression (UDC) method is configured in configuration information (pdcp-config) of a PDCP layer device via the RRC message (e.g., RRCReconfiguration), efficiently configuring the UDC method by the base station (network). In order to prevent an unnecessary decompression failure or deterioration of a compression rate, the base station (network) may configure the RRC message and transmit the same to the terminal in consideration of one method or multiple methods among the methods proposed in the following.

First method: When configuring an uplink data compression (UDC) method in configuration information (pdcp-config) of a PDCP layer device, the base station (or network) may configure the UDC method for all bearer types (or bearer-type PDCP layer devices). All bearer types may include an MCG bearer (MCG terminated (MCG or SCG) bearer or bearer with a PDCP layer device on the MCG), an SCG bearer (SCG terminated (SCG or MCG) bearer or bearer with a PDCP layer device on the SCG), or a split bearer (MCG terminated split bearer, SCG terminated split bearer, or bearer with a PDCP layer device on the MCG (or SCG)). The bearer types may indicate a data radio bearer (DRB) or a bearer using an RLC layer device (RLC AM) operating in an acknowledged mode (AM) mode. For example, in the first method, when configuring the uplink data compression (UDC) method in the configuration information (pdcp-config) of the PDCP layer device, the base station (or network) may configure the UDC method for all bearer types (or bearer-type PDCP layer devices) using an RLC layer device (RLC AM) operating in the AM mode. As another method, for example, in the first method, when configuring the uplink data compression (UDC) method in the configuration information (pdcp-config) of the PDCP layer device, the base station (or network) may configure the UDC method for all bearer types (or bearer-type PDCP layer devices) using at least one RLC layer device (RLC AM) operating in the AM mode. This is because, if the UDC compression method is configured (or used) in a bearer using an RLC layer device operating in an UM mode, the performance of the UDC compression method is significantly degraded due to data loss. In addition, in the first method, if configuring the uplink data compression (UDC) method in the configuration information (pdcp-config) of the PDCP layer device, the base station (or network) may prevent an increase in terminal processing complexity by not configuring an ROHC method or an EHC method. For example, in the first method, if not configuring the uplink data compression (UDC) method in the configuration information (pdcp-config) of the PDCP layer device, the base station (or network) may configure the ROHC method or the EHC method. In addition, in the first method, if configuring the ROHC method or the EHC method in the configuration information (pdcp-config) of the PDCP layer device, the base station (or network) may prevent an increase in terminal processing complexity by not configuring the UDC method. In the first method, if not configuring the ROHC method or the EHC method in the configuration information (pdcp-config) of the PDCP layer device, the base station (or network) may configure the UDC method.

Second method: A second method may include the first method (or may be applied in the same manner) and proposes a method of configuring the UDC method differently depending on whether the PDCP layer device, for which the UDC method is to be configured, is an E-UTRA PDCP layer device (or LTE PDCP layer device) or an NR PDCP layer device. In the second method, when configuring the uplink data compression (UDC) method in the configuration information (pdcp-config) of the PDCP layer device, if the PDCP layer device is an E-UTRA PDCP layer device, the base station (or network) may not configure the UDC method for a split bearer (or split DRB) or an LTE- WLAN aggregation (LWA) bearer (LWA bearer or LWA DRB). For example, if the PDCP layer device is an E-UTRA PDCP layer device, the base station (or network) may configure the UDC method only for a bearer (or bearer type) other than a split bearer (or split DRB) or an LTE-WLAN aggregation (LWA) bearer (LWA bearer or LWA DRB). For an E-UTRA PDCP layer device, header (or data) compression or decompression is not implemented due to implementation complexity for a split bearer or an LWA bearer, so that terminal implementation complexity may be increased. In the second method, when configuring the uplink data compression (UDC) method in the configuration information (pdcp-config) of the PDCP layer device, if the PDCP layer device is an NR PDCP layer device, the base station (or network) may configure the UDC method for all bearer types (or bearer-type PDCP layer devices). For example, if the PDCP layer device is an NR PDCP layer device, the base station (or network) may configure the UDC method for all bearer types (or bearer-type PDCP layer devices) using an RLC layer device (RLC AM) operating in the AM mode. For an NR PDCP layer device, header (or data) compression or decompression is implemented for a split bearer, an LWA bearer, or all bearer types, so that the UDC method is implemented in a simple manner so as to increase a data compression rate and save transmission resources. If the base station is an E-UTRA base station and is connected to an evolved packet core (EPC) system, and the terminal supports EN-DC (dual connectivity for LTE and NR), the base station (or network) may configure, for the terminal, an E-UTRA PDCP layer device or an NR PDCP layer device for an MCG terminated MCG bearer regardless of whether dual connectivity is configured for the terminal, and the base station (or network) may configure an NR PDCP layer device for all other bearers (or bearer types) (or all other bearers except an MCG terminated MCG bearer). If the base station is an NR base station and is connected to a 5G core (5GC) system, and MR-DC is configured for the terminal (or in MR-DC (NR and dual connectivity for NR), the base station (or network) may configure an NR PDCP layer device for all bearer types.

In the following, the disclosure newly proposes a dormant bandwidth part in the next-generation mobile communication system, and specifically proposes terminal operations in each bandwidth part when each bandwidth part is shifted or switched.

Figure 7:
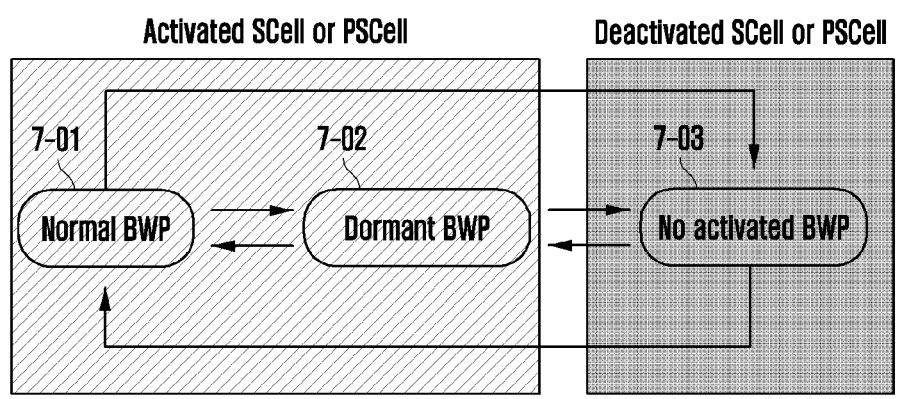
FIG. 7 is a diagram illustrating a bandwidth part-specific state shifting procedure or a bandwidth part switching procedure, according to an embodiment of the disclosure.

FIG. 7 is a diagram illustrating a bandwidth part-specific state shifting procedure or a bandwidth part switching procedure, according to an embodiment of the disclosure.

Referring to FIG. 7, a bandwidth part of each cell (e.g., SCell or PSCell) of each cell group of a terminal may be activated to a normal bandwidth part 7-01, may be activated to a dormant bandwidth part 7-02, or may be deactivated 7-03, and the normal bandwidth part or the dormant bandwidth part may be activated or deactivated based on configuration information of an RRC message, MAC control information, or DCI of PDCCH.

State shifting (activation, deactivation, or making dormant) for each bandwidth part of a cell, activating a normal bandwidth part, activating a dormant bandwidth part, activating a first active bandwidth part activated from dormancy, or deactivating a normal bandwidth part or a dormant bandwidth part, which are proposed in the disclosure, may be performed based on one indication or configuration in the following cases.

A case where a bandwidth part state of a cell is configured via an RRC message, if a bandwidth part of each cell is configured via an RRC message, and a dormant bandwidth part is configured for the cell, or if a first active bandwidth part is configured as a dormant bandwidth part, the cell starts by switching or activating to the dormant bandwidth part, and an operation in the dormant bandwidth part is performed.

A case where a cell activation, deactivation, or dormancy MAC CE is received,

A case where a MAC CE indicating to activate or deactivate a first active bandwidth part or a dormant bandwidth part from a normal bandwidth part or dormancy is received, A case where DCI of PDCCH indicating to activate, deactivate, or switch a first active bandwidth part or a dormant bandwidth part from a normal bandwidth part or dormancy is received, A case where a cell hibernation timer is not configured for an active state cell, and a configured cell inactivity timer expires, A case where a bandwidth part hibernation timer is not configured for an active state bandwidth part, and a configured bandwidth part state inactivity timer (e.g., bwpInactivityTimer) expires, the state shifting or the dormant bandwidth part operating method proposed in the disclosure may have the following characteristics.

For an SPCell (PCell or PSCell) (or downlink bandwidth part or uplink bandwidth part of the cell), a dormant bandwidth part cannot be configured, and only a normal bandwidth part is configured and is always activated. Since synchronization is performed and a main control signal is transmitted or received in an SPCell, if a bandwidth part of the SPCell is dormant or deactivated, or is operated as a dormant bandwidth part, a connection with a base station may be disconnected, so that the bandwidth part of the SPCell should always be kept active.

Despite an SCell or a bandwidth part of an SCell, if a PUCCH is configured, a dormant state or a dormant bandwidth part cannot be configured. Since there may be another cell in which feedback, such as HARQ ACK/NACK, needs to be transmitted via the PUCCH, an active state or a normal bandwidth part needs to be activated so as to be used.

Due to the above characteristics, neither a cell inactivity timer (ScellDeactivationTimer) nor a bandwidth part hibernation timer is applied to an SPCell or a bandwidth part of an SPCell, and to an SCell or a bandwidth part of an SCell, for which a PUCCH is configured, the timers may operate only for other SCells.

A cell or bandwidth part hibernation timer (ScellHibernationTimer) has priority over a cell or bandwidth part state inactivity timer (ScellDeactivationTimer). For a timer value, if one value is configured via an RRC message, the same value may be applied to all cells. As another method, a base station may configure a different timer value for each SCell or for each BWP in consideration of characteristics of each SCell or each BWP.

Unless a cell or a bandwidth part is indicated to be active or dormant via an RRC message, the cell or the bandwidth part operates initially in a deactivated state by default.

In the disclosure, an uplink may indicate an uplink bandwidth part, and a downlink may indicate a downlink bandwidth part. This is because only one active or dormant bandwidth part is operable for each uplink or downlink.

In the disclosure, an active state, a deactivated state, or a dormant state is operated, and when a cell or a bandwidth part is shifted or switched, shifting or switching is performed in a bandwidth part level, wherein, when state shifting or switching occurs according to a bandwidth part level, state shifting or switching is performed, in a bandwidth part (downlink bandwidth part or uplink bandwidth part) for which state shifting or switching is indicated, according to the indication of state shifting or switching. For example, if a bandwidth part (downlink bandwidth part or uplink bandwidth part) is shifted from an active state to a dormant state or is switched (activated) to a dormant bandwidth part, the bandwidth part may be shifted to a dormant state or may be switched (or activated) to a dormant bandwidth part.

In the disclosure, bandwidth part switching (BWP switching) refers to a case where, when bandwidth part switching is indicated via DCI of PDCCH, if the switching is indicated by a bandwidth part identifier during downlink assignment allocation, a downlink bandwidth part is switched to a bandwidth part indicated by the bandwidth part identifier, and refers to a case where, when bandwidth part switching is indicated via DCI of PDCCH, if the switching is indicated by a bandwidth part identifier during UL grant allocation, an uplink bandwidth part is switched to a bandwidth part indicated by the bandwidth part identifier. Since a DCI format of a PDCCH itself is different from a format (format1) for downlink assignment and a format (format0) for UL grant, even if an uplink and a downlink are not separately described, the terminal may operate according to the DCI format.

The method of operating state shifting according to a bandwidth part level, and the bandwidth part operations according to respective states, proposed in the disclosure, may be extended and applied to various embodiments. In the following of the disclosure, specific embodiments, in which the contents proposed in the disclosure are extended and applied, will be described.

Figure 8:
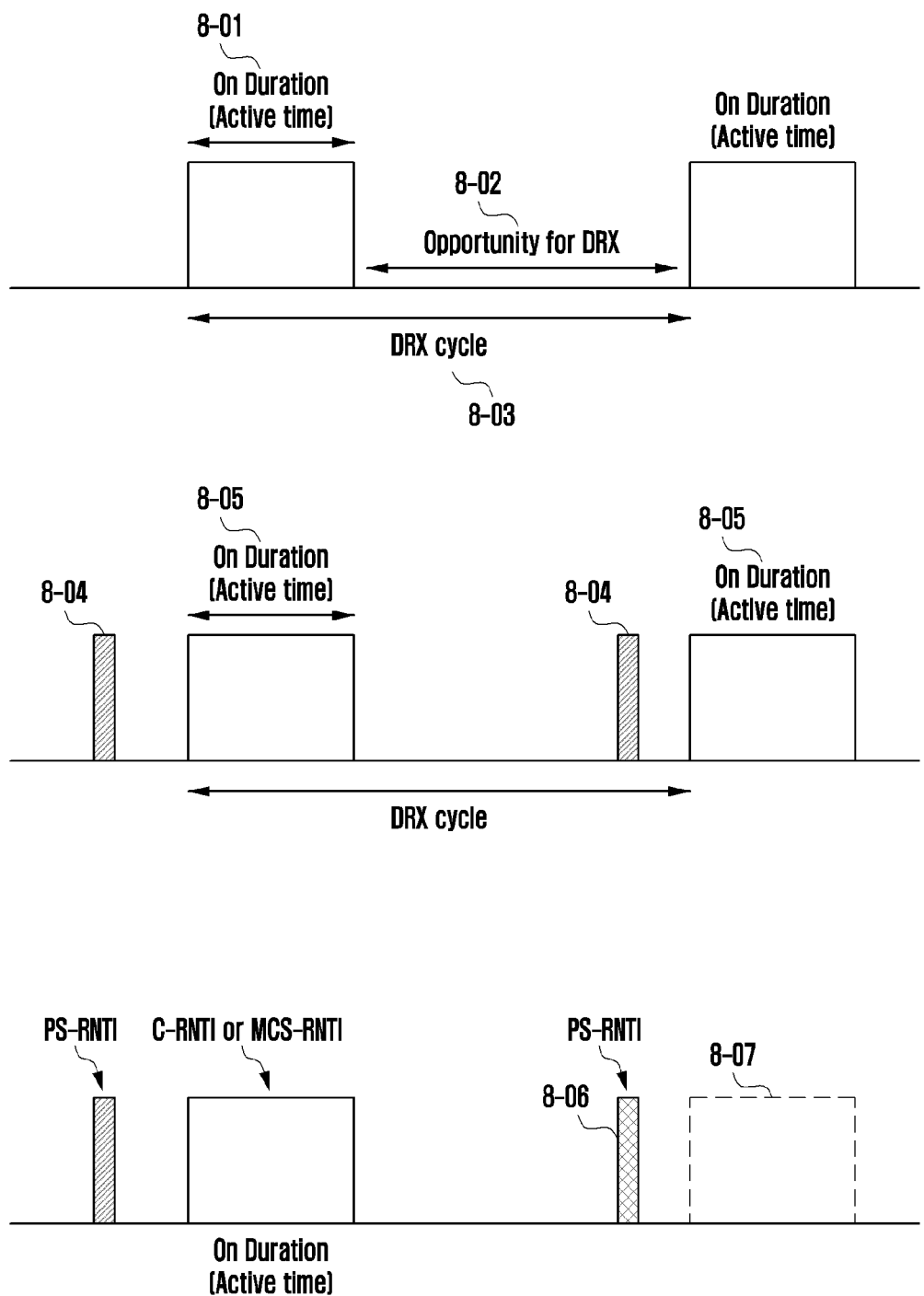
FIG. 8 is a diagram illustrating a discontinuous reception (DRX) configuration or DRX operation method capable of reducing battery consumption of a terminal, according to an embodiment of the disclosure.

FIG. 8 is a diagram illustrating a DRX configuration or DRX operation method capable of reducing battery consumption of a terminal, according to an embodiment of the disclosure.

Referring to FIG. 8, a base station may configure a terminal with a DRX function, such as a DRX cycle, a DRX start point, an offset, or on-duration (active time), for a PCell, an SCell, or PSCell via an RRC message, as shown in FIG. 6. In the disclosure, it is considered to configure the DRX function for a PCell, an SPCell, or a PSCell.

If the DRX function is configured for a PCell (or SPCell or PSCell), the terminal may apply the DRX function in consideration of a DRX cycle 8-03, a DRX start time, or an offset. When the DRX function is applied, the terminal may monitor a PDCCH or DCI of a PDCCH, which may be received from the base station, in the PCell only in an active time interval (on-duration or active time, 8-01) of DRX. The terminal may reduce battery consumption by preventing the terminal from monitoring a PDCCH or DCI of a PDCCH outside the active time interval (outside active time, 8-02) of the DRX function.

In FIG. 6, the base station may configure a power saving function (power saving mode) for the terminal via an RRC message in order to further improve reduction of battery consumption of the terminal. If the power saving function is configured together with the DRX function, the terminal monitors a PDCCH outside the active time interval for a short time interval 8-04 configured via RRC before the active time 8-01, during which the terminal needs to monitor a PDCCH, in the DRX function, and the terminal monitors and receives a wake-up signal (WUS) outside the active time interval. The base station may indicate, using a bit of DCI of PDCCH of the WUS signal, whether or not the terminal should perform PDCCH monitoring in subsequent active time 8-05 or 8-07.

For example, the terminal, for which the power saving function or the DRX function has been configured, may monitor a WUS signal for the short time interval 8-04 configured via an RRC message before every active time 8-05, and if a bit value of DCI of PDCCH relating to the subsequent active time 8-05 or 8-07 has 0 (or 1) in the received WUS signal, the terminal may be indicated not to perform PDCCH monitoring for the subsequent active time 8-07, or the terminal may be indicated not to perform PDCCH monitoring, by preventing a timer corresponding to the subsequent active time from operating in a MAC layer. If the bit value of DCI of PDCCH relating to the subsequent active time 8-05 or 8-07 has 1 (or 0) in the received WUS signal, the terminal may be indicated to perform PDCCH monitoring for the subsequent active time 8-05, or may be indicated to perform PDCCH monitoring, by causing the timer corresponding to the subsequent active time to operate in the MAC layer.

The terminal may not monitor a WUS signal or a PDCCH for detecting of a WUS signal in an active time interval.

When monitoring a WUS signal for the short time interval 8-04 configured via the RRC message before every active time 8-05, the terminal, for which the power saving function or the DRX function has been configured, may detect the signal by checking a PDCCH by using a first RNTI identifier (e.g., PS-RNTI) 8-06. The first RNTI identifier (e.g., PS-RNTI) may be configured for multiple terminals, and the base station may concurrently indicate, using the first RNTI identifier (e.g., PS-RNTI), to multiple terminals whether or not to perform PDCCH monitoring in a subsequent active time interval.

When monitoring and detecting a PDCCH in the active time 8-05, the terminal, for which the power saving function or the DRX function has been configured, may detect a signal, based on a second RNTI (e.g., C-RNTI), a third RNTI (e.g., MCS-C-RNTI), or a fourth RNTI (e.g., SPS-C-RNTI or CS-RNTI) uniquely configured for the terminal via the RRC message. The second RNTI (e.g., C-RNTI) may be used for indicating general terminal scheduling, the third RNTI (e.g., MCS-C-RNTI) may be used for indicating a modulation and coding scheme of the terminal, and the fourth RNTI (SPS-C-RNTI or CS-RNTI) may be used for indicating a periodic transmission resource of the terminal.

Based on the method proposed in FIG. 8, the base station may indicate a state of a cell or a cell group of the terminal to be activated, deactivated, or dormant by using DCI of PDCCH in the active time 8-05 or the short time interval 8-04 configured via the RRC message. In addition, the terminal may perform PDCCH monitoring to receive an indication for the state of the cell or cell group in the active time 8-05 or the short time interval 8-04 configured via the RRC message. If dual connectivity is configured for the terminal, the terminal may perform PDCCH monitoring in the active time 8-05 or the short time interval 8-04 configured via the RRC message in a PCell of an MCG, the DCI of PDCCH may receive an indication for an activation, deactivation, or dormant state with respect to a cell (SCell) of the MCG or a PSCell (or SCell) of an SCG, and the terminal may perform, according to the indication, activation, deactivation, or dormancy of the cell (or bandwidth part) or switching of a bandwidth part. For example, the base station may configure, for the terminal, an activation, deactivation, or dormant state with respect to the cell (SCell) of the MCG or the PSCell (or SCell) of the SCG via the DCI of PDCCH in the active time 8-05 or the short time interval 8-04 configured via the RRC message in the PCell of the MCG.

Figure 9:
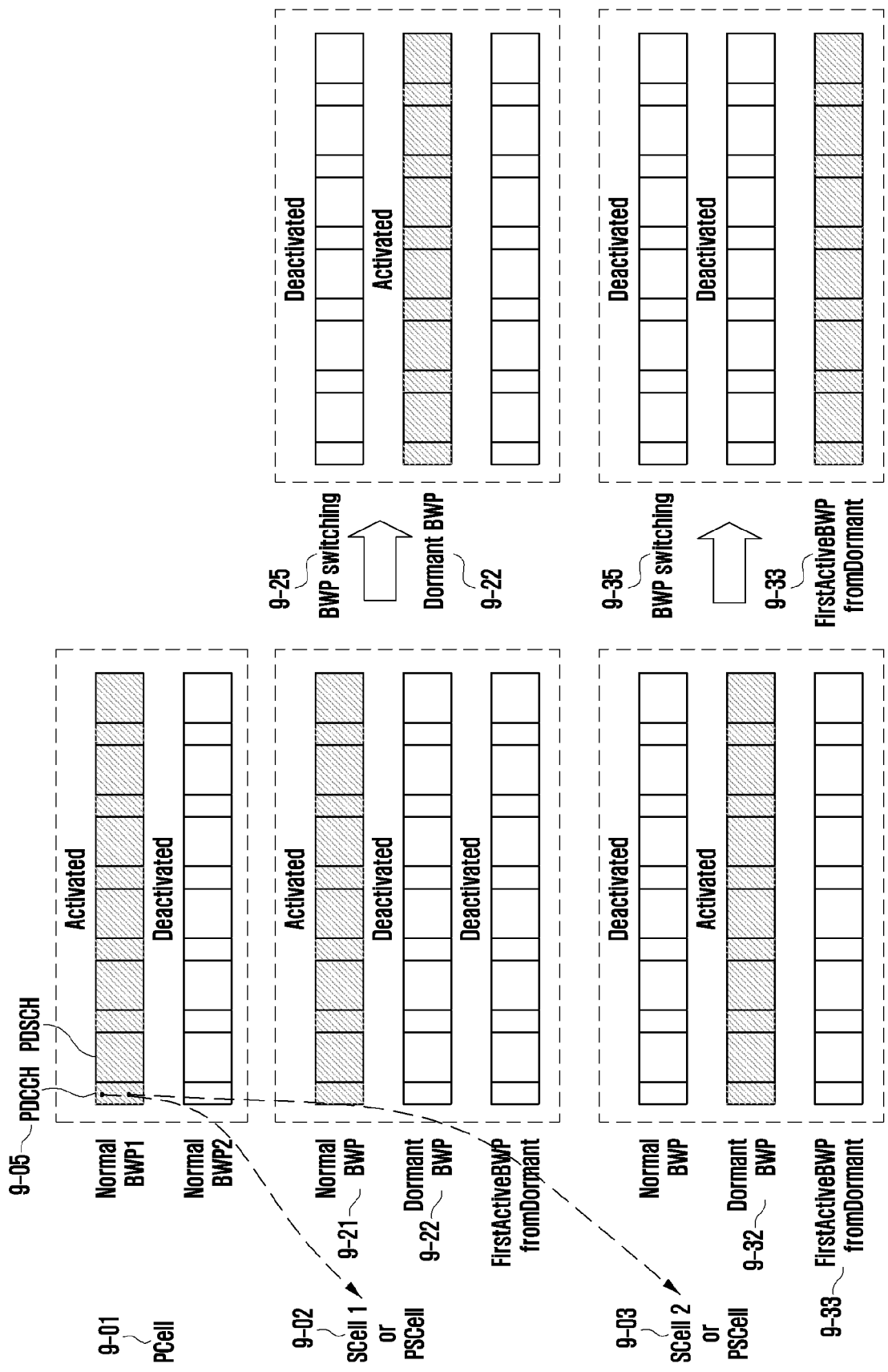
FIG. 9 is a diagram illustrating a concept of a method of operating a dormant bandwidth part in an activated SCell or PSCell, according to an embodiment of the disclosure.

FIG. 9 is a diagram illustrating the concept of a method of operating a dormant bandwidth part in an activated SCell or PSCell, according to an embodiment of the disclosure.

As shown in FIG. 6, a base station may, for a terminal via an RRC message, configure multiple SCells for carrier aggregation, assign each SCell identifier, configure a dormant bandwidth part for each SCell or configure multiple cell groups for dual connectivity and assign a cell group identifier, and configure or indicate a cell group suspension indicator or configure a dormant bandwidth part with respect to each cell group or a PSCell of each cell group. The multiple SCells may be included in each SCell group so as to be configured, and one SCell group may include multiple SCells. An SCell group identifier may be assigned to each SCell group, and multiple SCell identifiers may be configured to be included in or mapped to each SCell group identifier. An SCell identifier value or an SCell group identifier value may be assigned with a predetermined bit value, or may have an integer value (or natural number value). Alternatively, the PSCell of each cell group may be indicated by a cell group identifier.

Referring to FIG. 9, the base station may define a new bitmap in DCI of PDCCH transmitted in a PCell, may perform mapping to cause each bit value of the bitmap to indicate each SCell identifier value, each SCell group identifier value, a cell group (or secondary cell group) identifier, or a PSCell (or SCell) of a cell group (or secondary cell group), and may indicate, by defining each bit value, whether to perform switching to a dormant bandwidth part, whether to activate a dormant bandwidth part, or whether to suspend or resume a cell group, with respect to the SCell, the SCells belonging to an SCell group, the cell group (or secondary cell group), or the PSCell (or SCell) of the cell group (or secondary cell group), which correspond to the bit. With respect to the SCell, SCells belonging to an SCell group, the cell group (or secondary cell group) identifier, or the PSCell (or SCell) of the cell group (or secondary cell group), which correspond to the bit, whether to switch from a dormant bandwidth part to a normal bandwidth part (e.g., first active bandwidth part activated from dormancy) or whether to activate a normal bandwidth part (e.g., first active bandwidth part activated from dormancy) may be indicated.

In FIG. 9, after receiving DCI of PDCCH in a PCell 9-01, the terminal may identify, while reading the DCI, whether there is a bitmap including an indication (e.g., switching or activating to a dormant bandwidth part, or switching or activating to a normal bandwidth part) for bandwidth parts of SCell groups or an SCell, or an indication indicating to suspend or resume a cell group (or secondary cell group) or a PSCell (or SCell) of a cell group (or secondary cell group), and if there is the bitmap, with respect to the SCell, the SCells 9-02 and 9-03 belonging to an SCell group, the cell group (or secondary cell group), or the PSCell (or SCell) of the cell group (or secondary cell group), indicated by each bit of the bitmap, the terminal may switch or activate the bandwidth parts or suspend or resume the cell groups according to the bit value. For example, if the bit of the bitmap indicates a first SCell (or first SCell identifier) 9-02, a cell group (or secondary cell group), or a PSCell (or SCell) of a cell group (or secondary cell group), or indicates an SCell group (or SCell group identifier) including the first SCell, and the bit value is 0 (or 1), the terminal may, with respect to the first SCell 9-02, the cell group (or secondary cell group), or the PSCell (or SCell) of the cell group (or secondary cell group), activate a bandwidth part 9-21 to a dormant bandwidth part 9-22, or switch a current bandwidth part to the dormant bandwidth part 9-22, or if the current bandwidth part is not a dormant bandwidth part, the terminal may switch or activate 9-25 the currently activated bandwidth part 9-21 to the dormant bandwidth part 9-22, or may suspend or deactivate the cell group. As another method, a bandwidth part of a cell group (or secondary cell group) or that of a PSCell (or SCell) of a cell group (or secondary cell group) is maintained as it is, the second DRX configuration information or second SRS configuration information proposed in the disclosure is applied, and PDCCH monitoring or SRS transmission is performed with a long cycle, so that power consumption of the terminal may be reduced.

In FIG. 9, after receiving DCI of PDCCH in the PCell 9-01, the terminal may identify, while reading the DCI, whether there is a bitmap including an indication (e.g., switching or activating to a dormant bandwidth part, or switching or activating to a normal bandwidth part) for bandwidth parts of SCell groups or an SCell, an indication for a bandwidth part of a cell group (or secondary cell group) or a PSCell (or SCell) of a cell group (or secondary cell group), or an indication indicating to suspend or resume a cell group, and if there is the bitmap, with respect to the SCell, the SCells 9-02 and 9-03 belonging to an SCell group, the cell group (or secondary cell group), or the PSCell (or SCell) of the cell group (or secondary cell group), which is indicated by each bit of the bitmap, the terminal may switch or activate the bandwidth parts or suspend or resume the cell groups according to the bit value. For example, if the bit of the bitmap indicates the second SCell (or second SCell identifier) 9-03 or indicates an SCell group (or SCell group identifier) including the second SCell, a cell group (or secondary cell group), or a PSCell (or SCell) of a cell group (or secondary cell group) and the bit value is 1 (or 0), if a currently activated bandwidth part of the second SCell 9-03 is a dormant bandwidth part 9-32, if the currently activated bandwidth part is not a normal bandwidth part, or if the current bandwidth part (or cell) is activated and the current bandwidth part is activated to the dormant bandwidth part 9-32 (or activated to a bandwidth part other than a normal bandwidth part), the terminal may switch or activate 9-35 the bandwidth part of the second SCell 9-03 to a bandwidth part (e.g., first active bandwidth part activated from dormancy, 9-33) configured via an RRC message or may resume or activate the cell group. When, due to the bit value of 1 (or 0), the SCell, the SCells belonging to an SCell group, the cell group (or secondary cell group), or the PSCell (or SCell) of the cell group (or secondary cell group), indicated by the bit, should be switched or activated to a bandwidth part other than a dormant bandwidth part, or the cell group should be resumed, if, for the SCell or each of the SCells belonging to the SCell group, the SCell is deactivated or the SCell is activated and an activated bandwidth part is not a dormant bandwidth part (or is a normal bandwidth part), then the bit value may not be applied, may be disregarded, or may not be read, or if the cell group (or secondary cell group) or the PSCell (or SCell) of the cell group (or secondary cell group) has already been active or resumed, then the bit value may not be applied, may be disregarded, or may not be read. When, due to the bit value of 0 (or 1), the SCell, the SCells belonging to an SCell group, the cell group (or secondary cell group), or the PSCell (or SCell) of the cell group (or secondary cell group), indicated by the bit, should be switched or activated to a dormant bandwidth part, or the cell group should be suspended, if, for the SCell or each of the SCells belonging to the SCell group, the SCell is active and an activated bandwidth part is a dormant bandwidth part, then the bit value may not be applied, may be disregarded, or may not be read, or if the cell group (or secondary cell group) or the PSCell (or SCell) of the cell group (or secondary cell group) has already been suspended or deactivated, then the bit value may not be applied, may be disregarded, or may not be read.

In the following, the disclosure proposes methods capable of rapidly activating a cell (SCell, PSCell, or SCell) when activating the same.

Specifically, the base station may configure, via an RRC message (RRCReconfiguration or RRCResume), first channel measurement configuration information enabling rapid measuring and reporting of a channel when the terminal activates a cell. In the first channel measurement configuration information, in order to rapidly activate the cell or a cell group, configuration information of a cell (e.g., PCell, PSCell, or SCell) of the cell group may include configuration information which enables the base station to transmit a large number of channel measurement signals temporarily or transmit channel measurement signals frequently so that channel measurement may be rapidly performed in the cell, wherein the configuration information includes a cycle for a frequent channel measurement signal (e.g., a radio resource, a temporary reference signal or tracking reference signal (TRS), a synchronization signal block (SSB), a channel state information reference signal (CSI-RS), or a reference signal (RS)), transmission resource information for transmission (frequency or time transmission resource in which the frequent channel measurement signal is transmitted), an interval or a frequency (the number of times the frequent channel measurement signal is transmitted), a timer value (time at which the frequent channel measurement signal is transmitted), a time interval (interval in which the frequent channel measurement signal is transmitted (e.g., an offset of a time unit (slot, subframe, symbol, or the like)), or a transmission resource, cycle, interval, timing, offset, or the like via which the terminal should report a measurement result. The first channel measurement configuration information may enable configuration of a short reporting cycle (or transmission resource) in which the terminal may report a channel measurement result, or may enable configuration of a transmission resource for channel measurement so that the base station is able to transmit a large number of channel measurement signals (or transmission resources or, for example, radio resources or temporary reference signals or tracking reference signals (TRSs)) or transmit channel measurement signals frequently so as to support the terminal to perform rapid channel measurement or measure more signals. The first channel measurement configuration information may include configuration information, from the base station, for a channel measurement signal for a specific terminal (or terminals) in the cell or bandwidth part. The first channel measurement configuration information may be configured differently for each cell or each bandwidth part with respect to multiple cells or bandwidth parts configured by the RRC message, and in order to support the terminal to easily measure the transmission resources for channel measurement, beam-related configuration information (transmission configuration indication (TCI) state or Quasi Co-Location (QCL)), such as a beam direction, a beam number, or a beam location, may be configured together. In the first channel measurement configuration information, a timing advance (TA) value (or offset value) for synchronization of a downlink signal of the base station or an uplink signal of the base station, a timer (time alignment timer (TAT)) indicating validity of the TA value, or a timer value (TAT value) is configured, so that channel measurement or channel measurement reporting may be performed properly. For example, the first channel measurement configuration information may include a cycle of the channel measurement signal, the number of signal transmissions, a period in which the signal is transmitted, an offset for the time at which the signal is transmitted, a duration between transmitted signals, a list of multiple transmittable channel measurement signals, a time transmission resource (or frequency transmission resource) indicating a location of the signal to be transmitted, a transmission resource (time transmission resource or frequency transmission resource) for reporting of a measurement result, a cycle of reporting the measurement result, beam-related configuration information (transmission configuration indication (TCI) state or Quasi Co-Location (QCL)) for measuring of the channel measurement signals, or the like. The first channel measurement configuration information configured via the RRC message may include multiple pieces of channel measurement signal information, and beam configuration information or one piece of channel measurement signal information among the multiple pieces of channel measurement signal information configured in the above via the RRC message, MAC CE, or DCI is indicated, so that the terminal may perform channel measurement or channel measurement reporting by applying or using the indicated beam configuration information or channel measurement signal information. The indication may include defining mapping of a bitmap, an index, or an identifier and each piece of channel measurement signal information configured in the above, and performing indication based on the defined mapping. As another method, by configuring or indicating the channel measurement signal information via the RRC message or MAC CE, the terminal may perform channel measurement or channel measurement reporting by applying or using the configured (or indicated) channel measurement signal information.

As another method, when the first channel measurement configuration information is included in the RRC message so as to be configured for the terminal, if a cell is configured to be active via the RRC message and is thus indicated to be active via the RRC message, the terminal may apply and use the first channel measurement configuration information to perform channel measurement or reporting rapidly so that the cell is rapidly activated. For example, the first channel measurement configuration information, channel measurement signal information, or beam-related configuration information, which is applicable when a cell is configured to be active via the RRC message and is thus indicated to be active via the RRC message, may be configured as separate configuration information in the RRC message (if only default configuration, channel measurement signal information (or beam-related configuration information) corresponding to identifier 0, or one piece of channel measurement signal information (or beam-related configuration information) is configured, the channel measurement signal information (or beam-related configuration information) is applied).

The first channel measurement configuration information proposed in the disclosure may be available for configuration of only downlink bandwidth part configuration information for each cell. For example, the first channel measurement configuration information proposed in the disclosure may not be available for configuration of uplink bandwidth part configuration information for each cell. This is because, only after first measuring a downlink channel and then reporting a measurement result of the channel or cell, the terminal may be able to correctly receive a PDCCH and follow the indication of the base station.

The first channel measurement configuration information proposed in the disclosure may be initially deactivated when configured via an RRC message or after handover, and may be activated later by MAC control information, DCI information of a PDCCH, or an RRC message, which will be proposed later in this disclosure. When the configuration is performed via an RRC message as in the above, the base station may easily manage a cell state or channel measurement of the terminal only when an initial state is a deactivated state, and a timing of when and how the terminal is to perform channel measurement may be accurately performed without a processing delay problem of the RRC message.

The second channel measurement configuration information may be included and configured in the RRC message (RRCReconfiguration or RRCResume). The second channel measurement configuration information may include general channel measurement configuration information, such as a transmission resource, cycle, time interval, or frequency of the channel measurement signal, or a transmission resource, cycle, or time interval for channel measurement reporting.

In the following, the disclosure proposes a MAC control information (MAC control element) structure or indication method, in which, when first channel measurement configuration information or second channel measurement information is configured for the terminal via an RRC message as proposed in the above, while activating a cell, channel measurement or measurement result reporting may be rapidly performed based on the first channel measurement configuration information, and the cell may be rapidly activated. For example, MAC control information (or RRC message) proposed in the disclosure may indicate a cell to be activated or deactivated from among multiple cells (SCells) configured via RRC, or if a cell is indicated to be activated, the MAC control information (or RRC message) may indicate measurement signal information to be applied, a method to measure a signal (for example, a signal transmission resource number for measurement, the number of signals to be transmitted, a time interval in which the signal is to be measured, an offset based on which a measurement time interval is to be determined, a cycle at which the signal is to be measured, a transmission resource in which the signal is to be measured, or the like may be indicated), and a method to perform reporting (for example, a measurement result number for reporting, a time interval in which a measurement result is to be reported, an offset based on which a measurement result reporting transmission resource is to be determined, a cycle at which the measurement result is to be reported, a transmission resource in which the measurement result is to be reported, or the like may be indicated) from first channel measurement configuration information configured via the RRC message, thereby enabling rapid cell activation based on the first channel measurement configuration information configured via the RRC message.

Figure 10:
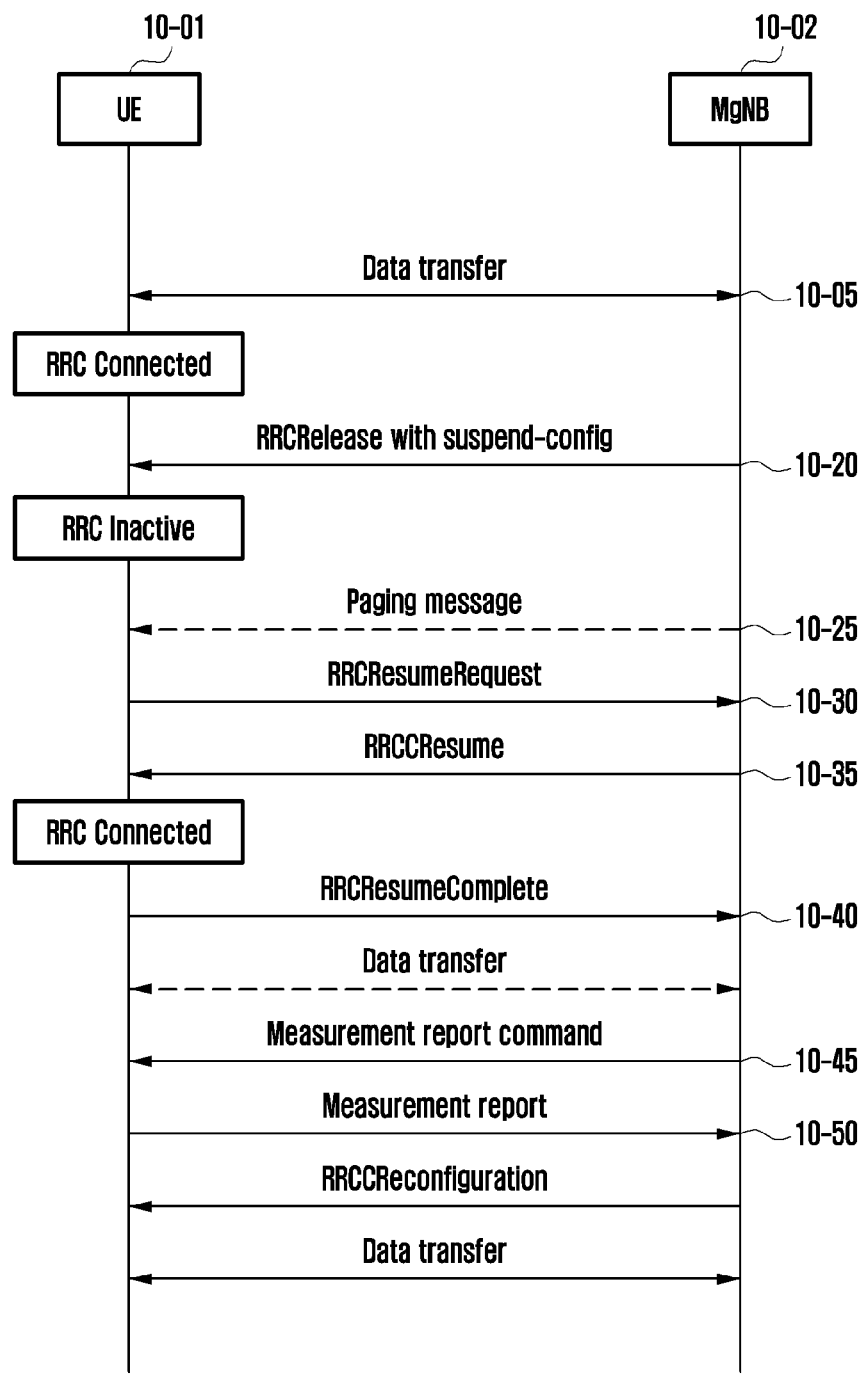
FIG. 10 is a diagram illustrating an embodiment in which embodiments proposed in the disclosure are extended and applied to an RRC inactive mode terminal according to an embodiment of the disclosure.

FIG. 10 is a diagram illustrating an embodiment in which embodiments proposed in the disclosure are extended and applied to an RRC inactive mode terminal according to an embodiment of the disclosure.

In the disclosure, a cell group or a cell may indicate a PCell of a master cell group (MCG), an SCell of an MCG, a PSCell of a secondary cell group (SCG), or an SCell of an SCG.

The above embodiments propose that, in the RRC connected mode as in FIG. 6, even if a terminal shifts SCell configuration information (e.g., the control described or proposed in FIG. 6) or PSCell (or SCell) configuration information of a cell group (e.g., secondary cell group), configured or stored for the proposed embodiments, to the RRC inactive mode, the terminal does not clear or discard the SCell or PSCell (or SCell) configuration information and continues storing the same. In addition, it is proposed that, when RRC connection resumption is performed, the terminal in the RRC inactive mode determines whether to discard or clear, maintain and apply, or reconfigure the stored SCell configuration information (e.g., configuration information described or proposed in FIG. 6) or PSCell (or SCell) configuration information of a cell group (e.g., secondary cell group), via reconfiguration or via an indicator of an RRCReconfiguration message or an RRCResume message transmitted by the base station. When the base station transmits, to the terminal, an RRCRelease message including an indicator or configuration for shifting the terminal to the RRC inactive mode, the base station may include and transmit configuration information or an indicator indicating whether to discard or clear, maintain and apply, or reconfigure the SCell configuration information (e.g., configuration information described or proposed in FIG. 6) or the PSCell (or SCell) configuration information of a cell group (e.g., secondary cell group), the configuration information or indicator being stored in the RRCRelease message. The terminal may perform movement in the RRC inactive mode, and when performing RAN notification area (RNA) updating, the terminal may receive and apply the configuration information or indicator indicating whether to discard or clear, maintain and apply, or reconfigure the SCell configuration information (e.g., configuration information described or proposed in FIG. 6) or the PSCell (or SCell) configuration information of a cell group (e.g., secondary cell group), the configuration information or indicator being stored in the RRCRelease message that the base station has transmitted to the terminal.

In the embodiment proposed in the disclosure, the base station may allow a first active bandwidth part of downlink or uplink bandwidth part configuration information of each cell to be configured as a dormant bandwidth part, in the SCell configuration information (e.g., configuration information described or proposed in FIG. 6) or PSCell (or SCell) configuration information of the cell group (e.g., secondary cell group) of the RRC message, and when the terminal activates each SCell, each cell group, or a PSCell of each cell group, the base station may directly enable operation, as a dormant bandwidth part, of a downlink bandwidth part or uplink bandwidth part of each SCell, each cell group, or the PSCell of each cell group, or may enable suspension or resumption of the cell group, thereby reducing battery consumption of the terminal.

As another method, in the embodiment proposed in the disclosure, the base station may not configure, as a dormant bandwidth part, a first active bandwidth part of downlink or uplink bandwidth part configuration information of each cell, in the SCell configuration information (e.g., configuration information described or proposed in FIG. 6) or PSCell (or SCell) configuration information of the cell group (e.g., secondary cell group) of the RRC message, and when the terminal activates or resumes each SCell, each cell group, or a PSCell of each cell group, the base station may always cause activation of a downlink bandwidth part or uplink bandwidth part of each SCell, each cell group, or the PSCell of each cell group to a first active bandwidth part, and may enable switching or activation to a dormant bandwidth part or may enable suspension or resumption of the cell group, thereby reducing battery consumption of the terminal in the embodiments proposed in the disclosure.

The embodiment proposed above may be extended to each SCell configuration information or PSCell configuration information of a master cell group (MCG) or a secondary cell group (SCG) of the terminal, for which dual connectivity has been configured, so as to be applied. For example, the SCell configuration information or PSCell configuration information of the SCG may also be stored when the terminal is shifted to the RRC inactive mode, and when RRC connection resumption is performed as in the above, or when the terminal is shifted to the RRC inactive mode, the base station may transmit, to the terminal, configuration information or an indicator indicating whether to discard or clear, maintain and apply, or reconfigure the SCell configuration information (e.g., configuration information described or proposed in FIG. 6) or the PSCell configuration information of the MCG or SCG, stored in the RRC message (e.g., RRCResume, RRCReconfiguration, or RRCRelease).

Referring to FIG. 10, a terminal 10-01 may perform network connection to a base station 10-02 and may transmit or receive data 10-05. If, for a predetermined reason, the base station needs to shift the terminal to the RRC inactive mode, the base station may transmit an RRCRelease message 10-20 so as to shift the terminal to the RRC inactive mode. The base station may transmit, to the terminal, the RRC message (e.g., RRCRelease) including configuration information or an indicator indicating whether to discard or clear, maintain and apply, or reconfigure the stored SCell configuration information (e.g., configuration information described or proposed in FIG. 6) or PSCell (SCell) configuration information of a cell group (e.g., secondary cell group) of the MCG or SCG. For the terminal to which dual connectivity is applied, the base station may determine whether to suspend and resume master cell group bearer configuration, RRC configuration information, or SCell configuration information of the MCG or SCG, and may inquire, in order to determine whether to suspend or resume secondary cell group bearer configuration and RRC configuration information, a secondary cell base station about the suspension or resumption and receive a respond thereto, thereby determining the suspension or resumption of secondary cell group bearer configuration and RRC configuration information. The base station may configure a list of frequencies to be measured by the terminal in an RRC idle mode or an RRC inactive mode, frequency measurement configuration information, a frequency measurement period, or the like via the RRCRelease message.

The terminal in the RRC inactive mode may, while moving, receive 10-25 a paging message and perform RRC connection resumption when uplink data needs to be transmitted or a RAN notification area needs to be updated.

If the terminal needs to establish a connection, the terminal performs random access, and when transmitting an RRCResumeRequest message to the base station, terminal operations related to transmission of the message are as follows 10-30.

1. When the terminal identifies system information, and the system information indicates transmission of a full terminal connection resumption identifier (I-RNTI or full resume ID), the terminal prepares to transmit the message including the stored full terminal connection resumption identifier (I-RNTI). If the system information indicates to transmit a truncated terminal connection resumption identifier (truncated I-RNTI or truncated resume ID), the terminal configures the stored full terminal connection resumption identifier (I-RNTI) into a truncated terminal connection resumption identifier (truncated resume ID) according to a predetermined method, and prepares to transmit the message including the configured truncated terminal connection resumption identifier.

2. The terminal restores RRC connection configuration information and security context information from stored terminal context.

3. The terminal updates a new KgNB security key corresponding to a master cell group, based on a current KgNB security key, a NextHop (NH) value, and an NCC value which is received via the RRCRelease message and stored.

4. If the terminal receives an SCG-counter value (or sk-counter) via the RRCRelease message, the terminal updates a new SKgNB security key corresponding to a secondary cell group, based on the KgNB security key and the SCG-counter (or sk-counter).

5. The terminal derives new security keys (K_RRCenc, K_RRC_int, K_UPint, and K_UPenc) to be used in integrity protection and verification and in encryption and decryption, by using the newly updated KgNB security key.

6. If the terminal receives the SCG-counter value (or sk-counter) via the RRCRelease message, the terminal derives new security keys (SK_RRCenc, SK_RRC_int, SK_UPint, and SK_UPenc) to be used in integrity protection and verification and in encryption and decryption, by using the newly updated SKgNB security key corresponding to the secondary cell group.

7. The terminal calculates MAC-I and prepares to transmit the message including the calculated MAC-I.

8. The terminal resumes SRB1 (SRB1 should be resumed in advance because the RRCResume message is to be received via SRB1 in response to the RRCResumeRequest message to be transmitted).

9. The terminal configures the RRCResumeRequest message and transmits the message to a lower layer.

10. The terminal resumes the integrity protection and verification by applying the updated security keys and a preconfigured algorithm with respect to all bearers (MCG terminated RBs) except for SRB0 corresponding to the master cell group, and applies the integrity verification and protection to data to be transmitted and received at a later time (the resumption and application of the integrity verification and protection are performed to increase reliability and security on data transmitted to or received from SRB1 or DRBs at a later time).

11. The terminal resumes the encryption and decryption by applying the updated security keys and a preconfigured algorithm with respect to all bearers (MCG terminated RBs) except for SRB0 corresponding to the master cell group, and applies the encryption and decryption to data to be transmitted and received at a later time (the resumption and application of the encryption and decryption are performed to increase reliability and security on data transmitted to or received from SRB1 or DRBs at a later time).

12. If the terminal receives the SCG-counter value (or sk-counter) via the RRCRelease message, the terminal resumes the integrity protection and verification by applying the updated security keys and a preconfigured algorithm with respect to all bearers (SCG terminated RBs) corresponding to the secondary cell group, and applies the integrity protection and verification to data to be transmitted and received at a later time (the resumption and application of the integrity protection and verification are performed to increase reliability and security on the data to be transmitted to or received from DRBs at a later time).

13. If the terminal receives the SCG-counter value (or sk-counter) via the RRCRelease message, the terminal resumes the encryption and decryption by applying the updated security keys and a preconfigured algorithm with respect to all bearers (SCG terminated RBs) corresponding to the secondary cell group, and applies the encryption and decryption to data to be transmitted and received at a later time. (The resumption and application of the encryption and decryption are performed to increase reliability and security on the data to be transmitted to or received from DRBs at a later time.)

When the terminal needs to establish a connection and performs random access, transmit the RRCResumeRequest message to the base station, and then receives 10-35 the RRCResume message in response thereto, proposed terminal operations are as follows. If the RRCResume message includes an indicator indicating to report, if the terminal has a valid frequency measurement result measured in the RRC inactive mode, the frequency measurement result, the terminal may include the frequency measurement result in an RRCResumeComplete message so as to report the same. The base station may transmit, to the terminal, the RRC message (e.g., RRCResume) including configuration information or an indicator indicating whether the terminal is to discard or clear, maintain and apply, or reconfigure the stored SCell configuration information (e.g., configuration information described or proposed in FIG. 6) of the MCG or SCG.

1. When the message is received, the terminal restores a PDCP state corresponding to the master cell group, resets a COUNT value, and re-establishes PDCP layer devices of all DRBs (MCG terminated RBs) and SRB2 corresponding to the master cell group.

2. If the terminal receives an SCG-counter value (or sk-counter) via the message, the terminal updates a new SKgNB security key corresponding to the secondary cell group, based on a KgNB security key and the SCG-counter (or sk-counter). The terminal derives new security keys (SK_RRCenc, SK_RRC_int, SK_UPint, and SK_UPenc) to be used in integrity protection and verification and in encryption and decryption, by using the newly updated SKgNB security key corresponding to the secondary cell group.

3. If the message includes master cell group (masterCellgroup) configuration information.
   A. The terminal performs and applies the master cell group configuration information included the message. The master cell group information may include configuration information on RLC layer devices belonging to the master cell group, a logical channel identifier, a bearer identifier, and the like.

4. If the message includes bearer configuration information (radioBearerConfig).
   A. The terminal performs and applies the bearer configuration information (radioBearerConfig) included in the message. The bearer configuration information (radioBearerConfig) may include configuration information on PDCP layer devices, configuration information on SDAP layers devices, a logical channel identifier, a bearer identifier, etc. for each of bearers.

5. If the message includes secondary cell group (secondaryCellgroup) configuration information.
   A. The terminal performs and applies the secondary cell group configuration information included in the message. The secondary cell group information may include configuration information on RLC layer devices belonging to the secondary cell group, a logical channel identifier, a bearer identifier, and the like.

6. If the message includes secondary bearer configuration information (radioBearerConfig).
   A. The terminal performs and applies the secondary bearer configuration information (radioBearerConfig) included in the message. The secondary bearer configuration information (radioBearerConfig) may include configuration information on PDCP layer devices, configuration information on SDAP layer devices, a logical channel identifier, a bearer identifier, etc. for each of secondary bearers.

7. The terminal resumes all DRMs (MCG terminated RBs) and SRB2 corresponding to the master cell group.

8. If the message includes frequency measurement configuration information (measConfig).
   A. The terminal performs and applies the frequency measurement configuration information included the message. For example, frequency measurement may be performed according to the configuration.

9. The terminal is shifted to the RRC connected mode.

10. The terminal indicates, to a higher layer device, that the suspended RRC connection has been resumed.

11. The terminal configures and delivers 10-40 the RRCResumeComplete message for transmission to a lower layer.

If the terminal has terminal context information and bearer configuration information for the suspended secondary cell group, the terminal may perform frequency measurement based on frequency configuration information configured via system information, the RRCRelease message, or the RRCResume message, and if there is a valid result, the terminal may transmit the RRCResumeComplete message including an indicator so as to indicate the presence of the result. When the base station receives the indicator, if resumption of frequency carrier aggregation or dual connectivity is necessary, the base station may indicate 10-45 to the terminal to report a frequency measurement result and may receive a frequency measurement result report, or the base station may receive 10-50 the frequency measurement result report via the RRCResumeComplete message. When the frequency measurement result is received, the base station may inquire the secondary cell base station about whether to resume bearer information for the suspended secondary cell group, and may receive a respond so as to make a determination, and the base station may provide an indication of resumption or release of bearers for the secondary cell group, by transmitting the RRCReconfiguration message to the terminal. The base station may transmit, to the terminal, the RRC message (e.g., RRCReconfiguration) including configuration information or an indicator indicating whether the terminal is to discard or clear, maintain and apply, or reconfigure the stored SCell configuration information (e.g., configuration information described or proposed in FIG. 6) of the MCG or SCG.

In the embodiment proposed in FIG. 10 of the disclosure, the base station may allow a first active bandwidth part of downlink or uplink bandwidth part configuration information of each cell to be configured as a dormant bandwidth part, in the SCell configuration information (e.g., configuration information described or proposed in FIG. 6) or PSCell (or SCell) configuration information of the cell group (e.g., secondary cell group) of the RRC message (e.g., RRCRelease, RRCResume, or RRCReconfiguartion), and therefore when the terminal activates each SCell or a PSCell of the cell group (e.g., secondary cell group), the base station may directly enable operation, as a dormant bandwidth part, of a downlink bandwidth part or uplink bandwidth part of each SCell or PSCell, or may enable suspension or resumption of the cell group, thereby reducing battery consumption of the terminal. For example, a method may be operated for each SCell or PSCell, in which, if an SCell state is configured to be active or a cell group state is configured to be active, suspended, or deactivated in SCell configuration information or cell group configuration information of the RRC message (e.g., RRCRelease, RRCResume, or RRCReconfiguartion), if an indicator for suspending or resuming the cell group is configured, or if an indication of activating the SCell is received via MAC control information proposed in the disclosure, the SCell or PSCell may be activated, resumed, or suspended, and when the SCell or PSCell is activated, a downlink bandwidth part or uplink bandwidth part of the SCell or PSCell may be directly activated to a dormant bandwidth part, thereby reducing battery consumption of the terminal.

As described above, if the terminal in the RRC inactive mode is shifted to the RRC connected mode, and the SCell configuration information or PSCell (or SCell) configuration information of the cell group (e.g., secondary cell group) proposed in the disclosure is restored, applied, or reconfigured, switching or activation between bandwidth parts or activation or application of a dormant bandwidth part may be performed for each activated SCell or activated PSCell (or SCell) of the cell group according to the embodiments proposed in the disclosure. The embodiments of the disclosure may also be extended and applied when handover is performed.

If the terminal receives an indicator for suspension, resumption, activation, or deactivation for a cell, a cell group, or a PSCell of a cell group according to the embodiments proposed in the disclosure, a PHY layer device or a MAC layer device having received the indication may provide the indication to a higher layer device (e.g., MAC layer device, RLC layer device, PDCP layer device, or RRC layer device). When a higher layer device receives the indication (e.g., cell group suspension, resumption, activation, or deactivation) from a lower layer device, the higher layer device may perform a protocol layer device procedure for cell group suspension, resumption, activation, or deactivation corresponding to the indication. Alternatively, if the terminal receives an indicator for suspension, resumption, activation, or deactivation for a cell group or a PSCell of a cell group via the RRC message as in the embodiments of the disclosure, an RRC layer device having received the indication may provide the indication to a lower layer device (e.g., PHY layer device, MAC layer device, RLC layer device, or PDCP layer device). When a lower layer device receives the indication (e.g., cell group suspension, resumption, activation, or deactivation) from a higher layer device, the lower layer device may perform a protocol layer device procedure for cell group suspension, resumption, activation, or deactivation corresponding to the indication.

Various embodiments may be configured and operated by converging or extending the embodiments proposed in the disclosure.

Figure 11A:
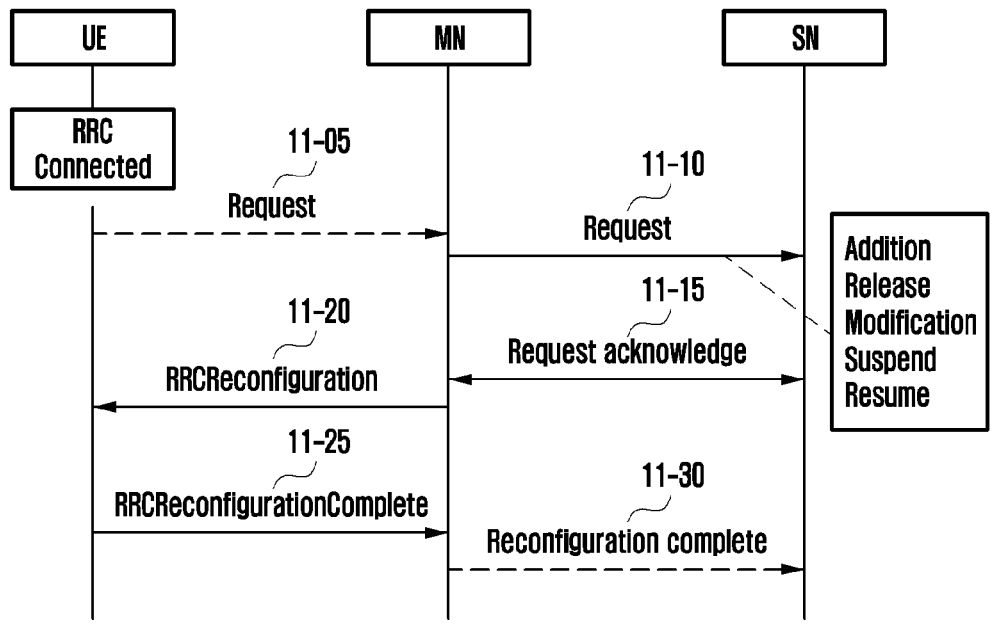
FIG. 11A proposes an example of a signaling procedure of configuring or clearing dual connectivity, or activating, resuming, suspending, or deactivating a secondary cell group configured with dual connectivity, according to an embodiment of the disclosure.
Figure 11A:
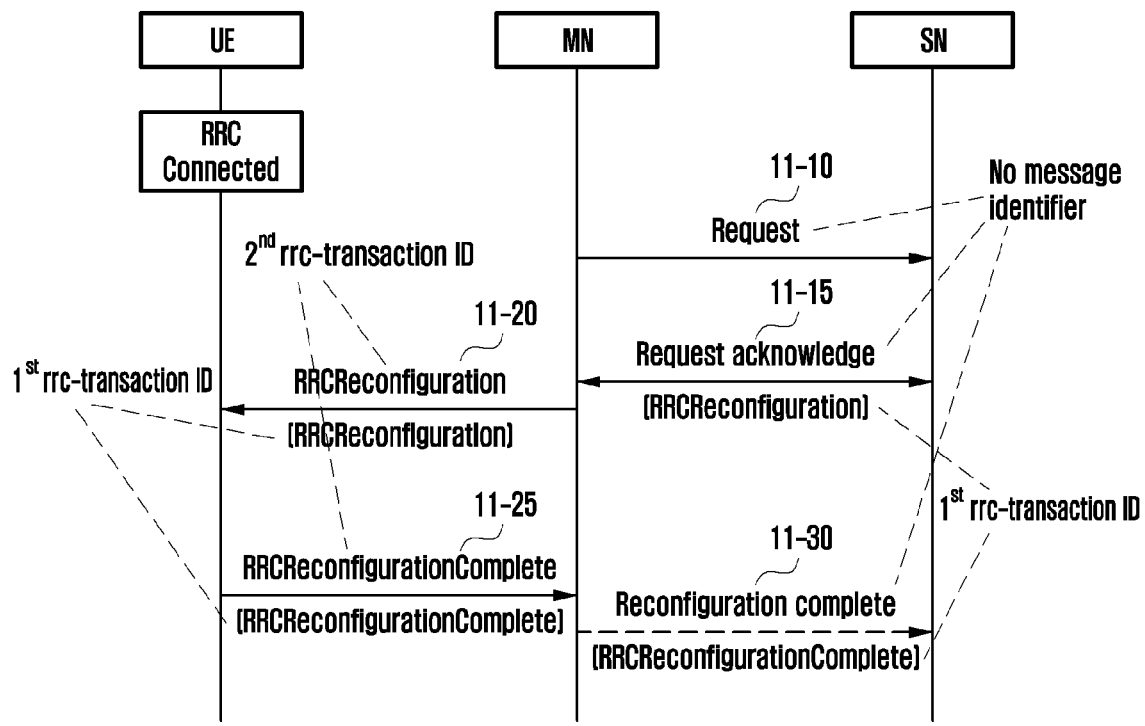
Figure 11B:
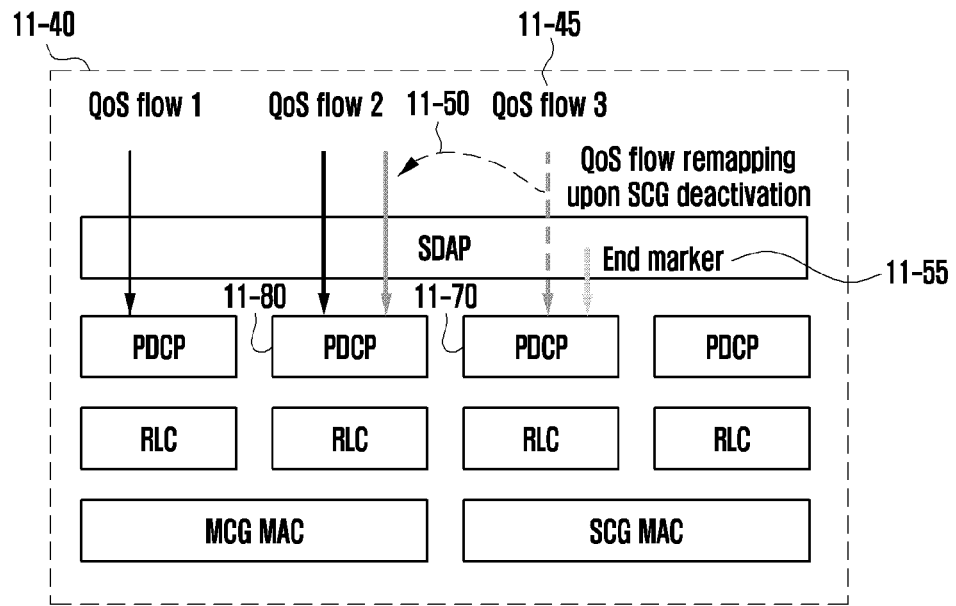
FIG. 11B proposes an example of a signaling procedure of configuring or clearing dual connectivity, or activating, resuming, suspending, or deactivating a secondary cell group configured with dual connectivity, according to an embodiment of the disclosure.

FIGS. 11A and 11B propose a signaling procedure of configuring or clearing dual connectivity, or activating, resuming, suspending, or deactivating a secondary cell group for which dual connectivity is configured in the next generation mobile communication system according to various embodiments of the disclosure of the disclosure.

Referring to FIGS. 11A and 11B, first signaling of configuring or clearing dual connectivity, or configuring, clearing, activating, resuming, suspending, or deactivating a secondary cell group configured with dual connectivity is as follows.

In FIGS. 11A and 11B, a terminal may establish an RRC connection with a network or a base station as in FIG. 6 of the disclosure, and may transmit data to or receive data from the base station (e.g., master cell group (MCG), master node (MN), or cells (PCell or SCell) of the master cell group).

The base station may configure dual connectivity for the terminal according to a predetermined reason (e.g., if a high data transmission rate is required, if high QoS requirements should be satisfied, or in response to a request 11-05 from the terminal). For example, the terminal may transmit, to the base station, a request for configuring or clearing, activating or deactivating, or resuming or suspending dual connectivity, a cell group (e.g., secondary cell group), or a cell, and a message for the request may include a frequency (or channel) measurement result report, a cell group identifier, cell identifiers, or measurement results, in 11-05. As another method, the base station may determine, by considering a downlink (or uplink) data amount or a buffer amount, whether the base station is to configure, clear, add, deactivate, activate, resume, change, reconfigure, or suspend dual connectivity, a cell group (e.g., secondary cell group), or a cell.

A master base station (master node (MN) or master cell group (MCG)) may receive a frequency or channel measurement report for each frequency or channel received from the terminal, and may determine a secondary base station (secondary node (SN) or secondary cell group (SCG)), for which dual connectivity is to be configured, on the basis of the measurement report. Alternatively, the master base station may determine, by considering a downlink (or uplink) data amount or a buffer amount, whether the base station is to configure, clear, add, deactivate, activate, resume, change, reconfigure, or suspend dual connectivity, a cell group (e.g., secondary cell group), or a cell. In order to configure, clear, add, deactivate, activate, resume, change, reconfigure, or suspend dual connectivity, a cell group (e.g., secondary cell group), or a cell for the determined secondary base station, the master base station may transmit a request message 11-10 for requesting whether it is possible to configure or add as a secondary cell group of the terminal, to the secondary base station via an Xn interface (e.g., interface between base stations) or an Sn interface (e.g., interface between base stations or between a base station and AMF or UMF). For the request message, each separate new request message may be defined and used to configure, clear, add, deactivate, activate, resume, change, reconfigure, or suspend dual connectivity, a cell group (e.g., secondary cell group), or a cell for the secondary base station, and alternatively, a new indicator may be defined from an existing message (e.g., SN addition request message, SN modification request message, SN release request message, or the like) so as to indicate (or request) to configure, clear, add, deactivate, activate, resume, change, reconfigure, or suspend a cell group (e.g., secondary cell group), or a cell. The request message may include information, such as cell group configuration information (e.g., master cell group configuration information) currently configured for the terminal, bearer configuration information, capability information of the terminal, frequency (or channel) measurement result information of the terminal, or the like, and when a secondary cell group is configured for the terminal in consideration of the information, the secondary base station may configure secondary cell group configuration information or the bearer configuration information so as not to exceed a terminal capability or according to the terminal capability or the bearer configuration information of the master cell group.

When the request message is rejected, the secondary base station (SCG) having received the request message 11-10 may configure a rejection message and transmit a request acceptance message 11-15 to the master base station via the Xn interface (e.g., interface between base stations) or the Sn interface (e.g., interface between base stations or between a base station and AMF or UMF). If the request message is accepted, the secondary base station may transmit the request acceptance message 11-15 including an indicator or configuration information for configuring, clearing, adding, deactivating, activating, resuming, changing, reconfiguring, or suspending of dual connectivity, a cell group (e.g., secondary cell group), or a cell to the master base station via the Xn interface (e.g., interface between base stations) or the Sn interface (e.g., interface between base stations or between a base station and AMF or UMF). The request acceptance message may include some of the following information.

- Identifier identical to a message identifier included in the request message, or indicator indicating acceptance of the request made from the request message
- Indicator or configuration information (e.g., indicator or configuration information for the master cell group) for configuring, clearing, adding, deactivating, activating, resuming, changing, reconfiguring, or suspending of dual connectivity, a cell group (e.g., secondary cell group), or a cell
- First RRC message (e.g., RRCReconfiguration message) including an indicator or configuration information for configuring, clearing, adding, deactivating, activating, resuming, changing, reconfiguring, or suspending of dual connectivity, a cell group (e.g., secondary cell group), or a cell
- The first RRC message may include some of the following information.
  - First RRC message identifier for distinguishing the first RRC message (e.g., rrc-Transaction identifier). The terminal and the base station (e.g., secondary base station) transmit or receive multiple RRC messages to or from each other, and identifiers for distinguishing the respective RRC messages may be thus included in the RRC messages. For example, an RRC message (e.g., RRCReconfiguration) transmitted by a transmission end, an RRC message (e.g., RRCReconfigurationComplete) transmitted by a reception end, which corresponds to the RRC message (e.g., RRCReconfiguration), or an RRC message corresponding to the RRC message transmitted by the transmission end may include the same first RRC message identifier.
  - Indicator or configuration information (e.g., indicator or configuration information for the terminal) for configuring, clearing, adding, deactivating, activating, resuming, changing, reconfiguring, or suspending of dual connectivity, a cell group (e.g., secondary cell group), or a cell
  - Indicator indicating a cell group state (e.g., activated, deactivated, suspended, or resumed)
  - Cell group identifiers for distinguishing cell groups. The cell group identifiers may be assigned by the master base station, or one identifier among previously appointed identifiers may be assigned by the secondary base station.
  - Cell group or cell configuration information
  - Bearer configuration information. For example, indicator information (e.g., PDCP suspension indicator, PDCP re-establishment indicator, PDCP data recovery indicator, RLC re-establishment indicator, MAC partial initialization indicator, MAC initialization indicator, or indicator triggering a new operation) indicating an operation of a protocol layer device (e.g., SDAP layer device, PDCP layer device, RLC layer device, or MAC layer device) of each bearer, an indicator indicating to initiate a header compression protocol (robust header compression (ROHC) or Ethernet header compression (EHC)) or a data compression protocol (UDC), or an indicator indicating to continue using a header compression protocol (robust header compression (ROHC) or Ethernet header compression (EHC)) or a data compression protocol (UDC) (or an indicator indicating not to initialize a header compression protocol or a data compression protocol (UDC))
- If an indicator or configuration information for configuring, adding, activating, resuming, changing, or reconfiguring of dual connectivity, a cell group (e.g., secondary cell group), or a cell is included, a first indicator (e.g., mobilityControlInfor or ReconfigurationWithSync) may be included together. However, if an indicator or configuration information for clearing, deactivating, reconfiguring, or suspending of dual connectivity, a cell group (e.g., secondary cell group), or a cell is included, a first indicator (e.g., mobilityControlInfor or ReconfigurationWithSync) may not be included. The first indicator may be an indicator triggering random access to the cell group or cell, an indicator for signal synchronization with a new cell, an indicator indicating frequency shifting of the terminal, or an indicator indicating changing of the cell group (or cell).
- If the indicator or configuration information for configuring, adding, activating, resuming, changing, or reconfiguring of dual connectivity, a cell group (e.g., secondary cell group), or a cell is included, random access configuration information may be included together. However, if an indicator or configuration information for clearing, deactivating, reconfiguring, or suspending of dual connectivity, a cell group (e.g., secondary cell group), or a cell is included, the random access configuration information may not be included. The random access configuration information may include random access transmission resource information (time or frequency transmission resource) for preamble transmission, designated preamble information, or the like for the cell group or cell.
- Time information indicating when to activate, resume, deactivate, or suspend dual connectivity, a cell group (e.g., secondary cell group), or a cell (PSCell or SCG SCell) (e.g., information indicating timing (e.g., X time unit, subframe unit, time slot unit, or symbol unit), for example, time information indicating, if the message is received in an nth time unit, whether to activate, resume, deactivate, or suspend the cell in an (n+X)th time unit)
- First channel measurement configuration information for each cell or each bandwidth part
- Second channel measurement configuration information for each cell or each bandwidth part
- Indicator for adding of cell group configuration, indicator indicating cell group change (Reconfiguration- WithSync), or indicator indicating random access (ReconfigurationWithSync or newly defined indicator)

Indicator indicating, when activating a cell group, whether to activate the cell group by performing random access or activate the cell group without random access (ReconfigurationWithSync processor newly defined indicator)

Radio resource management (RRM) configuration information or frequency measurement configuration information, or separate configuration information of radio resource management (RRM) or frequency measurement, which needs to be applied or performed when a cell group is deactivated (e.g., frequency measurement configuration information (reduced or relaxed RRM configuration information) simplified to reduce battery consumption)

Configuration information for radio link monitoring (RLM) or configuration information for RLM which needs to be applied or performed when a cell group is deactivated. For example, the configuration information for RLM is configuration information of beams for each bandwidth part or configuration information of beams in units of cells to be measured by the terminal when a cell group is deactivated, may include beam-related configuration information (transmission configuration indication (TCI) state or Quasi Co-Location (QCL)), may include a timing advance (TA) value (or offset value) for synchronization of a downlink signal of the base station or an uplink signal of the base station, a timer (time alignment timer (TAT)) indicating validity of the TA value, or a timer value (TAT value), or may include synchronization signal block (SSB) configuration information to be measured, channel state information reference signal (CSI-RS) configuration information, reference signal (RS) configuration information, or transmission resource information (e.g., PUCCH configuration information (e.g., scheduling request (SR) information or specific transmission resource), frequency transmission resource, or time transmission resource) enabling result reporting when a beam failure occurs. In addition, the configuration information may include bandwidth part configuration information (e.g., indication may be performed using a bandwidth part identifier) indicating a bandwidth part in which RLM is to be performed. As another method, when a cell group is deactivated, the terminal is able to minimize a cell group activation delay by performing RLM in a first active bandwidth part (or first active downlink bandwidth part, firstActiveDownlinkBWP-ID) configured via the RRC message and monitoring, early, the first active bandwidth part required to be activated when the cell group is activated. As another method, if a cell group is configured to be deactivated (or activated), the terminal may continue to maintain a connected state with the cell group by performing RLM in a last (or previously) activated bandwidth part before the cell group is deactivated (e.g., if bandwidth part configuration information indicating a bandwidth part in which RLM is to be performed is not configured), or may perform activation in a first active bandwidth part (or first active downlink bandwidth part, firstActiveDownlinkBWP-ID) configured via the RRC message when the cell group is activated. If, when activating the cell group, bandwidth part-related configuration information indicating a bandwidth part, in which RLM is to be performed, is not configured, the terminal may perform RLM in a last (or previously) activated bandwidth part. In addition, the configuration information may include beam-related configuration information (e.g., indication may be performed using a bandwidth part identifier, a TCI state, or QCL configuration information) indicating a beam in which RLM is to be performed. As another method, when a cell group is deactivated, the terminal is able to minimize a cell group activation delay by performing RLM in a beam (e.g., TCI state or QCL configuration information) configured via the RRC message, or by activating the beam, performing RLM, and monitoring, early, the beam required to be activated when activating the cell group. As another method, if a cell group is configured to be deactivated (or activated), the terminal may continue to maintain a connected state with the cell group by performing RLM in a last (or previously) activated beam before the cell group is deactivated (e.g., if beam-related configuration information indicating a beam in which RLM is to be performed is not configured), or may perform activation in a beam configured via the RRC message when the cell group is activated. If, when activating the cell group, beam-related configuration information indicating a beam, in which RLM is to be performed, is not configured, the terminal may perform RLM in a last (or previously) activated beam.

Configuration information for beam failure detection (BFD) or configuration information for BFD which needs to be applied or performed when a cell group is deactivated. For example, the configuration information for BFD is configuration information of beams for each bandwidth part or configuration information of beams in units of cells to be measured by the terminal when a cell group is deactivated, may include beam-related configuration information (transmission configuration indication (TCI) state or Quasi Co-Location (QCL)), may include a timing advance (TA) value (or offset value) for synchronization of a downlink signal of the base station or an uplink signal of the base station, a timer (time alignment timer (TAT)) indicating validity of the TA value, or a timer value (TAT value), or may include synchronization signal block (SSB) configuration information to be measured, channel state information reference signal (CSI-RS) configuration information, reference signal (RS) configuration information, or transmission resource information (e.g., PUCCH configuration information (e.g., scheduling request (SR) information or specific transmission resource), frequency transmission resource, or time transmission resource) enabling result reporting when a beam failure occurs. In addition, the configuration information may include bandwidth part configuration information (e.g., indication may be performed using a bandwidth part identifier) indicating a bandwidth part in which beam failure detection is to be performed. As another method, when a cell group is deactivated, the terminal is able to minimize a cell group activation delay by performing beam failure detection in a first active bandwidth part (or first active downlink bandwidth part, firstActiveDownlinkBWP-ID) configured via the RRC message and monitoring, early, the first active bandwidth part required to be activated when the cell group is activated. As another method, if a cell group is configured to be deactivated (or activated), the terminal may continue to maintain a connected state with the cell group by performing beam failure detection in a last (or previously) activated bandwidth part before the cell group is deactivated (e.g., if bandwidth part configuration information indicating a bandwidth part in which beam failure detection is to be performed is not configured), or may perform activation in a first active bandwidth part (or first active downlink bandwidth part, firstActiveDownlinkBWP-ID) configured via the RRC message when the cell group is activated. If, when activating the cell group, bandwidth part-related configuration information indicating a bandwidth part, in which beam failure detection is to be performed, is not configured, the terminal may perform beam failure detection in a last (or previously) activated bandwidth part. In addition, the configuration information may include beam-related configuration information (e.g., indication may be performed using a bandwidth part identifier, a TCI state, or QCL configuration information) indicating a beam in which beam failure detection is to be performed. As another method, when a cell group is deactivated, the terminal is able to minimize a cell group activation delay by performing beam failure detection in a beam (e.g., TCI state or QCL configuration information) configured via the RRC message, or monitoring, early, the beam required to be activated when activating the cell group. As another method, if a cell group is configured to be deactivated (or activated), the terminal may continue to maintain a connected state with the cell group by performing beam failure detection in a last (or previously) activated beam before the cell group is deactivated (e.g., if beam-related configuration information indicating a beam in which beam failure detection is to be performed is not configured), or may perform activation in a beam configured via the RRC message when the cell group is activated. If, when activating the cell group, beam-related configuration information indicating a beam, in which beam failure detection is to be performed, is not configured, the terminal may perform beam failure detection in a last (or previously) activated beam.

SDAP layer device configuration information (sdap-config): The SDAP layer device configuration information may be configured for each bearer and may include the following information. The SDAP layer device configuration information is configuration information for determination of the presence or absence of an uplink (or downlink) SDAP header or a method of mapping QoS flows to bearers (DRBs) when an NR base station or E-UTRA base station is connected to 5G core (5GC).

PDU session identifier (pdu-Session): The identifier indicates a PDU session of QoS flows mapped to the bearer.

Indicator indicating the presence or absence of a downlink SDAP header (sdap-HeaderDL): The indicator indicates the presence or absence of an SDAP header for downlink date of the bearer. A value of the indicator cannot be changed after the bearer is established.

Indicator indicating the presence or absence of an uplink SDAP header (sdap-HeaderUL): The indicator indicates the presence or absence of an SDAP header for uplink date of the bearer. If the bearer is configured as a default bearer, the network configures the indicator to indicate the presence of the SDAP header for uplink data.

Indicator indicating a default bearer (defaultDRB): The indicator indicates whether an established bearer (or DRB) is a default bearer of the PDU session. Among the bearers (or instances) belonging to the same PDU session (or having the same PDU session identifier value), an indicator value indicating the default bearer may be configured to TRUE for at most one bearer, and may be configured to FALSE for the remaining bearers. For example, only one default bearer may be configured for one PDU session.

Configuration information for adding of QoS flow mapping information (mappedQoS-FlowsToAdd): The configuration information indicates a list of QoS Flow identifiers (QFIs) of uplink QoS flows of the PDU session, which are additionally mapped to the bearer. One QFI identifier value may be included and configured at most once from SDAP layer device configuration information having the same PDU session identifier value in all SDAP layer device configuration information configured for the terminal. A QFI identifier of a QoS flow remapped when QoS flow remapping is configured is included and configured only in configuration information (mappedQoS-FlowsToAdd) for adding of QoS flow mapping information of SDAP layer device configuration information corresponding to a new bearer (or a newly mapped bearer), and is not included in configuration information (mappedQoS-FlowsToRelease) for releasing of QoS flow mapping information corresponding to an old bearer (or previously mapped bearer).

Configuration information for releasing of QoS flow mapping information (mappedQoS-FlowsToRelease): The configuration information indicates a list of QFI identifiers (QFIs) of QoS flows of the PDU session released from existing QoS flows which are bearer-mapped to the bearer.

If the request acceptance message 11-15 is received, the master base station (MCG) may identify the request acceptance message, and may transmit the second RRC message 11-20, to the terminal, a second RRC message (e.g., RRCReconfiguration) including information (e.g., first RRC message included in the request acceptance message 11-15) included in the request acceptance message. The second RRC message may include some of the following information.

Second RRC message identifier (e.g., rrc-Transaction identifier) for distinguishing the second RRC message. The terminal and the base station (e.g., master base station) transmit or receive multiple RRC messages to and from each other, and identifiers for distinguishing respective RRC messages may be thus included in the RRC messages. For example, an RRC message (e.g., RRCReconfiguration) transmitted by a transmission end, an RRC message (e.g., RRCReconfigurationComplete) transmitted by a reception end, which corresponds to the RRC message (e.g., RRCReconfiguration), or an RRC message corresponding to the RRC message transmitted by the transmission end may include the same second RRC message identifier.

First RRC message included in the request acceptance message 11-15

- Indicator or configuration information (e.g., indicator or configuration information for the terminal) for configuring, clearing, adding, deactivating, activating, resuming, changing, reconfiguring, or suspending of dual connectivity, a cell group (e.g., secondary cell group), or a cell
- Indicator indicating a cell group state (e.g., activated, deactivated, suspended, or resumed)
- Cell group identifier for distinguishing cell groups. The cell group identifiers may be assigned by the master base station, or one identifier among previously appointed identifiers may be assigned by the secondary base station.
- Cell group or cell configuration information
- Bearer configuration information. For example, indicator information (e.g., PDCP suspension indicator, PDCP re-establishment indicator, PDCP data recovery indicator, RLC re-establishment indicator, MAC partial initialization indicator, MAC initialization indicator, or indicator triggering a new operation) indicating an operation of a protocol layer device (e.g., SDAP layer device, PDCP layer device, RLC layer device, or MAC layer device) of each bearer, an indicator indicating to initiate a header compression protocol (robust header compression (ROHC) or Ethernet header compression (EHC)) or a data compression protocol (UDC), or an indicator indicating to continue using a header compression protocol (robust header compression (ROHC) or Ethernet header compression (EHC)) or a data compression protocol (UDC) (or an indicator indicating not to initialize a header compression protocol or a data compression protocol (UDC))
- If an indicator or configuration information for configuring, adding, activating, resuming, changing, or reconfiguring of dual connectivity, a cell group (e.g., secondary cell group), or a cell is included, a first indicator (e.g., mobilityControllnfor or ReconfigurationWithSync) may be included together. However, if an indicator or configuration information for clearing, deactivating, reconfiguring, or suspending of dual connectivity, a cell group (e.g., secondary cell group), or a cell is included, a first indicator (e.g., mobilityControllnfor or ReconfigurationWithSync) may not be included. The first indicator may be an indicator triggering random access to the cell group or cell, an indicator for signal synchronization with a new cell, an indicator indicating frequency shifting of the terminal, or an indicator indicating changing of the cell group (or cell). As another method, the terminal may perform PDCCH monitoring in the indicated or configured cell group or cell, and may trigger and perform random access as indicated in PDCCH. For example, a higher layer device (e.g., RRC layer device) may transmit, to a lower layer device (e.g., MAC layer device), an indicator triggering random access.
- If the indicator or configuration information for configuring, adding, activating, resuming, changing, or reconfiguring of dual connectivity, a cell group (e.g., secondary cell group), or a cell is included, random access configuration information may be included together. However, if an indicator or configuration information for clearing, deactivating, reconfiguring, or suspending of dual connectivity, a cell group (e.g., secondary cell group), or a cell is included, the random access configuration information may not be included. The random access configuration information may include random access transmission resource information (time or frequency transmission resource) for preamble transmission, designated preamble information, or the like for the cell group or cell.
- Time information indicating when to activate, resume, deactivate, or suspend dual connectivity, a cell group (e.g., secondary cell group), or a cell (PSCell or SCG SCell) (e.g., information indicating timing (e.g., X time unit, subframe unit, time slot unit, or symbol unit), for example, time information indicating, if the message is received in an nth time unit, whether to activate, resume, deactivate, or suspend the cell in an (n+X)th time unit)
- First channel measurement configuration information for each cell or each bandwidth part
- Second channel measurement configuration information for each cell or each bandwidth part
- Indicator for adding of cell group configuration, indicator indicating cell group change (ReconfigurationWithSync), or indicator indicating random access (ReconfigurationWithSync or newly defined indicator)
- Indicator indicating, when activating a cell group, whether to activate the cell group by performing random access or activate the cell group without random access (ReconfigurationWithSync processor newly defined indicator)
- Radio resource management (RRM) configuration information or frequency measurement configuration information, or separate configuration information of radio resource management (RRM) or frequency measurement, which needs to be applied or performed when a cell group is deactivated (e.g., frequency measurement configuration information (reduced or relaxed RRM configuration information) simplified to reduce battery consumption)
- Configuration information for radio link monitoring (RLM) or configuration information for RLM which needs to be applied or performed when a cell group is deactivated. For example, the configuration information for BFD is configuration information of beams for each bandwidth part or configuration information of beams in units of cells to be measured by the terminal when a cell group is deactivated, may include beam-related configuration information (transmission configuration indication (TCI) state or Quasi Co-Location (QCL)), may include a timing advance (TA) value (or offset value) for synchronization of a downlink signal of the base station or an uplink signal of the base station, a timer (time alignment timer (TAT)) indicating validity of the TA value, or a timer value (TAT value), or may include synchronization signal block (SSB) configuration information to be measured, channel state information reference signal (CSI-RS) configuration information, reference signal (RS) configuration information, or transmission resource information (e.g., PUCCH configuration information (e.g., scheduling request (SR) information or specific transmission resource), frequency transmission resource, or time transmission resource) enabling result reporting when a beam failure occurs. In addition, the configuration information may include bandwidth part configuration information (e.g., indication may be performed using a bandwidth part identifier) indicating a bandwidth part in which RLM is to be performed. As another method, when a cell group is deactivated, the terminal is able to minimize a cell group activation delay by performing RLM in a first active bandwidth part (or first active downlink bandwidth part, firstActiveDownlinkBWP-ID) configured via the RRC message and monitoring, early, the first active bandwidth part required to be activated when the cell group is activated. As another method, if a cell group is configured to be deactivated (or activated), the terminal may continue to maintain a connected state with the cell group by performing RLM in a last (or previously) activated bandwidth part before the cell group is deactivated (e.g., if bandwidth part configuration information indicating a bandwidth part in which RLM is to be performed is not configured), or may perform activation in a first active bandwidth part (or first active downlink bandwidth part, firstActiveDownlinkBWP-ID) configured via the RRC message when the cell group is activated. If, when activating the cell group, bandwidth part-related configuration information indicating a bandwidth part, in which RLM is to be performed, is not configured, the terminal may perform RLM in a last (or previously) activated bandwidth part. In addition, the configuration information may include beam-related configuration information (e.g., indication may be performed using a bandwidth part identifier, a TCI state, or QCL configuration information) indicating a beam in which RLM is to be performed. As another method, when a cell group is deactivated, the terminal is able to minimize a cell group activation delay by performing RLM in a beam (e.g., TCI state or QCL configuration information) configured via the RRC message, or by activating the beam, performing RLM, and monitoring, early, the beam required to be activated when activating the cell group. As another method, if a cell group is configured to be deactivated (or activated), the terminal may continue to maintain a connected state with the cell group by performing RLM in a last (or previously) activated beam before the cell group is deactivated (e.g., if beam-related configuration information indicating a beam in which RLM is to be performed is not configured), or may perform activation in a beam configured via the RRC message when the cell group is activated. If, when activating the cell group, beam-related configuration information indicating a beam, in which RLM is to be performed, is not configured, the terminal may perform RLM in a last (or previously) activated beam.

Configuration information for beam failure detection (BFD) or configuration information for BFD which needs to be applied or performed when a cell group is deactivated. For example, the configuration information for BFD is configuration information of beams for each bandwidth part or configuration information of beams in units of cells to be measured by the terminal when a cell group is deactivated, may include beam-related configuration information (transmission configuration indication (TCI) state or Quasi Co-Location (QCL)), may include a timing advance (TA) value (or offset value) for synchronization of a downlink signal of the base station or an uplink signal of the base station, a timer (time alignment timer (TAT)) indicating validity of the TA value, or a timer value (TAT value), or may include synchronization signal block (SSB) configuration information to be measured, channel state information reference signal (CSI-RS) configuration information, reference signal (RS) configuration information, or transmission resource information (e.g., PUCCH configuration information (e.g., scheduling request (SR) information or specific transmission resource), frequency transmission resource, or time transmission resource) enabling result reporting when a beam failure occurs. In addition, the configuration information may include bandwidth part configuration information (e.g., indication may be performed using a bandwidth part identifier) indicating a bandwidth part in which beam failure detection is to be performed. As another method, when a cell group is deactivated, the terminal is able to minimize a cell group activation delay by performing beam failure detection in a first active bandwidth part (or first active downlink bandwidth part, firstActiveDownlinkBWP-ID) configured via the RRC message and monitoring, early, the first active bandwidth part required to be activated when the cell group is activated. As another method, if a cell group is configured to be deactivated (or activated), the terminal may continue to maintain a connected state with the cell group by performing beam failure detection in a last (or previously) activated bandwidth part before the cell group is deactivated (e.g., if bandwidth part configuration information indicating a bandwidth part in which beam failure detection is to be performed is not configured), or may perform activation in a first active bandwidth part (or first active downlink bandwidth part, firstActiveDownlinkBWP-ID) configured via the RRC message when the cell group is activated. If, when activating the cell group, bandwidth part-related configuration information indicating a bandwidth part, in which beam failure detection is to be performed, is not configured, the terminal may perform beam failure detection in a last (or previously) activated bandwidth part. In addition, the configuration information may include beam-related configuration information (e.g., indication may be performed using a bandwidth part identifier, a TCI state, or QCL configuration information) indicating a beam in which beam failure detection is to be performed. As another method, when a cell group is deactivated, the terminal is able to minimize a cell group activation delay by performing beam failure detection in a beam (e.g., TCI state or QCL configuration information) configured via the RRC message, or monitoring, early, the beam required to be activated when activating the cell group. As another method, if a cell group is configured to be deactivated (or activated), the terminal may continue to maintain a connected state with the cell group by performing beam failure detection in a last (or previously) activated beam before the cell group is deactivated (e.g., if beam-related configuration information indicating a beam in which beam failure detection is to be performed is not configured), or may perform activation in a beam configured via the RRC message when the cell group is activated. If, when activating the cell group, beam-related configuration information indicating a beam, in which beam failure detection is to be performed, is not configured, the terminal may perform beam failure detection in a last (or previously) activated beam.

SDAP layer device configuration information (sdap-config): The SDAP layer device configuration information may be configured for each bearer and may include the following information. The SDAP layer device configuration information is configuration information for determination of the presence or absence of an uplink (or downlink) SDAP header or a method of mapping QoS flows to bearers (DRBs) when an NR base station or E-UTRA base station is connected to 5G core (5GC).

PDU session identifier (pdu-Session): The identifier indicates a PDU session of QoS flows mapped to the bearer.

Indicator indicating the presence or absence of a downlink SDAP header (sdap-HeaderDL): The indicator indicates the presence or absence of an SDAP header for downlink date of the bearer. A value of the indicator cannot be changed after the bearer is established.

Indicator indicating the presence or absence of an uplink SDAP header (sdap-HeaderUL): The indicator indicates the presence or absence of an SDAP header for uplink date of the bearer. If the bearer is configured as a default bearer, the network configures the indicator to indicate the presence of the SDAP header for uplink data.

Indicator indicating a default bearer (defaultDRB): The indicator indicates whether an established bearer (or DRB) is a default bearer of the PDU session. Among the bearers (or instances) belonging to the same PDU session (or having the same PDU session identifier value), an indicator value indicating the default bearer may be configured to TRUE for at most one bearer, and may be configured to FALSE for the remaining bearers. For example, only one default bearer may be configured for one PDU session.

Configuration information for adding of QoS flow mapping information (mappedQoS-FlowsToAdd): The configuration information indicates a list of QoS Flow identifiers (QFIs) of uplink QoS flows of the PDU session, which are additionally mapped to the bearer. One QFI identifier value may be included and configured at most once from SDAP layer device configuration information having the same PDU session identifier value in all SDAP layer device configuration information configured for the terminal. A QFI identifier of a QoS flow remapped when QoS flow remapping is configured is included and configured only in configuration information (mappedQoS-FlowsToAdd) for adding of QoS flow mapping information of SDAP layer device configuration information corresponding to a new bearer (or a newly mapped bearer), and is not included in configuration information (mappedQoS-FlowsToRelease) for releasing of QoS flow mapping information corresponding to an old bearer (or previously mapped bearer).

Configuration information for releasing of QoS flow mapping information (mappedQoS-FlowsToRelease): The configuration information indicates a list of QFI identifiers (QFIs) of QoS flows of the PDU session released from existing QoS flows which are bearer-mapped to the bearer.

When the second RRC message 11-20 is received, the terminal may read and check the second RRC message, or may read information (e.g., first RRC message included in the second RRC message) included in the second RRC message, and the terminal may configure, add, change, resume, suspend, or deactivate dual connectivity or a cell group (e.g., secondary cell group). In addition, if a first indicator for triggering random access is included in the first RRC message or the second RRC message, random access may be triggered for the configured or indicated cell group or cell. When random access is performed, if there is random access information in the RRC message, or if there is random access information that has been stored, random access (e.g., contention-free random access (e.g., 4-step random access or 2-step random access)) may be performed based on system information or the random access information which has been stored or received via the RRC message. If there is no random access information in the RRC message, random access (e.g., contention-based random access (e.g., 4-step random access or 2-step random access)) may be performed. As another method, the terminal may perform PDCCH monitoring in the indicated or configured cell group or cell, and may trigger and perform random access as indicated in PDCCH. For example, a higher layer device (e.g., RRC layer device) may transmit, to a lower layer device (e.g., MAC layer device), an indicator triggering random access.

Reference numeral 11-40 in FIGS. 11A and 11B describe a problem that may occur in the terminal when the first RRC message or the second RRC message, which includes configuration information (e.g., configuring the cell group to be inactive) indicating to deactivate a cell group (or secondary cell group) of the terminal and includes SDAP layer device configuration information for configuring of QoS flow remapping, is transmitted to the terminal. In addition, the problem that may occur in the above may occur when the base station configures (e.g., configuring to 1), for a cell group to be deactivated (or deactivated cell group), a reflective QoS flow to DRB mapping indication (RDI) value or reflective QoS indication (RQI) value of the SDAP header of downlink data, and indicates reflective mapping, so as to configure QoS flow remapping.

In reference numeral 11-40, if the terminal, for which dual connectivity is configured, receives the first RRC message or the second RRC message including configuration information indicating to deactivate a cell group (or a secondary cell group) (e.g., configuring the cell group to be inactive), the terminal may deactivate the cell group. The terminal cannot transmit or receive data for the deactivated cell group (or via bearers of the inactive cell group). However, if the first RRC message or the second RRC message includes configuration information (e.g., configuring the cell group to be inactive) indicating to deactivate the cell group (or secondary cell group) of the terminal and includes SDAP layer device configuration information for configuring of QoS flow remapping, the terminal may perform QoS flow remapping for the deactivated cell group. For example, when configuration information (mappedQoS-FlowsToAdd) for adding of QoS flow mapping information of the SDAP layer device configuration information indicates a list of QoS flow identifiers (QFIs) of uplink QoS flows of a PDU session additionally mapped to a new bearer (or a newly mapped bearer, 11-80), a QFI identifier (i.e., QoS flow 11-45) of the remapped QoS flow may be included for QoS flow remapping 11-50. For example, a first QoS flow (QoS flow 3, 11-45), which has been mapped to a first bearer 11-70 (previous DRB or old DRB) belonging to the cell group (SCG) to be deactivated, may be configured (or indicated) to be remapped 11-50 to a second bearer (new DRB, 11-80) of the activated cell group (MCG). For the QoS flow remapping 11-50, the base station may configure (e.g., configuring to 1) the reflective QoS flow to DRB mapping indication (RDI) value or reflective QoS indication (RQI) value of the SDAP header of downlink data so as to indicate reflective mapping.

If QoS flow remapping 11-50 is configured for the terminal as described above, in order to prevent out-of-order delivery in a reception end, which may occur due to QoS flow remapping, the SDAP layer device may generate, using SDAP control data (SDAP control PDU), an end marker 11-55 including a QFI corresponding to the remapped QoS flow (QoS flow 3, 11-45), so as to transmit the same in the first bearer 11-70 (previous DRB or old DRB). However, as described above, the terminal cannot transmit or receive data for the deactivated cell group (or via bearers of the inactive cell group), wherein a problem occurs if the end marker is generated and transmitted via the bearers of the inactive cell group. For example, due to generation of the end marker, the terminal may unnecessarily request the base station to reactivate the cell group, for which deactivation has been indicated by the base station, or may cause unnecessary signaling (e.g., terminal-requested RRC message for requesting to activate the cell group, activation indication RRC message for reactivation by the base station, or deactivation indication RRC message indicating re-deactivation by the base station). In addition, due to deactivation of the cell group, transmission of the end marker may fail.

Therefore, in the following, the disclosure proposes methods of solving problems that may occur when QoS flow remapping is configured or indicated for a cell group to be deactivated as described above. One or multiple methods among the following methods may be applied, or a new method may be applied by combining multiple methods.

First method: If QoS flow remapping is required (or to be configured) for the terminal, or if QoS flow remapping is required for a bearer belonging to a cell group to be deactivated, an NR base station or E-UTRA base station connected to 5GC may configure, for the terminal, the QoS flow remapping (e.g., QoS flow remapping by transmitting the RRC message including SDAP layer device configuration information to the terminal, or QoS flow remapping via reflective mapping by configuring an RDI field or RQI field of the SDAP header) before deactivating the cell group (e.g., SCG) (or before transmitting the RRC message including an indicator for deactivation of the cell group). For example, if QoS flow remapping is required (or to be configured) for the terminal, or if QoS flow remapping is required for a bearer belonging to a cell group to be deactivated, indication or configuration of deactivating the cell group may not be configured together via the RRC message (for example, QoS flow remapping may not be configured or allowed for the cell group to be deactivated or the bearer belonging to the cell group). For example, if the RRC message (e.g., RRCReconfiguration) includes an indicator for deactivation of the cell group (or if the cell group is configured to be inactive), the NR base station or E-UTRA base station connected to 5GC may perform restriction so that the SDAP layer device configuration information or the RDI field (or RQI field) configuration of the SDAP header (e.g., configuring to 1) is not present, not included together, or not configured together, or QoS flow remapping is not performed, wherein the SDAP layer device configuration information includes a PDU session identifier, an indicator (sdap-HeaderDL) indicating the presence or absence of the downlink SDAP header, an indicator (sdap-HeaderUL) indicating the presence or absence of the uplink SDAP header, an indicator (defaultDRB) indicating the default bearer, configuration information (mappedQoS-FlowsToAdd) for adding of QoS flow mapping information, or configuration information (mappedQoS-FlowsToRelease) for releasing of QoS flow mapping information. In addition, for example, if the RRC message (e.g., RRCReconfiguration) does not include an indicator for deactivation of the cell group (or if the cell group is not configured to be inactive), the NR base station or E-UTRA base station connected to 5GC may allow the SDAP layer device configuration information or the RDI field (or RQI field) configuration of the SDAP header (e.g., configuring to 1) to be present, included, or configured, or QoS flow remapping to be performed, wherein the SDAP layer device configuration information includes a PDU session identifier, an indicator (sdap-HeaderDL) indicating the presence or absence of the downlink SDAP header, an indicator (sdap-HeaderUL) indicating the presence or absence of the uplink SDAP header, an indicator (defaultDRB) indicating the default bearer, configuration information (mappedQoS-FlowsToAdd) for adding of QoS flow mapping information, or configuration information (mappedQoS-FlowsToRelease) for releasing of QoS flow mapping information. In addition, for example, if the SDAP layer device configuration information or the RDI field (or RQI field) configuration of the SDAP header (e.g., configuring to 1) is present, included, or configured, or QoS flow remapping is configured, the NR base station or E-UTRA base station connected to 5GC may restrict the RRC message (e.g., RRCReconfiguration) so as not to include an indicator for deactivation of the cell group (or not to configure the cell group to be inactive), wherein the SDAP layer device configuration information includes a PDU session identifier, an indicator (sdap-HeaderDL) indicating the presence or absence of the downlink SDAP header, an indicator (sdap-HeaderUL) indicating the presence or absence of the uplink SDAP header, an indicator (defaultDRB) indicating the default bearer, configuration information (mappedQoS-FlowsToAdd) for adding of QoS flow mapping information, or configuration information (mappedQoS-FlowsToRelease) for releasing of QoS flow mapping information. In addition, for example, if the SDAP layer device configuration information or the RDI field (or RQI field) configuration of the SDAP header (e.g., configuring to 1) is not present, not included, or not configured, or QoS flow remapping is not performed, the NR base station or E-UTRA base station connected to 5GC may allow the RRC message (e.g., RRCReconfiguration) to include an indicator for deactivation of the cell group (or to configure the cell group to be inactive), wherein the SDAP layer device configuration information includes a PDU session identifier, an indicator (sdap-HeaderDL) indicating the presence or absence of the downlink SDAP header, an indicator (sdap-HeaderUL) indicating the presence or absence of the uplink SDAP header, an indicator (defaultDRB) indicating the default bearer, configuration information (mappedQoS-FlowsToAdd) for adding of QoS flow mapping information, or configuration information (mappedQoS-FlowsToRelease) for releasing of QoS flow mapping information.

Second method: If QoS flow remapping is required (or to be configured) for the terminal, or if QoS flow remapping is required for a bearer belonging to a cell group to be deactivated, even if an NR base station or E-UTRA base station configures, for the terminal, the QoS flow remapping while deactivating the cell group (e.g., SCG) (or while transmitting an RRC message including an indicator for deactivating the cell group), the SDAP layer device of the terminal may not generate an end marker in the bearer of the cell group to be deactivated, according to the first condition, wherein the QoS flow remapping includes, for example, QoS flow remapping by including SDAP layer device configuration information in the RRC message and transmitting the same to the terminal, or QoS flow remapping via reflective mapping by configuring an RDI field or RQI field of the SDAP header. For example, according to the first condition, with respect to a bearer that does not belong to the deactivated cell group or a case where a cell group to which the bearer belongs is not deactivated, the SDAP layer device of the terminal may generate an end marker for the bearer when QoS flow remapping is performed. The first condition may include a condition in which, when QoS flow remapping (mapping between an uplink QoS flow and a bearer) has been configured for a certain QoS flow (or when the RDI field (or RQI field) of a downlink SDAP header of received data is configured to 1), if an SDAP layer device has already been established, there is no mapping between a bearer and a QoS flow, stored for the QoS flow, and a default bearer is configured, or if a cell group to which the QoS flow (or bearer) belongs is not deactivated, an end marker is generated and transmitted to the default bearer, or the first condition may include a condition in which, when QoS flow remapping (mapping between an uplink QoS flow and a bearer) has been configured for a certain QoS flow (or when the RDI field (or RQI field) of a downlink SDAP header of received data is configured to 1), if mapping between a bearer and a QoS flow, stored for the QoS flow, is different from mapping between a bearer and a QoS flow configured via new RRC message, if an uplink SDAP header exists, or if a cell group to which the QoS flow (or bearer) belongs is not deactivated, an end marker is generated and transmitted to a bearer corresponding to bearer mapping with a previously stored QoS flow.

In addition, the default bearer in the SDAP layer device configuration information is used as a bearer for data transmission for an uplink QoS flow that has no (or is not configured with) mapping between a QoS flow and a bearer. Therefore, if the default bearer is configured as a bearer which belongs to the deactivated cell group, data cannot be transmitted, or a request to activate the cell10roup may be made unnecessarily.

Therefore, the disclosure proposes restriction that the default bearer configured in the SDAP layer device configuration information cannot be configured as a bearer belonging to a deactivated cell group. Alternatively, the disclosure proposes to configure the default bearer configured in the SDAP layer device configuration information, as a bearer belonging to a cell group that is not deactivated. As another method, the NR base station or E-UTRA base station connected to 5GC may transmit another RRC message including SDAP layer device configuration information to the terminal before transmitting the RRC message for cell group deactivation to the terminal, so as to change or reconfigure the default bearer to a bearer belonging to a cell group that is not deactivated. As another method, the NR base station or E-UTRA base station connected to 5GC may transmit, while transmitting the RRC message for cell group deactivation to the terminal, the RRC message including SDAP layer device configuration information to the terminal, so as to change or reconfigure the default bearer to a bearer belonging to a cell group that is not deactivated.

In the following, the disclosure proposes a first embodiment of a terminal operation in consideration of dual connectivity configuration information when an RRC message (e.g., RRCReconfiguration) is received. The embodiment proposes a procedure in which, when the terminal activates, adds, or change a cell group, the cell group may be activated without random access (RACH less activation).

If the terminal receives an RRCReconfiguration message, the terminal may perform the following procedures.
1> If an MCG (or master node (MN)) is configured to LTE (E-UTRA) and an SCG (or (secondary node (SN)) is configured to NR (i.e., if E-UTRA nr-SecondaryCell-GroupConfig is configured), or if the terminal is configured to (NG) EN-DC (next generation E-UTRA NR—dual connectivity connected to 5GC),
  2> If the RRCReconfiguration message is received via an E-UTRA RRC message in a MobilityFromNR-Command message (message indicating handover from NR to (NG) EN-DC),
    3> In the message, if reconfigurationWithSync configuration information is included in spCellConfig of the SCG, or if a cell group of the SCG is not configured to be inactive,
      4> The terminal may perform (trigger or start) random access for an SPCell (or SCG or PSCell).
      4> If configured (or indicated) to activate the cell group (e.g., secondary cell group) (or if the cell group is not configured to be inactive), if the cell group has been inactive previously, or if the terminal has been in a connected mode, the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) associated with the cell group (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. In the following of the disclosure, MAC layer device initialization or partial initialization of the MAC layer device will be described in detail.
    3> Else, if the cell group of the SCG is not configured to be inactive, if a new indicator (e.g., RACH-less indication) is included in the message and it is thus indicated not to perform random access, or if reconfigurationWithSync configuration information is not included in spCellConfig of the SCG in the message,
      4> The terminal may not perform (trigger or start) random access for an SPCell (or SCG or PSCell).

4> The terminal may activate the SPCell without random access, may start PDCCH monitoring for the SPCell, or may start PDSCH reception.
4> If configured (or indicated) to activate the cell group (e.g., secondary cell group) (or if the cell group is not configured to be inactive), if the cell group has been inactive previously, or if the terminal has been in a connected mode, the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) associated with the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. In the following of the disclosure, MAC layer device initialization or partial initialization of the MAC layer device will be described in detail.
3> Else,
4> The procedures performed by the terminal are terminated.
1> If an MCG (or master node (MN) is configured to NR and an SCG (or secondary node (SN) is configured to NR (i.e., if E-UTRA nr-SecondaryCellGroupConfig is configured), if the terminal is configured to NR-DC (NR—dual connectivity connected to 5GC), receives an RRCReconfiguration message via nr-SCG of mrdc-SecondaryCellGroup configuration information through SRB1, or receives the mrdc-SecondaryCellGroup configuration information via the RRCReconfiguration or RRCResume message through SRB1,
2> In the message, if reconfigurationWithSync configuration information is included in spCellConfig of nr-SCG, or if a cell group of the SCG is not configured to be inactive,
3> The terminal may perform (trigger or start) random access for an SPCell (or SCG or PSCell).
3> If configured (or indicated) to activate the cell group (e.g., secondary cell group) (or if the cell group is not configured to be inactive), if the cell group has been inactive previously, or if the terminal has been in a connected mode, the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) associated with the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. In the following of the disclosure, MAC layer device initialization or partial initialization of the MAC layer device will be described in detail.
2> Else, if the cell group of the SCG is not configured to be inactive, if a new indicator (e.g., RACH-less indication) is included in the message and it is thus indicated not to perform random access, or if reconfigurationWithSync configuration information is not included in spCellConfig of the SCG in the message,
3> The terminal may not perform (trigger or start) random access for an SPCell (or SCG or PSCell).
3> The terminal may activate the SPCell without random access, may start PDCCH monitoring for the SPCell, or may start PDSCH reception.
3> If configured (or indicated) to activate the cell group (e.g., secondary cell group) (or if the cell group is not configured to be inactive), if the cell group has been inactive previously, or if the terminal has been in a connected mode, the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) associated with the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. In the following of the disclosure, MAC layer device initialization or partial initialization of the MAC layer device will be described in detail.
2> Else,
3> The procedures performed by the terminal are terminated.
1> In the message, if reconfigurationWithSync configuration information is included in spCellConfig of an MCG or SCG, and if a MAC layer device of an NR cell group has successfully performed random access triggered above,
  2> A first timer T304 for the cell group may be stopped (or if the timer is running).
  2> A second timer T310 for the cell group or source SPCell may be stopped (or if the timer is running).

If reconfigurationWithSync is included in the message, and when the terminal performs reconfiguration (reconfiguration with Sync) to perform synchronization, the following procedures may be performed.
  1> If a dual active protocol stack (DAPS) bearer is not configured, if a cell group (or SCG) is not configured to be inactive, if RLM-related configuration or beam failure detection-related configuration information for a deactivated cell group is not configured (if a cell group is configured to be inactive, the second timer continues to run, and RLM is performed to support rapid cell group activation), or if the procedure is not performed for a deactivated cell group (or SCG),
    2> The second timer T310 for the cell group or SPCell may be stopped (or if the timer is running).
  1> A third timer T312 for the cell group or SPCell may be stopped (or if the timer is running).
  1> If a cell group (or SCG) is not configured to be inactive, or if the procedure is not performed for a deactivated cell group (or SCG),
    2> The first timer T304 for the SPCell (PCell of MCG or PSCell of SCG) may be started by configuring to a value of the first timer T304 included in reconfigurationWithSync configuration information of the message.

As proposed in the disclosure, if RLM-related configuration information or beam failure detection-related configuration information is configured for a deactivated cell group (or SCG) via the RRC message (e.g., RRCReconfiguration message), the terminal may perform radio link failure detection as follows.
  1> If a cell group is configured to be inactive (or if beam failure detection or RLM is configured for a deactivated cell group), or an indication that an SPCell is not synchronized is received from a lower layer device a predetermined number of times (e.g., N310 value),
    The second timer T310 for the SPCell may be started. (When the cell group is activated (or configured to be active or not configured to be inactive) or random access is started or performed for the SPCell, if the second timer is running, the second timer may be stopped. In addition, if the second timer expires, it may be declared that a radio link failure has occurred for the cell group.)
  1> If a DAPS bearer is configured, if an indication that an SPCell is not synchronized is received from a lower layer device a predetermined number of times (e.g., N310 value), or if the first timer is running,
    The second timer T310 for the source SPCell may be started.
  1> If an indication that an SPCell is not synchronized is received from a lower layer device a predetermined number of times (e.g., N310 value), or if the first timer T304 or a fourth timer is not running,
    The second timer T310 for the source SPCell may be started.

In the following, the disclosure proposes a second embodiment of a terminal operation in consideration of dual connectivity configuration information when an RRC message (e.g., RRCReconfiguration) is received. The embodiment proposes a procedure in which, when the terminal activates, adds, or change a cell group, the cell group may be activated without random access (RACH less activation).

If the terminal receives an RRCReconfiguration message, the terminal may perform the following procedures.
  1> If an MCG (or master node (MN)) is configured to LTE (E-UTRA) and an SCG (or (secondary node (SN)) is configured to NR (i.e., if E-UTRA nr-SecondaryCellGroupConfig is configured), or if the terminal is configured to (NG) EN-DC (next generation E-UTRA NR—dual connectivity connected to 5GC),
    2> If the RRCReconfiguration message is received via an E-UTRA RRC message in a MobilityFromNR-Command message (message indicating handover from NR to (NG) EN-DC),
      3> In the message, if reconfigurationWithSync configuration information is included in spCellConfig of the SCG, if the cell group of the SCG is not configured to be inactive, if a time alignment timer (TAT) (timer for determination of validity of a timing advance (TA) value for synchronization between the terminal and the base station) running in the MAC layer device is not running (or if the timer has expired or an indication that the timer has expired is received from a lower layer device), if an indication that a beam failure is detected is received from a lower layer device (or if a beam failure has occurred), if beam failure detection or RLM for the deactivated cell group is not configured, or if a radio link failure is detected during RLM (or if the second timer T310 has expired, or a radio link to the SCG is not valid),
        4> The terminal may perform (trigger or start) random access for an SPCell (or SCG or PSCell).
      3> If configured (or indicated) to activate the cell group (e.g., secondary cell group) (or if the cell group is not configured to be inactive), if the cell group has been inactive previously, or if the terminal has been in a connected mode, the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) associated with the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. In the following of the disclosure, MAC layer device initialization or partial initialization of the MAC layer device will be described in detail.

3> Else, if the cell group of the SCG is not configured to be inactive, if a new indicator (e.g., RACH-less indication) is included in the message and it is thus indicated not to perform random access, if a time alignment timer (TAT) (timer for determination of validity of a timing advance (TA) value for synchronization between the terminal and the base station) running in the MAC layer device is running (or if the timer has not expired or an indication that the timer has expired is not received from a lower layer device), if no indication that a beam failure is detected is received from a lower layer device (or if a beam failure has not occurred), if beam failure detection or RLM for the deactivated cell group is configured, if no radio link failure is detected during RLM (or if the second timer T310 has not expired, or a radio link to the SCG is valid), or if reconfigurationWith-Sync configuration information is not included in spCellConfig of the SCG in the message,
    4> The terminal may not perform (trigger or start) random access for an SPCell (or SCG or PSCell).
    4> The terminal may activate the SPCell without random access, may start PDCCH monitoring for the SPCell, or may start PDSCH reception.
    4> If configured (or indicated) to activate the cell group (e.g., secondary cell group) (or if the cell group is not configured to be inactive), if the cell group has been inactive previously, or if the terminal has been in a connected mode, the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) associated with the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. In the following of the disclosure, MAC layer device initialization or partial initialization of the MAC layer device will be described in detail.
3> Else, if the cell group of the SCG is not configured to be inactive, if a new indicator (e.g., RACH-less indication) is included in the message and it is thus indicated not to perform random access, if a time alignment timer (TAT) (timer for determination of validity of a timing advance (TA) value for synchronization between the terminal and the base station) running in the MAC layer device is not running (or if the timer has expired or an indication that the timer has expired is received from a lower layer device), if an indication that a beam failure is detected is received from a lower layer device (or if a beam failure has occurred), if beam failure detection or RLM for the deactivated cell group is not configured, if a radio link failure is detected during RLM (or if the second timer T310 has expired, or a radio link to the SCG is not valid), or if reconfigurationWith-Sync configuration information is not included in spCellConfig of the SCG,
    4> The terminal may perform (trigger or start) random access for an SPCell (or SCG or PSCell).
    4> If configured (or indicated) to activate the cell group (e.g., secondary cell group) (or if the cell group is not configured to be inactive), if the cell group has been inactive previously, or if the terminal has been in a connected mode, the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) associated with the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. In the following of the disclosure, MAC layer device initialization or partial initialization of the MAC layer device will be described in detail.
3> Else,
    4> The procedures performed by the terminal are terminated.
1> If an MCG (or master node (MN) is configured to NR and an SCG (or secondary node (SN) is configured to NR (i.e., if E-UTRA nr-SecondaryCellGroupConfig is configured), if the terminal is configured to NR-DC (NR—dual connectivity connected to 5GC), receives an RRCReconfiguration message via nr-SCG of mrdc-SecondaryCellGroup configuration information through SRB1, or receives the mrdc-SecondaryCellGroup configuration information via the RRCReconfiguration or RRCResume message through SRB1,
  2> In the message, if reconfigurationWithSync configuration information is included in spCellConfig of nr-SCG, if the cell group of the SCG is not configured to be inactive, if a time alignment timer (TAT) (timer for determination of validity of a timing advance (TA) value for synchronization between the terminal and the base station) running in the MAC layer device is not running (or if the timer has expired or an indication that the timer has expired is received from a lower layer device), if an indication that a beam failure is detected is received from a lower layer device (or if a beam failure has occurred), if beam failure detection or RLM for the deactivated cell group is not configured, or if a radio link failure is detected during RLM (or if the second timer T310 has expired, or a radio link to the SCG is not valid), 3> The terminal may perform (trigger or start) random access for an SPCell (or SCG or PSCell).

3> If configured (or indicated) to activate the cell group (e.g., secondary cell group) (or if the cell group is not configured to be inactive), if the cell group has been inactive previously, or if the terminal has been in a connected mode, the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) associated with the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. In the following of the disclosure, MAC layer device initialization or partial initialization of the MAC layer device will be described in detail.

2> Else, if the cell group of the SCG is not configured to be inactive, if a new indicator (e.g., RACH-less indication) is included in the message and it is thus indicated not to perform random access, if a time alignment timer (TAT) (timer for determination of validity of a timing advance (TA) value for synchronization between the terminal and the base station) running in the MAC layer device is running (or if the timer has not expired or an indication that the timer has expired is not received from a lower layer device), if no indication that a beam failure is detected is received from a lower layer device (or if a beam failure has not occurred), if beam failure detection or RLM for the deactivated cell group is configured, if reconfigurationWithSync configuration information is not included in spCellConfig of the SCG in the message, or if no radio link failure is detected during RLM (or if the second timer T310 has not expired, or a radio link to the SCG is valid), 3> The terminal may not perform (trigger or start) random access for an SPCell (or SCG or PSCell).

3> The terminal may activate the SPCell without random access, may start PDCCH monitoring for the SPCell, or may start PDSCH reception.

4> If configured (or indicated) to activate the cell group (e.g., secondary cell group) (or if the cell group is not configured to be inactive), if the cell group has been inactive previously, or if the terminal has been in a connected mode, the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) associated with the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. In the following of the disclosure, MAC layer device initialization or partial initialization of the MAC layer device will be described in detail.

2> Else, if the cell group of the SCG is not configured to be inactive, if a new indicator (e.g., RACH-less indication) is included in the message and it is thus indicated not to perform random access, if a time alignment timer (TAT) (timer for determination of validity of a timing advance (TA) value for synchronization between the terminal and the base station) running in the MAC layer device is not running (or if the timer has expired or an indication that the timer has expired is received from a lower layer device), if an indication that a beam failure is detected is received from a lower layer device (or if a beam failure has occurred), if beam failure detection or RLM for the deactivated cell group is not configured, if a radio link failure is detected during RLM (or if the second timer T310 has expired, or a radio link to the SCG is not valid), or if reconfigurationWithSync configuration information is not included in spCellConfig of the SCG, 3> The terminal may perform (trigger or start) random access for an SPCell (or SCG or PSCell).

3> If configured (or indicated) to activate the cell group (e.g., secondary cell group) (or if the cell group is not configured to be inactive), if the cell group has been inactive previously, or if the terminal has been in a connected mode, the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) associated with the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. In the following of the disclosure, MAC layer device initialization or partial initialization of the MAC layer device will be described in detail.
2> Else,
   3> The procedures performed by the terminal are terminated.
1> In the message, if reconfigurationWithSync configuration information is included in spCellConfig of an MCG or SCG, and if a MAC layer device of an NR cell group has successfully performed random access triggered above,
   2> The first timer T304 for the cell group may be suspended (or if the timer is running).
   2> A second timer T310 for the cell group or source SPCell may be stopped (or if the timer is running).
If reconfigurationWithSync is included in the message, and when the terminal performs reconfiguration (reconfiguration with Sync) to perform synchronization, the following procedures may be performed.
1> If a dual active protocol stack (DAPS) bearer is not configured, if a cell group (or SCG) is not configured to be inactive, if RLM-related configuration or beam failure detection-related configuration information for a deactivated cell group is not configured (if a cell group is configured to be inactive, the second timer continues to run, and RLM is performed to support rapid cell group activation), or if the procedure is not performed for a deactivated cell group (or SCG),
   2> The second timer T310 for the cell group or SPCell may be stopped (or if the timer is running).
1> The third timer T312 for the cell group or SPCell may be stopped (or if the timer is running).
1> If a cell group (or SCG) is not configured to be inactive, or if the procedure is not performed for a deactivated cell group (or SCG),
   2> The first timer T304 for the SPCell (PCell of MCG or PSCell of SCG) may be started by configuring to a value of the first timer T304 included in reconfigurationWithSync configuration information of the message.
As proposed in the disclosure, if RLM-related configuration information or beam failure detection-related configuration information is configured for a deactivated cell group (or SCG) via the RRC message (e.g., RRCReconfiguration message), the terminal may perform radio link failure detection as follows.
1> If a cell group is configured to be inactive (or if beam failure detection or RLM is configured for a deactivated cell group), or an indication that an SPCell is not synchronized is received from a lower layer device a predetermined number of times (e.g., N310 value),
The second timer T310 for the SPCell may be started.
(When the cell group is activated (or configured to be active or not configured to be inactive), when random access is started or performed for the SPCell, or when the random access has been successfully performed, if the second timer is running, the second timer may be stopped. In addition, if the second timer expires, it may be declared that a radio link failure has occurred for the cell group.)
1> If a DAPS bearer is configured, if an indication that an SPCell is not synchronized is received from a lower layer device a predetermined number of times (e.g., N310 value), or if the first timer is running,
The second timer T310 for the source SPCell may be started.
1> If an indication that an SPCell is not synchronized is received from a lower layer device a predetermined number of times (e.g., N310 value), or if the first timer T304 or the fourth timer is not running,
The second timer T310 for the source SPCell may be started.

In the following, the disclosure proposes a third embodiment of a terminal operation in consideration of dual connectivity configuration information when an RRC message (e.g., RRCReconfiguration) is received. The embodiment proposes a procedure in which, when the terminal activates, adds, or change a cell group, the cell group may be activated without random access (RACH less activation).

If the terminal receives an RRCReconfiguration message, the terminal may perform the following procedures.
1> If an MCG (or master node (MN)) is configured to LTE (E-UTRA) and an SCG (or (secondary node (SN)) is configured to NR (i.e., if E-UTRA nr-SecondaryCell-GroupConfig is configured), or if the terminal is configured to (NG) EN-DC (next generation E-UTRA NR—dual connectivity connected to 5GC),
   2> If the RRCReconfiguration message is received via an E-UTRA RRC message in a MobilityFromNR-Command message (message indicating handover from NR to (NG) EN-DC),
     3> In the message, if reconfigurationWithSync configuration information is included in spCellConfig of the SCG, if the cell group of the SCG is not configured to be inactive, if a time alignment timer (TAT) (timer for determination of validity of a timing advance (TA) value for synchronization between the terminal and the base station) running in the MAC layer device is not running (or if the timer has expired or an indication that the timer has expired is received from a lower layer device), if an indication that a beam failure is detected is received from a lower layer device (or if a beam failure has occurred), if beam failure detection or RLM for the deactivated cell group is not configured, or if a radio link failure is detected during RLM (or if the second timer T310 has expired, or a radio link to the SCG is not valid),
        4> The terminal may perform (trigger or start) random access for an SPCell (or SCG or PSCell).
        4> If configured (or indicated) to activate the cell group (e.g., secondary cell group) (or if the cell group is not configured to be inactive), if the cell group has been inactive previously, or if the terminal has been in a connected mode, the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) associated with the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. In the following of the disclosure, MAC layer device initialization or partial initialization of the MAC layer device will be described in detail.

3> Else, if the cell group of the SCG is not configured to be inactive, if a new indicator (e.g., RACH-less indication or second reconfigurationWithcSync) is included in the message and it is thus indicated not to perform random access, if a time alignment timer (TAT) (timer for determination of validity of a timing advance (TA) value for synchronization between the terminal and the base station) running in the MAC layer device is running (or if the timer has not expired or an indication that the timer has expired is not received from a lower layer device), if no indication that a beam failure is detected is received from a lower layer device (or if a beam failure has not occurred), if beam failure detection or RLM for the deactivated cell group is configured, if no radio link failure is detected during RLM (or if the second timer T310 has not expired, or a radio link to the SCG is valid), or if reconfigurationWithSync configuration information is not included in spCellConfig of the SCG in the message,
    4> The terminal may not perform (trigger or start) random access for an SPCell (or SCG or PSCell).
    4> The terminal may activate the SPCell without random access, may start PDCCH monitoring for the SPCell, or may start PDSCH reception.
    4> The terminal may introduce a new fourth timer to identify whether the SPCell has been successfully activated without random access. For example, the fourth timer may be started when the conditions are satisfied. The fourth timer may be stopped if a PDCCH or PDSCH is successfully received from the SPCell. If the fourth timer expires, the terminal may trigger SCG failure reporting and report the same via the MCG. As another method, if the fourth timer expires, the terminal may perform random access (contention-based random access (CBRA) or contention-free random access (CFRA)) or 2-step random access (two-step RACH) (i.e., the terminal may fall back to random access), based on separate random access configuration information (e.g., second reconfigurationWithSync may be configured, preamble information, smtc information, or a new terminal identifier (RNTI value) may be configured, or a need code is configured to be S so as to be stored and used) which is broadcast from system information or configured via the RRC message. As another method, if the terminal fails to activate the cell group without random access (e.g., if a PDCCH or PDSCH is not successfully received for a certain period of time), the terminal may perform random access (contention-based random access (CBRA) or contention-free random access (CFRA)) or 2-step random access (two-step RACH) (i.e., the terminal may fall back to random access), based on separate random access configuration information which is broadcast from system information or configured via the RRC message. The separate random access configuration information may be configured when an indication to deactivate the cell group is transmitted to the terminal via the RRC message, or may be configured when an indication (or reconfigurationWithSync) for the terminal to activate the cell group is transmitted to the terminal via the RRC message. Whether the cell group has been successfully activated without random access may be determined based on that, for example, the terminal successfully receives a PDCCH from the terminal, receives a transmission resource (uplink grant or downlink assignment), or receives the RRC message from the base station.
    4> If configured (or indicated) to activate the cell group (e.g., secondary cell group) (or if the cell group is not configured to be inactive), if the cell group has been inactive previously, or if the terminal has been in a connected mode, the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) associated with the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. In the following of the disclosure, MAC layer device initialization or partial initialization of the MAC layer device will be described in detail.
3> Else, if the cell group of the SCG is not configured to be inactive, if a new indicator (e.g., RACH-less indication) is included in the message and it is thus indicated not to perform random access, if a time alignment timer (TAT) (timer for determination of validity of a timing advance (TA) value for synchronization between the terminal and the base station) running in the MAC layer device is not running (or if the timer has expired or an indication that the timer has expired is received from a lower layer device), if an indication that a beam failure is detected is received from a lower layer device (or if a beam failure has occurred), if beam failure detection or RLM for the deactivated cell group is not configured, if a radio link failure is detected during RLM (or if the second timer T310 has expired, or a radio link to the SCG is not valid), or if reconfigurationWithSync configuration information is not included in spCellConfig of the SCG, 4> The terminal may perform (trigger or start) random access for an SPCell (or SCG or PSCell).

4> If configured (or indicated) to activate the cell group (e.g., secondary cell group) (or if the cell group is not configured to be inactive), if the cell group has been inactive previously, or if the terminal has been in a connected mode, the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) associated with the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. In the following of the disclosure, MAC layer device initialization or partial initialization of the MAC layer device will be described in detail.

3> Else,

4> The procedures performed by the terminal are terminated.

1> If an MCG (or master node (MN) is configured to NR and an SCG (or secondary node (SN) is configured to NR (i.e., if E-UTRA nr-SecondaryCellGroupConfig is configured), if the terminal is configured to NR-DC (NR—dual connectivity connected to 5GC), receives an RRCReconfiguration message via nr-SCG of mrdc-SecondaryCellGroup configuration information through SRB1, or receives the mrdc-SecondaryCellGroup configuration information via the RRCReconfiguration or RRCResume message through SRB1, 2> In the message, if reconfigurationWithSync configuration information is included in spCellConfig of nr-SCG, if the cell group of the SCG is not configured to be inactive, if a time alignment timer (TAT) (timer for determination of validity of a timing advance (TA) value for synchronization between the terminal and the base station) running in the MAC layer device is not running (or if the timer has expired or an indication that the timer has expired is received from a lower layer device), if an indication that a beam failure is detected is received from a lower layer device (or if a beam failure has occurred), if beam failure detection or RLM for the deactivated cell group is not configured, or if a radio link failure is detected during RLM (or if the second timer T310 has expired, or a radio link to the SCG is not valid), 3> The terminal may perform (trigger or start) random access for an SPCell (or SCG or PSCell).

3> If configured (or indicated) to activate the cell group (e.g., secondary cell group) (or if the cell group is not configured to be inactive), if the cell group has been inactive previously, or if the terminal has been in a connected mode, the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) associated with the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. In the following of the disclosure, MAC layer device initialization or partial initialization of the MAC layer device will be described in detail.

2> Else, if the cell group of the SCG is not configured to be inactive, if a new indicator (e.g., RACH-less indication or second reconfigurationWithcSync) is included in the message and it is thus indicated not to perform random access, if a time alignment timer (TAT) (timer for determination of validity of a timing advance (TA) value for synchronization between the terminal and the base station) running in the MAC layer device is running (or if the timer has not expired or an indication that the timer has expired is not received from a lower layer device), if no indication that a beam failure is detected is received from a lower layer device (or if a beam failure has not occurred), if beam failure detection or RLM for the deactivated cell group is configured, if no radio link failure is detected during RLM (or if the second timer T310 has not expired, or a radio link to the SCG is valid), or if reconfigurationWithSync configuration information is not included in spCellConfig of the SCG in the message, 3> The terminal may not perform (trigger or start) random access for an SPCell (or SCG or PSCell).
  3> The terminal may activate the SPCell without random access, may start PDCCH monitoring for the SPCell, or may start PDSCH reception.
  3> The terminal may introduce a new fourth timer to identify whether the SPCell has been successfully activated without random access. For example, the fourth timer may be started when the conditions are satisfied. The fourth timer may be stopped if a PDCCH or PDSCH is successfully received from the SPCell. If the fourth timer expires, the terminal may trigger SCG failure reporting and report the same via the MCG. As another method, if the fourth timer expires, the terminal may perform random access (contention-based random access (CBRA) or contention-free random access (CFRA)) or 2-step random access (two-step RACH) (i.e., the terminal may fall back to random access), based on separate random access configuration information (e.g., second reconfigurationWithSync may be configured, preamble information, smtc information, or a new terminal identifier (RNTI value) may be configured, or a need code is configured to be S so as to be stored and used) which is broadcast from system information or configured via the RRC message. As another method, if the terminal fails to activate the cell group without random access (e.g., if a PDCCH or PDSCH is not successfully received for a certain period of time), the terminal may perform random access (contention-based random access (CBRA) or contention-free random access (CFRA)) or 2-step random access (two-step RACH) (i.e., the terminal may fall back to random access), based on separate random access configuration information which is broadcast from system information or configured via the RRC message. The separate random access configuration information may be configured when an indication to deactivate the cell group is transmitted to the terminal via the RRC message, or may be configured when an indication (or reconfigurationWithSync) for the terminal to activate the cell group is transmitted to the terminal via the RRC message.
  3> If configured (or indicated) to activate the cell group (e.g., secondary cell group) (or if the cell group is not configured to be inactive), if the cell group has been inactive previously, or if the terminal has been in a connected mode, the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) associated with the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. In the following of the disclosure, MAC layer device initialization or partial initialization of the MAC layer device will be described in detail.
2> Else, if the cell group of the SCG is not configured to be inactive, if a new indicator (e.g., RACH-less indication) is included in the message and it is thus indicated not to perform random access, if a time alignment timer (TAT) (timer for determination of validity of a timing advance (TA) value for synchronization between the terminal and the base station) running in the MAC layer device is not running (or if the timer has expired or an indication that the timer has expired is received from a lower layer device), if an indication that a beam failure is detected is received from a lower layer device (or if a beam failure has occurred), if beam failure detection or RLM for the deactivated cell group is not configured, if a radio link failure is detected during RLM (or if the second timer T310 has expired, or a radio link to the SCG is not valid), or if reconfigurationWithSync configuration information is not included in spCellConfig of the SCG,
  3> The terminal may perform (trigger or start) random access for an SPCell (or SCG or PSCell).
  3> If configured (or indicated) to activate the cell group (e.g., secondary cell group) (or if the cell group is not configured to be inactive), if the cell group has been inactive previously, or if the terminal has been in a connected mode, the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) associated with the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. In the following of the disclosure, MAC layer device initialization or partial initialization of the MAC layer device will be described in detail.
2> Else,
  3> The procedures performed by the terminal are terminated.
1> In the message, if reconfigurationWithSync configuration information is included in spCellConfig of an MCG or SCG, and if a MAC layer device of an NR cell group has successfully performed random access triggered above,
  2> A first timer T304 for the cell group may be stopped (or if the timer is running).
  2> A second timer T310 for the cell group or source SPCell may be stopped (or if the timer is running).

If reconfigurationWithSync is included in the message, and when the terminal performs reconfiguration (reconfiguration with Sync) to perform synchronization, the following procedures may be performed.
1> If a dual active protocol stack (DAPS) bearer is not configured, if a cell group (or SCG) is not configured to be inactive, if RLM-related configuration or beam failure detection-related configuration information for a deactivated cell group is not configured (if a cell group is configured to be inactive, the second timer continues to run, and RLM is performed to support rapid cell group activation), or if the procedure is not performed for a deactivated cell group (or SCG),
2> The second timer T310 for the cell group or SPCell may be suspended (or if the timer is running).
1> A third timer T312 for the cell group or SPCell may be stopped (or if the timer is running).
1> If a cell group (or SCG) is not configured to be inactive, or if the procedure is not performed for a deactivated cell group (or SCG),
2> The first timer T304 for the SPCell (PCell of MCG or PSCell of SCG) may be started by configuring to a value of the first timer T304 included in reconfigurationWithSync configuration information of the message.

As proposed in the disclosure, if RLM-related configuration information or beam failure detection-related configuration information is configured for a deactivated cell group (or SCG) via the RRC message (e.g., RRCReconfiguration message), the terminal may perform radio link failure detection as follows.
1> If a cell group is configured to be inactive (or if beam failure detection or RLM is configured for a deactivated cell group), or an indication that an SPCell is not synchronized is received from a lower layer device a predetermined number of times (e.g., N310 value),
The second timer T310 for the SPCell may be started. (When the cell group is activated (or configured to be active or not configured to be inactive), when random access is started or performed for the SPCell, or when the random access has been successfully performed, if the second timer is running, the second timer may be stopped. In addition, if the second timer expires, it may be declared that a radio link failure has occurred for the cell group.)
1> If a DAPS bearer is configured, if an indication that an SPCell is not synchronized is received from a lower layer device a predetermined number of times (e.g., N310 value), or if the first timer is running,
The second timer T310 for the source SPCell may be started.
1> If an indication that an SPCell is not synchronized is received from a lower layer device a predetermined number of times (e.g., N310 value), or if the first timer T304 or the fourth timer is not running,
The second timer T310 for the source SPCell may be started.

In the disclosure, when the terminal receives the RRC message (e.g., RRCReconfiguration message or RRCResume message) including an indicator for cell group activation (or the cell group is configured to be active), and when random access is performed according to the conditions proposed in the disclosure, if the terminal performs CFRA random access, the TAT configured for (or associated with) the cell group may be started (or resumed) or a TA value (timing advance command (TAC)) may be newly applied.

However, when the terminal receives the RRC message (e.g., RRCReconfiguration message or RRCResume message) including an indicator for cell group activation (or the cell group is configured to be active), and when random access is performed according to the conditions proposed in the disclosure, if the terminal performs CBRA random access, the base station is unable to identify a cell identifier of the terminal (CBRA does not include a cell identifier of the terminal), so that the TAT configured for (or associated with) the cell group (or PSCell) may not be started (or resumed), or a TA value (timing advance command (TAC)) may not be newly applied. Therefore, in order to solve problems above, when the base station transmits, to the terminal, the RRC message (e.g., RRCReconfiguration message or RRCResume message) including an indicator for cell group activation (or the cell group is configured to be active), or when the RRC message includes an indicator to perform random access, the base station may always configure a CFRA transmission resource (e.g., designated preamble transmission resource (dedicated preamble)) for random access in the RRC message, so as to enable the terminal to perform CFRA random access when performing random access according to the conditions proposed in the disclosure. As another method, in order to solve problems above, if the terminal receives the RRC message (e.g., RRCReconfiguration message or RRCResume message) including an indicator for cell group activation (or the cell group is configured to be active), when performing random access (or CBRA random access) according to the conditions proposed in the disclosure, if the TAT configured for (or associated with) the cell group (or PSCell) is running, the terminal may consider that the TAT has stopped or expired. If the TAT is stopped or expired as in the above, even if the terminal performs CBRA random access, since the TAT is started (or resumed) or a TA value (timing advance command (TAC)) may be newly applied, the problems can be solved.

The terminal may receive the second RRC message 11-20 or apply received configuration information, and may generate a third RRC message 11-25 or a fourth RRC message so as to transmit 11-30 the same to the base station. The third RRC message may include some of the following information.
Second RRC message identifier having the same value as that of the second RRC message identifier included in the second RRC message
Indicator or identifier indicating that the second RRC message has been successfully received
Fourth RRC message including a response indicating that the first RRC message generated and transmitted by a secondary base station has been successfully received. The fourth RRC message may include some of the following information.
First RRC message identifier having the same value as that of the first RRC message identifier included in the first RRC message
Indicator or identifier indicating that the first RRC message has been successfully received
Response indicator indicating that the first RRC message has been successfully applied When the base station (e.g., master base station) receives the third RRC message, the base station may identify, via a second identifier, whether the received message is a response message to the second RRC message. Further, the base station may check the fourth RRC message included in the third message, and may add the fourth RRC message to a configuration completion message indicating completion of configuration for a secondary cell group base station, so as to transmit 11-30 the configuration completion message to the secondary base station via the Xn interface (e.g., interface between base stations) or the Sn interface (e.g., interface between base stations or between a base station and AMF or UMF). The configuration completion message may include some of the following information.

Fourth RRC message included in the third RRC message

Indicator or identifier indicating that configuration (adding, changing, or clearing of a cell group) or indication (activation, deactivation, suspension, or resumption of a cell group) indicated via the request acceptance message or the first RRC message has been completed When the configuration completion message is received, the base station (e.g., secondary base station) may read and check the fourth RRC message included in the configuration completion message, and may identify, via the first identifier, whether the received message is a response message to the first RRC message. Further, the base station may identify whether the indicated configuration or indication has been successfully completed. When the configuration completion message or the fourth RRC message is received, the secondary base station may transmit, to the master base station in response to the reception, a response message indicating that the configuration completion message or the fourth RRC message has been successfully received.

Figure 12:
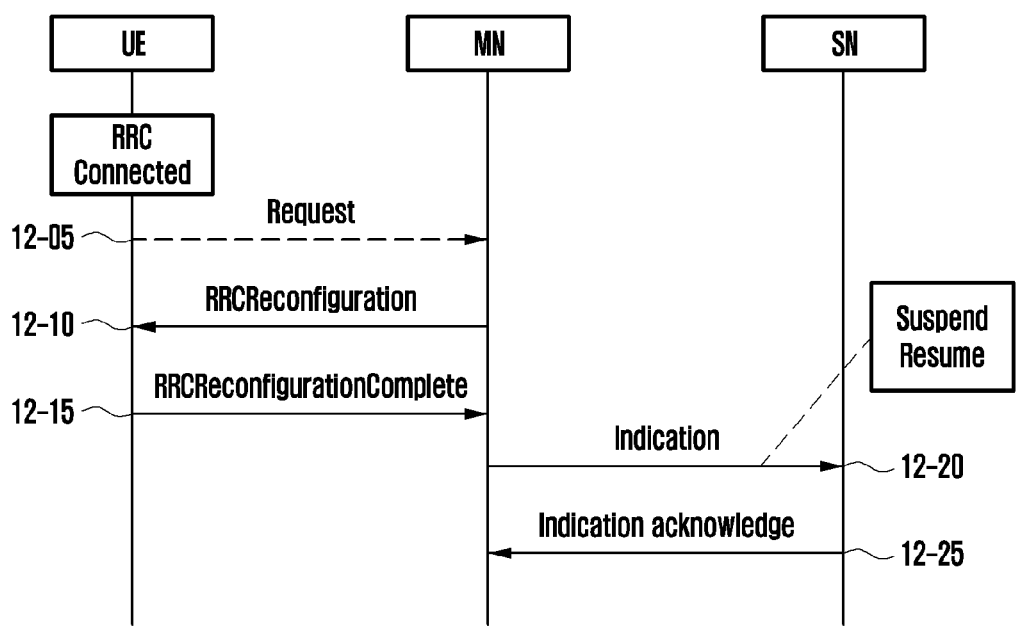
FIG. 12 proposes another example of a signaling procedure of configuring or clearing dual connectivity, or configuring, clearing, activating, resuming, suspending, or deactivating a secondary cell group configured with dual connectivity, according to an embodiment of the disclosure.

FIG. 12 proposes another example of a signaling procedure of configuring or clearing dual connectivity, or configuring, clearing, activating, resuming, suspending, or deactivating a secondary cell group configured with dual connectivity, according to an embodiment of the disclosure.

Referring to FIG. 12, second signaling of configuring or clearing dual connectivity, or configuring, clearing, activating, resuming, suspending, or deactivating a secondary cell group configured with dual connectivity is as follows.

In FIG. 12, a terminal may establish an RRC connection with a network or a base station as in FIG. 6 of the disclosure, and may transmit data to or receive data from the base station (e.g., master cell group (MCG), master node (MN), or cells (PCell or SCell) of the master cell group).

The base station may configure dual connectivity for the terminal according to a predetermined reason (e.g., if a high data transmission rate is required, if high QoS requirements should be satisfied, or in response to a message 12-05 from the terminal). For example, the terminal may transmit, to the base station, a request for configuring or clearing, activating or deactivating, or resuming or suspending dual connectivity, a cell group (e.g., secondary cell group), or a cell, and a message for the request may include a frequency (or channel) measurement result report, a cell group identifier, cell identifiers, or measurement results, in 12-05. As another method, the base station may determine, by considering a downlink (or uplink) data amount or a buffer amount, whether the base station is to configure, clear, add, deactivate, activate, resume, change, reconfigure, or suspend dual connectivity, a cell group (e.g., secondary cell group), or a cell.

A master base station (master node (MN) or master cell group (MCG)) may receive a frequency or channel measurement report for each frequency or channel received from the terminal, and may determine a secondary base station (secondary node (SN) or secondary cell group (SCG)), for which dual connectivity is to be configured, on the basis of the measurement report. Alternatively, the master base station may determine, by considering a downlink (or uplink) data amount or a buffer amount, whether the base station is to configure, clear, add, deactivate, activate, resume, change, reconfigure, or suspend dual connectivity, a cell group (e.g., secondary cell group), or a cell. The master base station may transmit a first RRC message 12-10 to the terminal in order to configure, clear, add, deactivate, activate, resume, change, reconfigure, or suspend dual connectivity, a cell group (e.g., secondary cell group), or a cell for the determined secondary base station. In the first RRC message, each separate new request message may be defined and used to perform indication to configure, clear, add, deactivate, activate, resume, change, reconfigure, or suspend dual connectivity, a cell group (e.g., secondary cell group), or a cell for the terminal, and alternatively, a new indicator may be defined from an existing message (e.g., RRCReconfiguration message or RRCResume message) so as to indicate (or request) to configure, clear, add, deactivate, activate, resume, change, reconfigure, or suspend a cell group (e.g., secondary cell group), or a cell. The first RRC message may include some of the following information.

First RRC message identifier for distinguishing the first RRC message (e.g., rrc-Transaction identifier). The terminal and the base station (e.g., master base station) transmit or receive multiple RRC messages to and from each other, and identifiers for distinguishing respective RRC messages may be thus included in the RRC messages. For example, an RRC message (e.g., RRCReconfiguration) transmitted by a transmission end, an RRC message (e.g., RRCReconfigurationComplete) transmitted by a reception end, which corresponds to the RRC message (e.g., RRCReconfiguration), or an RRC message corresponding to the RRC message transmitted by the transmission end may include the same first RRC message identifier.

Indicator or configuration information (e.g., indicator or configuration information for the terminal) for configuring, clearing, adding, deactivating, activating, resuming, changing, reconfiguring, or suspending of dual connectivity, a cell group (e.g., secondary cell group), or a cell Indicator indicating a cell group state (e.g., activated, deactivated, suspended, or resumed)

Cell group identifier for distinguishing cell groups. The cell group identifiers may be assigned by the master base station, or one identifier among previously appointed identifiers may be assigned by the secondary base station.

Cell group or cell configuration information

Bearer configuration information. For example, indicator information (e.g., PDCP suspension indicator, PDCP re-establishment indicator, PDCP data recovery indicator, RLC re-establishment indicator, MAC partial initialization indicator, MAC initialization indicator, or indicator triggering a new operation) indicating an operation of a protocol layer device (e.g., SDAP layer device, PDCP layer device, RLC layer device, or MAC layer device) of each bearer, an indicator indicating to initiate a header compression protocol (robust header compression (ROHC) or Ethernet header compression (EHC)) or a data compression protocol (UDC), or an indicator indicating to continue using a header compression protocol (robust header compression (ROHC) or Ethernet header compression (EHC)) or a data compression protocol (UDC) (or an indicator indicating not to initialize a header compression protocol or a data compression protocol (UDC))

If an indicator or configuration information for configuring, adding, activating, resuming, changing, or reconfiguring of dual connectivity, a cell group (e.g., secondary cell group), or a cell is included, a first indicator (e.g., mobilityControlInfor or ReconfigurationWithSync) may be included together. However, if an indicator or configuration information for clearing, deactivating, reconfiguring, or suspending of dual connectivity, a cell group (e.g., secondary cell group), or a cell is included, a first indicator (e.g., mobilityControlInfor or ReconfigurationWithSync) may not be included. The first indicator may be an indicator triggering random access to the cell group or cell, an indicator for signal synchronization with a new cell, an indicator indicating frequency shifting of the terminal, or an indicator indicating changing of the cell group (or cell). As another method, the terminal may perform PDCCH monitoring in the indicated or configured cell group or cell, and may trigger and perform random access as indicated in PDCCH. For example, a higher layer device (e.g., RRC layer device) may transmit, to a lower layer device (e.g., MAC layer device), an indicator triggering random access.

If the indicator or configuration information for configuring, adding, activating, resuming, changing, or reconfiguring of dual connectivity, a cell group (e.g., secondary cell group), or a cell is included, random access configuration information may be included together. However, if an indicator or configuration information for clearing, deactivating, reconfiguring, or suspending of dual connectivity, a cell group (e.g., secondary cell group), or a cell is included, the random access configuration information may not be included. The random access configuration information may include random access transmission resource information (time or frequency transmission resource) for preamble transmission, designated preamble information, or the like for the cell group or cell.

Time information indicating when to activate, resume, deactivate, or suspend dual connectivity, a cell group (e.g., secondary cell group), or a cell (PSCell or SCG SCell) (e.g., information indicating timing (e.g., X time unit, subframe unit, time slot unit, or symbol unit), for example, time information indicating, if the message is received in an nth time unit, whether to activate, resume, deactivate, or suspend the cell in an (n+X)th time unit)

First channel measurement configuration information for each cell or each bandwidth part Second channel measurement configuration information for each cell or each bandwidth part Indicator for adding of cell group configuration, indicator indicating cell group change (ReconfigurationWithSync), or indicator indicating random access (ReconfigurationWithSync or newly defined indicator)

Indicator indicating, when activating a cell group, whether to activate the cell group by performing random access or activate the cell group without random access (ReconfigurationWithSync processor newly defined indicator)

Radio resource management (RRM) configuration information or frequency measurement configuration information, or separate configuration information of radio resource management (RRM) or frequency measurement, which needs to be applied or performed when a cell group is deactivated (e.g., frequency measurement configuration information (reduced or relaxed RRM configuration information) simplified to reduce battery consumption)

Configuration information for radio link monitoring (RLM) or configuration information for RLM which needs to be applied or performed when a cell group is deactivated. For example, the configuration information for BFD is configuration information of beams for each bandwidth part or configuration information of beams in units of cells to be measured by the terminal when a cell group is deactivated, may include beam-related configuration information (transmission configuration indication (TCI) state or Quasi Co-Location (QCL)), may include a timing advance (TA) value (or offset value) for synchronization of a downlink signal of the base station or an uplink signal of the base station, a timer (time alignment timer (TAT)) indicating validity of the TA value, or a timer value (TAT value), or may include synchronization signal block (SSB) configuration information to be measured, channel state information reference signal (CSI-RS) configuration information, reference signal (RS) configuration information, or transmission resource information (e.g., PUCCH configuration information (e.g., scheduling request (SR) information or specific transmission resource), frequency transmission resource, or time transmission resource) enabling result reporting when a beam failure occurs. In addition, the configuration information may include bandwidth part configuration information (e.g., indication may be performed using a bandwidth part identifier) indicating a bandwidth part in which RLM is to be performed. As another method, when a cell group is deactivated, the terminal is able to minimize a cell group activation delay by performing RLM in a first active bandwidth part (or first active downlink bandwidth part, firstActiveDownlinkBWP-ID) configured via the RRC message and monitoring, early, the first active bandwidth part required to be activated when the cell group is activated. As another method, if a cell group is configured to be deactivated (or activated), the terminal may continue to maintain a connected state with the cell group by performing RLM in a last (or previously) activated bandwidth part before the cell group is deactivated (e.g., if bandwidth part configuration information indicating a bandwidth part in which RLM is to be performed is not configured), or may perform activation in a first active bandwidth part (or first active downlink bandwidth part, firstActiveDownlinkBWP-ID) configured via the RRC message when the cell group is activated. If, when activating the cell group, bandwidth part-related configuration information indicating a bandwidth part, in which RLM is to be performed, is not configured, the terminal may perform RLM in a last (or previously) activated bandwidth part. In addition, the configuration information may include beam-related configuration information (e.g., indication may be performed using a bandwidth part identifier, a TCI state, or QCL configuration information) indicating a beam in which RLM is to be performed. As another method, when a cell group is deactivated, the terminal is able to minimize a cell group activation delay by performing RLM in a beam (e.g., TCI state or QCL configuration information) configured via the RRC message, or by activating the beam, performing RLM, and monitoring, early, the beam required to be activated when activating the cell group. As another method, if a cell group is configured to be deactivated (or activated), the terminal may continue to maintain a connected state with the cell group by performing RLM in a last (or previously) activated beam before the cell group is deactivated (e.g., if beam-related configuration information indicating a beam in which RLM is to be performed is not configured), or may perform activation in a beam configured via the RRC message when the cell group is activated. If, when activating the cell group, beam-related configuration information indicating a beam, in which RLM is to be performed, is not configured, the terminal may perform RLM in a last (or previously) activated beam.

Configuration information for beam failure detection (BFD) or configuration information for BFD which needs to be applied or performed when a cell group is deactivated. For example, the configuration information for BFD is configuration information of beams for each bandwidth part or configuration information of beams in units of cells to be measured by the terminal when a cell group is deactivated, may include beam-related configuration information (transmission configuration indication (TCI) state or Quasi Co-Location (QCL)), may include a timing advance (TA) value (or offset value) for synchronization of a downlink signal of the base station or an uplink signal of the base station, a timer (time alignment timer (TAT)) indicating validity of the TA value, or a timer value (TAT value), or may include synchronization signal block (SSB) configuration information to be measured, channel state information reference signal (CSI-RS) configuration information, reference signal (RS) configuration information, or transmission resource information (e.g., PUCCH configuration information (e.g., scheduling request (SR) information or specific transmission resource), frequency transmission resource, or time transmission resource) enabling result reporting when a beam failure occurs. In addition, the configuration information may include bandwidth part configuration information (e.g., indication may be performed using a bandwidth part identifier) indicating a bandwidth part in which beam failure detection is to be performed. As another method, when a cell group is deactivated, the terminal is able to minimize a cell group activation delay by performing beam failure detection in a first active bandwidth part (or first active downlink bandwidth part, firstActiveDownlinkBWP-ID) configured via the RRC message and monitoring, early, the first active bandwidth part required to be activated when the cell group is activated. As another method, if a cell group is configured to be deactivated (or activated), the terminal may continue to maintain a connected state with the cell group by performing beam failure detection in a last (or previously) activated bandwidth part before the cell group is deactivated (e.g., if bandwidth part configuration information indicating a bandwidth part in which beam failure detection is to be performed is not configured), or may perform activation in a first active bandwidth part (or first active downlink bandwidth part, firstActiveDownlinkBWP-ID) configured via the RRC message when the cell group is activated. If, when activating the cell group, bandwidth part-related configuration information indicating a bandwidth part, in which beam failure detection is to be performed, is not configured, the terminal may perform beam failure detection in a last (or previously) activated bandwidth part. In addition, the configuration information may include beam-related configuration information (e.g., indication may be performed using a bandwidth part identifier, a TCI state, or QCL configuration information) indicating a beam in which beam failure detection is to be performed. As another method, when a cell group is deactivated, the terminal is able to minimize a cell group activation delay by performing beam failure detection in a beam (e.g., TCI state or QCL configuration information) configured via the RRC message, or monitoring, early, the beam required to be activated when activating the cell group. As another method, if a cell group is configured to be deactivated (or activated), the terminal may continue to maintain a connected state with the cell group by performing beam failure detection in a last (or previously) activated beam before the cell group is deactivated (e.g., if beam-related configuration information indicating a beam in which beam failure detection is to be performed is not configured), or may perform activation in a beam configured via the RRC message when the cell group is activated. If, when activating the cell group, beam-related configuration information indicating a beam, in which beam failure detection is to be performed, is not configured, the terminal may perform beam failure detection in a last (or previously) activated beam.

When the first RRC message 12-10 is received, the terminal may read and check the first RRC message, and the terminal may configure, add, change, resume, suspend, or deactivate dual connectivity or a cell group (e.g., secondary cell group). In addition, if a first indicator for triggering random access is included in the first RRC message, random access may be triggered for the configured or indicated cell group or cell. When random access is performed, if there is random access information in the RRC message, or if there is random access information that has been stored, random access (e.g., contention-free random access (e.g., 4-step random access or 2-step random access)) may be performed based on system information or the random access information which has been stored or received via the RRC message. If there is no random access information in the RRC message, random access (e.g., contention-based random access (e.g., 4-step random access or 2-step random access)) may be performed. As another method, the terminal may perform PDCCH monitoring in the indicated or configured cell group or cell, and may trigger and perform random access as indicated in PDCCH. For example, a higher layer device (e.g., RRC layer device) may transmit, to a lower layer device (e.g., MAC layer device), an indicator triggering random access.

The terminal may receive the first RRC message 12-10 or apply received configuration information, and may generate a second RRC message 12-15 and transmit the same to the base station. The second RRC message may include some of the following information.

First RRC message identifier having the same value as that of the first RRC message identifier included in the first RRC message Indicator or identifier indicating that the first RRC message has been successfully received When the base station (e.g., master base station) receives the second RRC message, the base station may identify, via a first identifier, whether the received message is a response message to the first RRC message. The base station may check the first RRC message, and may transmit the first RRC message 12-20, which includes an indication that a cell group has been configured, added, cleared, activated, resumed, suspended, or deactivated for a secondary cell group base station, to the secondary base station via an Xn interface (e.g., interface between base stations) or an Sn interface (e.g., interface between base stations or between a base station and AMF or UMF). The indication message may include some of the following information.

Identifier enabling to distinguish the indication message

Indicator or configuration information (e.g., indicator or configuration information for the secondary cell group) for configuring, clearing, adding, deactivating, activating, resuming, changing, reconfiguring, or suspending of dual connectivity, a cell group (e.g., secondary cell group), or a cell When the indication message is received, the base station (e.g., secondary base station) may read and check a message or configuration information included in the indication message, and may generate an indication acknowledgment message as a response message to the indication message, so as to transmit the indication acknowledgment message 12-25 to the master base station.

Identifier having the same value as that of the indicator included in the indication message Indicator or identifier indicating that the indication message has been successfully received Response indicator indicating that the indication message has been successfully applied The signaling procedures proposed in the disclosure may be expanded into new signaling procedures by converging and modifying each other. For example, if the message 12-05 is received from the terminal, the master base station makes an inquiry or request to the secondary base station as in first RRC message 12-20 or request message 11-10 of FIGS. 11A and 11B, receives a response message as in the indication acknowledgment message 12-25 or request acceptance message 11-15 of FIGS. 11A and 11B in response to the inquiry or request, and then may configure the RRC message corresponding to 12-20 according to the response message so as to transmit the RRC message to the terminal, and the terminal may configure the cell group according to an indication of the RRC message and may transmit, to the master base station, second RRC message 12-15 in response thereto.

Figure 13:
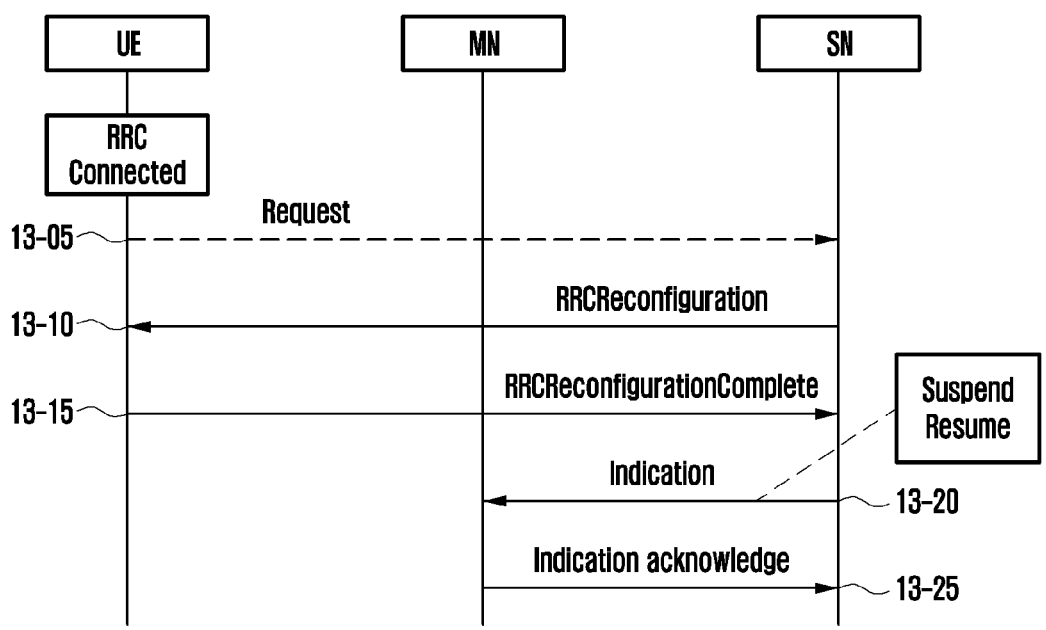
FIG. 13 proposes another example of a signaling procedure of configuring or clearing dual connectivity, or configuring, clearing, activating, resuming, suspending, or deactivating a secondary cell group configured with dual connectivity, according to an embodiment of the disclosure.

FIG. 13 proposes another example of a signaling procedure of configuring or clearing dual connectivity, or configuring, clearing, activating, resuming, suspending, or deactivating a secondary cell group configured with dual connectivity, according to an embodiment of the disclosure.

Referring to FIG. 13, third signaling of configuring or clearing dual connectivity, or configuring, clearing, activating, resuming, suspending, or deactivating a secondary cell group configured with dual connectivity is as follows.

In FIG. 13, a terminal may establish an RRC connection with a network or a base station as in FIG. 6 of the disclosure, and may transmit data to or receive data from a base station (e.g., master cell group (MCG), master node (MN), or cells (PCell or Scell) of the master cell group).

In FIG. 13, according to configuration in FIG. 6, a base station may configure, for a terminal, an SRB (e.g., SRB3) enabling direct transmission or reception of a control message or an RRC message between the terminal and a secondary base station.

The base station (e.g., secondary base station or master base station) may configure dual connectivity for the terminal according to a predetermined reason (e.g., when a high data transmission rate is required, when high QoS requirements should be satisfied, or in response to a request 13-05 from the terminal). For example, the terminal may transmit, to the base station, a request for configuring or clearing, activating or deactivating, or resuming or suspending dual connectivity, a cell group (e.g., secondary cell), or a cell, or may transmit a request to the secondary base station via SRB3, and a message for the request may include 13-05 a frequency (or channel) measurement result report, a cell group identifier, cell identifiers, or measurement results. As another method, the secondary base station may determine, by considering a downlink (or uplink) data amount or a buffer amount, whether the base station is to configure, clear, add, deactivate, activate, resume, change, reconfigure, or suspend dual connectivity, a cell group (e.g., secondary cell group), or a cell.

The secondary base station (master node (MN) or master cell group (MCG)) may receive a frequency or channel measurement report for each frequency or channel received from the terminal and may determine, based on the measurement report, whether to configure, clear, add, deactivate, activate, resume, change, reconfigure, or suspend dual connectivity, a cell group (secondary cell group), or a cell. Alternatively, the secondary base station may determine, by considering a downlink (or uplink) data amount or a buffer amount, whether the base station is to configure, clear, add, deactivate, activate, resume, change, reconfigure, or suspend dual connectivity, a cell group (e.g., secondary cell group), or a cell.

The secondary base station may transmit a first RRC message 13-10 to the terminal via SRB3 in order to configure, clear, add, deactivate, activate, resume, change, reconfigure, or suspend dual connectivity, a cell group (secondary cell group), or a cell. In the first RRC message, each separate new request message may be defined and used to perform indication to configure, clear, add, deactivate, activate, resume, change, reconfigure, or suspend dual connectivity, a cell group (e.g., secondary cell group), or a cell for the terminal, and alternatively, a new indicator may be defined from an existing message (e.g., RRCReconfiguration message or RRCResume message) so as to indicate (or request) to configure, clear, add, deactivate, activate, resume, change, reconfigure, or suspend a cell group (e.g., secondary cell group), or a cell. The first RRC message may include some of the following information.

First RRC message identifier for distinguishing the first RRC message (e.g., rrc-Transaction identifier). The terminal and the base station (e.g., secondary base station) transmit or receive multiple RRC messages to or from each other, and identifiers for distinguishing the respective RRC messages may be thus included in the RRC messages. For example, an RRC message (e.g., RRCReconfiguration) transmitted by a transmission end, an RRC message (e.g., RRCReconfigurationComplete) transmitted by a reception end, which corresponds to the RRC message (e.g., RRCReconfiguration), or an RRC message corresponding to the RRC message transmitted by the transmission end may include the same first RRC message identifier.

Indicator or configuration information (e.g., indicator or configuration information for the terminal) for configuring, clearing, adding, deactivating, activating, resuming, changing, reconfiguring, or suspending of dual connectivity, a cell group (e.g., secondary cell group), or a cell Indicator indicating a cell group state (e.g., activated, deactivated, suspended, or resumed)

Cell group identifier for distinguishing cell groups. The cell group identifiers may be assigned by the master base station, or one identifier among previously appointed identifiers may be assigned by the secondary base station.

Cell group or cell configuration information

Bearer configuration information. For example, indicator information (e.g., PDCP suspension indicator, PDCP re-establishment indicator, PDCP data recovery indicator, RLC re-establishment indicator, MAC partial initialization indicator, MAC initialization indicator, or indicator triggering a new operation) indicating an operation of a protocol layer device (e.g., SDAP layer device, PDCP layer device, RLC layer device, or MAC layer device) of each bearer, an indicator indicating to initiate a header compression protocol (robust header compression (ROHC) or Ethernet header compression (EHC)) or a data compression protocol (UDC), or an indicator indicating to continue using a header compression protocol (robust header compression (ROHC) or Ethernet header compression (EHC)) or a data compression protocol (UDC) (or an indicator indicating not to initialize a header compression protocol or a data compression protocol (UDC))

If an indicator or configuration information for configuring, adding, activating, resuming, changing, or reconfiguring of dual connectivity, a cell group (e.g., secondary cell group), or a cell is included, a first indicator (e.g., mobilityControlInfor or ReconfigurationWithSync) may be included together. However, if an indicator or configuration information for clearing, deactivating, reconfiguring, or suspending of dual connectivity, a cell group (e.g., secondary cell group), or a cell is included, a first indicator (e.g., mobilityControlInfor or ReconfigurationWithSync) may not be included. The first indicator may be an indicator triggering random access to the cell group or cell, an indicator for signal synchronization with a new cell, an indicator indicating frequency shifting of the terminal, or an indicator indicating changing of the cell group (or cell). As another method, the terminal may perform PDCCH monitoring in the indicated or configured cell group or cell, and may trigger and perform random access as indicated in PDCCH. For example, a higher layer device (e.g., RRC layer device) may transmit, to a lower layer device (e.g., MAC layer device), an indicator triggering random access.

If the indicator or configuration information for configuring, adding, activating, resuming, changing, or reconfiguring of dual connectivity, a cell group (e.g., secondary cell group), or a cell is included, random access configuration information may be included together. However, if an indicator or configuration information for clearing, deactivating, reconfiguring, or suspending of dual connectivity, a cell group (e.g., secondary cell group), or a cell is included, the random access configuration information may not be included. The random access configuration information may include random access transmission resource information (time or frequency transmission resource) for preamble transmission, designated preamble information, or the like for the cell group or cell.

Time information indicating when to activate, resume, deactivate, or suspend dual connectivity, a cell group (e.g., secondary cell group), or a cell (PSCell or SCG Scell) (e.g., information indicating timing (e.g., X time unit, subframe unit, time slot unit, or symbol unit), for example, time information indicating, if the message is received in an nth time unit, whether to activate, resume, deactivate, or suspend the cell in an (n+X)th time unit)

First channel measurement configuration information for each cell or each bandwidth part Second channel measurement configuration information for each cell or each bandwidth part Indicator for adding of cell group configuration, indicator indicating cell group change (ReconfigurationWithSync), or indicator indicating random access (ReconfigurationWithSync or newly defined indicator)

Indicator indicating, when activating a cell group, whether to activate the cell group by performing random access or activate the cell group without random access (ReconfigurationWithSync processor newly defined indicator)

Radio resource management (RRM) configuration information or frequency measurement configuration information, or separate configuration information of radio resource management (RRM) or frequency measurement, which needs to be applied or performed when a cell group is deactivated (e.g., frequency measurement configuration information (reduced or relaxed RRM configuration information) simplified to reduce battery consumption)

Configuration information for radio link monitoring (RLM) or configuration information for RLM which needs to be applied or performed when a cell group is deactivated. For example, the configuration information for RLM is configuration information of beams for each bandwidth part or configuration information of beams in units of cells to be measured by the terminal when a cell group is deactivated, may include beam-related configuration information (transmission configuration indication (TCI) state or Quasi Co-Location (QCL)), may include a timing advance (TA) value (or offset value) for synchronization of a downlink signal of the base station or an uplink signal of the base station, a timer (time alignment timer (TAT)) indicating validity of the TA value, or a timer value (TAT value), or may include synchronization signal block (SSB) configuration information to be measured, channel state information reference signal (CSI-RS) configuration information, reference signal (RS) configuration information, or transmission resource information (e.g., PUCCH configuration information (e.g., scheduling request (SR) information or specific transmission resource), frequency transmission resource, or time transmission resource) enabling result reporting when a beam failure occurs. In addition, the configuration information may include bandwidth part configuration information (e.g., indication may be performed using a bandwidth part identifier) indicating a bandwidth part in which RLM is to be performed. As another method, when a cell group is deactivated, the terminal is able to minimize a cell group activation delay by performing RLM in a first active bandwidth part (or first active downlink bandwidth part, firstActiveDownlinkBWP-ID) configured via the RRC message and monitoring, early, the first active bandwidth part required to be activated when the cell group is activated. As another method, if a cell group is configured to be deactivated (or activated), the terminal may continue to maintain a connected state with the cell group by performing RLM in a last (or previously) activated bandwidth part before the cell group is deactivated (e.g., if bandwidth part configuration information indicating a bandwidth part in which RLM is to be performed is not configured), or may perform activation in a first active bandwidth part (or first active downlink bandwidth part, firstActiveDownlinkBWP-ID) configured via the RRC message when the cell group is activated. If, when activating the cell group, bandwidth part-related configuration information indicating a bandwidth part, in which RLM is to be performed, is not configured, the terminal may perform RLM in a last (or previously) activated bandwidth part. In addition, the configuration information may include beam-related configuration information (e.g., indication may be performed using a bandwidth part identifier, a TCI state, or QCL configuration information) indicating a beam in which RLM is to be performed. As another method, when a cell group is deactivated, the terminal is able to minimize a cell group activation delay by performing RLM in a beam (e.g., TCI state or QCL configuration information) configured via the RRC message, or by activating the beam, performing RLM, and monitoring, early, the beam required to be activated when activating the cell group. As another method, if a cell group is configured to be deactivated (or activated), the terminal may continue to maintain a connected state with the cell group by performing RLM in a last (or previously) activated beam before the cell group is deactivated (e.g., if beam-related configuration information indicating a beam in which RLM is to be performed is not configured), or may perform activation in a beam configured via the RRC message when the cell group is activated. If, when activating the cell group, beam-related configuration information indicating a beam, in which RLM is to be performed, is not configured, the terminal may perform RLM in a last (or previously) activated beam.

Configuration information for beam failure detection (BFD) or configuration information for BFD which needs to be applied or performed when a cell group is deactivated. For example, the configuration information for RLM is configuration information of beams for each bandwidth part or configuration information of beams in units of cells to be measured by the terminal when a cell group is deactivated, may include beam-related configuration information (transmission configuration indication (TCI) state or Quasi Co-Location (QCL)), may include a timing advance (TA) value (or offset value) for synchronization of a downlink signal of the base station or an uplink signal of the base station, a timer (time alignment timer (TAT)) indicating validity of the TA value, or a timer value (TAT value), or may include synchronization signal block (SSB) configuration information to be measured, channel state information reference signal (CSI-RS) configuration information, reference signal (RS) configuration information, or transmission resource information (e.g., PUCCH configuration information (e.g., scheduling request (SR) information or specific transmission resource), frequency transmission resource, or time transmission resource) enabling result reporting when a beam failure occurs. In addition, the configuration information may include bandwidth part configuration information (e.g., indication may be performed using a bandwidth part identifier) indicating a bandwidth part in which beam failure detection is to be performed. As another method, when a cell group is deactivated, the terminal is able to minimize a cell group activation delay by performing beam failure detection in a first active bandwidth part (or first active downlink bandwidth part, firstActiveDownlinkBWP-ID) configured via the RRC message and monitoring, early, the first active bandwidth part required to be activated when the cell group is activated. As another method, if a cell group is configured to be deactivated (or activated), the terminal may continue to maintain a connected state with the cell group by performing beam failure detection in a last (or previously) activated bandwidth part before the cell group is deactivated (e.g., if bandwidth part configuration information indicating a bandwidth part in which beam failure detection is to be performed is not configured), or may perform activation in a first active bandwidth part (or first active downlink bandwidth part, firstActiveDownlinkBWP-ID) configured via the RRC message when the cell group is activated. If, when activating the cell group, bandwidth part-related configuration information indicating a bandwidth part, in which beam failure detection is to be performed, is not configured, the terminal may perform beam failure detection in a last (or previously) activated bandwidth part. In addition, the configuration Information may include beam-related configuration information (e.g., indication may be performed using a bandwidth part identifier, a TCI state, or QCL configuration information) indicating a beam in which beam failure detection is to be performed. As another method, when a cell group is deactivated, the terminal is able to minimize a cell group activation delay by performing beam failure detection in a beam (e.g., TCI state or QCL configuration information) configured via the RRC message, or monitoring, early, the beam required to be activated when activating the cell group. As another method, if a cell group is configured to be deactivated (or activated), the terminal may continue to maintain a connected state with the cell group by performing beam failure detection in a last (or previously) activated beam before the cell group is deactivated (e.g., if beam-related configuration information indicating a beam in which beam failure detection is to be performed is not configured), or may perform activation in a beam configured via the RRC message when the cell group is activated. If, when activating the cell group, beam-related configuration information indicating a beam, in which beam failure detection is to be performed, is not configured, the terminal may perform beam failure detection in a last (or previously) activated beam.

When the first RRC message 13-10 is received, the terminal may read and check the first RRC message, and the terminal may configure, add, change, resume, suspend, or deactivate dual connectivity or a cell group (e.g., secondary cell group). In addition, if a first indicator for triggering random access is included in the first RRC message, random access may be triggered for the configured or indicated cell group or cell. When random access is performed, if there is random access information in the RRC message, or if there is random access information that has been stored, random access (e.g., contention-free random access (e.g., 4-step random access or 2-step random access)) may be performed based on system information or the random access information which has been stored or received via the RRC message. If there is no random access information in the RRC message, random access (e.g., contention-based random access (e.g., 4-step random access or 2-step random access)) may be performed. As another method, the terminal may perform PDCCH monitoring in the indicated or configured cell group or cell, and may trigger and perform random access as indicated in PDCCH. For example, a higher layer device (e.g., RRC layer device) may transmit, to a lower layer device (e.g., MAC layer device), an indicator triggering random access.

The terminal may receive the first RRC message 13-10 or apply received configuration information, and may generate a second RRC message so as to transmit the second RRC message 13-15 to the secondary base station via SRB3. The second RRC message may include some of the following information.

First RRC message identifier having the same value as that of the first RRC message identifier included in the first RRC message Indicator or identifier indicating that the first RRC message has been successfully received When the base station (e.g., secondary base station) receives the second RRC message, the base station may identify, via a first identifier, whether the received message is a response message to the first RRC message. The base station may check the first RRC message, and may transmit 13-20 an indication message, which includes an indication that a cell group has been configured, added, cleared, activated, resumed, suspended, or deactivated for a master base station or a master cell group base station, to the master base station via an Xn interface (e.g., interface between base stations) or an Sn interface (e.g., interface between base stations or between a base station and AMF or UMF). The indication message may include some of the following information.

Identifier enabling to distinguish the indication message

Indicator or configuration information (e.g., indicator or configuration information for the secondary cell group) for configuring, clearing, adding, deactivating, activating, resuming, changing, reconfiguring, or suspending of dual connectivity, a cell group (e.g., secondary cell group), or a cell When the indication message is received, the base station (e.g., master base station) may read and check a message or configuration information included in the indication message, and may generate an indication acknowledgment message as a response message to the indication message, so as to transmit 13-25 the indication acknowledgment message to the secondary base station.

Identifier having the same value as that of the indicator included in the indication message Indicator or identifier indicating that the indication message has been successfully received Response indicator indicating that the indication message has been successfully applied When, as proposed in the disclosure, a message is transmitted to the terminal in order to configure or indicate a cell group or cell configuration information to the terminal, for example, if the message includes an indicator or configuration information for configuring, adding, activating, resuming, changing, or reconfiguring dual connectivity, a cell group (e.g., secondary cell group), or a cell, SDAP configuration information may be included or reconfigured, or mapping configuration information between a QoS flow and a bearer of an SDAP layer device may be included, configured or reconfigured. However, if the message includes an indicator or configuration information for clearing, deactivating, reconfiguring, or suspending of dual connectivity, a cell group (e.g., secondary cell group), or a cell, the SDAP configuration information may not be included or may not be reconfigured, or the mapping configuration information between a QoS flow and a bearer of the SDAP layer device may not be included, may not be configured, may not be reconfigured, or may be suspended from being applied.

The signaling procedures proposed in the disclosure may be expanded into new signaling procedures by converging and modifying each other.

The signaling proposed in the disclosure may be extended to multi-connectivity. For example, configuration information of multiple cell groups may be configured for the terminal via an RRC message, one or more cell groups (or cells) among the configured multiple cell groups may be activated or resumed via an indicator of a PDCCH, MAC control information, or an RRC message, or one or more cell groups may be suspended or deactivated.

In the following, the disclosure proposes a terminal operation for each cell (PSCell or SCG sCell) when dual connectivity, a cell group (e.g., secondary cell group), or a cell (PSCell or SCG sCell) is activated, resumed, added, deactivated, cleared, or suspended as proposed in the disclosure, or a terminal operation for each protocol layer device (e.g., SDAP layer device, PDCP layer device, RLC layer device, MAC layer device, or PHY layer device).

1> If the terminal receives (e.g., via DCI of PDCCH, MAC control information, or RRC message) an identifier or configuration information for configuring, adding, activating, or resuming, changing, or reconfiguring of dual connectivity, a cell group (e.g., secondary cell group), or a cell, the terminal may perform some of the following procedures.

2> A higher layer device (e.g., RRC layer device) may indicate the configuration information or indicator to a lower layer device (e.g., PDCP layer device, RLC layer device, MAC layer device, or PHY layer device).

2> Terminal operation for PSCell: When an indicator or configuration information is received, the terminal may maintain a PSCell active, may activate a downlink bandwidth part of the PSCell to a normal bandwidth part (e.g., first active bandwidth part, or bandwidth part other than a dormant bandwidth part) configured via an RRC message, or a last activated bandwidth part, and may perform a terminal operation for the activated bandwidth part. As another method, when an indicator or configuration information is received, the terminal may maintain a PSCell active, may reconfigure or switch a DRX configuration cycle or a PDCCH monitoring cycle of the PSCell to a short cycle based on first DRX configuration information, and may perform PDCCH monitoring and a terminal operation for an active cell. In this way, by performing the terminal operation for the PSCell, a scheduling indication may be received rapidly from a cell group or cell, and data transmission or reception may be started. In order to more rapidly receive a scheduling indication from a cell group or cell, and to start data transmission or reception, the terminal may measure a large number of channel signals or measure channel signals frequently, based on first channel measurement configuration information configured via the RRC message, and may rapidly perform channel measurement reporting, that is, reporting a measurement result to the base station. If a predetermined condition is satisfied, the terminal may measure a channel signal again based on second channel measurement configuration information and may report a measurement result to the terminal.

2> Terminal operation for sCell of secondary cell group: When an indicator or configuration information is received, the terminal may activate an sCell of the secondary cell group, may activate a downlink bandwidth part or an uplink bandwidth part to a bandwidth part (e.g., first active bandwidth part) configured via the RRC message, and may perform a terminal operation for the activated sCell or bandwidth part. As another method, when an indicator or configuration information is received, if a dormant bandwidth part is configured for an sCell of the secondary cell group, the terminal may maintain the sCell active, may activate a downlink bandwidth part of the sCell to a bandwidth part (e.g., first active bandwidth part) configured via the RRC message, and may perform a terminal operation for the activated bandwidth part, or if a dormant bandwidth part is not configured for the sCell of the secondary cell group, the terminal may switch the sCell to be active, may activate the downlink bandwidth part or uplink bandwidth part to a bandwidth part (e.g., first active bandwidth part) configured via the RRC message, and may perform a terminal operation for the activated sCell or bandwidth part. As another method, when an indicator or configuration information is received, the terminal may determine, according to an indicator or sCell configuration information configured in the message including the indicator or configuration information, switching, activation, or deactivation of a bandwidth part or a state of the sCell, and may perform a terminal operation.

2> Terminal operation of MAC layer device for secondary cell group: When an indicator or configuration information is received, the terminal may perform initialization for the MAC layer device (MAC reset) (e.g., the terminal may reset or clear configuration information configured for the MAC layer device, may suspend or reset configured timers, or may also suspend or reset HARQ). For example, a timing advance timer (TAT) indicating validity of signal synchronization between the terminal and the base station may be considered to have been suspended or expired. As another method, when an indicator or configuration information is received, the terminal may perform MAC partial reset (or, when the message including the indicator or configuration information includes an indicator indicating MAC partial reset, the MAC partial reset may be performed). For example, the timing advance timer (TAT) indicating validity of signal synchronization between the terminal and the base station may be continuously maintained, or HARQ retransmission that is being performed may be continued. As another method, for the MAC layer device, the current configuration may be maintained without performing any procedure. If an indication for triggering of random access is indicated from a higher layer device (e.g., RRC layer device), or if the TAT has been suspended or has expired, the terminal may trigger random access. Alternatively, if the TAT has not been suspended or has not expired, random access may not be triggered or performed. This is because, if the TAT is running, this indicates that signal synchronization with the secondary cell group is made or maintained, and thus triggering or performing of random access may cause unnecessary random access. As another method, if the base station triggers random access via an indication of PDCCH, the terminal may trigger random access, may configure or adjust a timing advance (TA) value, or may start a TA timer. After completing random access, a secondary cell group may be resumed or activated, and data transmission or reception may be resumed. The random access may include performing contention-based random access (CBRA). As another method, when performing random access, if random access configuration information (dedicated RACH config or dedicated preamble) specified in the message (or previously received message) indicating activation or resumption of the cell group is configured (or included), contention-free random access (CFRA)) may be performed, or if random access configuration information (dedicated RACH config or dedicated preamble) specified in the message (or previously received message) indicating activation or resumption of the cell group is not configured (or included), contention-based random access (CBRA) may be performed, or random access may not be performed. If the cell group (e.g., secondary cell group) is configured (or indicated) to be active (or if the cell group is not configured to be inactive), the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) linked to the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. If the MAC layer device is not reset or is not partially reset as proposed in the above, since data stored in a downlink buffer of the terminal is not flushed, an error may occur in soft combining when data is received later (e.g., after cell group activation if the cell group is activated), or since data in an uplink buffer (e.g., message 3 buffer or message A buffer) is not flushed, when data is transmitted later (e.g., when the cell group is activated, or thereafter), old data may be transmitted and an error may thus occur.

2> Operation for data radio bearer (DRB) configured for secondary cell group: When an indicator or configuration information is received, the terminal may resume DRBs (or SN (SCG) terminated DRB, DRB with the PDCP layer device configured for the SCG, bearer using the RLC UM mode, or bearer using the RLC AM mode) included in the secondary cell group. For example, for a split bearer (bearer in which one RLC layer device is configured for the master cell group, and another RLC layer device is configured for the secondary cell group) in which the PDCP layer device is configured for the master cell group, the RRC message including the configuration information or indicator may also include an indicator (reestablishRLC) triggering re-establishment of the RLC layer device configured for the secondary cell group, or the terminal may perform re-establishment for the RLC layer device configured for the secondary cell group. For example, for a split bearer (bearer in which one RLC layer device is configured for the master cell group, and another RLC layer device is configured for the secondary cell group) in which the PDCP layer device is configured for the secondary cell group, the RRC message including the configuration information or indicator may also include an indicator (reestablishRLC) triggering re-establishment of the RLC layer device configured for the master cell group, or may also include an indicator triggering PDCP re-establishment (reestablishPDCP), PDCP resumption (PDCP resume), or PDCP recovery (recoverPDCP) in the PDCP layer device configured for the secondary cell group, or the terminal may perform re-establishment for the RLC layer device configured for the master cell group, or may perform PDCP re-establishment, PDCP resumption (PDCP resume), or PDCP recovery (PDCP data recovery) in the PDCP layer device configured for the secondary cell group. For example, for bearers configured for the secondary cell group, the bearers may be resumed, or the RRC layer device may indicate, to the PDCP layer device, triggering of PDCP re-establishment, PDCP resumption, or PDCP recovery, or the PDCP layer device may perform PDCP re-establishment, PDCP resumption (PDCP resume), or PDCP recovery (for example, if a security key (or security algorithm (ciphering or integrity protection algorithm)) is changed (or updated), PDCP re-establishment (or PDCP resumption or first PDCP resumption) may be indicated or performed, and if the security key is not changed (or not updated), PDCP data recovery (or PDCP resumption or second PDCP resumption) may be indicated or performed). The terminal may trigger first PDCP resumption for the bearers (or bearers using the RLC UM mode or bearers using the RLC AM mode) configured for the secondary cell group, or the first PDCP resumption may be performed in the PDCP layer device. As another method, in order to solve a security issue caused by transmission of different data with the same security key when the secondary cell group is activated or resumed, the terminal may trigger second PDCP resumption for the bearers (or bearers using the RLC UM mode or bearers using the RLC AM mode) configured for the secondary cell group, or may perform the second PDCP resumption in the PDCP layer device. As another method, if a higher layer device triggers PDCP layer device resumption, the terminal may trigger and perform first PDCP resumption, and if a higher layer device indicates an indicator for triggering of PDCP layer device resumption or for activation or resumption of the cell group (cell), the terminal may trigger and perform second PDCP resumption. As another method, in order to solve a security issue caused by transmission of different data with the same security key, if an indicator for activation or resumption of a cell group (or cell) is indicated, the base station may configure a new security key by adding security key configuration information (e.g., sk-counter) to the RRC message including the indicator for activation or resumption of the cell group (or cell) and may enable changing or updating of the security key, or may add a PDCP re-establishment indicator to the RRC message in order to change or update security keys of the bearers (or bearers using the RLC UM mode or bearers using the RLC AM mode) configured for the secondary cell group, or the terminal may perform PDCP re-establishment for the bearers. As another method, if the message including an indication for resumption or activation of a cell group includes security configuration information, if changing (updating) of the security configuration information is indicated, or if an indicator indicating first PDCP resumption is included, the terminal may trigger the first PDCP resumption, or the first PDCP resumption may be performed in the PDCP layer device with respect to the bearers (or bearers using the RLC UM mode or bearers using the RLC AM mode) configured for the secondary cell group. However, if the message including an indication of resumption or activation of a cell group does not include security configuration information, if changing (updating) of the security configuration information is not indicated, or if an indicator indicating second PDCP resumption is included, the terminal may trigger the second PDCP resumption in order to solve a security issue caused by transmission of different data with the same security key when the secondary cell group is activated or resumed, or the second PDCP resumption may be performed in the PDCP layer device with respect to the bearers (or bearers using the RLC UM mode or bearers using the RLC AM mode) configured for the secondary cell group. The methods proposed above may be performed when a message including an indication for suspension or deactivation of a cell group is received. In addition, the methods proposed above may be applied to SCG bearers (bearers having a PDCP layer device in SCG or SCG terminated bearers).

2> Operation for signaling radio bearer (SRB) configured for secondary cell group: If an indicator or configuration information is received, and a PSCell is activated, or if an activated downlink bandwidth part of the PSCell is a normal bandwidth part other than a dormant bandwidth part, or the activated PSCell performs PDCCH monitoring with a long cycle based on first DRX configuration information, the terminal may continuously maintain SRBs (or SN (SCG) terminated SRB, or SRB or SRB3 in which a PDCP layer device is configured for SCG) included in the secondary cell group (for example, the terminal may continuously transmit a control message to or receive a control message from the secondary base station). Alternatively, data discard (e.g., discard indication to the PDCP layer device or RLC re-establishment) may be performed to discard old data (e.g., PDCP SDU or PDCP PDU) stored in SRBs configured for the secondary cell group. As another method, when an indicator or configuration information is received, the terminal may resume SRBs (or SN (SCG) terminated SRB, or SRB or SRB3 in which a PDCP layer device is configured for SCG) included in the secondary cell group. Alternatively, data discard (e.g., discard indication to the PDCP layer device or RLC re-establishment) may be performed to discard old data (e.g., PDCP SDU or PDCP PDU) stored in SRBs configured for the secondary cell group. For example, for a split bearer (bearer in which one RLC layer device is configured for the master cell group, and another RLC layer device is configured for the secondary cell group) in which the PDCP layer device is configured for the master cell group, the RRC message including the configuration information or indicator may also include an indicator (reestablishRLC) triggering re-establishment of the RLC layer device configured for the secondary cell group, or the terminal may perform re-establishment for the RLC layer device configured for the secondary cell group. For example, for a split bearer (one RLC layer device is configured for the master cell group, and another RLC layer device is configured for the secondary cell group) in which the PDCP layer device is configured for the secondary cell group, the RRC message including the configuration information or indicator may also include an indicator (reestablishRLC) triggering re-establishment of the RLC layer device configured for the master cell group, or may also include an indicator triggering PDCP re-establishment (reestablishPDCP), PDCP resumption (PDCP resume), or PDCP data recovery (recoverPDCP) in the PDCP layer device configured for the secondary cell group, or the terminal may perform re-establishment for the RLC layer device configured for the master cell group, or may perform PDCP re-establishment, PDCP resumption (PDCP resume), or PDCP data recovery in the PDCP layer device configured for the secondary cell group. For example, for bearers configured for the secondary cell group, the bearers may be resumed, or the RRC layer device may indicate, to the PDCP layer device, triggering of PDCP re-establishment or PDCP resumption, or the PDCP layer device may perform PDCP re-establishment or PDCP resumption (PDCP resume) (for example, if a security key (or security algorithm (ciphering or integrity protection algorithm)) is changed (or updated), PDCP re-establishment (or PDCP resumption or first PDCP resumption) may be indicated or performed, and if the security key is not changed (or not updated), PDCP data recovery (or PDCP resumption or second PDCP resumption) may be indicated or performed). The terminal may trigger first PDCP resumption for the bearers configured for the secondary cell, or the first PDCP resumption may be performed in the PDCP layer device. As another method, in order to solve a security issue caused by transmission of different data with the same security key when the secondary cell group is activated or resumed, the terminal may trigger second PDCP resumption for the bearers configured for the secondary cell group, or may perform the second PDCP resumption in the PDCP layer. As another method, if a higher layer device triggers PDCP layer device resumption, the terminal may trigger and perform first PDCP resumption, and if a higher layer device indicates an indicator to trigger PDCP layer device resumption or to activate or resume a cell group (cell), the terminal may trigger and perform second PDCP resumption. As another method, in order to solve a security issue caused by transmission of different data with the same security key, when an indicator for activation or resumption of a cell group (or cell) is indicated, the base station may configure a network security key by adding security key configuration information (e.g., sk-counter) to the RRC message including the indicator for activation or resumption of a cell group (or cell) and may enable changing or updating of the security key, or may add a PDCP re-establishment indicator to the RRC message in order to change or update security keys of the bearers configured for the secondary cell group, or the terminal may perform PDCP re-establishment for the bearers. As another method, if the message including an indication for resumption or activation of a cell group includes security configuration information, if changing (updating) of the security configuration information is indicated, or if an indicator indicating first PDCP resumption is included, the terminal may trigger the first PDCP resumption, or the first PDCP resumption may be performed in the PDCP layer device with respect to the bearers configured for the secondary cell group. However, if the message including an indication of resumption or activation of a cell group does not include security configuration information, if changing (updating) of the security configuration information is not indicated, or if an indicator indicating second PDCP resumption is included, the terminal may trigger the second PDCP resumption in order to solve a security issue caused by transmission of different data with the same security key when the secondary cell group is activated or resumed, or the second PDCP resumption may be performed in the PDCP layer device with respect to the bearers configured for the secondary cell group. The methods proposed above may be performed when a message including an indication for suspension or deactivation of a cell group is received. In addition, the methods proposed above may be applied to SCG bearers (bearers having a PDCP layer device in SCG or SCG terminated bearers).

2> Terminal operation for PUCCH sCell of secondary cell group: When an indicator or configuration information is received, the terminal may activate a PUCCH sCell of the secondary cell group, may activate a downlink bandwidth part or an uplink bandwidth part to a bandwidth part (e.g., first active bandwidth part) configured via the RRC message, and may perform a terminal operation for the activated sCell or bandwidth part. As another method, when an indicator or configuration information is received, if a dormant bandwidth part is configured for a PUCCH sCell of the secondary cell group, the terminal may maintain the sCell active, may activate a downlink bandwidth part of the sCell to a bandwidth part (e.g., first active bandwidth part) configured via the RRC message, and may perform a terminal operation for the activated bandwidth part, or if a dormant bandwidth part is not configured for the sCell of the secondary cell group, the terminal may switch the sCell to be active, may activate the downlink bandwidth part or uplink bandwidth part to a bandwidth part (e.g., first active bandwidth part) configured via the RRC message, and may perform the terminal operation for the activated sCell or bandwidth part. As another method, when an indicator or configuration information is received, the terminal may determine, according to an indicator or sCell configuration information configured in the message including the indicator or configuration information, switching, activation, or deactivation of a bandwidth part or a state of the sCell, and may perform a terminal operation. As another method, when an indication or configuration information is received, the terminal may apply, to the PUCCH sCell, first DRX configuration information (e.g., suspending second DRX configuration information and performing reconfiguration to the first DRX configuration information) configured via the RRC message, and may perform a terminal operation in the activated sCell if the terminal is able to perform PDCCH monitoring.

2> The terminal may transmit, to the master cell group or secondary cell group, an indicator indicating that a cell group (e.g., secondary cell group) or a cell has been configured, added, activated, resumed, changed, or reconfigured, and the terminal may transmit the indicator to the secondary cell group (or base station) or the master cell group (or base station) via a physical signal (e.g., HARQ ACK, NACK, or new transmission resource), MAC control information, or an RRC message.

2> If an indicator indicating to resume, activate, or add a cell group (e.g., secondary cell group) or a cell is received, if the cell group has been previously inactive, or if the terminal is in a connected mode, the terminal may trigger a PDCP state report in the PDCP layer device and report the same to the base station with respect to configured SCG bearers, bearers connected to the SCG RLC layer device, SCG split bearers, MCG bearers, or MCG split bearers. States of window variables or lost data between the terminal and the base station may be identifiable by transmission of the PDCP state report, so that a transmission window and a reception window may be synchronized.

1> If the terminal receives (e.g., via DCI of PDCCH, MAC control information, or RRC message) an identifier or configuration information for clearing, deactivating, reconfiguring, or suspending of dual connectivity, a cell group (e.g., secondary cell group), or a cell, if the cell group has been previously active, or if the terminal is in a connected mode, the terminal may perform some of the following procedures.

2> A higher layer device (e.g., RRC layer device) may indicate the configuration information or indicator to a lower layer device (e.g., PDCP layer device, RLC layer device, MAC layer device, or PHY layer device).

2> Terminal operation for PSCell: When an indicator or configuration information is received, the terminal may maintain a PSCell active, may activate a downlink bandwidth part of the PSCell to a dormant bandwidth part configured via the RRC message, and may perform a terminal operation for the dormant bandwidth part. As another method, when an indicator or configuration information is received, the terminal may maintain a PSCell active, may reconfigure or switch a DRX configuration cycle or a PDCCH monitoring cycle of the PSCell to a very long cycle based on second DRX configuration information, and may perform PDCCH monitoring and a terminal operation for the active cell. As another method, when an indicator or configuration information is received, the terminal may deactivate a PSCell and may perform a terminal operation for the deactivated cell. In this way, by performing a terminal operation for the PSCell, power consumption of the terminal may be reduced.

2> Terminal operation for sCell of secondary cell group: When an indicator or configuration information is received, the terminal may deactivate an sCell of the secondary cell group and may perform a terminal operation for the deactivated sCell. As another method, when an indicator or configuration information is received, or if a dormant bandwidth part is configured for an sCell of the secondary cell group, the terminal may maintain the sCell active, may activate a downlink bandwidth part of the sCell to a dormant bandwidth part, and may perform a terminal operation for the dormant bandwidth part, or if no dormant bandwidth part is configured for the sCell of the secondary cell group, the terminal may switch the sCell to be deactivated, and may perform a terminal operation for the deactivated cell or bandwidth part. As another method, when an indicator or configuration information is received, the terminal may determine, according to an indicator or sCell configuration information configured in the message including the indicator or configuration information, switching, activation, or deactivation of a bandwidth part or a state of the sCell, and may perform a terminal operation.

2> Terminal operation of MAC layer device for secondary cell group: When an indicator or configuration information is received, the terminal may perform initialization for the MAC layer device (MAC reset) (e.g., the terminal may reset or clear configuration information configured for the MAC layer device, may suspend or reset configured timers, or may also suspend or reset HARQ). For example, a timing advance timer (TAT) indicating validity of signal synchronization between the terminal and the base station may be considered to have been suspended or expired. As another method, in order to prevent data loss due to the reset of the MAC layer device, when an indicator or configuration information is received, the terminal may perform MAC partial reset (alternatively, when the message including the indicator or configuration information includes an indicator indicating MAC partial reset, the MAC partial reset may be performed). For example, the timing advance timer (TAT) indicating validity of signal synchronization between the terminal and the base station may be continuously maintained, or HARQ retransmission that is being performed may be continued. As another method, for the MAC layer device, the current configuration may be maintained without performing any procedure. When the TAT is continuously maintained, if the TAT expires, the terminal may adjust or configure timing advance (TA) again by performing random access even if the secondary cell group is suspended or deactivated. When performing random access, the terminal may indicate, using an indicator, to the base station that the random access is for adjusting TA (for example, a buffer state report (MAC control information) may be included and transmitted, and the absence of data to be transmitted may be indicated, or a new indicator may be introduced), after completion of the random access, the base station may transmit, to the terminal, a message including an indication for the terminal to suspend or deactivate the cell group again, or after completing the random access, the terminal may maintain the cell group suspended or deactivated (as another method, the terminal may maintain, by itself, the cell group suspended or deactivated without an indication from the base station). As another method, when the TAT is continuously maintained, if the TAT expires, since the base station is also driving the same TAT, the base station may trigger random access (for TA adjustment or reconfiguration) for the terminal via a cell (pCell, sCell, or PSCell) with respect to the master cell group or the secondary cell group, or may transmit, to the terminal, a message including an indicator for resumption or activation of the cell group. If the cell group (e.g., secondary cell group) is configured (or indicated) to be active (or if the cell group is not configured to be inactive), the terminal may initialize (MAC reset) the MAC layer device. The MAC layer device initialization (MAC reset) may be performed after determining whether the terminal is to perform random access, after random access is triggered, when random access has been performed successfully (or after completion of random access), when the cell group is activated without random access, or when the cell group has been activated successfully without random access (e.g., successful PDCCH reception or transmission resource reception). This is because, when the cell group is activated, if the MAC layer device is initialized first, it is considered that a time alignment timer (TAT) linked to the cell group or PTAG (or PSCell) has expired, so that the cell group may not be activated without random access proposed in the disclosure (For example, the cell group may be activated without random access only when the TAT is running). As another method, partial initialization (partial MAC reset) of the MAC layer device may be performed instead of the initialization of the MAC layer device. If the MAC layer device is not reset or is not partially reset as proposed in the above, since data stored in a downlink buffer of the terminal is not flushed, an error may occur in soft combining when data is received later (e.g., after cell group activation if the cell group is activated), or since data in an uplink buffer (e.g., message 3 buffer or message A buffer) is not flushed, when data is transmitted later (e.g., when the cell group is activated, or thereafter), old data may be transmitted and an error may thus occur.

2> Operation for data radio bearer (DRB) (or bearers using the RLC UM mode or bearers using the RLC AM mode) configured for secondary cell group: When an indicator or configuration information is received, the terminal may suspend DRBs (or SN (SCG) terminated DRB, DRB with the PDCP layer device configured for the SCG, bearer using the RLC UM mode, or bearer using the RLC AM mode) included in the secondary cell group. For example, for a split bearer (one RLC layer device is configured for the master cell group, and another RLC layer device is configured for the secondary cell group) in which the PDCP layer device is configured for the master cell group, the RRC message including the configuration information or indicator may also include an indicator (reestablishRLC) triggering re-establishment of the RLC layer device configured for the secondary cell group, or my also include an indicator triggering PDCP data recovery in the PDCP layer device configured for the master cell group, or the terminal may perform re-establishment for the RLC layer device configured for the secondary cell group, or may perform PDCP data recovery in the PDCP layer device configured for the master cell group. For example, for a split bearer (bearer in which one RLC layer device is configured for the master cell group, and another RLC layer device is configured for the secondary cell group) in which the PDCP layer device is configured for the secondary cell group, the RRC message including the configuration information or indicator may also include an indicator (reestablishRLC) triggering re-establishment of the RLC layer device configured for the master cell group, or may also include an indicator triggering PDCP re-establishment (reestablishPDCP), PDCP suspension (PDCP suspend), or PDCP recovery (recoverPDCP) in the PDCP layer device configured for the secondary cell group, or the terminal may perform re-establishment for the RLC layer device configured for the master cell group, or may perform PDCP re-establishment, PDCP suspension (PDCP suspend), or PDCP recovery (PDCP data recovery) in the PDCP layer device configured for the secondary cell group (for example, if a security key (or security algorithm (ciphering or integrity protection algorithm)) is changed (or updated), PDCP re-establishment (or PDCP resumption or first PDCP resumption) may be indicated or performed, and if the security key is not changed (or not updated), PDCP data recovery (or PDCP resumption or second PDCP resumption) may be indicated or performed). For example, for bearers (or bearers using the RLC UM mode or bearers using the RLC AM mode) configured for the secondary cell group, the bearers may be suspended, the RRC layer device may indicate, to the PDCP layer device, triggering of PDCP re-establishment or PDCP suspension, or PDCP re-establishment or PDCP suspension (PDCP suspend) may be performed in the PDCP layer device. The terminal may trigger first PDCP suspension for the bearers (or bearers using the RLC UM mode or bearers using the RLC AM mode) configured for the secondary cell group, or the first PDCP suspension may be performed in the PDCP layer device. As another method, in order to solve a security issue caused by transmission of different data with the same security key when the secondary cell group is activated or resumed, the terminal may trigger second PDCP suspension for the bearers (or bearers using the RLC UM mode or bearers using the RLC AM mode) configured for the secondary cell group, or the second PDCP suspension may be performed in the PDCP layer device. As another method, if a higher layer device triggers PDCP layer device suspension, first PDCP suspension may be triggered or performed, and if a higher layer device triggers PDCP layer device suspension or indicates an indicator for deactivation or suspension of a cell group (or cell), second PDCP suspension may be triggered and performed. As another method, if the message including an indication for suspension or deactivation of a cell group includes security configuration information, if changing (updating) of the security configuration information is indicated, or if an indicator indicating first PDCP suspension is included, the terminal may trigger the first PDCP suspension, or the first PDCP suspension may be performed in the PDCP layer device with respect to the bearers (or bearers using the RLC UM mode or bearers using the RLC AM mode) configured for the secondary cell group. However, if the message including an indication of suspension or deactivation of a cell group does not include security configuration information, if changing (updating) of the security configuration information is not indicated, or if an indicator indicating second PDCP suspension is included, the terminal may trigger the second PDCP suspension in order to solve a security issue caused by transmission of different data with the same security key when the secondary cell group is activated or resumed, or the second PDCP suspension may be performed in the PDCP layer device with respect to the bearers (or bearers using the RLC UM mode or bearers using the RLC AM mode) configured for the secondary cell group. The methods proposed above may be performed when a message including an indication for resumption or deactivation of a cell group is received. In addition, the methods proposed above may be applied to SCG bearers (bearers having a PDCP layer device in SCG or SCG terminated bearers).

2> Operation for signaling radio bearer (SRB) configured for secondary cell group: If an indicator or configuration information is received, and a PSCell is activated, or if an activated downlink bandwidth part of the PSCell is a normal bandwidth part other than a dormant bandwidth part, or the activated PSCell performs PDCCH monitoring with a long cycle based on second DRX configuration information, the terminal may continuously maintain SRBs (or SN (SCG) terminated SRB, or SRB or SRB3 in which a PDCP layer device is configured for SCG) included in the secondary cell group without suspension (for example, the terminal may continuously transmit a control message to or receive a control message from the secondary base station). Alternatively, data discard (e.g., discard indication to the PDCP layer device or RLC re-establishment) may be performed to discard old data (e.g., PDCP SDU or PDCP PDU) stored in SRBs configured for the secondary cell group. As another method, when an indicator or configuration information is received, the terminal may suspend SRBs (or SN (SCG) terminated SRB, or SRB or SRB3 in which a PDCP layer device is configured in SCG) included in the secondary cell group. Alternatively, data discard (e.g., discard indication to the PDCP layer device or RLC re-establishment) may be performed to discard old data (e.g., PDCP SDU or PDCP PDU) stored in SRBs configured for the secondary cell group. For example, for a split SRB bearer (one RLC layer device is configured for the master cell group, and another RLC layer device is configured for the secondary cell group) in which the PDCP layer device is configured for the master cell group, the RRC message including the configuration information or indicator may also include an indicator (reestablishRLC) triggering re-establishment of the RLC layer device configured for the secondary cell group, or may also include an indicator triggering PDCP data recovery in the PDCP layer device configured for the master cell group, or the terminal may perform re-establishment for the RLC layer device configured for the secondary cell group, or may perform PDCP data recovery in the PDCP layer device configured for the master cell group. For example, for a split bearer (one RLC layer device is configured for the master cell group, and another RLC layer device is configured for the secondary cell group) in which the PDCP layer device is configured for the secondary cell group, the RRC message including the configuration information or indicator may also include an indicator (reestablishRLC) triggering re-establishment of the RLC layer device configured for the master cell group, or may also include an indicator triggering PDCP re-establishment (reestablishPDCP), PDCP suspension (PDCP suspend), or PDCP data recovery in the PDCP layer device configured for the secondary cell group, or the terminal may perform re-establishment for the RLC layer device configured for the master cell group, or PDCP re-establishment or PDCP suspension (PDCP suspend) may be performed in the PDCP layer device configured for the secondary cell group. For example, for bearers configured for the secondary cell group, the bearers may be resumed, or the RRC layer device may indicate, to the PDCP layer device, triggering of PDCP re-establishment or PDCP suspension, or the PDCP layer device may perform PDCP re-establishment or PDCP suspension (PDCP suspend) (for example, if a security key (or security algorithm (ciphering or integrity protection algorithm)) is changed (or updated), PDCP re-establishment (or PDCP resumption or first PDCP resumption) may be indicated or performed, and if the security key is not changed (or not updated), PDCP data recovery (or PDCP resumption or second PDCP resumption) may be indicated or performed). The terminal may trigger first PDCP suspension for the bearers configured for the secondary cell group or may perform the first PDCP suspension in the PDCP layer device. As another method, in order to solve a security issue caused by transmission of different data with the same security key when the secondary cell group is activated or resumed, the terminal may trigger second PDCP suspension for the bearers configured for the secondary cell group, or may perform the second PDCP suspension in the PDCP layer device. As another method, if a higher layer device triggers PDCP layer device suspension, first PDCP suspension may be triggered or performed, and if a higher layer device triggers PDCP layer device suspension or indicates an indicator for deactivation or suspension of a cell group (or cell), second PDCP suspension may be triggered and performed. As another method, if the message including an indication for suspension or deactivation of a cell group includes security configuration information, if changing (updating) of the security configuration information is indicated, or if an indicator indicating first PDCP suspension is included, the terminal may trigger the first PDCP suspension or perform the first PDCP resumption in the PDCP layer device with respect to the bearers configured for the secondary cell group. However, if the message including an indication of suspension or deactivation of a cell group does not include the security configuration information, if changing (updating) of the security configuration information is not indicated, or if an indicator indicating second PDCP suspension is included, the terminal may trigger the second PDCP suspension in order to solve a security issue caused by transmission of different data with the same security key when the secondary cell group is activated or resumed, or the second PDCP suspension may be performed in the PDCP layer device with respect to the bearers configured for the secondary cell group. The methods proposed above may be performed when a message including an indication for resumption or deactivation of a cell group is received. In addition, the methods proposed above may be applied to SCG bearers (bearers having a PDCP layer device in SCG or SCG terminated bearers).

2> Terminal operation for PUCCH sCell of secondary cell group: When an indicator or configuration information is received, the terminal may deactivate a PUCCH sCell of the secondary cell group and may perform a terminal operation for the deactivated sCell. As another method, when an indicator or configuration information is received, or if a dormant bandwidth part is configured for a PUCCH sCell of the secondary cell group, the terminal may maintain the sCell active, may activate a downlink bandwidth part of the sCell to a dormant bandwidth part, and may perform a terminal operation for the dormant bandwidth part, or if no dormant bandwidth part is configured for the PUCCH sCell of the secondary cell group, the terminal may switch the PUCCH sCell to be deactivated, and may perform a terminal operation for the deactivated cell or bandwidth part. As another method, when an indicator or configuration information is received, the terminal may determine, according to an indicator or sCell configuration information configured in the message including the indicator or configuration information, switching, activation, or deactivation of a bandwidth part or a state of the sCell, and may perform a terminal operation. As another method, when an indication or configuration information is received, the terminal may apply second DRX configuration information configured via the RRC message for the PUCCH sCell, and if PDCCH monitoring is able to be performed based on a long cycle, a terminal operation for the activated sCell may be performed.

2> The terminal may transmit, to the master cell group or secondary cell group, an indicator indicating that a cell group (e.g., secondary cell group) or a cell has been suspended, deactivated, cleared, or changed, and the terminal may transmit the indicator to the secondary cell group (or base station) or the master cell group (or base station) via a physical signal (e.g., HARQ ACK, NACK, or new transmission resource), MAC control information, or an RRC message.

2> If an indicator indicating to suspend, deactivate, or clear a cell group (e.g., secondary cell group) or a cell is received, the terminal may trigger a PDCP state report in the PDCP layer device and report the same to the base station with respect to configured SCG bearers, bearers connected to the SCG RLC layer device, SCG split bearers, MCG bearers, or MCG split bearers. States of window variables or lost data between the terminal and the base station may be identifiable by transmission of the PDCP state report, so that a transmission window and a reception window may be synchronized.

The MAC layer device initialization (MAC reset) proposed in the disclosure may include the following procedures as terminal operations. For example, if a higher layer device receives an indication to reset the MAC layer device (if an indication for resetting is requested), the MAC layer device of the terminal may perform the following procedures as terminal operations. However, the partial MAC resetting of the MAC layer device proposed in the disclosure may include one or multiple terminal operations which are some of or have been modified from the following procedures. For example, if a higher layer device receives an indication to partially reset the MAC layer device (if an indication for partial resetting is requested), the MAC layer device of the terminal may include one or multiple terminal operations which are some of or have been modified from the following procedures. The resetting or partial resetting of the MAC layer device may be indicated or performed for each cell group (e.g., MCG or SCG). For example, when an RRC message including an indicator for deactivation of a cell group is received (or a cell group is configured to be inactive), or if the cell group was active previously, or if the terminal is in the RRC connected mode, some of the following procedures may be performed as partial resetting of the MAC layer device, or when an RRC message including an indicator for activation of a cell group is received (or a cell group is configured to be active), or if the cell group was inactive previously, or if the terminal is in the RRC connected mode, the remaining parts of the following procedures may be performed as partial reset of the MAC layer device.

A Bj value configured for each logical channel is initialized to 0. The Bj value is a value that is increased and maintained before each time logical channel prioritization (LCP) is performed, by a value obtained by multiplying a prioritized bit rate (PBR) configured in the RRC message by T (time elapsed after the last increase of Bj) with respect to each logical channel. When an RRC message including an indicator for deactivation of a cell group is received (or a cell group is configured to be inactive), or if the cell group was active previously, or if the terminal is in the RRC connected mode, resetting of a Bj value configured for each logical channel to 0 may be performed as one operation of partial resetting of the MAC layer device when the RRC layer device indicates the partial resetting of the MAC layer device (this is because, priority of data transmission may be considered by allowing the Bj value to be increased even when the cell group is inactive). As another method, when an RRC message including an indicator for activation of a cell group is received (or a cell group is configured to be active), or if the cell group was inactive previously, or if the terminal is in the RRC connected mode, resetting of a Bj value configured for each logical channel to 0 may be performed as one operation of partial resetting of the MAC layer device when the RRC layer device indicates the partial resetting of the MAC layer device (this is because, priority of data transmission may be considered more fairly by allowing the Bj value to be increased from a time when the cell group is inactive).

If there is a running timer in the MAC layer device, all running timers may be stopped. The timer is a data inactivity timer (DataInactivity timer), wherein shifting to the RRC idle mode may be performed when the timer expires, and the timer may be resumed every time data is transmitted or received. Alternatively, a bandwidth part inactivity timer or a TAT related to a cell group (MCG, pCell, SCG, or PSCell) may be included or stopped. However, when an RRC message including an indicator for deactivation of a cell group is received (or a cell group is configured to be inactive), or if the cell group was active previously, or if the terminal is in the RRC connected mode, the terminal may not perform partial resetting of the MAC layer device when the RRC layer device indicates to perform the same (if there is a running timer in the MAC layer device, stopping all running timers), and if there is a running timer in the MAC layer device, the terminal may stop all timers other than a TAT related to the cell group (e.g., SCG or PSCell), as one operation of partial resetting of the MAC layer device. In the partial resetting of the MAC layer device, the timer is a data inactivity timer (DataInactivity timer), wherein shifting to the RRC idle mode may be performed when the timer expires, and the timer may be resumed every time data is transmitted or received. Alternatively, a bandwidth part inactivity timer may be included or stopped.

All TATs may be considered to have been expired. In addition, if the TAT expires, HARQ buffers for all serving cells connected to or configured for the timer are flushed, a notification of releasing PUCCH resources or SRS resources for the serving cells may be provided to the RRC layer device, or downlink transmission resources (any configured downlink assignment) or uplink transmission (any configured uplink grants) configured for the MAC layer device may be released. However, when an RRC message including an indicator for deactivation of a cell group is received (or a cell group is configured to be inactive), or if the cell group was active previously, or if the terminal is in the RRC connected mode, the terminal may not perform partial resetting of the MAC layer device when the RRC layer device indicates to perform the same (considering that all TATs have expired), and may continuously maintain all TATs related to the cell group (SCG or PSCell), as one operation of partial resetting of the MAC layer device.

New data indicator (NDI) values for all uplink HARQ processes are configured to 0.

If there is random access in progress, the random access is suspended.

If there are CFRA transmission resources (contention-free random access resources) for (explicitly signaled) 4-step random access (4-step random access (RA) type) or 2-step random access (2-step RA type) configured via the RRC message proposed in the disclosure, the CFRA transmission resources may be discarded. However, when an RRC message including an indicator for deactivation of a cell group is received (or a cell group is configured to be inactive), if the cell group was active previously, if the terminal is in the RRC connected mode, or if CFRA transmission resources for 4-step random access (4-step random access (RA) type) or 2-step random access (2-step RA type) are configured (or included) in the RRC message, the terminal may not perform partial resetting of the MAC layer device when the RRC layer device indicates to perform the same (discarding the CFRA transmission resources), and may continuously maintain or store the CFRA transmission resources (or when the cell group is activated, CFRA random access may be performed based on the CFRA transmission resources), as one operation of partial resetting of the MAC layer device. However, when an RRC message including an indicator for deactivation of a cell group is received (or a cell group is configured to be inactive), if the cell group was active previously, if the terminal is in the RRC connected mode, or if CFRA transmission resources for 4-step random access (4-step random access (RA) type) or 2-step random access (2-step RA type) are not configured (or not included) in the RRC message, the terminal may, when the RRC layer device indicates to perform partial resetting of the MAC layer device, perform the same (discarding the CFRA transmission resources), as one operation of partial resetting of the MAC layer device. As another method, as one operation of partial resetting of the MAC layer device, if there are configured CFRA transmission resources (contention-free random access resources) for (explicitly signaled) 4-step random access (4-step random access (RA) type) or 2-step random access (2-step RA type), proposed in the disclosure, the CFRA transmission resources may always be discarded.

A message 3 (Msg3) buffer may be flushed.

A message A (MSGA) buffer may be flushed.

If there is a triggered scheduling request (SR) procedure, the same may be canceled.

If there is a triggered buffer status report (BSR) procedure, the same may be canceled.

If there is a triggered listen-before-talk (LBT) procedure, the same may be canceled.

If there is a triggered beam failure recovery (BFR) procedure, the same may be canceled.

If there is a triggered procedure of confirming configured uplink transmission resources (configured uplink grant confirmation), the same may be canceled.

Soft buffers for all downlink HARQ processes may be flushed.

In each HARQ process, for a certain transmission block (TB), subsequently received transmission (or transmission resource) is considered as first transmission (or transmission resource).

If there is a temporary cell identifier (temporary C-RNTI), the temporary cell identifier is released.

All beam failure counter variables (BFI_COUNTER) are reset (e.g., configuring values to 0). However, when an RRC message including an indicator for deactivation of a cell group is received (or a cell group is configured to be inactive), if the cell group was active previously, if the terminal is in the RRC connected mode, if the RRC message includes configuration information indicating to perform RLM or beam failure detection (BFD), if RLM or beam failure detection is configured via the configuration information relating to RLM or beam failure detection so as to be continuously performed in a current (or previous) active beam (TCI state) or a current (or previous) active bandwidth part, or if a previously used beam or bandwidth part is not configured (or not changed) to a new different beam or a new different bandwidth part, the terminal may, when the RRC layer device indicates to perform partial resetting of the MAC layer device, not perform the same (resetting all beam failure counter variables (BFI_COUNTER)), and may maintain or continuously use the beam failure counter variables (BFI_COUNTER), as one operation of partial resetting of the MAC layer device (this is because, when the beam or bandwidth part is continuously used, if resetting is performed, beam failure or RLM detection may be delayed due to resetting of counter variable values). However, when an RRC message including an indicator for deactivation of a cell group is received (or a cell group is configured to be inactive), if the cell group was active previously, if the terminal is in the RRC connected mode, if the RRC message does not include configuration information indicating to perform RLM or beam failure detection (BFD), if the RRC message includes configuration information indicating to perform RLM or beam failure detection (BFD), and RLM or beam failure detection is configured via the configuration information relating to RLM or beam failure detection so as not to be continuously performed in a current (or previous) active beam (TCI state) or a current (or previous) active bandwidth part, or if a previously used beam or bandwidth part is configured (or reconfigured or changed) to a new different beam or a new different bandwidth part, the terminal may, when the RRC layer device indicates to perform partial resetting of the MAC layer device, perform the same (resetting all beam failure counter variables (BFI_COUNTER)), as one operation of partial resetting of the MAC layer device (this is because, when the beam or bandwidth part is changed, if resetting is not performed, beam failure or RLM detection may occur too early due to maintenance of counter variable values). As another method, all beam failure counter variables (BFI_COUNTER) may always be reset as one operation of partial resetting of the MAC layer device.

All LBT counter variables (LBT_COUNTER) are reset.

The partial resetting of the MAC layer device (partial MAC reset) proposed in the disclosure may include one or multiple terminal operations among the following procedures. For example, if a higher layer device receives an indication to partially reset the MAC layer device (if an indication for partial resetting is requested), the MAC layer device of the terminal may include one or multiple terminal operations among the following procedures. A first embodiment of partial resetting of the MAC layer device proposed in the disclosure is as follows.

When an RRC message including an indicator for deactivation of a cell group is received (or a cell group is configured to be inactive), or if the cell group was active previously, or if the terminal is in the RRC connected mode, resetting of a Bj value configured for each logical channel to 0 may be performed as one operation of partial resetting of the MAC layer device when the RRC layer device indicates the partial resetting of the MAC layer device (this is because, priority of data transmission may be considered by allowing the Bj value to be increased even when the cell group is inactive). As another method, when an RRC message including an indicator for activation of a cell group is received (or a cell group is configured to be active), or if the cell group was inactive previously, or if the terminal is in the RRC connected mode, resetting of a Bj value configured for each logical channel to 0 may be performed as one operation of partial resetting of the MAC layer device when the RRC layer device indicates the partial resetting of the MAC layer device (this is because, priority of data transmission may be considered more fairly by allowing the Bj value to be increased from a time when the cell group is inactive).

When an RRC message including an indicator for deactivation of a cell group is received (or a cell group is configured to be inactive), or if the cell group was active previously, or if the terminal is in the RRC connected mode, when the RRC layer device indicates to perform partial resetting of the MAC layer device, the terminal may not stop all running timers if there is a timer running in the MAC layer device, and may stop all timers other than a TAT related to the cell group (SCG or PSCell) if there is a timer running in the MAC layer device, as one operation of partial resetting of the MAC layer device. In the partial resetting of the MAC layer device, the timer is a data inactivity timer (DataInactivity timer), wherein shifting to the RRC idle mode may be performed when the timer expires, and the timer may be resumed every time data is transmitted or received. Alternatively, a bandwidth part inactivity timer may be included or stopped.

When an RRC message including an indicator for deactivation of a cell group is received (or a cell group is configured to be inactive), or if the cell group was active previously, or if the terminal is in the RRC connected mode, the terminal may not perform partial resetting of the MAC layer device when the RRC layer device indicates to perform the same (considering that all TATs have expired), and may continuously maintain all TATs related to the cell group (SCG or PSCell), as one operation of partial resetting of the MAC layer device.

New data indicator (NDI) values for all uplink HARQ processes are configured to 0.

If there is random access in progress, the random access is suspended.

When an RRC message including an indicator for deactivation of a cell group is received (or a cell group is configured to be inactive), if the cell group was active previously, if the terminal is in the RRC connected mode, or if CFRA transmission resources for 4-step random access (4-step random access (RA) type) or 2-step random access (2-step RA type) are configured (or included) in the RRC message, the terminal may, when the RRC layer device indicates to perform partial resetting of the MAC layer device, not discard the CFRA transmission resources, and may continuously maintain or store the CFRA transmission resources (or when the cell group is activated, CFRA random access may be performed based on the CFRA transmission resources), as one operation of partial resetting of the MAC layer device. However, when an RRC message including an indicator for deactivation of a cell group is received (or a cell group is configured to be inactive), if the cell group was active previously, if the terminal is in the RRC connected mode, or if CFRA transmission resources for 4-step random access (4-step random access (RA) type) or 2-step random access (2-step RA type) are not configured (or not included) in the RRC message, the terminal may, when the RRC layer device indicates to perform partial resetting of the MAC layer device, perform the same (discarding the CFRA transmission resources), as one operation of partial resetting of the MAC layer device. As another method, as one operation of partial resetting of the MAC layer device, if there are configured CFRA transmission resources (contention-free random access resources) for (explicitly signaled) 4-step random access (4-step random access (RA) type) or 2-step random access (2-step RA type), proposed in the disclosure, the CFRA transmission resources may always be discarded.

A message 3 (Msg3) buffer may be flushed.

A message A (MSGA) buffer may be flushed.

If there is a triggered scheduling request (SR) procedure, the same may be canceled.

If there is a triggered buffer status report (BSR) procedure, the same may be canceled.

If there is a triggered listen-before-talk (LBT) procedure, the same may be canceled.

If there is a triggered beam failure recovery (BFR) procedure, the same may be canceled.

If there is a triggered procedure of confirming configured uplink transmission resources (configured uplink grant confirmation), the same may be canceled.

Soft buffers for all downlink HARQ processes may be flushed.

In each HARQ process, for a certain transmission block (TB), subsequently received transmission (or transmission resource) is considered as first transmission (or transmission resource).

If there is a temporary cell identifier (temporary C-RNTI), the temporary cell identifier is released.

When an RRC message including an indicator for deactivation of a cell group is received (or a cell group is configured to be inactive), if the cell group was active previously, if the terminal is in the RRC connected mode, if the RRC message includes configuration information indicating to perform RLM or beam failure detection (BFD), if RLM or beam failure detection is configured via the configuration information relating to RLM or beam failure detection so as to be continuously performed in a current (or previous) active beam (TCI state) or a current (or previous) active bandwidth part, or if a previously used beam or bandwidth part is not configured (or not changed) to a new different beam or a new different bandwidth part, the terminal may, when the RRC layer device indicates to perform partial resetting of the MAC layer device, not perform the same (resetting all beam failure counter variables (BFI_COUNTER)), and may maintain or continuously use the beam failure counter variables (BFI_COUNTER), as one operation of partial resetting of the MAC layer device (this is because, when the beam or bandwidth part is continuously used, if resetting is performed, beam failure or RLM detection may be delayed due to resetting of counter variable values). However, when an RRC message including an indicator for deactivation of a cell group is received (or a cell group is configured to be inactive), if the cell group was active previously, if the terminal is in the RRC connected mode, if the RRC message does not include configuration information indicating to perform RLM or beam failure detection (BFD), if the RRC message includes configuration information indicating to perform RLM or beam failure detection (BFD), and RLM or beam failure detection is configured via the configuration information relating to RLM or beam failure detection so as not to be continuously performed in a current (or previous) active beam (TCI state) or a current (or previous) active bandwidth part, or if a previously used beam or bandwidth part is configured (or reconfigured or changed) to a new different beam or a new different bandwidth part, the terminal may, when the RRC layer device indicates to perform partial resetting of the MAC layer device, perform the same (resetting all beam failure counter variables (BFI_COUNTER)), as one operation of partial resetting of the MAC layer device (this is because, when the beam or bandwidth part is changed, if resetting is not performed, beam failure or RLM detection may occur too early due to maintenance of counter variable values). As another method, all beam failure counter variables (BFI_COUNTER) may always be reset as one operation of partial resetting of the MAC layer device.

All LBT counter variables (LBT_COUNTER) are reset.

When resetting of the MAC layer device is performed, if an indicator for partial resetting of the MAC layer device is not included, not indicated, or not performed, the terminal may reset the entire MAC layer device, and accordingly the terminal may flush all the configured normal HARQ process, HARQ process for MBS, or HARQ process for system information.

In the following, the disclosure proposes MAC layer device procedures required to be performed by the terminal, for which dual connectivity is configured, if a cell group (or SCG) is configured to be inactive, if beam failure detection is configured, or if RLM is configured for the terminal, as proposed in the above. For example, it is proposed that, depending on whether the cell group configured via the RRC message is inactive or active, the terminal performs different beam failure detection or beam failure recovery procedures.

1> If the terminal receives an RRC message, and beam failure detection, first BFR, or second BFR is configured in the RRC message, or if a cell (PSCell or sCell) or a cell group, for which the beam failure detection is configured, is not configured to be inactive (or is configured to be active),
2> The terminal performs beam failure detection.
2> If a beam failure is detected for the cell (PSCell or sCell) or cell group,
3> The first BFR or the second BFR proposed in the disclosure is performed.
2> If a problem is detected in random access due to a beam failure,
3> The terminal reports the random access problem due to the beam failure.
1> Else, if the terminal receives an RRC message, and beam failure detection, first BFR, or second BFR is configured in the RRC message, or if a cell (PSCell or sCell) or a cell group (or SCG) is configured to be inactive in the RRC message, and the beam failure, first BFR, or second BFR is configured for the cell group, or if the cell or cell group, for which the beam failure is configured, is configured to be inactive,
2> The terminal performs beam failure detection.
2> If a beam failure is detected for the cell (PSCell or sCell) or cell group,
3> The first BFR or the second BFR proposed in the disclosure is not performed. This is because random access may be unnecessarily triggered for the deactivated cell group. The MAC layer device may indicate or report that a beam failure has been detected, to a higher layer device (or RRC layer device).
2> If a beam failure is detected for the deactivated cell group (SCG) or cell (PSCell) or the MAC layer device,
3> The terminal reports the beam failure to the base station (or MCG). For example, the beam failure may be included in an SCG failure report message (SCGFailureInformation) and transmitted to the base station for reporting.
2> If a problem is detected in random access due to a beam failure,
3> The terminal reports the random access problem due to the beam failure.

The disclosure proposes a detailed procedure for beam failure detection of the MAC layer device of the terminal, proposed above, when the beam failure detection is configured in the RRC message.

1> If an indication that a beam failure has occurred is received from a lower layer device,
2> A timer (BeamFailureDetectionTimer) for beam failure detection may be started or resumed. (The timer may be configured in the RRC message.)

2> A value of a variable (BFI_COUNTER) to count the number of beam failures is increased by 1.
2> If the variable value for counting of the number of beam failures is greater than or equal to the maximum number of beam failures (beamFailureInstanceMaxCount) (the maximum number of beam failures may be configured in the RRC message.),
   3> If the serving cell (cell in which the beam failure has occurred) is an sCell,
      4> Beam failure recovery (BFR) may be triggered or performed for the cell.
   3> Else, if the serving cell (cell in which the beam failure has occurred) is a PSCell, or if the cell group (or PSCell) is deactivated (or is not activated or is inactive) (For example, the next procedure is applicable only to the PSCell, and is not applied to a pCell),
      4> The occurrence of the beam failure in the cell may be indicated to a higher layer device (e.g., RRC layer device).
      4> It may be considered that a time alignment timer (TAT) corresponding to (or associated with) the cell group, PSCell, or primary timing advance group (PTAG) has expired. Alternatively, the TAT associated with the cell group, PSCell, or PTAG may be stopped. If a beam failure occurs for the deactivated cell group or cell, it may be determined that a TA value is no longer valid, so that the TAT does not need to be driven unnecessarily. Alternatively, RLM may also be suspended, or a radio link failure may be declared. This is because, if a beam failure occurs for the deactivated cell group or cell, it may be considered that a radio link is no longer valid.
   3> Else, if the serving cell (cell in which the beam failure has occurred) is an SPCell (pCell or PSCell), or if the cell group (or SPCell (pCell or PSCell)) is not deactivated (or is activated, or is active) (For example, the next procedure is applicable to each of pCell and PSCell.),
      4> Random access may be started or performed for the SPCell.
1> If a timer for beam failure detection has expired,
1> Alternatively, if a timer for beam failure detection, which is linked to (or configured for) the cell (or cell group) and used for detecting a beam failure, the number of beam failure detections, or a reference signal is reconfigured from a higher layer device (RRC layer device, upper layer), if an RRC message including an indicator for deactivation of the cell group is received (or the cell group is configured to be inactive), if the cell group was active previously, if the terminal is in the RRC connected mode, if the RRC message includes configuration information indicating to perform RLM or beam failure detection (BFD), if the RRC message includes configuration information indicating to perform RLM or beam failure detection (BFD), and RLM or beam failure detection is configured via the configuration information relating to RLM or beam failure detection so as not to be continuously performed in a current (or previous) active beam (TCI state) or a current (or previous) active bandwidth part, or if a previously used beam or bandwidth part is configured (or changed) to a new different beam or a new different bandwidth part, 2> Beam failure counter variables (BFI_COUNTER) may be reset (or have values configured to 0).

Beam failure recovery (BFR) proposed in the disclosure is as follows.

In the disclosure, first BFR (e.g., Rel-15 beam failure recovery (BFR)) is possible only for pCell or SPCell. For example, if a beam failure occurs, the terminal in the connected mode performs random access. Random access differs based on whether a preamble for BFR is configured in the RRC message. The preamble may be configured for each beam. In addition, if the preamble for BFR is configured, a search space for BFR is also configured. If the preamble for BFR is configured as described above, CFRA is performed. For example, if a failure occurs in beam #1, the terminal searches for a beam, and if beam #3 is determined to be valid, the terminal identifies whether the preamble for BFR has been configured for beam #3, and performs CFRA with the preamble if the preamble has been configured. In addition, the terminal waits for a response and performs PDCCH monitoring in the configured search space. When the terminal performs random access, the base station identifies, via the preamble, that a beam failure has occurred, and assigns scheduling (DL assignment or UL grant) to the terminal via a PDCCH. Then, the terminal continuously transmits or receives data in the beam and the beam is recovered. (In the CFRA, since the base station accurately identifies a beam failure, there is no need to transmit RAR for TA reconfiguration.)

If the preamble for BFR is not configured in the RRC message, the terminal performs CBRA. For example, if a failure occurs in beam #1, the terminal searches for a beam, and if beam #3 is determined to be valid, the terminal identifies whether the preamble for BFR has been configured for beam #3, and performs CFRA if the preamble is not configured. In addition, the terminal waits for a response and waits for RAR. The base station is unable to identify why the terminal suddenly performs random access, but transmits RAR and completes the random access. Then, the terminal performs data transmission or reception in the beam for PDCCH indication, and the beam is recovered.

BeamFailureRecoveryConfig for SPCell or first BFR (e.g., Rel-15 beam failure recovery (BFR)) is configured for UL BWP. This is because, if BFR is triggered, a BFR dedicated preamble may be configured.

The second BFR (Rel-16 beam failure recovery (BFR)) of the disclosure is possible not only for an SPCell but also for an sCell. A dedicated scheduling request (SR or PUCCH transmission resource) for BFR may be configured for each cell and for each bandwidth part via the RRC message. If a beam failure occurs for a bandwidth part of the sCell, a BFR MAC control element (CE) is generated. In addition, if a beam failure occurs for the bandwidth part, and if the dedicated SR is configured (pCell or PUCCH SR), the SR is transmitted on PUCCH. Further, if beam failure reporting fails continuously in the dedicated SR, random access is performed based on CBRA. If the number of times of SR is exceeded, only CBRA may be performed similarly, even in a case of transmitting BSR in legacy. The random access is performed in a pCell. Therefore, for sCells, when transmitting MAC cEs via the pCell, if the terminal discovers an sCell with a failure and a valid beam among TCI sets (or TCI states) configured via RRC, the terminal may optionally report a valid beam for each of the sCells. When the terminal transmits a MAC CE including a valid beam for the sCell, if HARQ-ACK is received for an MAC PDU including the MAC CE, the terminal and the base station use the valid beam for the sCell. If the MAC CE does not include a valid beam for the sCell, the base station may designate a beam via DCI of PDCCH or a TCI state MAC CE in response.

In addition, in second BFR (Rel-16 beam failure recovery (BFR)), BFR for SPCell may also be improved.

For example, like Rel-15, the second BFR (Rel-16 beam failure recovery (BFR)) is possible for pCell or SPCell. For example, if a beam failure occurs, random access is performed. Random access differs based on whether a preamble for BFR is configured. The preamble may be configured for each beam. In addition, if the preamble for BFR is configured, a search space for BFR is also configured. If the preamble for BFR is configured as described above, CFRA is performed with the preamble. For example, if a failure occurs in beam #1, the terminal searches for a beam, and if beam #3 is determined to be valid, the terminal identifies whether the preamble for BFR has been configured for beam #3, and performs CFRA if the preamble is configured. In addition, the terminal waits for a response and performs PDCCH monitoring in the configured search space. When the terminal performs random access, the base station identifies, via the preamble, that a beam failure has occurred, and assigns scheduling (DL assignment or UL grant) to the terminal via a PDCCH. Then, the terminal continuously transmits or receives data in the beam and the beam is recovered (In the CFRA, since the base station accurately identifies a beam failure, there is no need to transmit RAR for TA reconfiguration).

If the preamble for BFR is not configured, the terminal performs CBRA. For example, if a failure occurs in beam #1, the terminal searches for a beam, and if beam #3 is determined to be valid, the terminal identifies whether the preamble for BFR has been configured for beam #3, and performs CFRA if the preamble is not configured. In addition, the terminal waits for a response and waits for RAR. The base station is unable to identify why the terminal suddenly performs random access, but transmits RAR, and after receiving the RAR, the terminal generates a BFR MAC CE and transmits the same via Msg3. However, the MAC CE may not include a valid beam for an SPCell. This is because, with respect to BFR occurred in the pCell, unlike the sCell, a BFR MAC CE is transmitted in the pCell. For example, if a beam failure occurs in the pCell, the terminal searches for a valid beam and transmits a preamble for the valid beam, so that the base station and the terminal already identify the valid beam for the pCell in random access. For example, the valid beam is already included. Therefore, when random access is completed, the terminal performs data transmission or reception in beam #3 and the beam is recovered.

For example, when BFR is triggered for a Rel-16 SPCell, random access is triggered unconditionally regardless of SR, and a BFR MAC CE is configured (if a preamble for BFR is not configured) and transmitted. In addition, BeamFailureRecoverySCellConfig is configured for a DL BWP in the RRC message for Rel-16 BFR or sCell. This is to configure a candidate RS which may be included in a BFR MAC CE when BFR is triggered. A dedicated SR for the sCell BFR may be included in MAC-CellGroupConfig in the RRC message and may be configured in schedulingRequestConfig.

In addition, in the RRC message, the base station may configure a beam failure RS so as to enable the terminal to identify a beam failure. If all the RSs indicate failures, the terminal detects a beam failure and performs random access.

If the base station has configured a preamble for beam failure recovery in advance, CFRA is performed for the random access, and the base station may identify, based on the preamble, whether the terminal has performed random access for beam recovery.

However, if the base station does not configure a preamble for beam failure recovery in advance, the terminal performs CBRA. From the point of view of the base station, this is indistinguishable from triggering a BSR and triggering random access in order to transmit uplink data in a state where an SR is not configured. However, one of the two may be determined based on the terminal suddenly performing random access, and if there is a BSR, BSR information is received, and if there is no BSR, BFR is recognized. Even if the two cases are triggered concurrently, the base station may implicitly make a determination by referring to the preamble and reading the BSR. When reading a SSB, the terminal may identify the number of beams, and a cycle, time, frequency resource at a certain beam is transmitted. In addition, the terminal may measure an intensity of a beam and may perform random access for a beam exceeding a predetermined standard. If a certain beam is selected, random access may be performed for the beam in consideration of the time, frequency resource, or cycle.

In the following, the disclosure proposes procedures required to be performed by the terminal if a cell group is configured to be active or inactive, or if a PSCell of a cell group is configured to be active or inactive. The terminal may receive an indication of an active state or an inactive state via an RRC message (RRCReconfiguration or RRCResume), MAC control information, or PDCCH DCI for a cell group or a cell (PSCell). For example, if configured to be inactive in the RRC message (RRCReconfiguration or RRCResume), MAC control information, or PDCCH DCI, the cell group (or SCG) or the cell (or PSCell) may be deactivated, and if not configured to be inactive (or configured to be active) in the RRC message (RRCReconfiguration or RRCResume), MAC control information, or PDCCH DCI, the cell group or the cell may be activated.

In the disclosure, when an indication to activate the cell group or the cell is received (or if an indication for deactivation is not received), if the cell group was inactive previously, or if the terminal is in the RRC connected mode, the terminal may perform the following operations.

If an indication to activate the cell group (or SCG) or the cell (or PSCell) of the terminal is received via PDCCH DCI (L1 control signal), a MAC CE, or an RRC message (or if an indication for deactivation is not received), if the cell group was inactive previously, or if the terminal is in the RRC connected mode, the terminal may perform one or multiple of the following operations.

The terminal may activate the cell group or the cell.

The terminal performs switching to or activation of an uplink bandwidth part or a downlink bandwidth part (e.g., first active downlink bandwidth part or first active uplink bandwidth part) configured via the RRC message. As another method, when activating the cell group or the cell by performing random access (or if reconfigurationWithSync is configured, if a beam failure is detected, if a radio link failure is detected, or if a TAT is not running (or has expired)), the terminal may perform switching to or activation of an uplink bandwidth part or a downlink bandwidth part (e.g., first active downlink bandwidth part or first active uplink bandwidth part) configured via the RRC message. In addition, when performing random access, the terminal may perform the random access in the bandwidth part. However, if random access is not performed (or if it is configured not to perform random access, if a beam failure is not detected, if a radio link failure is not detected, or if a TAT is running (or has not expired), the terminal may activate a previously (or last) activated bandwidth part.

The terminal transmits a sounding reference signal (SRS) via the activated bandwidth part so as to enable the base station to perform uplink channel measurement. For example, transmission may be performed periodically.

If a PUCCH is configured for the activated bandwidth part, PUCCH transmission is performed.

If there is a suspended type 1 configuration transmission resource, a stored type 1 transmission resource may be initialized according to an original configuration so as to be used. The type 1 configuration transmission resource is a periodic transmission resource (uplink or downlink) pre-allocated via an RRC message, and refers to a transmission resource which may be activated via the RRC message so as to be used.

PHR is triggered for the bandwidth part. The PHR may be triggered for MCG or SCG. In addition, the PHR may be reported to MCG or SCG.

In the activated bandwidth part, the terminal may report a channel measurement result (CSI, CQI, PMI, RI, PTI, CRI, or the like) for downlink according to a configuration of the base station.

In the activated bandwidth part, PDCCH monitoring may be performed to read an indication of the base station.

PDCCH monitoring is performed to read cross-scheduling for the activated bandwidth part.

A bandwidth part inactivity timer is started or resumed. As another method, a bandwidth part inactivity timer may be started or resumed only if a bandwidth part hibernation timer is not configured. If the bandwidth part hibernation timer can be configured via an RRC message, and when the timer expires, the bandwidth part may be made dormant or switched to a dormant bandwidth part. For example, the bandwidth part inactivity timer may be started or resumed only in a dormant bandwidth part.

In the disclosure, terminal operations when an indication to deactivate a cell group or a cell is received are as follows.

If an indication to deactivate a cell group (or SCG) or a cell (or PSCell) of the terminal is received via PDCCH DCI (L1 control signal), a MAC CE, or an RRC message, if the cell group (or cell) was inactive previously, or if the terminal is in the RRC connected mode, the terminal may perform one or multiple of the following operations.

The terminal deactivates the cell group or cell, or the uplink or downlink bandwidth part indicated above.

A TAT (e.g., TA timer associated with (configured for) a primary timing advance group (PTAG) or a secondary timing advance group (STAG)) associated with the cell (PSCell) or cell group may be continuously maintained without stopping so that, when activating the cell or cell group again, the terminal may rapidly activate the same without random access. If the time alignment timer (TAT) associated with the cell group has expired in the deactivated cell or cell group, the MAC layer device may indicate that the TAT has expired, to a higher layer device (e.g., RRC layer device). Alternatively, if the time alignment timer (TAT) associated the cell group has expired in the deactivated cell or cell group, the terminal may suspend beam failure detection or RLM (or may consider that a beam failure has occurred or that a radio link is invalid). As another method, if the terminal detects a beam failure, the terminal may stop the TAT associated with the cell group (or may consider that the TAT has expired) or may suspend RLM. As another method, if a radio link failure is detected, the terminal may stop the TAT associated with the cell group (or may consider that the TAT has expired) or may suspend beam failure detection (or may consider that a beam failure has occurred).

The terminal suspends a bandwidth part inactivity timer (e.g., inactivity timer for downlink bandwidth part) which is configured for or is running in the cell or bandwidth part.

A periodic downlink transmission resource (DL SPS or configured downlink assignment) or a periodic uplink transmission resource (UL SPS or configured uplink grant Type 2), configured for the cell or bandwidth part, may be cleared. The clearing of the transmission resource indicates that the terminal stores configuration information, such as cycle information configured via an RRC message, but removes and no longer uses information on a periodic transmission resource indicated or activated via L1 signaling (e.g., DCI). The periodic transmission resource may be referred to as a type 2 configuration transmission resource. The clearing of the periodic transmission resource may be performed only when the sCell is shifted from an active state to an inactive state. This is because, when shifting is performed from a dormant state to an inactive state, since there is no periodic transmission resource in the dormant state, clearing of the same is not required. As another method, only when the periodic downlink transmission resource or the periodic uplink transmission resource is configured or is configured so as to be used, the periodic transmission resources may be cleared.

A periodic uplink transmission resource (configured uplink grant Type 1 configured via RRC) configured for the cell or bandwidth part may be suspended. The suspending of the transmission resource indicates that the terminal stores but no longer uses transmission resource configuration information configured via an RRC message. The periodic transmission resource may be referred to as a type 1 configuration transmission resource. The clearing of the periodic transmission resource may be performed only when the sCell is shifted from an active state to an inactive state. This is because, when shifting is performed from a dormant state to an inactive state, since there is no periodic transmission resource in the dormant state, clearing of the same is not required. As another method, only when the periodic downlink transmission resource or the periodic uplink transmission resource is configured or is configured so as to be used, the periodic transmission resources may be cleared.

All HARQ buffers configured for the cell or bandwidth part are flushed.

If there is a PUSCH transmission resource configured for a periodic channel measurement report (semi-persistent CSI reporting) for the cell or bandwidth part, the PUSCH transmission resource is cleared.

The terminal does not transmit an SRS for the cell or bandwidth part.

For the cell or bandwidth part, the terminal neither performs channel measurement (CSI, CQI, PMI, RI, PTI, CRI, or the like) for downlink, nor performs measurement reporting.

The terminal does not transmit uplink data through a UL-SCH in the cell or bandwidth part.

The terminal does not perform random access for the cell or bandwidth part.

The terminal does not perform PDCCH monitoring in the cell or bandwidth part.

The terminal does not perform PDCCH monitoring for the cell or bandwidth part. In addition, even in a case of cross-scheduling, in a cell to be scheduled, the terminal does not perform PDCCH monitoring for the cell.

The terminal does not perform PUCCH or SPUCCH transmission in the cell or bandwidth part.

In the following, the disclosure describes PDCP re-establishment proposed in the disclosure.

In the PDCP re-establishment proposed in the disclosure, specific operations of a transmission PDCP layer device (transmitting PDCP entity) and a reception PDCP layer device) receiving PDCP entity) are as follows.

In the disclosure, when the terminal receives an RRC message (e.g., RRCReconfiguration message), if a cell group (e.g., SCG) is configured to be active (or not configured to be inactive) in the RRC message, or in the disclosure, when the terminal receives an RRC message (e.g., RRCReconfiguration message), if a cell group (e.g., SCG) is configured to be inactive in the RRC message, or if a higher layer device (e.g., RRC layer device) requests PDCP re-establishment for a bearer, or when the terminal receives an RRCReconfiguration message, if PDCP re-establishment is indicated by an indicator, if a security key (or security algorithm) has been changed, or if the RRC message includes reconfigurationWithSync information (or is an RRC message indicating handover), the transmission PDCP layer device may perform the following procedures.

1. For UM DRBs and AM DRBs, if there is no indicator (drb-ContinueROHC) indicating to continuously use a header compression protocol, the transmission PDCP layer device initializes a header compression protocol (ROHC protocol) for uplink and starts in a uni-directional (U) mode of an initialization and refresh (IR) state.

2. For UM DRBs and AM DRBs, if there is no indicator (drb-ContinueEHC-UL) indicating to continuously use a header compression protocol for uplink, a header compression protocol (EHC protocol) may be initialized.

3. If UDC is configured for AM DRBs, a compression buffer or a UDC compression buffer may be initialized (e.g., all values may be initialized to 0), or if dictionary information (dictionary or pre-dictionary) is configured, the compression buffer or the UDC compression buffer may be filled (pre-filled) with the dictionary information. As another method, if UDC is configured for AM DRBs, the compression buffer or the UDC compression buffer may always be initialized (e.g., all values may be initialized to 0 without applying dictionary information). As another method, if an indicator indicating to continuously use a UDC protocol (or compression buffer) is not configured in the RRC message (or if not configured to continuously use the UDC protocol), and if UDC is configured for AM DRBs, the compression buffer or the UDC compression buffer may be initialized (e.g., all values may be initialized to 0), or if dictionary information (dictionary or pre-dictionary) is configured, the compression buffer or the UDC compression buffer may be filled (pre-filled) with the dictionary information. However, if an indicator indicating to continuously use a UDC protocol (or compression buffer) is configured in the RRC message (or if configured to continuously use the UDC protocol), and if UDC is configured for AM DRBs, the compression buffer or the UDC compression buffer may be used continuously without initialization. As another method, if an indicator indicating to continuously use a UDC protocol (or compression buffer) is not configured in the RRC message (or if not configured to continuously use the UDC protocol), and if UDC is configured for AM DRBs, the compression buffer or the UDC compression buffer may be initialized (e.g., all values may be initialized to 0), or if dictionary information (or pre-dictionary) is configured, the compression buffer or the UDC compression buffer may be filled (pre-filled) with the dictionary information. However, if an indicator indicating to continuously use a UDC protocol (or compression buffer) is configured in the RRC message (or if configured to continuously use the UDC protocol), and if UDC is configured for AM DRBs, the compression buffer or the UDC compression buffer may be initialized (e.g., all values may be initialized to 0 without applying dictionary information). In order to continuously increase a compression rate of a UDC compression method also in handover, a network (or base station) may define an indicator (e.g., drb-ContinueUDC) indicating to continuously use the UDC protocol (or compression buffer) via the RRC message (e.g., RRCReconfiguration), and may configure the same for the terminal so as to configure (or indicate) to continuously use the UDC protocol (or compression buffer).

4. For UM DRBs and SRBs, a window state variable (e.g., TX_NEXT) is configured to a default value.

5. For SRBs, all stored data (e.g., PDCP SDUs or PDCP PDUs) is discarded. (Because RRC messages are generated for transmission to a source base station, the RRC messages are discarded so as not to be transmitted to a target base station.)

6. A new security key and encryption algorithm received from a higher layer device (e.g., RRC layer device) are applied.

7. A new security key and integrity protection algorithm received from a higher layer device (e.g., RRC layer device) are applied.

8. For UM DRBs (all previously stored PDCP PDUs are discarded), PDCP sequence numbers have already been assigned, but data (e.g., PDCP SDUs) which has not yet been delivered to a lower layer device is considered as data received from a higher layer (e.g., SDAP layer device or TCP/IP layer device), and data transmission is performed in ascending order of COUNT values (or PDCP sequence numbers) assigned before PDCP re-establishment. In addition, a data discard timer is not resumed. Specifically, header compression is newly performed on the data (PDCP SDU), an integrity procedure or encryption is performed again, and a PDCP header is configured and delivered to a lower layer device.

9. For AM DRBs for which PDCP layer devices have been suspended (all previously stored PDCP PDUs are discarded), starting from first data (e.g., PDCP SDU), a successful acknowledgment of which is not received from lower layers (e.g., RLC layer devices), respective PDCP SDUs to which PDCP sequence numbers (or COUNT values) have already been assigned are considered as PDCP SDUs received from a higher layer device (for example, PDCP sequence numbers (or COUNT values) are newly assigned), and the PDCP SDUs may be transmitted in ascending order of the COUNT values (or PDCP sequence numbers) assigned before PDCP re-establishment (without resuming a PDCP data discard timer for each of the PDCP SDUs). For example, for the data (PDCP SDUs), new compression (ROHC, EHC, or UDC) is performed, the integrity procedure or encryption is performed again, a PDCP header is configured and delivered to a lower layer device, so that the data is transmitted. When performing UDC compression, the terminal may perform UDC compression if the UDC has been configured for the data (PDCP SDU or uplink PDCP SDU) (perform compression of the uplink PDCP SDU). Because the data is considered as new PDCP SDUs received from a higher layer device, the base station (or network or reception PDCP layer device) cannot identify up to which PDCP SDU the terminal has performed UDC compression before PDCP re-establishment, so that content of a UDC decompression buffer cannot be identified when UDC decompression is performed, resulting in a UDC compression failure. Therefore, for AM DRBs for which the PDCP layer devices have been suspended, it may be restricted that an indicator indicating to continuously use the UDC protocol (or compression buffer) is not configured via the RRC message (e.g., RRCResume) (or continuous use of the UDC protocol is not configured) (for example, the network may not configure the indicator (drb-ContinueUDC) in configuration information (pdcp-config) of the PDCP layer devices via the RRCResume message. For example, for the AM DRBs for which PDCP layer devices have been suspended, if UDC is configured when UDC compression is performed, the compression buffer or the UDC compression buffer may always be initialized (e.g., all values may be initialized to 0), or if dictionary information (dictionary or pre-dictionary) is configured, the compression buffer or the UDC compression buffer may be filled (pre-filled) with the dictionary information, and then UDC compression may be performed on the data).

10. For AM DRBs for which PDCP layer devices have not been suspended (all previously stored PDCP PDUs are discarded), new compression (ROHC, EHC, or UDC) is performed on data in ascending order of COUNT values (PDCP sequence numbers) assigned before PDCP re-establishment, starting from first data (e.g., PDCP SDU), a successful acknowledgment of which is not received from lower layers (e.g., RLC layer devices), the integrity procedure or encryption is performed again, a PDCP header is configured and delivered to a lower layer device, so that the data is retransmitted or transmitted. For example, cumulative retransmission is performed starting from the first data, a successful acknowledgment of which is not received. When performing UDC compression, the terminal may perform the UDC compression for the data (PDCP SDU or uplink PDCP SDU) (perform compression of the uplink PDCP SDU). As another method, for the AM DRBs for which PDCP layer devices have not been suspended (all previously stored PDCP PDUs are discarded), new compression (ROHC, EHC, or UDC) is performed on data in ascending order of COUNT values (PDCP sequence numbers) assigned before PDCP re-establishment, starting from the first data (e.g., PDCP SDU), a successful acknowledgment of which is not received from lower layers (e.g., RLC layer devices), the integrity procedure or encryption is performed again, a PDCP header is configured and delivered to a lower layer device, so that the data is retransmitted or transmitted. For example, cumulative retransmission is performed starting from the first data, a successful acknowledgment of which is not received. When performing UDC compression, if an indicator indicating to continuously use a UDC protocol (or compression buffer) is not configured in the RRC message (or if not configured to continuously use the UDC protocol), the terminal may perform UDC compression for the data (PDCP SDU or uplink PDCP SDU) (perform compression of the uplink PDCP SDU if drb-ContinueUDC is not configured) (for example, if an indicator indicating to continuously use a UDC protocol (or compression buffer) is not configured in the RRC message (or if not configured to continuously use the UDC protocol), and if UDC is configured for AM DRBs, the compression buffer or UDC compression buffer may be initialized (e.g., all values may be initialized to 0), or if dictionary information (dictionary or pre-dictionary) is configured, the compression buffer or the UDC compression buffer may be filled (pre-filled) with the dictionary information, and then UDC compression may be performed on the data). However, if an indicator indicating to continuously use a UDC protocol (or compression buffer) is configured in the RRC message (or if configured to continuously use the UDC protocol), and if UDC is configured for AM DRBs, the compression buffer or UDC compression buffer may be continuously used without initialization, new UDC compression may not be applied to the data (PDCP SDU, uplink PDCP SDU, PDCP SDU previously used to generate UDC data block, or PDCP SDU to which UDC compression was previously applied) (or the same UDC compression may be applied using the same compression buffer as that for UDC compression applied before, or the same compressed data (UDC data block) as before may be generated), or with respect to the data, a new security key (or security algorithm) may be applied to previous UDC compressed data (UDC data block) (or the same compressed data (UDC data block) as before) to newly perform only integrity protection or encryption, and a PDCP PDU is configured to perform transmission (perform compression of the uplink PDCP SDU if drb-ContinueUDC is configured or if it has not been compressed before). For example, if an indicator indicating to continuously use a UDC protocol (or compression buffer) is configured in the RRC message (or if configured to continuously use the UDC protocol), and if UDC is configured for AM DRBs, or if the data (PDCP SDU or uplink PDCP SDU) has not already been UDC-compressed, or only if no UDC compression method has already been performed (or applied) for the data (PDCP SDU or uplink PDCP SDU), the UDC compression method may be performed for the data (PDCP SDU or uplink PDCP SDU), or an updated new security key (or security algorithm) may be applied to newly perform integrity protection or encryption, and a PDCP PDU is configured to perform transmission (as another method, if the data (PDCP SDU or uplink PDCP SDU) has already been UDC-compressed, or if the UDC compression method has already been performed (or applied) for the data (PDCP SDU or uplink PDCP SDU), the same UDC compression may be applied using the same compression buffer as that for UDC compression applied before, or the same compressed data (UDC data block) as before may be generated). This is because, in a case where an indicator indicating to continuously use a UDC protocol (or compression buffer) is configured in the RRC message, if, during PDCP re-establishment, the transmission PDCP layer device newly applies (or re-applies) UDC to the data (PDCP SDU or uplink PDCP SDU) to which the UDC compression method was previously applied, the base station (or reception PDCP layer device) is unable to identify content of a UDC compression buffer, based on which compression is performed according to terminal implementation, so that a UDC decompression failure problem occurs in the reception PDCP layer device. For example, after the terminal performs UDC compression on PDCP SDU1, PDCP SDU2, and PDCP SDU3, when an acknowledgment is successfully received for PDCP SDU1, if PDCP re-establishment is performed, the terminal needs to perform retransmission or transmission starting from PDCP SDU2. In this case, if new UDC compression is applied to PDCP SDU2 and PDCP SDU3, the UDC compression buffer is continuously used, so that UDC compression may be applied again to PDCP SDU2 and PDCP SDU3, based on a buffer previously used for compression of PDCP SDU3. The problem is that the base station is unable to identify whether the terminal has performed UDC compression up to PDCP SDU3 or up to PDCP SDU4 before PDCP re-establishment, so that when UDC decompression is performed, content of a UDC decompression buffer is unknown, and therefore a UDC compression failure occurs. Therefore, in the PDCP re-establishment, without applying new UDC compression to PDCP SDU2 and PDCP SDU3 (or the same UDC compression may be applied using the same compression buffer as that for UDC compression applied before, or the same compressed data (UDC data block) as before may be generated), if a new security key (or security algorithm) is applied to UDC data blocks previously generated by UDC compression on PDCP SDU2 and PDCP SDU3 (or UDC data blocks generated in the same way as that for the UDC data blocks previously generated by UDC compression on PDCP SDU2 and PDCP SDU3), integrity protection or encryption is applied (COUNT values assigned to the data are applied), and a PDCP PDU is configured so as to perform transmission, a UDC decompression failure problem may be prevented in the reception PDCP layer device. Since the transmission PDCP layer device has never previously applied UDC compression to PDCP SDU4, PDCP SDU5, or new data subsequent thereto, UDC compression is continuously performed after compression of the PDCP SDU3, based on the updated UDC compression buffer, wherein a new security key (or security algorithm) may be applied to apply integrity protection and encryption, and a PDCP PDU may be configured to perform transmission. As another method to solve the problem above, if an indicator indicating to continuously use a UDC protocol (or compression buffer) is configured for the terminal via the RRC message, the terminal may report, to the base station via the RRC message or PDCP control data (PDCP control PDU), information (e.g., buffer content value, COUNT value of data used for updating, or PDCP sequence number) relating to the UDC compression buffer applied when new UDC compression is performed, so as to enable synchronization between the compression buffer and the decompression buffer.

As another method, in order to configure to continuously use a UDC protocol (or compression buffer) during UDC compression configured for the terminal in handover, the network (or base station) may transmit, to the terminal, the RRC message (e.g., RRCReconfiguration message, RRC message including reconfigurationWithSync information, RRC message indicating handover, or RRC message that does not include information for changing (or reconfiguration) of security configuration information (security key or security algorithm)) in which PDCP layer device configuration information for an AM bearer does not include an indicator indicating PDCP re-establishment and includes an indicator indicating PDCP data recovery, so as to configure the terminal to continuously use the UDC protocol (or compression buffer) during UDC compression, or enable execution of PDCP data recovery proposed in the disclosure. The above procedure may be applied if the network (or base station) does not change (or reconfigure) security configuration information (security key or security algorithm) configured for the terminal in handover (when the RRC message including reconfigurationWithSync information is transmitted).

If a higher layer device (e.g., RRC layer device) requests PDCP re-establishment for a bearer, or when the terminal receives the RRCReconfiguration message, if PDCP re-establishment is indicated, the reception PDCP layer device performing the following procedures.

1. Due to re-establishment of lower layer devices (e.g., RLC layer devices), data (e.g., PDCP PDU) received from the lower layer devices is processed.
2. All stored data (e.g., PDCP SDUs or PDCP PDUs) for SRBs is discarded (RRC messages received from a source base station are discarded).
3. If a reordering timer is running for SRBs and UM DRBs, the timer is stopped and reset, and header decompression is performed on all stored data (e.g., PDCP SDUs) for UM DRBs, and the data is delivered to a higher layer device.
4. For AM DRBs, if there is no indicator (drb-ContinueROHC) indicating to continuously use a header decompression protocol, header decompression (ROHC) is performed on stored data (e.g., PDCP SDUs).
5. For AM DRBs, if there is no indicator (drb-ContinueEHC-DL) indicating to continuously use a header decompression protocol for downlink, header decompression (EHC) is performed on stored data (e.g., PDCP SDUs).
6. For UM DRBs and AM DRBs, if there is no indicator (drb-ContinueROHC) indicating to continuously use a header decompression protocol, the reception PDCP layer device initializes a header decompression protocol (ROHC protocol) for downlink and starts in a uni-directional (U) mode of a no-context (NC) state.
7. For UM DRBs and AM DRBs, if there is no indicator (drb-ContinueEHC-DL) indicating to continuously use a header decompression protocol for downlink, a header decompression protocol (EHC protocol) may be initialized.
8. For UM DRBs and SRBs, window variables (e.g., RX_NEXT and RX_DELIV) are initialized to default values.
9. During the PDCP re-establishment, a new security key and an encryption/decryption algorithm received from a higher layer device (e.g., RRC layer device) are applied.
10. During the PDCP re-establishment, a new security key and an integrity protection/verification algorithm received from a higher layer device (e.g., RRC layer device) are applied.

In the following, the disclosure describes PDCP data recovery proposed in the disclosure.

In the PDCP data recovery proposed in the disclosure, specific operations of a transmission PDCP layer device (transmitting PDCP entity) and a reception PDCP layer device (receiving PDCP entity) are as follows.

In the disclosure, when the terminal receives an RRC message (e.g., RRCReconfiguration message), if a cell group (e.g., SCG) is configured to be active (or not configured to be inactive) in the RRC message, or in the disclosure, when the terminal receives an RRC message (e.g., RRCReconfiguration message), if a cell group (e.g., SCG) is configured to be inactive in the RRC message, or a higher layer device (e.g., RRC layer device) requests PDCP data recovery for a bearer, or when the terminal receives an RRCReconfiguration message, if PDCP data recovery is indicated by an indicator, the transmission PDCP layer device may perform the following procedures.

1. For AM DRBs, if a higher layer device (e.g., RRC layer device) requests PDCP data recovery, the transmission PDCP layer device performs the following procedures.
    A. In data (e.g., PDCP PDUs) previously transmitted to a re-established AM mode RLC layer device or a disconnected AM mode RLC layer device, retransmission (e.g., optional retransmission, and retransmission of only data, a successful acknowledgment of which is not received) is performed in ascending order of COUNT values (or PDCP sequence numbers) only for all data, successful acknowledgments (RLC ACK) of which are not received from lower layers (e.g., RLC layer devices). Transmission or retransmission may be performed on data previously stored in a buffer, and may be performed, for data that has not yet been generated, by generating the data.

First PDCP suspension (or resumption) proposed in the disclosure may include one or multiple terminal operations among the following procedures. The procedures proposed above may be applied or configured for a bearer using the RLC UM mode or a bearer using the RLC AM mode, or the terminal may perform the proposed procedures for a bearer using the RLC UM mode or a bearer using the RLC AM mode.

The transmission PDCP layer device of the terminal may initialize a transmission window variable or configure the same to a default value, or may discard stored data (e.g., PDCP PDU or PDCP SDU). As another method, only a PDCP PDU may be discarded in order to prevent data loss. This is to prevent old data from being transmitted or retransmitted when a secondary cell group is activated or resumed at a later time.

If a reordering timer (t-reordering) (timer for reordering data in ascending order based on PDCP sequence numbers or COUNT values) is running, the reception PDCP layer device of the terminal may stop or reset the reordering timer. Alternatively, header decompression may be performed on stored data (e.g., PDCP SDU), and the data may be delivered to a higher layer device in ascending order of COUNT values. The reception PDCP layer device of the terminal may initialize a reception window variable or may configure the same to a default value.

Second PDCP suspension (or resumption) proposed in the disclosure may include one or multiple terminal operations among the following procedures. The procedures proposed above may be applied or configured for a bearer using the RLC UM mode or a bearer using the RLC AM mode, or the terminal may perform the proposed procedures for a bearer using the RLC UM mode or a bearer using the RLC AM mode.

The transmission PDCP layer device of the terminal may maintain a variable value as it is without initializing a transmission window variable or without configuring the same to a default value. The reason for maintaining a variable value (e.g., COUNT value) is to solve a security issue caused by transmitting different data with the same security key (e.g., COUNT value) when the secondary cell group is activated or resumed. The transmission PDCP layer device of the terminal may discard stored data (e.g., PDCP PDU or PDCP SDU). As another method, only a PDCP PDU may be discarded in order to prevent data loss. This is to prevent old data from being transmitted or retransmitted when a secondary cell group is activated or resumed at a later time. As another method, the transmission PDCP layer device may store values of transmission window variables, and may initialize the window variables (e.g., configuring to 0). In addition, when a cell group is resumed or activated, if security configuration information is changed, if a message indicating resumption or activation of the cell group includes the security configuration information, or if changing of a security key is indicated, the initialized window variables may be used, or when a cell group is resumed or activated, if security configuration information is not changed, if a message indicating resumption or activation of the cell group does not include security configuration information, or if changing of a security key is not indicated, the stored values of transmission window variables are restored, or values of the transmission window variables may be configured, reconfigured, or initialized so as to be used based on the stored values of the transmission window variables.

If a reordering timer (t-reordering) (timer for reordering data in ascending order based on PDCP sequence numbers or COUNT values) is running, the reception PDCP layer device of the terminal may stop or reset the reordering timer. Alternatively, header decompression may be performed on stored data (e.g., PDCP SDU), and the data may be delivered to a higher layer device in ascending order of COUNT values. The reception PDCP layer device of the terminal may maintain a variable value without resetting a reception window variable or configuring the reception window variable to an initial value. The reason for maintaining a variable value (e.g., COUNT value) is to solve a security issue caused by transmitting different data with the same security key (e.g., COUNT value) when the secondary cell group is activated or resumed. As another method, when the terminal activates or resumes a secondary cell group, or receives data, the terminal may configure or update an RX_NEXT window variable (variable indicating a COUNT value of data expected to be received next) to a value of an RX_DELIV window variable (variable indicating a COUNT value corresponding to the next data of data delivered to a higher layer device) or a COUNT value of data that the terminal receives for the first time, in order to prevent the reordering timer from being immediately triggered even if there is no COUNT value or no PDCP sequence number gap. As another method, if a reordering timer value is configured via the message or if an indicator is received from a higher layer device, an RX_REORD (variable indicating a COUNT value of the next data of data having triggered the reordering timer) window variable may be configured or updated to a variable value of the RX_NEXT window variable, or the reordering timer may be stopped or resumed. As another method, the reception PDCP layer device may store values of reception window variables, and may initialize the window variables (e.g., configuring to 0). In addition, when a cell group is resumed or activated, if security configuration information is changed, if a message indicating resumption or activation of the cell group includes the security configuration information, or if changing of a security key is indicated, the initialized window variables may be used, or when a cell group is resumed or activated, if security configuration information is not changed, if a message indicating resumption or activation of the cell group does not include security configuration information, or if changing of a security key is not indicated, the stored values of reception window variables are restored, or values of the reception window variables may be configured, reconfigured, or initialized so as to be used based on the stored values of the reception window variables.

In the disclosure, when the terminal receives an RRC message (e.g., RRCReconfiguration message), if a cell group (e.g., SCG) is configured to be inactive in the RRC message, if an indicator indicating to initialize a header compression protocol (robust header compression (ROHC) or Ethernet header compression (EHC)) or a data compression protocol (UDC) is included, if an indicator indicating to continuously use a header compression protocol (robust header compression (ROHC) or Ethernet header compression (EHC)) or a data compression protocol (UDC) (or an indicator indicating not to perform initialization) is not included, if PDCP layer device suspension is indicated, or a security key is not changed, the PDCP layer device of the terminal may perform one or multiple of the following procedures.

- For UM DRBs and AM DRBs, if there is no indicator (drb-ContinueROHC) indicating to continuously use a header compression protocol, the transmission PDCP layer device initializes a header compression protocol (ROHC protocol) for uplink and starts in a uni-directional (U) mode of an initialization and refresh (IR) state.
- For UM DRBs and AM DRBs, if there is no indicator (drb-ContinueEHC-UL) indicating to continuously use a header compression protocol for uplink, the transmission PDCP layer device may initialize a header compression protocol (EHC protocol).
- If UDC is configured for AM DRBs, the transmission PDCP layer device may initialize a compression buffer or a UDC compression buffer (e.g., all values may be initialized to 0), or if dictionary information (dictionary or pre-dictionary) is configured, the compression buffer or the UDC compression buffer may be filled (pre-filled) with the dictionary information. As another method, if UDC is configured for AM DRBs, the compression buffer or the UDC compression buffer may always be initialized (e.g., all values may be initialized to 0 without applying dictionary information).
- For AM DRBs, if there is no indicator (drb-ContinueEHC-DL) indicating to continuously use a header decompression protocol for downlink, the reception PDCP layer device may perform header decompression (EHC) on stored data (e.g., PDCP SDUs).
- For UM DRBs and AM DRBs, if there is no indicator (drb-ContinueROHC) indicating to continuously use a header decompression protocol, the reception PDCP layer device initializes a header decompression protocol (OHC protocol) for downlink and starts in a uni-directional (U) mode of a no-context (NC) state.
- For UM DRBs and AM DRBs, if there is no indicator (drb-ContinueEHC-DL) indicating to continuously use a header decompression protocol for downlink, the reception PDCP layer device may initialize a header decompression protocol (EHC protocol).

In the disclosure, when the terminal receives an RRC message (e.g., RRCReconfiguration message), if a cell group (e.g., SCG) is configured to be active (or if not configured to be inactive) in the RRC message, if an indicator indicating to initialize a header compression protocol (robust header compression (ROHC) or Ethernet header compression (EHC)) or a data compression protocol (UDC) is included, if an indicator indicating to continuously use a header compression protocol (robust header compression (ROHC) or Ethernet header compression (EHC)) or a data compression protocol (UDC) (or an indicator indicating not to perform initialization) is not included, if PDCP layer device resumption is indicated, or a security key is not changed, the PDCP layer device of the terminal may perform one or multiple of the following procedures.

- For UM DRBs and AM DRBs, if there is no indicator (drb-ContinueROHC) indicating to continuously use a header compression protocol, the transmission PDCP layer device initializes a header compression protocol (ROHC protocol) for uplink and starts in a uni-directional (U) mode of an initialization and refresh (IR) state.
- For UM DRBs and AM DRBs, if there is no indicator (drb-ContinueEHC-UL) indicating to continuously use a header compression protocol for uplink, the transmission PDCP layer device may initialize a header compression protocol (EHC protocol).
- If UDC is configured for AM DRBs, the transmission PDCP layer device may initialize a compression buffer or a UDC compression buffer (e.g., all values may be initialized to 0), or if dictionary information (dictionary or pre-dictionary) is configured, the compression buffer or the UDC compression buffer may be filled (pre-filled) with the dictionary information. As another method, if UDC is configured for AM DRBs, the compression buffer or the UDC compression buffer may always be initialized (e.g., all values may be initialized to 0 without applying dictionary information).
- For AM DRBs, if there is no indicator (drb-ContinueEHC-DL) indicating to continuously use a header decompression protocol for downlink, the reception PDCP layer device may perform header decompression (EHC) on stored data (e.g., PDCP SDUs).
- For UM DRBs and AM DRBs, if there is no indicator (drb-ContinueROHC) indicating to continuously use a header decompression protocol, the reception PDCP layer device initializes a header decompression protocol (OHC protocol) for downlink and starts in a uni-directional (U) mode of a no-context (NC) state.
- For UM DRBs and AM DRBs, if there is no indicator (drb-ContinueEHC-DL) indicating to continuously use a header decompression protocol for downlink, the reception PDCP layer device may initialize a header decompression protocol (EHC protocol).

When the terminal receives an indicator (e.g., via DCI of PDCCH, MAC control information, or an RRC message) or configuration information for clearing, deactivating, reconfiguring, or suspending of dual connectivity, a cell group (e.g., secondary cell group), or a cell, and the terminal performs the proposed terminal operations, if data to be transmitted by the terminal via an uplink is generated or occurs, the terminal may transmit a scheduling request (SR) or MAC control information (or indicator, buffer amount, or buffer state report) to a master base station or secondary base station in a PUCCH transmission resource configured via the RRC message so as to request an uplink transmission resource or request configuring, adding, activating, resuming, changing, or reconfiguring of the dual connectivity, the cell group (e.g., secondary cell group), or the cell. As another method, when the terminal receives an indicator (e.g., via DCI of PDCCH, MAC control information, or an RRC message) or configuration information for clearing, deactivating, reconfiguring, or suspending of dual connectivity, a cell group (e.g., secondary cell group), or a cell, and the terminal performs the proposed terminal operations, if data to be transmitted by the terminal via an uplink is generated or occurs, the terminal may generate an RRC message and transmit the RRC message to a master base station or a secondary base station so as to request an uplink transmission resource, or request configuring, adding, activating, resuming, changing, or reconfiguring of the dual connectivity, the cell group (e.g., secondary cell group), or the cell.

The procedures proposed in the disclosure may be extended to multi-connectivity. For example, configuration information of multiple cell groups may be configured for the terminal via an RRC message, one or more cell groups (or cells) among the configured multiple cell groups may be activated or resumed via an indicator of a PDCCH, MAC control information, or an RRC message, or one or more cell groups may be suspended or deactivated.

In the following, the disclosure proposes terminal operations for, when a secondary cell group or a PSCell of a secondary cell group is deactivated or suspended by deactivation or suspension of the cell group or cell proposed in the disclosure, and when uplink data for the secondary cell group (or bearers belonging to the secondary cell group) is generated or occurs, reactivating or resuming the cell group or cell.

As proposed in the disclosure, if a cell group or a cell is deactivated or suspended, since the terminal cannot transmit or receive data, if uplink data is generated in the secondary cell group (or in bearers belonging to the secondary cell group) of the terminal, the cell group or cell may need to be reactivated or resumed. Requesting reactivation or resumption of the cell group or cell from the base station (maser base station or secondary base station) by the terminal may be performed according to one of the following methods or a method extended by a combination or application of the following methods.

First method: The terminal configures a message (e.g., RRC message) for requesting reactivation or resumption of a secondary cell group or a cell, and transmits the configured message to the master base station. When the message is received, the master base station, as in the first signaling of FIGS. 11A and 11B proposed in the disclosure, may request resumption and receive a response from the secondary base station, and may configure a message (e.g., RRC message) indicating reactivation or resumption of the secondary base station, so as to transmit the configured message to the terminal. As another method, as in the second signaling of FIG. 12, the master base station may configure a message (e.g., RRC message) indicating reactivation or resumption of the secondary cell group and may transmit the configured message to the terminal, and then the terminal may indicate activation or resumption to the secondary base station. As another method, as in the third signaling of FIG. 13, the terminal may configure a message (e.g., RRC message) for requesting reactivation or resumption of the secondary cell group or cell and may transmit the configured message to the secondary base station via SRB3, and the secondary base station may configure a message (e.g., RRC message) indicating reactivation or resumption of the secondary cell group and transmit the configured message to the terminal, and then activation or resumption may be indicated to the master base station. Second method: The terminal configures a message (e.g., MAC message) for requesting reactivation or resumption of a secondary cell group or a cell, and transmits the configured message to the master base station. When the message is received, the master base station, as in the first signaling of FIGS. 11A and 11B proposed in the disclosure, may request resumption and receive a response from the secondary base station, and may configure a message (e.g., RRC message or MAC control information) indicating reactivation or resumption of the secondary base station, so as to transmit the configured message to the terminal. As another method, as in the second signaling of FIG. 12, the master base station may configure a message (e.g., RRC message or MAC control information) indicating reactivation or resumption of the secondary cell group and may transmit the configured message to the terminal, and then the terminal may indicate activation or resumption to the secondary base station. As another method, as in the third signaling of FIG. 13, the terminal may configure a message (e.g., RRC message or MAC control information) for requesting reactivation or resumption of the secondary cell group or cell and may transmit the configured message to the secondary base station via SRB3, and the secondary base station may configure a message (e.g., RRC message or MAC control information) indicating reactivation or resumption of the secondary cell group and may transmit the configured message to the terminal, and then activation or resumption may be indicated to the master base station. When cell group activation or resumption is requested or indicated via MAC control information, the MAC control information may be newly defined and designed. As another method, a new value (field value or identifier value) may be defined and indicated or a new field (or indicator) may be defined in existing MAC control information (e.g., buffer state report).

Third method: The terminal configures a message (e.g., physical signal of a PHY layer device) for requesting reactivation or resumption of a secondary cell group or a cell, and transmits the configured message to the master base station. When the message is received, the master base station, as in the first signaling of FIGS. 11A and 11B proposed in the disclosure, may request resumption and receive a response from the secondary base station, and may configure a message (e.g., RRC message or physical signal of a PHY layer device) indicating reactivation or resumption of the secondary base station, so as to transmit the configured message to the terminal. As another method, as in the second signaling of FIG. 12, the master base station may configure a message (e.g., RRC message or physical signal of a PHY layer device) indicating reactivation or resumption of the secondary cell group and may transmit the configured message to the terminal, and then the terminal may indicate activation or resumption to the secondary base station. As another method, as in the third signaling of FIG. 13, the terminal may configure a message (e.g., physical signal of a PHY layer device) for requesting reactivation or resumption of the secondary cell group or cell and may transmit the configured message to the secondary base station via SRB3, and the secondary base station may configure a message (e.g., RRC message or physical signal of a PHY layer device) indicating reactivation or resumption of the secondary cell group and may transmit the configured message to the terminal, and then activation or resumption may be indicated to the master base station. When cell group activation or resumption is requested or indicated via a physical signal of the PHY layer device, the physical signal of the PHY layer device may be defined and designed as a new transmission resource (e.g., new scheduling request (SR) transmission resource (e.g., PUCCH transmission resource of PCell or PSCell) for the secondary cell group, or new field of PDCCH DCI (PDCCH transmission resource transmitted from PSCell or transmitted from PCell)). As another method, a new field (or indicator) may be defined, or a new value (field value or identifier value) may be defined and indicated in a physical signal (e.g., scheduling request (SR) transmission resource (e.g., PUCCH transmission resource of PCell or PSCell) or field of PDCCH DCI (PDCCH transmission resource transmitted from PSCell or transmitted from PCell)) of the existing PHY layer device. As another method, when the terminal performs PDCCH monitoring with a long cycle for the PSCell of the secondary cell group by applying second DRX configuration information, or when the secondary cell group of the terminal is deactivated or suspended, if random access is triggered for the terminal in the PSCell via DCI of PDCCH, the terminal may interpret the indication as activation of resumption of the secondary cell group. A physical transmission resource may refer to a transmission resource for random access, and the terminal may perform random access if uplink data for the secondary cell group is generated while the secondary cell group is suspended or deactivated as described above. As another method, when uplink data for the secondary cell group is generated while the secondary cell group is suspended or deactivated, if an SR transmission resource is configured (or if a TA timer is running), the SR transmission resource may be transmitted to the master cell group or the secondary cell group, and if no SR transmission is configured (or if a TA timer has expired), random access may be performed. Contention-based random access (CBRA) may be performed for the random access. As another method, if random access configuration information (dedicated RACH config or dedicated preamble) specified in the message (or previously received message) indicating suspension or deactivation of the cell group is configured (or included), contention-free random access (CFRA)) may be performed, or if random access configuration information (dedicated RACH config or dedicated preamble) specified in the message (or previously received message) indicating suspension or deactivation of the cell group is not configured (or not included), contention-based random access (CBRA) may be performed. During the random access or after completion of the random access, an indicator (e.g., buffer status report (MAC control element)) indicating that uplink data has been generated may be transmitted to the base station for indication of the same, and if the indicator is received or the random access is completed, the base station (e.g., secondary base station or master base station) may transmit, to the terminal, a message indicating to resume or activate the secondary cell group so as to enable resumption or activation of the secondary cell group, and may perform data transmission or reception again.

As proposed in the disclosure, when the terminal activates or resumes the cell group (e.g., secondary cell group) or cell (e.g., PSCell) according to the indicator of the RRC message, MAC control information, or PDCCH, activation or resumption of the cell group or cell may be completed at a first time point. The first time point may be configured via the RRC message as proposed in the disclosure. For example, the RRC message may include time information (e.g., information indicating timing (e.g., X time unit, subframe unit, time slot unit, or symbol unit) indicating when to activate, resume, deactivate, or suspend dual connectivity, a cell group (e.g., secondary cell group), or a cell (PSCell or SCG SCell). For example, if the RRC message, MAC control information, or PDCCH indicating activation, resumption, deactivation, or suspension of the cell group (e.g., secondary cell group) or cell (e.g., PSCell) is received in an nth time unit, time information indicating that the activation, resumption, deactivation, or suspension of the cell group or cell should be completed in an (n+X)th time unit may be configured. As another method, the time information (e.g., X) may not be configured by the base station, but may be predetermined and defined, and a fixed value may be used. For another example, after reception of the RRC message, MAC control information, or PDCCH indicating activation, resumption, deactivation, or suspension of the cell group (e.g., secondary cell group) or cell (e.g., PSCell), when random access is started (or when a preamble is transmitted) or random access is successfully completed in an nth time unit, time information indicating that the activation, resumption, deactivation, or suspension of the cell group or cell should be completed in an (n+X)th time unit may be configured. As another method, the time information (e.g., X) may not be configured by the base station, but may be predetermined and defined, and a fixed value may be used. When activation, suspension, deactivation, or resumption of the cell group or cell is completed, the terminal may perform proposed terminal operations according to a state (e.g., active, dormant, or inactive) of each cell or bandwidth part, proposed in the disclosure. When activation or resumption of the cell group or cell is completed, a DRX operation of the terminal may be started or resumed, or when deactivation or suspension of the cell group or cell is completed, the DRX operation of the terminal may be suspended or deactivated.

As proposed in the disclosure, when the terminal activates a cell (e.g., PSCell or SCell) of a cell group (e.g., master cell group or secondary cell group) according to an indication of MAC control information, activation of the cell may be completed at a second time point. The second time point may be configured via an RRC message as proposed in the disclosure. For example, the RRC message may include time information (e.g., information indicating timing (e.g., X time unit, subframe unit, time slot unit, or symbol unit) indicating when to activate or deactivate carrier aggregation, dual connectivity, a cell group (e.g., master cell group or secondary cell group), or a cell (MCG SCell or SCG SCell). For example, if MAC control information indicating activation or deactivation of a cell (e.g., SCell) is received in an nth time unit, time information indicating that the activation or deactivation of the cell should be completed in an (n+X)th time unit may be configured. As another method, the time information (e.g., X) may not be configured by the base station, but may be predetermined and defined, and a fixed value may be used. As another example, after reception of MAC control information indicating activation or deactivation of a cell (e.g., SCell or PSCell), when random access is started (or when a preamble is transmitted) or random access is successfully completed in an nth time unit, time information indicating that the activation or deactivation of the cell should be completed in an (n+X)th time unit may be configured. As another method, the time information (e.g., X) may not be configured by the base station, but may be predetermined and defined, and a fixed value may be used. When activation, suspension, deactivation, or resumption of the cell group or cell is completed, the terminal may perform proposed terminal operations according to a state (e.g., active, dormant, or inactive) of each cell or bandwidth part, proposed in the disclosure. When activation or resumption of the cell group or cell is completed, a DRX operation of the terminal may be started or resumed, or when deactivation or suspension of the cell group or cell is completed, the DRX operation of the terminal may be suspended or deactivated.

As proposed in the disclosure, when the terminal activates a cell group (e.g., master cell group or secondary cell group) or a cell (e.g., PSCell or SCell) according to an indication of an RRC message, activation of the cell may be completed at a third time point. The third time point may be configured via an RRC message as proposed in the disclosure. For example, the RRC message may include time information (e.g., information indicating timing (e.g., X time unit, subframe unit, time slot unit, or symbol unit) indicating when to activate or deactivate frequency aggregation, dual connectivity, a cell group (e.g., master cell group or secondary cell group), or a cell (MCG SCell, SCG SCell, or PSCell). For example, if the RRC message indicating activation or deactivation of a cell (e.g., SCell) is received in an nth time unit, time information indicating that the activation or deactivation of the cell should be completed in an (n+X)th time unit may be configured. As another method, the time information (e.g., X) may not be configured by the base station, but may be predetermined and defined, and a fixed value may be used. As another example, after reception of the RRC message indicating activation or deactivation of a cell (e.g., SCell or PSCell), when random access is started (or when a preamble is transmitted) or random access is successfully completed in an nth time unit, time information indicating that the activation or deactivation of the cell should be completed in an (n+X)th time unit may be configured. As another method, the time information (e.g., X) may not be configured by the base station, but may be predetermined and defined, and a fixed value may be used. X may be configured or predetermined based on a slot number, or may be configured or predetermined based on a shortest slot length of the configured PCell, PSCell, or SCells. When activation, suspension, deactivation, or resumption of the cell group or cell is completed, the terminal may perform proposed terminal operations according to a state (e.g., active, dormant, or inactive) of each cell or bandwidth part, proposed in the disclosure. When activation or resumption of the cell group or cell is completed, a DRX operation of the terminal may be started or resumed, or when deactivation or suspension of the cell group or cell is completed, the DRX operation of the terminal may be suspended or deactivated.

The concept of a cell group proposed in the disclosure may be extended to a sub-cell group. For example, in the disclosure, in order to configure dual connectivity for a terminal, a first cell group and a secondary cell group are configured, the first and secondary cell groups are applied as a master cell group and a secondary cell group to configure dual connectivity, and data transmission or reception may be performed with two base stations. However, if the concept of the cell group is extended to a sub-cell group, multiple sub-cell groups may be configured for the cell group, or a sub-cell identifier may be configured for each sub-cell group, with respect to a terminal connected to one base station. The terminal performs data transmission or reception with one base station, but as proposed in the disclosure, activation, suspension, resumption, or deactivation may be extended and applied via an RRC message, MAC control information, or PDCCH for different frequencies or cells for each sub-cell group. For example, when the terminal communicates with one base station via multiple frequencies or cells, the base station may configure, for the terminal, multiple sub-cell groups to allow the terminal to apply carrier aggregation with respect to multiple frequencies or cells of the base station corresponding to the cell group (master cell group), fields indicating the respective sub-cell groups may be defined in an RRC message, MAC control information, or PDCCH, and thus the respective fields may indicate activation, deactivation, suspension, or resumption of the respective sub-cell groups. The terminal may apply activation, suspension, resumption, or deactivation via an RRC message, MAC control information, or PDCCH, as proposed in the disclosure, for different frequencies or cells for each sub-cell group. As another method, the proposed sub-cell group may be implemented via introduction of downlink or uplink logical channel restriction for each cell. For example, configuration information that restricts logical channels belonging to one cell group to transmit or receive data only for a specific frequency or cell may be included in an RRC message so as to be configured for the terminal. As described above, logical channels (e.g., logical channel identifiers) are configured by mapping to respective cells or frequencies, and are grouped so as to be regarded as sub-cell groups as proposed above, fields indicating the respective cells may be defined in an RRC message, MAC control information, or PDCCH, and the respective fields may indicate activation, deactivation, suspension, or resumption of the respective cell.

In the disclosure, when the terminal, for which dual connectivity is configured, performs data transmission or reception with a master cell group or a secondary cell group, or when the secondary cell group is suspended or deactivated, if the master cell group detects a radio link failure, the terminal may report the radio link failure to the secondary cell group or to the master cell group via the secondary cell group. For example, an RRC message for radio link failure reporting may be configured and transmitted via split SRB1 or SRB3, thereby reporting the radio link failure. When split SRB1 is configured, the radio link failure may be always reported via split SRB1. As another method, when the terminal, for which dual connectivity is configured, performs data transmission or reception with a master cell group or a secondary cell group, or when the secondary cell group is suspended or deactivated, if the master cell group detects a radio link failure, the terminal may declare a radio link failure and may perform RRC connection re-establishment.

In the disclosure, when the terminal, for which dual connectivity is configured, performs data transmission or reception with a master cell group or a secondary cell group, or when the secondary cell group is suspended or deactivated, if the secondary cell group detects a radio link failure, the terminal may report the radio link failure to the master cell group or to the secondary cell group via the master cell group. For example, an RRC message for radio link failure reporting may be configured and transmitted via SRB1, split SRB1, or SRB3, thereby reporting the radio link failure. When SRB1 or split SRB1 is configured, the radio link failure may always be reported via split SRB1.

In the disclosure, when dual connectivity has been configured for the terminal, clearing of a secondary cell group may refer to clearing of connection (data transmission or reception) with the secondary cell group, or discarding or clearing of configuration information of the secondary cell group (or bearer configuration information or protocol layer device configuration information (PHY, MAC, RLC, PDCP, or SDAP layer device)), whereas suspending or deactivating of a secondary cell group may refer to clearing or suspending of connection (data transmission or reception) with the secondary cell group, but maintaining, suspending, or storing configuration information of the secondary cell group (or bearer configuration information or protocol layer device configuration information (PHY, MAC, RLC, PDCP, or SDAP layer device)), or rapidly resuming and activating connection with the secondary cell group later, based on the stored configuration information of the secondary cell group.

In the following, the disclosure proposes that, if frequency measurement or frequency measurement reporting is configured for the terminal via the RRC message (e.g., RRCReconfiguration) of the disclosure, if dual connectivity has been configured for the terminal, or if the frequency measurement or frequency measurement reporting is configured for a cell group (or SCG), the terminal prioritizes SRB3 and reports a frequency measurement result (measurement report) via SRB3, and proposes that the terminal reports the frequency measurement result via SRB1 (or SRB of MCG) only if SRB3 is not configured. However, the disclosure proposes that measurement reporting is not performed via SRB3 if the cell group (SCG) is deactivated. For example, it is proposed that, only when the cell group is not inactive (or if SRB3 is not suspended, or if transmission of the cell group (SCG) is not suspended), if SRB3 is configured, the terminal reports the frequency measurement result via SRB3, or if the cell group is inactive, the terminal reports the frequency measurement result via SRB1 (or SRB of MCG). This is because, if the frequency measurement result is transmitted via SRB3 when the cell group (SCG) is inactive, there occurs a problem that the cell group should be activated unnecessarily.

Specific procedures of the terminal proposed to solve the above problem are as follows.

1> If frequency measurement or frequency measurement reporting is configured for the terminal,
    2> If the terminal is configured with (NG) EN-DC (or if the frequency measurement or the frequency measurement reporting is configured for a cell group (or SCG)),
        3> If SRB3 is configured for the terminal, and if the cell group (SCG) is not configured to be inactive (or if the cell group (SCG) is not inactive, if SRB3 is not suspended, or if transmission of the cell group (SCG) is not suspended),
            4> The terminal delivers a frequency measurement result report message (MeasurementReport) to a lower layer device, for transmission via SRB3.
        3> Else,
            4> The terminal delivers a frequency measurement result report message to a lower layer device, for transmission via SRB1 (or SRB of MCG (E-UTRA)). The frequency measurement result report message may be included in a ULlnformationTransferMRDC message, i.e., an E-UTRA RRC message, so as to be transmitted.
    2> If the terminal is configured with NR-DC, or if the frequency measurement or the frequency measurement reporting is configured for a cell group (or SCG),
        3> If SRB3 is configured for the terminal, and if the cell group (SCG) is not configured to be inactive (or if the cell group (SCG) is not inactive, if SRB3 is not suspended, or if transmission of the cell group (SCG) is not suspended),
            4> The terminal delivers a frequency measurement result report message to a lower layer device, for transmission via SRB3.
        3> Else,
            4> The terminal delivers a frequency measurement result report message to a lower layer device, for transmission via SRB1 (or SRB of MCG(E-UTRA)). The frequency measurement result report message may be included in a ULlnformationTransferMRDC message, i.e., an NR RRC message, so as to be transmitted.
    2> Else (if NR (SCG) dual connectivity and E-UTRA (MCG) connected to (NG) EN-DC (5G core (5GC)) or NR-DC is not configured),
        3> The terminal delivers a frequency measurement result report message to a lower layer device, for transmission via SRB1 (or SRB of MCG (E-UTRA)).

In the following, the disclosure proposes that, if terminal assistance information (UE assistance information) reporting is configured for the terminal via the RRC message (e.g., RRCReconfiguration) of the disclosure, if dual connectivity has been configured for the terminal, or if the UE assistance information is configured for a cell group (or SCG or MCG), the terminal prioritizes SRB3 and reports a frequency measurement result (measurement report) via SRB3, and proposes that the terminal reports the UE assistance information via SRB1 (or SRB of MCG) only if SRB3 is not configured. However, the disclosure proposes that measurement reporting is not performed via SRB3 if the cell group (SCG) is deactivated. For example, it is proposed that, only when the cell group is not inactive (or if SRB3 is not suspended, or if transmission of the cell group (SCG) is not suspended), if SRB3 is configured, the terminal reports the frequency measurement result via SRB3, or if the cell group is inactive, the terminal reports the frequency measurement result via SRB1 (or SRB of MCG). This is because, if the UE assistance information is transmitted via SRB3 when the cell group (SCG) is inactive, there occurs a problem that the cell group should be activated unnecessarily.

The UE assistance information may include the following information, and if the terminal is configured to report each piece of the following information, or if reporting of each of the following information is initiated (or if a condition configured via the RRC message is satisfied), the terminal may report each piece of the following UE assistance information, and the terminal may configure a message (UEAssistanceInformation) for reporting of each piece of the following UE assistance information, so as to transmit the message to the base station via SRB1 or SRB3 and report the UE assistance information according to procedures proposed in the following of the disclosure.

Delay budget information including a desired increase or decrease for a connected mode discontinuous reception (DRX) cycle length in the RRC connected mode Overheating assistance information of the terminal In-terminal coexistence (in-device coexistence (IDC)-related assistance information (IDC assistance information))

Information on preferences for DRX parameters for power saving

Information on preferences for a maximum aggregated bandwidth for power saving

Information on preferences for the maximum number of secondary component carriers for power saving Information on preferences for the maximum number of multiple input multiple output (MIMO) layers for power saving Information on preferences for a minimum scheduling offset for cross-slot scheduling for power saving Information on preferences for an RRC mode (RRC idle mode, RRC inactive mode, or RRC connected mode) or an RRC state (RRC idle state, RRC inactive state, or RRC connected state)

The base station may configure the terminal to report one or multiple pieces of information among the UE assistance information, or may also configure conditions for reporting each piece of the UE assistance information or performing reporting. In order to report one or multiple pieces of information among the UE assistance information, the terminal may configure a UE assistance information message (UEAssistancelnformation) and transmit the same via SRB1 or SRB3 according to the procedures proposed in the following.

Specific procedures of the terminal proposed to solve the above problem are as follows.

1> If UE assistance information (UEAssistancelnformation) or UE assistance information (UEAssistancelnformation) reporting is configured for the terminal,
   2> If the terminal is configured with (NG) EN-DC (or if the UE assistance information (UEAssistancelnformation) or reporting the same is configured for a cell group (or SCG)),
      3> If SRB3 is configured for the terminal, and if the cell group (SCG) is not configured to be inactive (or if the cell group (SCG) is not inactive, if SRB3 is not suspended, or if transmission of the cell group (SCG) is not suspended),
         4> The terminal delivers a UE assistance information (UEAssistancelnformation) message to a lower layer device, for transmission via SRB3.
      3> Else,
         4> The terminal delivers a UE assistance information (UEAssistancelnformation) message to a lower layer device, for transmission via SRB1 (or SRB of MCG (E-UTRA)). The UE assistance information (UEAssistancelnformation) message may be included in a ULlnformationTransferMRDC message, i.e., an E-UTRA RRC message, so as to be transmitted.
   2> If the terminal is configured with NR-DC (or if the UE assistance information (UEAssistancelnformation) or reporting the same is configured for a cell group (or SCG),
      3> If SRB3 is configured for the terminal, and if the cell group (SCG) is not configured to be inactive (or if the cell group (SCG) is not inactive, if SRB3 is not suspended, or if transmission of the cell group (SCG) is not suspended),
         4> The terminal delivers a UE assistance information (UEAssistancelnformation) message to a lower layer device, for transmission via SRB3.
      3> Else,
         4> The terminal delivers a UE assistance information (UEAssistancelnformation) message to a lower layer device, for transmission via SRB1 (or SRB of MCG (E-UTRA)). The UE assistance information (UEAssistancelnformation) message may be included in a ULlnformationTransferMRDC message, i.e., an NR RRC message, so as to be transmitted.
   2> Else (if NR (SCG) dual connectivity and E-UTRA (MCG) connected to (NG) EN-DC (5G core (5GC)) or NR-DC is not configured),
      3> The terminal delivers a UE assistance information (UEAssistancelnformation) message to a lower layer device, for transmission via SRB1 (or SRB of MCG (E-UTRA)).

In the following, the disclosure proposes a first embodiment in which, in a case where dual connectivity has been configured for the terminal (NR-DC or (NG) EN-DC), when a secondary cell group (SCG) is inactive (or configured to be inactive) or is active, if a radio link failure for an MCG occurs (or if a radio link failure (RLF) for an MCG is detected), the terminal performs the following in order to effectively recover a radio link.

1> If the cell group (SCG) is not configured to be inactive (or if the cell group (SCG) is not inactive, if SRB3 is not suspended, or if transmission of the cell group (SCG) is not suspended),
   2> A first timer is started. The first timer is a timer for preventing the terminal from continuously waiting for recovering from an MCG radio link failure, and when the first timer expires, the terminal performs RRC connection re-establishment.
   2> If SRB1 is configured to be a split SRB,
      3> The terminal may configure a report message indicating that an MCG radio link has failed and transmit the message (MCGFailurelnformation) to a lower layer device via SRB1.
   2> Else (i.e., if SRB3 is configured),
      3> The terminal may configure a report message indicating that an MCG radio link has failed, and adds the message (MCGFailurelnformation) to a ULlnformationTransferMRDC message so as to transmit the same to a lower layer device via SRB3.

1> Else, if the cell group (SCG) is inactive (or if the cell group (SCG) is deactivated, if SRB3 is suspended, or if transmission of the cell group (SCG) is suspended),
   2> The terminal may perform RRC connection re-establishment. For example, in order to re-establish the RRC connection of the terminal, the terminal may transmit an RRC connection re-establishment request message (RRCReestablishmentRequest) to the base station, and receives a response message (RRCReestablishmentComplete) of the request message from the base station, so as to re-establish the RRC connection.

In the following, the disclosure proposes a second embodiment in which, in a case where dual connectivity has been configured for the terminal (NR-DC or (NG) EN-DC), when a secondary cell group (SCG) is inactive (or configured to be inactive) or is active, if a radio link failure for an MCG occurs (or if a radio link failure (RLF) for an MCG is detected), the terminal performs the following in order to effectively recover a radio link.

1> If the cell group (SCG) is not configured to be inactive (or if the cell group (SCG) is not inactive, if SRB3 is not suspended, or if transmission of the cell group (SCG) is not suspended),
   2> A first timer starts. The first timer is a timer for preventing the terminal from continuously waiting for recovering from an MCG radio link failure, and when the first timer expires, the terminal performs RRC connection re-establishment.

2> If SRB1 is configured to be a split SRB,
 3> The terminal may configure a report message indicating that an MCG radio link has failed and transmit the message (MCGFailureInformation) to a lower layer device via SRB1.
2> Else (i.e., if SRB3 is configured),
 3> The terminal may configure a report message indicating that an MCG radio link has failed, and adds the message (MCGFailureInformation) to a ULlnformationTransferMRDC message so as to transmit the same to a lower layer device via SRB3.
1> Else, if the cell group (SCG) is inactive (or if the cell group (SCG) is deactivated, if SRB3 is suspended, or if transmission of the cell group (SCG) is suspended),
 2> In order to request activation of the cell group, the terminal may configure a request message for activation of the cell group (SCG), and may transmit the request message to SRB1 or an RLC layer device for MCG of SRB1 (or the terminal may perform random access to the cell group (or SCG or PSCell) in order to activate the cell group). If the cell group is activated, the terminal may configure a report message indicating that the MCG radio link has failed, and if split SRB1 is configured, the terminal may transmit the message (MCGFailureInformation) to a lower layer device via split SRB1, and if split SRB1 is not configured and SRB3 is configured, the terminal may transmit the message via SRB3.

In the following, the disclosure proposes a third embodiment in which, in a case where dual connectivity has been configured for the terminal (NR-DC or (NG) EN-DC), when a secondary cell group (SCG) is inactive (or configured to be inactive) or is active, if a radio link failure for an MCG occurs (or if a radio link failure (RLF) for an MCG is detected), or if a beam failure (or random access problem or excess in the number of retransmissions of the RLC layer device) is detected for the MCG, the terminal performs the following in order to effectively recover a radio link.

1> A first timer is started. The first timer is a timer for preventing the terminal from continuously waiting for recovering from an MCG radio link failure, and when the first timer expires, the terminal performs RRC connection re-establishment. As another method, if the cell group (SCG) is not configured to be inactive (or if the cell group (SCG) is not inactive, if SRB3 is not suspended, or if transmission of the cell group (SCG) is not suspended), the first timer may be started.
1> If SRB1 is configured to be a split SRB, or if the cell group (SCG) is not configured to be inactive (or if the cell group (SCG) is not inactive, if SRB3 is not suspended, or if transmission of the cell group (SCG) is not suspended),
 2> The terminal may configure a report message indicating that an MCG radio link has failed and transmit the message (MCGFailureInformation) to a lower layer device via SRB1.
1> If SRB1 is configured to be a split SRB, if SRB1 is configured, or if the cell group (SCG) is configured to be inactive (or if the cell group (SCG) is inactive, if SRB3 is suspended, or if transmission of the cell group (SCG) is suspended),
 2> In order to request activation of the cell group, the terminal may configure a request message for activation of the cell group (SCG), and may transmit the request message to SRB1 or the RLC layer device for MCG of SRB1 (or the terminal may perform random access to the cell group (or SCG or PSCell) in order to activate the cell group). If the cell group is activated, the terminal may configure a report message indicating that the MCG radio link has failed, and if split SRB1 is configured, the terminal may transmit the message (MCGFailureInformation) to a lower layer device via split SRB1, and if split SRB1 is not configured and SRB3 is configured, the terminal may transmit the message via SRB3.
1> Else (i.e., if SRB3 is configured) or if the cell group (SCG) is configured to be inactive (or if the cell group (SCG) is inactive, if SRB3 is suspended, or if transmission of the cell group (SCG) is suspended),
 2> In order to request activation of the cell group, the terminal may configure a request message for activation of the cell group (SCG), and may transmit the request message to SRB1 or the RLC layer device for MCG of SRB1 (or the terminal may perform random access to the cell group (or SCG or PSCell) in order to activate the cell group). If the cell group is activated, the terminal may configure a report message indicating that an MCG radio link has failed, and may transmit the message (MCGFailureInformation) via SRB3 if SRB3 is configured.
1> Else (i.e., if SRB3 is configured) or if the cell group (SCG) is not configured to be inactive (or if the cell group (SCG) is not inactive, if SRB3 is not suspended, or if transmission of the cell group (SCG) is not suspended),
 2> The terminal may configure a report message indicating that an MCG radio link has failed, and adds the message (MCGFailureInformation) to a ULlnformationTransferMRDC message so as to transmit the same to a lower layer device via SRB3.

Figure 14:
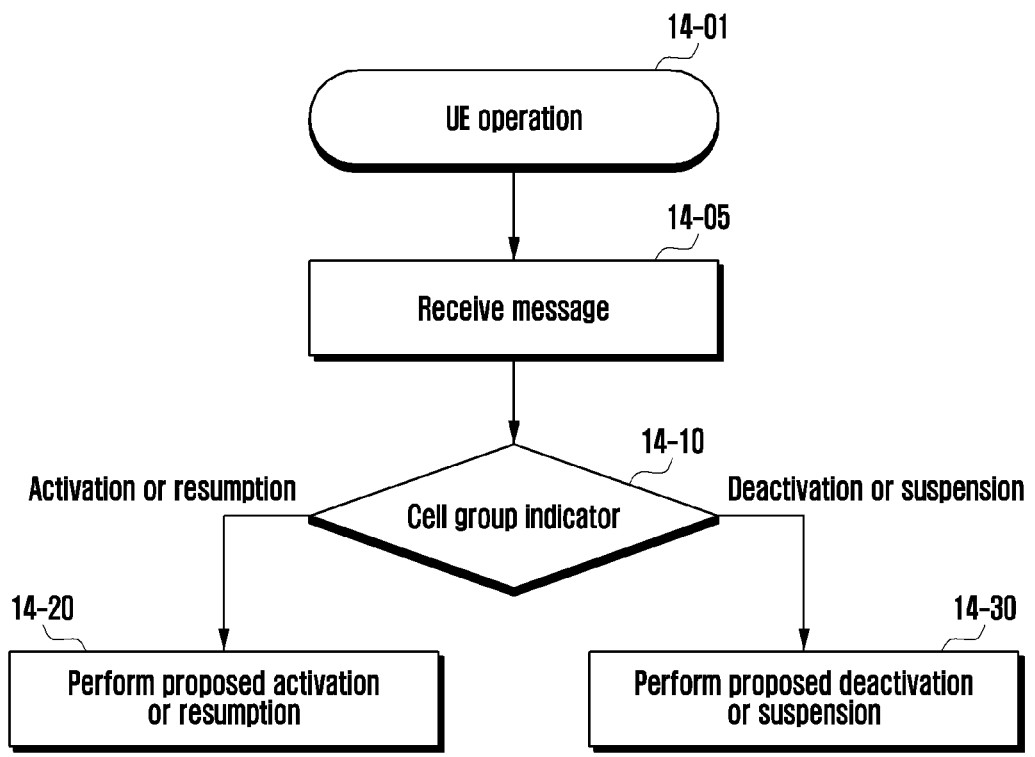
FIG. 14 is a diagram illustrating an operation of a terminal according to an embodiment of the disclosure.

FIG. 14 is a diagram illustrating an operation of a terminal according to an embodiment of the disclosure.

Referring to FIG. 14, a terminal 14-01 may receive 14-05 a message (e.g., DCI of PDCCH, MAC control information, or RRC message) from a base station. When the message includes cell group configuration information, a cell group state, or a cell group indicator, the terminal may identify 14-10 whether configuration, addition, activation, or resumption of a cell group is indicated, or whether clearing, deactivation, or suspension of the cell group is indicated. If configuration, addition, activation, or resumption of the cell group is indicated, the configuration, addition, activation, or resumption of the cell group, proposed in the disclosure, may be performed 14-20, and if clearing, deactivation, or suspension of the cell group is indicated, the clearing, deactivation, or suspension of the cell group, proposed in the disclosure, may be performed 14-30.

Figure 15:
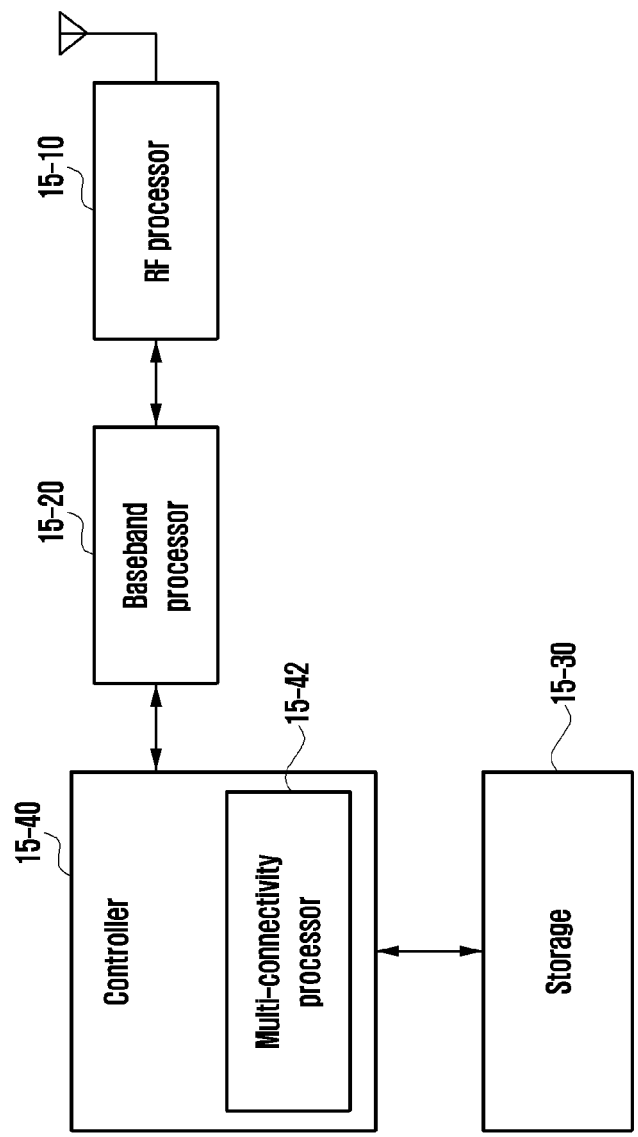
FIG. 15 illustrates a structure of a terminal according to an embodiment of the disclosure.

FIG. 15 illustrates a structure of a terminal to which an embodiment of the disclosure may be applied according to an embodiment of the disclosure.

Referring to FIG. 15, the terminal includes a radio frequency (RF) processor 15-10, a baseband processor 15-20, a storage 15-30, and a controller 15-40.

The RF processor 15-10 performs a function for signal transmission or reception via a wireless channel, such as signal band transform and amplification. For example, the RF processor 15-10 up-converts a baseband signal provided from the baseband processor 15-20 into an RF band signal, transmits the converted RF band signal via an antenna, and then down-converts the RF band signal received via the antenna into a baseband signal. For example, the RF processor 15-10 may include a transmission filter, a reception filter, an amplifier, a mixer, an oscillator, a digital-to-analog converter (DAC), an analog-to-digital converter (ADC), and the like. In the drawing, only one antenna is illustrated, but the terminal may have multiple antennas. The RF processor 15-10 may include multiple RF chains. The RF processor 15-10 may perform beamforming. For beamforming, the RF processor 15-10 may adjust a phase and a magnitude of each of signals transmitted or received via multiple antennas or antenna elements. The RF processor may perform MIMO, and may receive multiple layers when performing MIMO operations. The RF processor 15-10 may perform reception beam sweeping by appropriately configuring the multiple antennas or antenna elements under the control of the controller, or may adjust the direction and beam width of the reception beam so that the reception beam is coordinated with a transmission beam.

The baseband processor 15-20 performs conversion between a baseband signal and a bitstream according to physical layer specifications of the system. For example, during data transmission, the baseband processor 15-20 generates complex symbols by encoding and modulating a transmission bitstream. Further, during data reception, the baseband processor 15-20 reconstructs a reception bitstream via demodulation and decoding of a baseband signal provided from the RF processor 15-10. For example, in a case of conforming to an orthogonal frequency division multiplexing (OFDM) scheme, during data transmission, the baseband processor 15-20 generates complex symbols by encoding and modulating a transmission bitstream, maps the complex symbols to sub-carriers, and then configures OFDM symbols by performing an inverse fast Fourier transform (IFFT) operation and cyclic prefix (CP) insertion. Further, during data reception, the baseband processor 15-20 divides the baseband signal provided from the RF processor 15-10 in the units of OFDM symbols, reconstructs the signals mapped to the sub-carriers via a fast Fourier transform (FFT) operation, and then reconstructs the reception bitstream via demodulation and decoding.

The baseband processor 15-20 and the RF processor 15-10 transmit and receive signals as described above. Accordingly, the baseband processor 15-20 and the RF processor 15-10 may be referred to as a transmitter, a receiver, a transceiver, or a communicator. Moreover, at least one of the baseband processor 15-20 and the RF processor 15-10 may include multiple communication modules to support multiple different radio access technologies. At least one of the baseband processor 15-20 and the RF processor 15-10 may include different communication modules to process signals of different frequency bands. For example, the different radio access technologies may include an LTE network, an NR network, and the like. Further, the different frequency bands may include a super high frequency (SHF) (e.g., 2.5 GHz and 5 GHz) band and a millimeter wave (e.g., 60 GHz) band.

The storage 15-30 stores data, such as a default program, an application program, configuration information, and the like for operation of the terminal. The storage 15-30 provides stored data in response to a request of the controller 15-40.

The controller 15-40 controls overall operations of the terminal. For example, the controller 15-40 transmits or receives a signal via the baseband processor 15-20 and the RF processor 15-10. The controller 15-40 records and reads data in the storage 15-30. To this end, the controller 15-40 may include at least one processor. For example, the controller 15-40 may include a communication processor (CP) configured to perform control for communication and an application processor (AP) configured to control a higher layer, such as an application program. The controller 15-40 may further include a multi-connectivity processor 15-42 for supporting multi-connectivity.

In addition, The controller 15-40 is further configured to identify whether an acknowledged mode (AM) data radio bearer (DRB) is suspended in case that a packet data convergence protocol (PDCP) entity re-establishment is requested from an upper layer, identify whether an indicator is configured for indicating that an uplink data compression (UDC) is continuously used and a PDCP service data unit (SDU) is compressed, in case that the AM DRB is not suspended, and submit the PDCP SDU, in case that the indicator is configured for indicating that the UDC is continuously used and the PDCP SDU is compressed.

The controller 15-40 is further configured to perform uplink data compression of the PDCP SDU and submitting the PDCP SDU compressed, in case that the indicator is not configured for indicating that the UDC is continuously used or the PDCP SDU is not compressed.

wherein the PDCP SDU previously compressed is submitted to an integrity protection and ciphering function.

The controller 15-40 is further configured to perform integrity protection and ciphering of the submitted PDCP SDU for generating a PDCP protocol data unit (PDU), and submit the PDCP PDU to a lower layer.

wherein the indicator for indicating that the UDC is continuously used is configured based on a RRC message.

wherein a retransmission or a transmission of all the PDCP SDUs is performed in ascending order of count values associated to the PDCP SDU, from a first PDCP SDU for which the successful delivery of a corresponding PDCP data PDU has not been confirmed by lower layers, in case that the AM DRB is not suspended.

Figure 16:
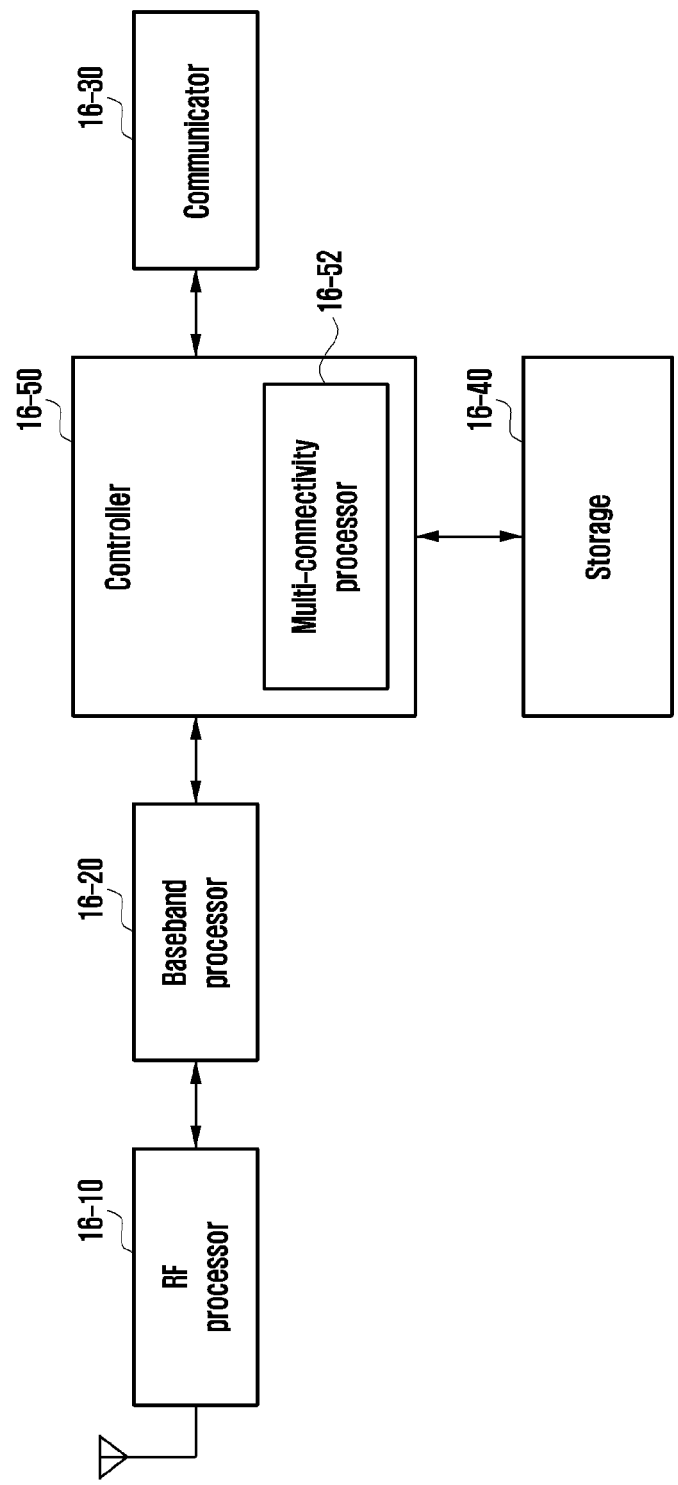
FIG. 16 illustrates a block configuration of a transmission and reception point (TRP) or a base station in a wireless communication system according to an embodiment of the disclosure.

FIG. 16 illustrates a block configuration of a TRP or a base station in a wireless communication system according to an embodiment of the disclosure.

Referring to FIG. 16, in the drawing, the base station includes an RF processor 16-10, a baseband processor 16-20, a backhaul communicator 16-30, a storage 16-40, and a controller 16-50.

The RF processor 16-10 performs a function for signal transmission or reception via a wireless channel, such as signal band transform and amplification. For example, the RF processor 16-10 up-converts a baseband signal provided from the baseband processor 16-20 into an RF band signal, transmits the converted RF band signal via an antenna, and then down-converts the RF band signal received via the antenna into a baseband signal. For example, the RF processor 16-10 may include a transmission filter, a reception filter, an amplifier, a mixer, an oscillator, a DAC, an ADC, and the like. In the drawing, only one antenna is illustrated, but a first access node may include multiple antennas. The RF processor 16-10 may include multiple RF chains. The RF processor 16-10 may perform beamforming. For beamforming, the RF processor 16-10 may adjust a phase and a magnitude of each of signals transmitted or received via the multiple antennas or antenna elements. The RF processor may perform downlink MIMO operations by transmitting one or more layers.

The baseband processor 16-20 performs a function of conversion between a baseband signal and a bitstream according to physical layer specifications of a first radio access technology. For example, during data transmission, the baseband processor 16-20 generates complex symbols by encoding and modulating a transmission bitstream. In addition, during data reception, the baseband processor 16-20 reconstructs a reception bitstream via demodulation and decoding of a baseband signal provided from the RF processor 16-10. For example, in a case of conforming to an OFDM scheme, during data transmission, the baseband processor 16-20 generates complex symbols by encoding and modulating a transmission bitstream, maps the complex symbols to sub-carriers, and then configures OFDM symbols via an IFFT operation and CP insertion. Further, during data reception, the baseband processor 16-20 divides the baseband signal provided from the RF processor 16-10 in units of OFDM symbols, reconstructs the signals mapped to the sub-carriers via an FFT operation, and then reconstructs the reception bitstream via demodulation and decoding. The baseband processor 16-20 and the RF processor 16-10 transmit and receive signals as described above. Accordingly, the baseband processor 16-20 and the RF processor 16-10 may be referred to as a transmitter, a receiver, a transceiver, a communicator, or a wireless communicator.

The communicator 16-30 provides an interface configured to perform communication with other nodes within a network.

The storage 16-40 stores data, such as a default program, an application program, and configuration information, for operation of the main base station. In particular, the storage 16-40 may store information on a bearer assigned to a connected terminal, a measurement result reported from a connected terminal, and the like. The storage 16-40 may store information serving as a criterion for determining whether to provide the terminal with multi-connectivity or to suspend multi-connectivity. The storage 16-40 provides stored data in response to a request of the controller 16-50.

The controller 16-50 controls overall operations of the main base station. For example, the controller 16-50 transmits or receives a signal via the baseband processor 16-20 and the RF processor 16-10 or via the backhaul communicator 16-30. The controller 16-50 records and reads data in the storage 16-40. To this end, the controller 16-50 may include at least one processor. The controller 16-50 may further include a multi-connectivity processor 16-52 for supporting multi-connectivity.

The controller 16-50 transmits via the communicator 16-30 to the terminal a control message such as a radio resource control (RRC). For example, the controller 16-50 the RRC message including an indicator for indicating that an uplink data compression (UDC) is continuously used. the indicator for indicating that an uplink data compression (UDC) is continuously used may be a drb-ContinueUDC.

The embodiments of the disclosure described and shown in the specification and the drawings are merely specific examples that have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

In addition, it will be apparent that a combination of all or a part of a particular embodiment with all or a part of one or more other embodiments set forth herein falls within the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    identifying an acknowledged mode (AM) data radio bearer (DRB) whose a packet data convergence protocol (PDCP) entity is not suspended, in case that a PDCP entity re-establishment is requested from an upper layer;
    identifying whether an indicator is configured for indicating that the PDCP entity continues an uplink data compression (UDC) protocol and whether a PDCP service data unit (SDU) is compressed, for the AM DRB whose the PDCP entity is not suspended; and
    performing an integrity protection or ciphering for the PDCP SDU compressed, in case that the indicator is configured for indicating that the PDCP entity continues the UDC protocol and the PDCP SDU is compressed.

2. The method of claim 1, further comprising:
    performing uplink data compression of the PDCP SDU, in case that the indicator is not configured for indicating that the PDCP entity continues the UDC protocol or the PDCP SDU is not compressed.

3. The method of claim 1, further comprising:
    submitting a PDCP protocol data unit (PDU) to a lower layer based on a result of the performing the integrity protection or ciphering for the PDCP SDU compressed.

4. The method of claim 1, wherein the indicator for indicating that the PDCP entity continues the UDC protocol is configured based on a radio resource control (RRC) message.

5. The method of claim 1, wherein a retransmission or a transmission of all PDCP SDUs is performed in ascending order of count values associated to the PDCP SDU, from a first PDCP SDU for a successful delivery of a corresponding PDCP Data PDU has not been confirmed by lower layers, for the AM DRB whose the PDCP entity is not suspended.

6. A terminal in a wireless communication system, the terminal comprising:
    at least one processor configured to:
    identify an acknowledged mode (AM) data radio bearer (DRB) whose a packet data convergence protocol (PDCP) entity is not suspended, in case that a PDCP entity re-establishment is requested from an upper layer,
    identify whether an indicator is configured for indicating that the PDCP entity continues an uplink data compression (UDC) protocol and whether a PDCP service data unit (SDU) is compressed, for the AM DRB whose the PDCP entity is not suspended, and
    perform an integrity protection or ciphering for the PDCP SDU compressed, in case that the indicator is configured for indicating that the PDCP entity continues the UDC protocol and the PDCP SDU is compressed.

7. The terminal of claim 6, wherein the at least one processor is further configured to:
    perform uplink data compression of the PDCP SDU,
    in case that the indicator is not configured for indicating that the PDCP entity continues the UDC protocol or the PDCP SDU is not compressed.

8. The terminal of claim 6, wherein the at least one processor is further configured to:
    submit a PDCP protocol data unit (PDU) to a lower layer based on a result of the performing the integrity protection or ciphering for the PDCP SDU compressed.

9. The terminal of claim 6, wherein the indicator for indicating that the PDCP entity continues the UDC protocol is configured based on a radio resource control (RRC) message.

10. The terminal of claim 6, wherein a retransmission or a transmission of all PDCP SDUs is performed in ascending order of count values associated to the PDCP SDU, from a first PDCP SDU for which a successful delivery of a corresponding PDCP data PDU has not been confirmed by lower layers, for the AM DRB whose the PDCP entity is not suspended.

* * * * *